US005835697A

United States Patent [19]

Watabe et al.

[11] Patent Number: 5,835,697

[45] Date of Patent: Nov. 10, 1998

[54] INFORMATION PROCESSING SYSTEM

[75] Inventors: Toru Watabe; Yasutomo Sakurai; Takumi Kishino; Yoshio Hirose; Koichi Odahara; Kazuhiro Nonomura; Takumi Takeno; Shinya Katoh, all of Kawasaki; Takato Noda, Sendai, all of Japan

[73] Assignee: Fujitsu Limited, Kawasaki, Japan

[21] Appl. No.: 674,786

[22] Filed: Jul. 3, 1996

[30] Foreign Application Priority Data

| | | | |
|---|---|---|---|
| Jul. 13, 1995 | [JP] | Japan | 7-177102 |
| Mar. 28, 1996 | [JP] | Japan | 8-073541 |

[51] Int. Cl.[6] .......... G06F 11/00

[52] U.S. Cl. .......... 395/182.09; 395/183.07

[58] Field of Search .......... 371/22.1, 22.36; 395/180, 181, 182.01, 182.06, 183.01, 182.09, 182.04, 182.05, 182.11, 182.13, 182.19, 183.07, 183.11, 185.01, 185.08; 364/488, 489

[56] References Cited

U.S. PATENT DOCUMENTS

| | | | |
|---|---|---|---|
| 5,182,754 | 1/1993 | Koumoto et al. | 371/68.3 |
| 5,202,980 | 4/1993 | Morita et al. | 395/575 |
| 5,297,269 | 3/1994 | Donaldson et al. | 395/425 |
| 5,347,639 | 9/1994 | Rechtschaffen et al. | 395/375 |
| 5,452,443 | 9/1995 | Oyamada et al. | 395/182.08 |
| 5,530,946 | 6/1996 | Bouvier et al. | 395/182.21 |
| 5,572,663 | 11/1996 | Hosaka | 395/182.1 |
| 5,577,050 | 11/1996 | Bair et al. | 371/10.2 |
| 5,606,686 | 2/1997 | Tarui et al. | 395/448 |

FOREIGN PATENT DOCUMENTS

| | | |
|---|---|---|
| S59-220865 | 12/1984 | Japan . |
| H05-204692 | 8/1993 | Japan . |
| 2 268 817 | 1/1994 | United Kingdom . |
| 94/08293 | 4/1994 | WIPO . |

*Primary Examiner*—Robert W. Beausoliel, Jr.
*Assistant Examiner*—Nadeem Iqbal
*Attorney, Agent, or Firm*—Staas & Halsey

[57] ABSTRACT

A TMR unit connects a plurality of processors by a bus and simultaneously executes the same processing operation. Among the plurality of processors, one of them is a master and the remaining processors are slaves. Information formed by only the master processor is outputted to the bus. Each processor has a multiplex control circuit. The multiplex control circuit compares output information formed by itself with bus information outputted to the bus, thereby detecting a failure and allowing an internal circuit to execute necessary processes.

26 Claims, 144 Drawing Sheets

FIG. 9

| MODE | PROCESSOR 10-1 (MASTER) | PROCESSOR 10-2 (FIRST SLAVE) | PROCESSOR 10-3 (SECOND SLAVE) | JUDGMENT OF FAILURE PROCESSOR |
|---|---|---|---|---|
| 1 | ○ | ○ | ○ | ALL PROCESSORS ARE NORMAL |
| 2 | ○ | ○ | × | PROCESSOR 10-3 (SECOND SLAVE PROCESSOR) FAILS |
| 3 | ○ | × | ○ | PROCESSOR 10-2 (FIRST SLAVE PROCESSOR) FAILS |
| 4 | ○ | × | × | PROCESSOR 10-1 (MASTER PROCESSOR) FAILS |
| 5 | × | ○ | ○ | PROCESSOR 10-1 (MASTER PROCESSOR) FAILS |
| 6 | × | ○ | × | IMPOSSIBLE (DOUBLE FAILURE) |
| 7 | × | × | ○ | IMPOSSIBLE (DOUBLE FAILURE) |
| 8 | × | × | × | BUS FAILS |

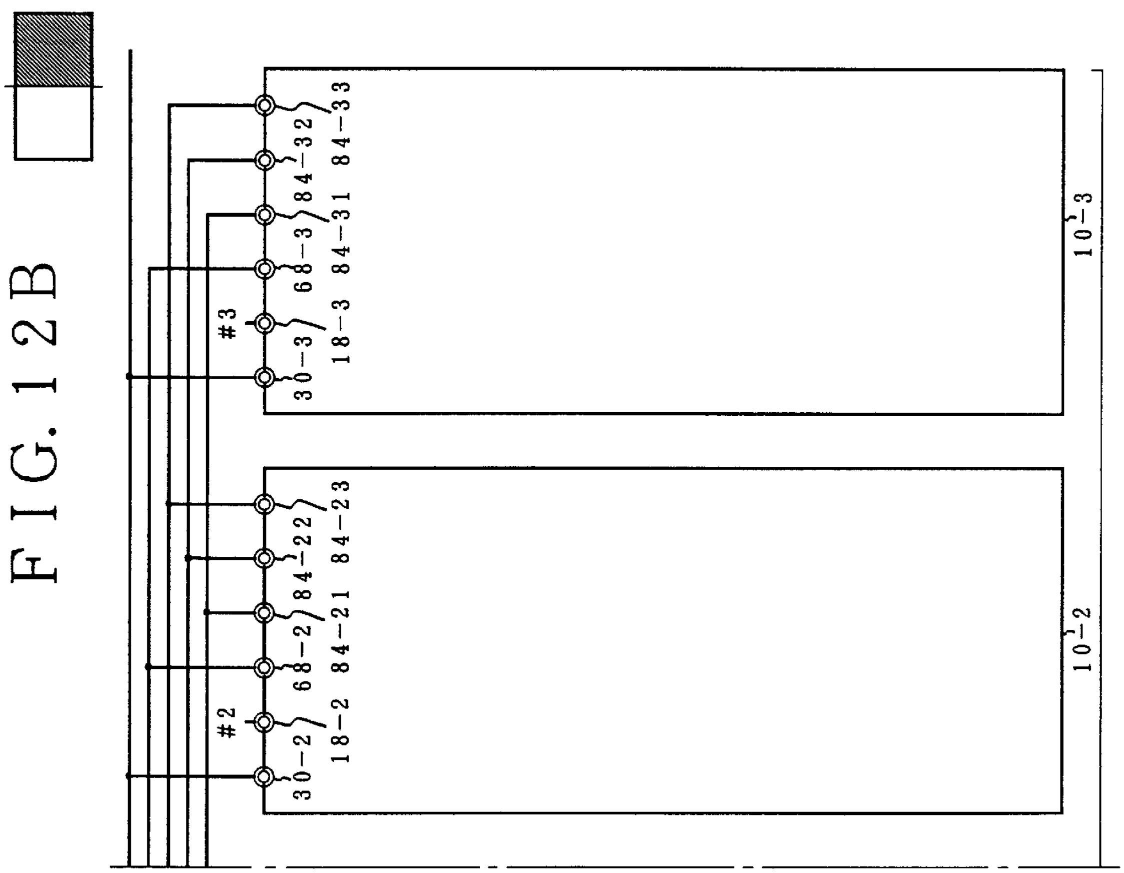
F I G. 1 2 B

FIG. 18

| PRESENT MASTER PROCESSOR NUMBER | NEW MASTER PROCESSOR NUMBER |
|---|---|
| #1 | #2 |
| #2 | #3 |
| #3 | #1 |

FIG. 22B
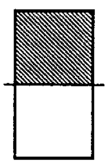
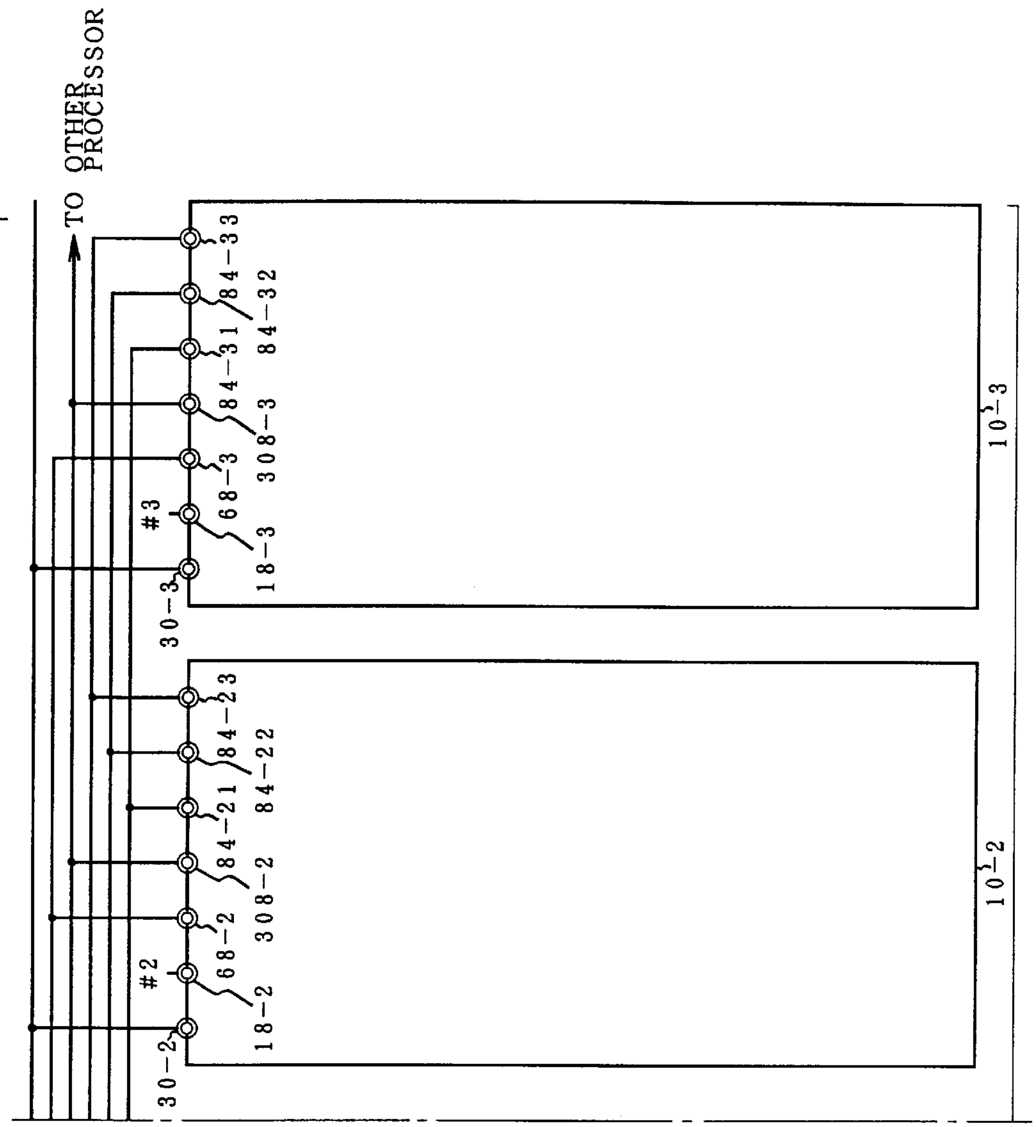

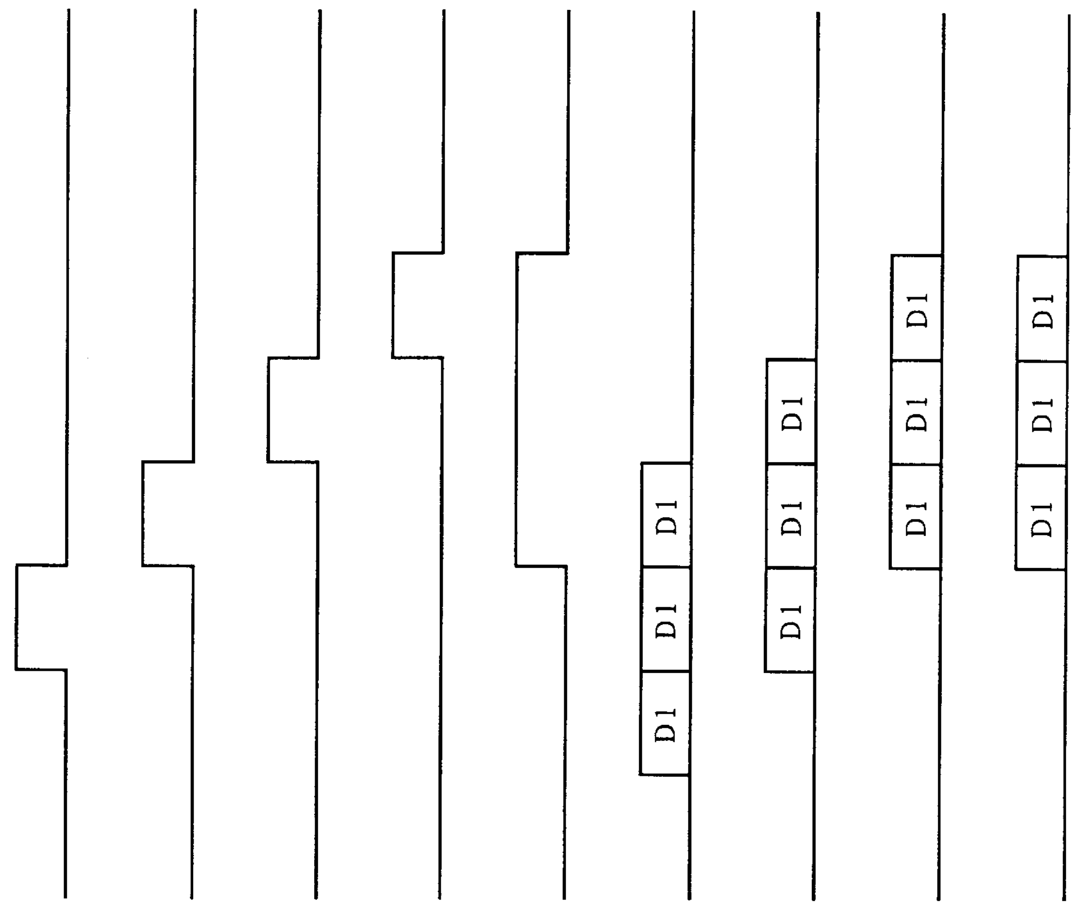
FIG. 26A RETRY SIGNAL E35
FIG. 26B FF330
FIG. 26C FF332
FIG. 26D FF334
FIG. 26E OR336 (E36)
FIG. 26F FF318
FIG. 26G FF320
FIG. 26H FF322
FIG. 26I OR328

FIG. 38B
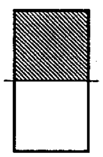
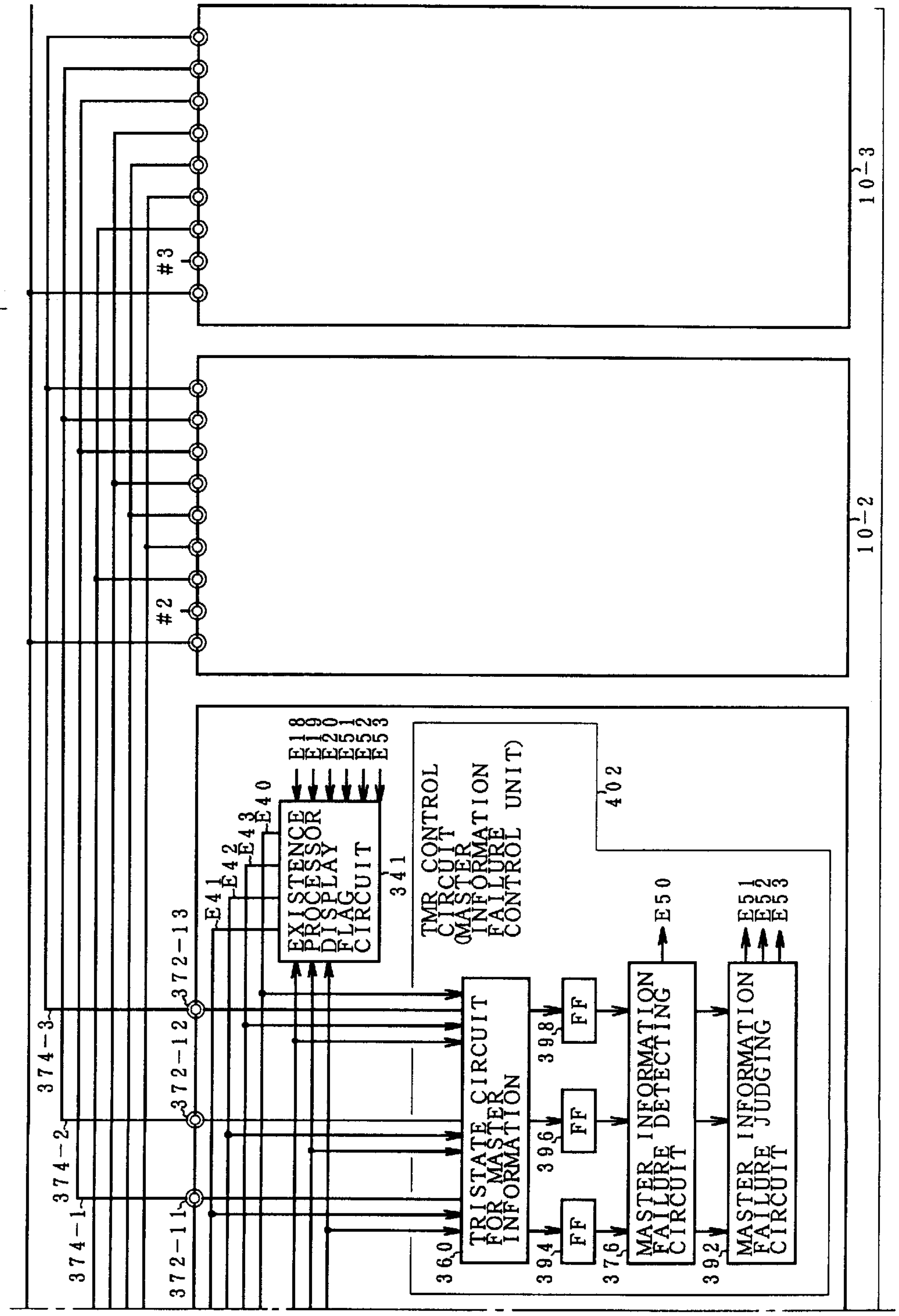

F I G. 4 3
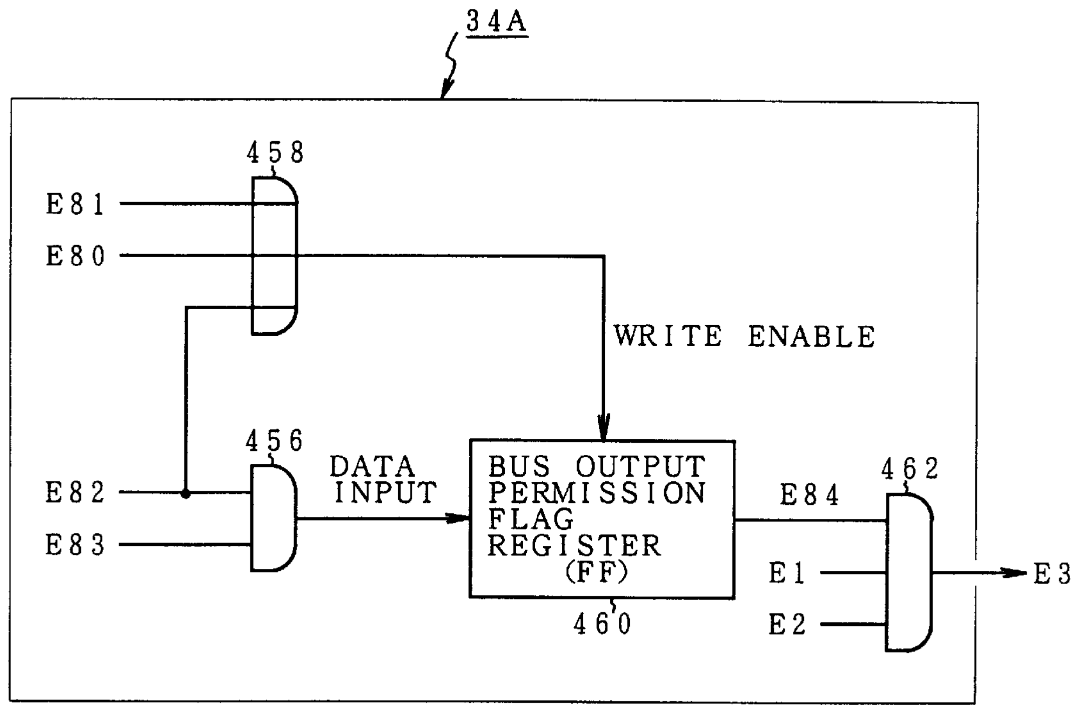

F I G. 4 5
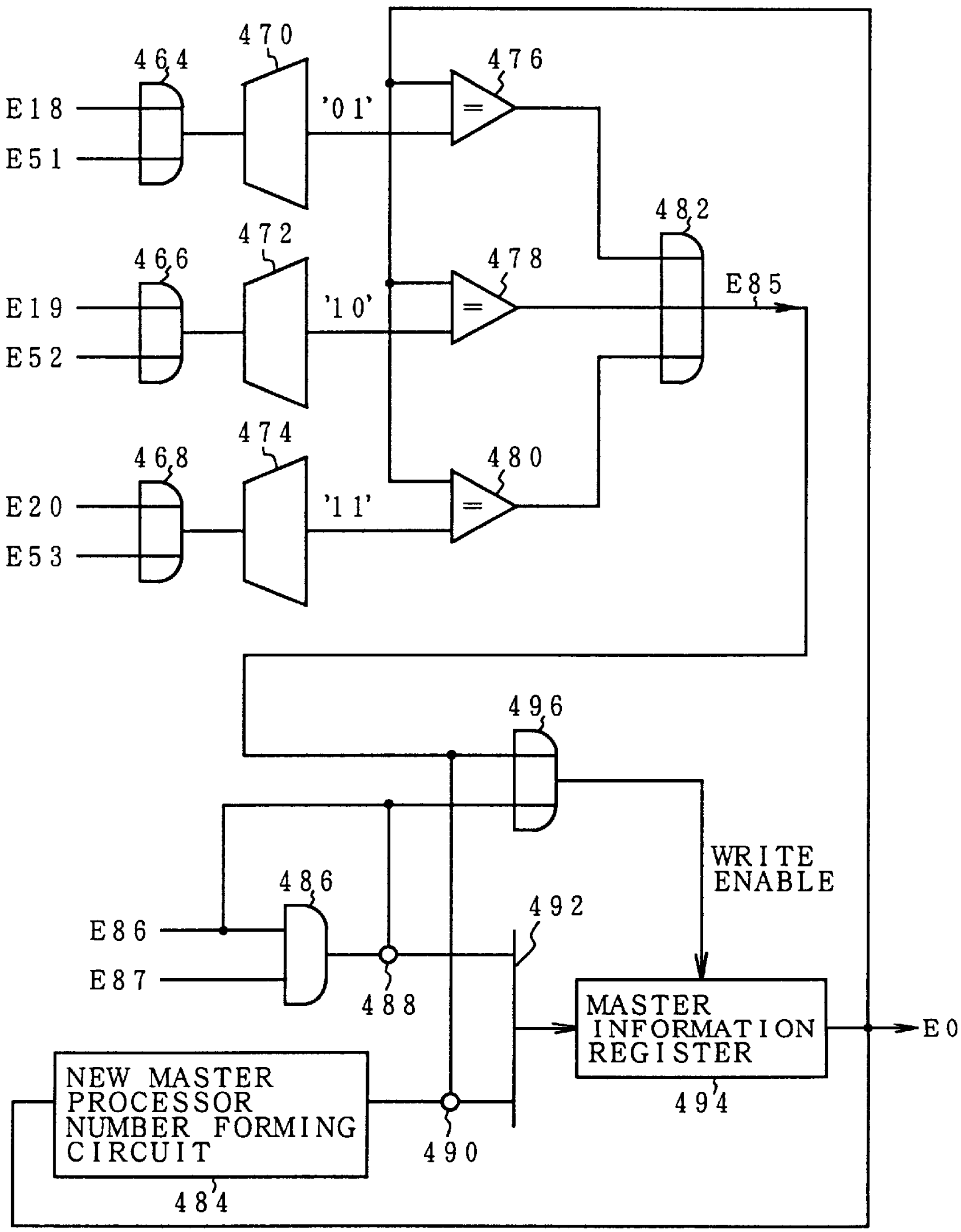

F I G. 4 7
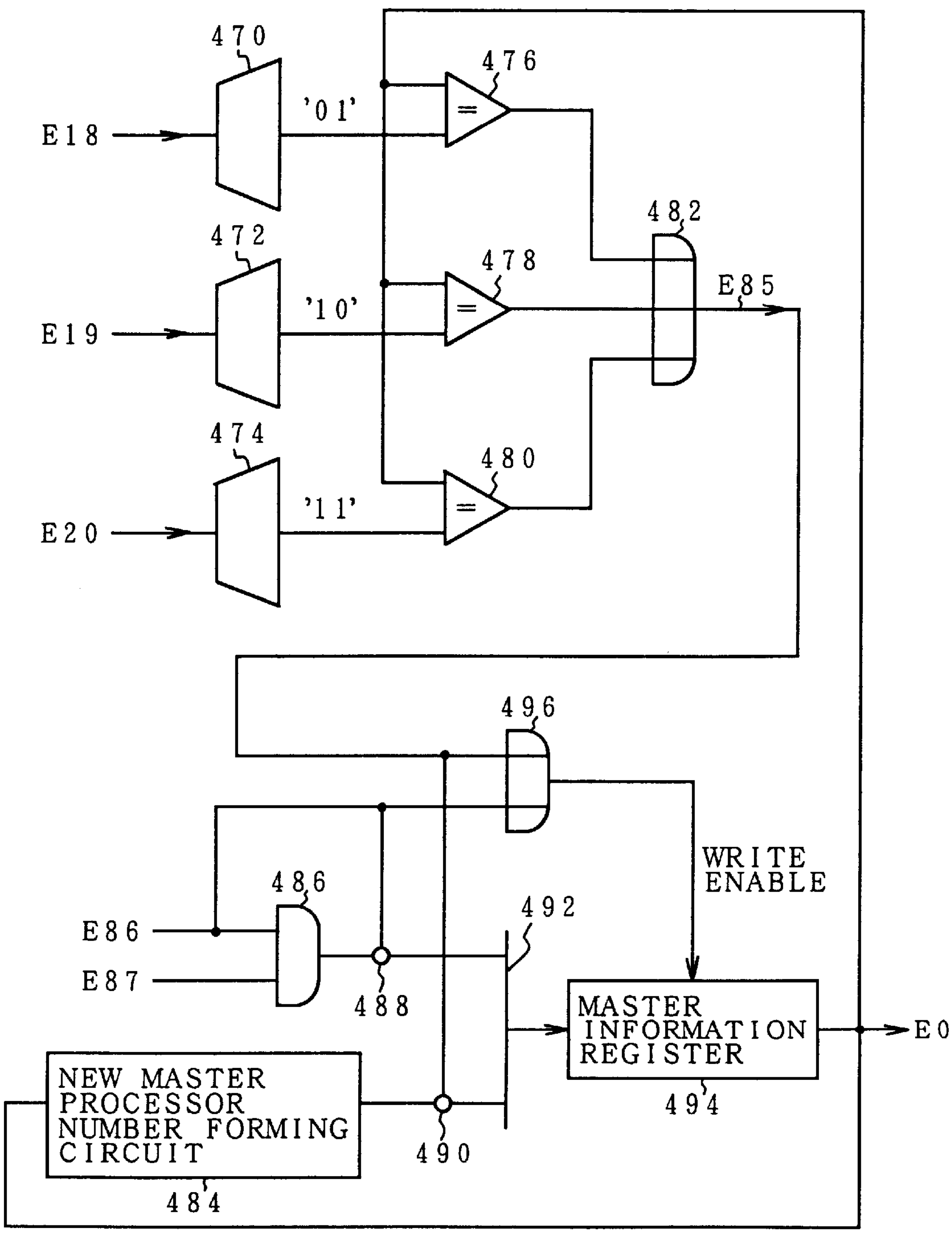

FIG. 53

| PROCESSOR 10-1 (MASTER) | PROCESSOR 10-2 (SLAVE) | PROCESSOR 10-3 (SLAVE) | JUDGMENT OF FAILURE PROCESSOR |
|---|---|---|---|
| ○ | ○ | ○ | ALL PROCESSORS ARE NORMAL |
| ○ | ○ | × | PROCESSOR 10-3 (SLAVE) FAILS |
| ○ | × | ○ | PROCESSOR 10-2 (SLAVE) FAILS |
| ○ | × | × | PROCESSOR 10-1 OR BUS FAILS |
| × | ○ | ○ | PROCESSOR 10-1 (MASTER) FAILS |
| × | ○ | × | IMPOSSIBLE (DOUBLE FAILURE) |
| × | × | ○ | IMPOSSIBLE (DOUBLE FAILURE) |
| × | × | × | PROCESSOR 10-1 (MASTER) FAILS |

* THE ABOVE TABLE SHOWS AN EXAMPLE IN THE CASE WHERE PROCESSOR 1 OPERATES AS MASTER PROCESSOR.

* THE MEANINGS OF THE ABOVE MARKS IN THE TABLE IS AS FOLLOWS.

○ : BUS INFORMATION FAILURE DETECTION SIGNAL OF THE RELEVANT PROCESSOR IS OFF. (NO FAILURE)

× : BUS INFORMATION FAILURE DETECTION SIGNAL OF THE RELEVANT PROCESSOR IS ON. (FAILURE EXISTS)

F I G. 6 1 A
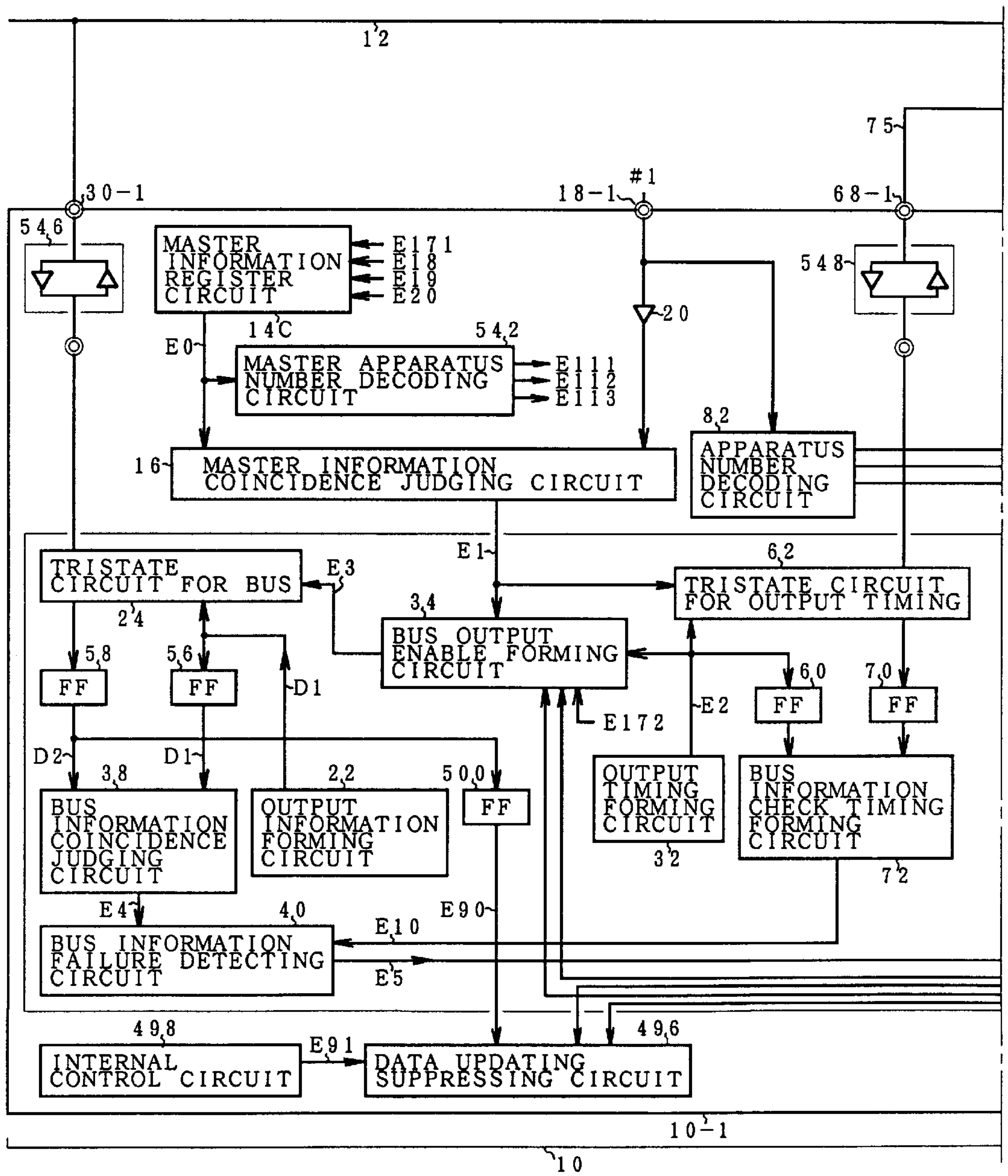

F I G. 6 8 A
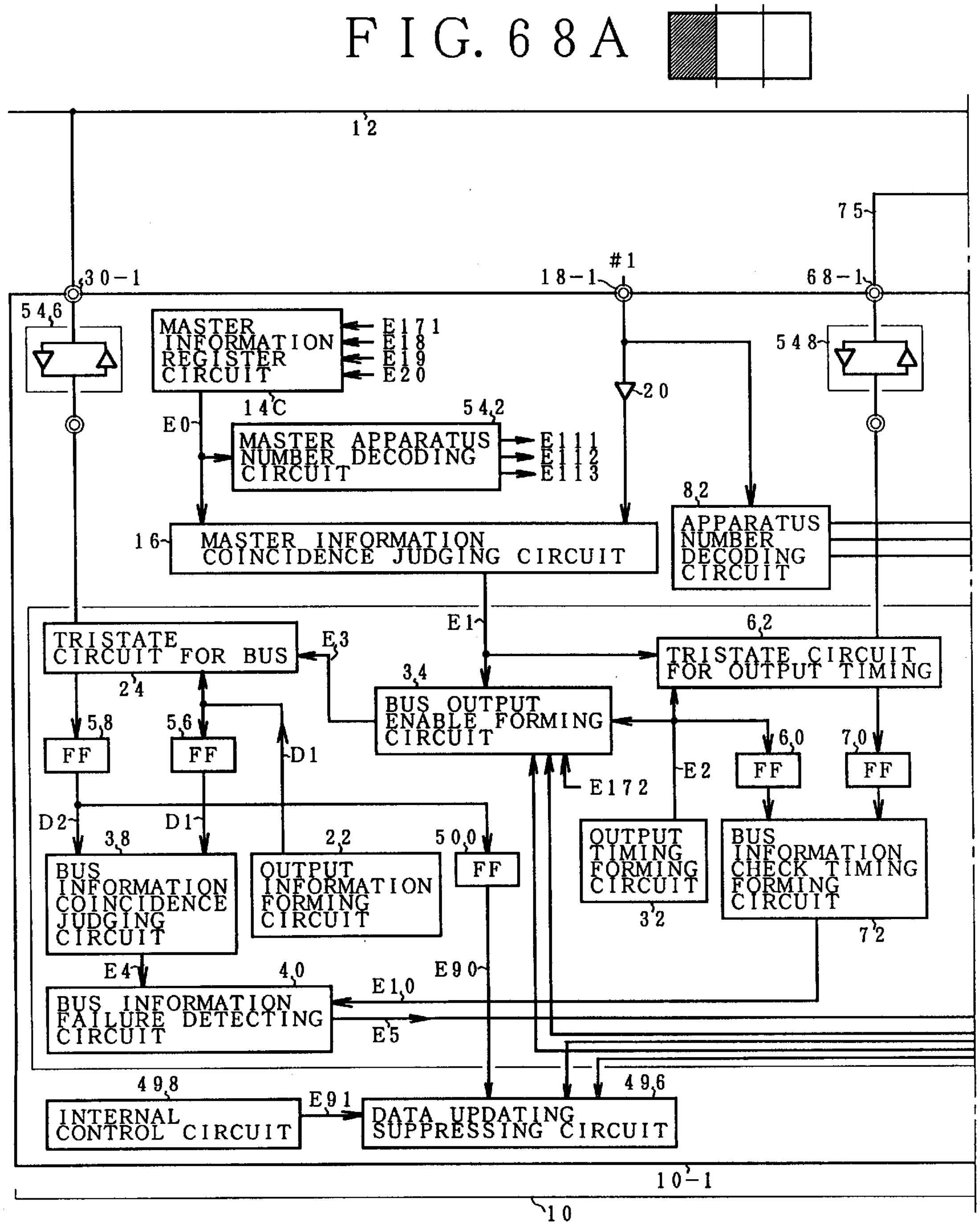

INFORMATION PROCESSING SYSTEM

BACKGROUND OF THE INVENTION

The invention relates to an information processing system of a high reliability in which a plurality of, for example, three processors constructing a multiplex unit are connected by a bus and the same process is simultaneously executed, thereby detecting a failure and executing a necessary process and, more particularly, to an information processing system of a high reliability in which one of the processors in the multiplex unit is set to a master processor and the remaining processors are set to slave processors and a failure is detected.

In recent years, in association with that the information processing system has widely been used in various fields, in the case where the information processing system fails, a possibility such that a large social and economical influence is exerted is considered.

Therefore, there is demanded an information processing system of a high reliability such that a failure hardly occurs as little as possible and even if a failure occurs, the failure can be certainly detected and, further, processes can be continued while keeping a consistency of the processing contents without stopping the operation of the processor.

Hitherto, as an information processing system of a high reliability, an information processing system having a multiplex construction comprising three or more processors has been provided. As a method of realizing such a multiplex processor, the following methods are considered. Processors such as three or more processors or the like and a majority decision logic circuit are prepared in one unit. The majority decision logic circuit uses a method whereby an arithmetic operation based on a majority decision logic is executed for output signals of three or more processors which are synchronously operating by the same clock and the result is transmitted to another processor such as a main memory unit or the like. In the multiplex processor using the majority decision logic, however, although the number of cycles which are executed by each processor doesn't increase, the number of execution cycles increases by only the number corresponding to the execution of the majority decision logic, so that a processing time is delayed. A hardware amount of the exclusive-use majority decision logic circuit itself is large. A number of signal lines are also needed between the processors and the majority decision logic circuit. A circuit construction becomes complicated and the costs are also high.

SUMMARY OF THE INVENTION

According to the invention, an information processing system of low costs and a high reliability which can sufficiently realize a high reliable function by a relatively small hardware amount is provided.

(TMR unit)

The information processing system of the invention is fundamentally based on a triple processor having, for example, three processors as a minimum construction. The triple processor having three processors is hereinafter referred to as a TMR unit. The TMR unit is an apparatus which satisfies the following conditions.

I. At least three processors are connected by a bus.

II. The three processors execute the same process synchronously with the same clock.

III. One of the processors is set to a master processor and the remaining processors are set to slave processors.

IV. The master processor outputs produced information to the bus and fetches information on the bus.

V. The slave processor doesn't output the produced information to the bus and executes only the fetching of the information on the bus.

With respect to such a TMR unit, according to the invention, a multiplex control circuit (TMR control circuit) is provided for each of a plurality of processors. The TMR control circuit detects a failure on the basis of a comparison between the output information formed by the processor and the bus information outputted onto the bus, thereby allowing an internal circuit to execute a necessary process. The information which is formed by the processor and is outputted to the bus denotes various information such as data, address, bus control information, and the like. The TMR control circuit has a bus information coincidence judging circuit for detecting a failure of the bus information from a dissidence between the bus information and the output information formed by each processor and executes the judgment of the failure detection by the bus information coincidence judging circuit at an output timing of the output information formed by each processor. The TMR control circuit comprises: an output timing forming circuit for forming a timing signal indicative of the information output timing when the information formed is outputted onto the bus; a timing signal output circuit for outputting a timing signal to the other processors by an exclusive-use signal line in an allocation state of the master processor; and a bus information failure detecting circuit for performing a failure detection by the comparison between the bus information and the output information by the timing signal inputted from the signal line or by a timing signal formed by the processor itself in the allocation state of the master processor and for comparing the bus information and the output information to thereby detect a failure when they don't coincide by the timing signal from the master processor inputted from the signal line or the timing signal formed by the processor itself in the allocation state of the slave processor. In case of the multiple bus construction, the output timing forming circuit, timing signal output circuit, and bus information failure detecting circuit are provided every bus. When the failure of the master processor is detected, the TMR control circuit of the processor to which the master processor was allocated disconnects from the bus by the processor itself. In the TMR control circuit of the processor to which the slave processor was allocated decides a new master processor among the remaining processors, thereby reconstructing a reduced multiplex unit. The TMR control circuit has master information register circuit in order to set the master processor.

According to such an information processor of the high reliability of the invention, in case of outputting information including the formed data, address, and other bus control information to the bus, only the information formed by the master processor is outputted to each processor constructing the TMR unit. The information formed by the slave processor is suppressed so as not to be outputted to the bus. In this state, each processor constructing the TMR unit fetches the information outputted onto the bus at a timing to output the information formed by the processor, judges whether the output information formed by the processor and the information on the bus coincide or not at the information output timing formed by the processor, and discriminates the failure in the TMR unit when they don't coincide. The number of buses can be set to one or a multiple bus construction can be used. In case of the multiple bus construction, the failure detection is performed every bus. In the case where a failure of a specific bus is detected, the failed bus is disconnected and the processes are continued by a reduced construction using only the remaining normal buses. Each processor constructing the TMR unit temporarily holds the bus information received from the bus, output information formed by the processor, and information output timing into the processor and, thereafter, performs a failure detection. In this case, although the number of access cycles of the bus slightly increases, since there is no need to maintain the information on the bus until the end of the detecting process, a cycle time of the bus can be reduced (high speed is realized) and a whole bus performance can be improved. In case of outputting information onto the bus, the master processor simultaneously outputs a signal indicative of the information output timing. The outputted timing signal is inputted to each processor constructing the TMR unit by using an exclusive-use signal line prepared among the processors constructing the TMR unit.

Each processor including the master processor constructing the TMR unit gets the OR of the information output timing signal sent from the master processor and a similar information output timing signal formed by each processor and uses it as an internal coincidence detection timing signal. The detection about the dissidence by the comparison between the bus information and the output information formed by the processor is performed on the basis of the coincidence detection timing signal. As for the detection of the coincidence of the bus information which is always outputted, it is sufficient to compare the information on the bus and the output information formed by each processor without using any special output timing signal.

In the case where a failure due to the dissidence of the bus information is detected in each processor constructing the TMR unit, each processor forms a failure detection signal and sends to each processor by using the exclusive-use signal line prepared among the processors. Each processor including the master processor judges the occurrence of the failure by the failure detection signal sent. When the failure is detected, each processor constructing the TMR unit judges a failed portion in accordance with a judging pattern of the failure detection signal received. When the failure is detected, in order to suppress a breaking of various resources by the failure data, the information inputted from the bus is held for only a necessary time until the completion of the failure detection and the held information is used to control the internal circuit. When the failure is detected, the updating of the various resources of the internal circuit is suppressed. Further, the failed processor is disconnected from the bus by the failure detection. When it is judged that the processor disconnected from the bus is the master processor, a new master processor is determined from the remaining normal processors. When the new master processor is again decided and the reduced TMR unit is reconstructed, the new master processor again transfers the information held due to the occurrence of the failure to the bus, thereby allowing a retry to be executed. The retransfer can be performed by a transfer instruction in the processor or it is also possible to connect the exclusive-use signal lines to the processors and to send a signal to instruct the retransfer from a master processing signal which detected the failure. The retransfer is not limited to the processor constructing the TMR unit but is similar in the cases of the other processors connected to the same bus.

(Existing processor display flag)

The TMR control circuit of the processor constructing the TMR unit has an existence processor display flag circuit with an existence processor display flag indicating which processor is at present normally operating and which processor is disconnected from the multiplex unit due to a failure or the like. A flag signal of the existence processor display flag is used as a mask output and a mask input of a failure judgment result. For example, an output mask circuit masks the output of the information from the processor itself by the signal of the existence processor display flag indicating that the processor itself is in the OFF state because of the disconnection from the TMR unit and generates the masked output. Thus, it is prevented that the processor disconnected from the TMR unit notifies the other processors constructing the TMR unit of the erroneous failure detection result and causes those processors to erroneously operate. Since the TMR control circuit has a bus output permission flag circuit in which a bus output permission flag that is turned on in an output permission state of the bus has been set, the output mask circuit masks the output of the information from the processor itself by a signal of the bus output permission flag and generates the masked output. Thus, a situation such that the processor disconnected from the TMR unit notifies the other processors constructing the TMR unit of the erroneous failure detection result and causes those processors to erroneously operate is certainly prevented twice. The flag signal of the existence processor display flag is used to mask the output information from the other processors in an input mask circuit. Thus, even if an erroneous failure detection result is notified from the other processor disconnected from the TMR unit, the erroneous operation can be prevented. The TMR control circuit of each processor has a master information notifying circuit for inputting and outputting master information indicating each processor recognizes which processor as a master processor through the exclusive-use signal lines, thereby mutually notifying the master information. The TMR control circuit has a master information failure judging circuit and forms a master failure judging signal indicative of the processor which caused a master information failure on the basis of a comparison result between the master information of the processor itself and the master information notified from the other processor in the master information notifying circuit. In the case where the failure of the bus information of the master processor or the failure of the master information of the master processor is discriminated, each processor constructing the TMR unit determines a new master processor from the remaining normal processors and updates the contents of the master information.

(Bus failure possibility flag)

In the case where each processor constructing the TMR unit has a construction such that a transceiver circuit is further provided between the TMR control circuit and the bus, when a failure of the bus itself occurs, a failure detection pattern such that the master processor is normal and there is a bus information failure in all of the slave processors is obtained. The failure detection pattern is judged like a master processor failure by a majority deciding process. Therefore, a bus failure detecting circuit for turning on a bus failure possibility flag when the bus failure possibility pattern is detected is provided. When the bus failure possibility pattern is detected, the bus failure possibility flag is turned on and the master processor is updated and a disconnection of the old master processor from the multiplex unit is not performed. When the failure of the bus failure possibility pattern once occurs and the failure of the old master processor is detected after the bus failure possibility flag was turned on, it is judged that the old master processor failed. The old master processor is disconnected from the multiplex unit. When the failure of the bus failure possibility pattern once occurs and the failure of the bus itself is detected after the bus failure possibility flag was turned on, since the bus failure possibility pattern is again detected, the bus itself is disconnected in this instance. In case of the multiplex construction of the bus, the bus failure detecting circuit is provided every bus. When the failure of the bus itself is detected, the failed bus is disconnected, only the remaining normal buses are used, and the processes are continued by the reduced bus construction. Further, when the processor constructing the TMR unit fails, the failed processor is ordinarily automatically disconnected by a hardware, a reduced construction is formed, and the processes are continued.

(Wake-up mode)

For example, a processor fails among a plurality of processors constructing the TMR unit, the TMR unit reduced to two processors is reconstructed. A case of constructing the TMR unit by two processors is also included. In this case, it is necessary to exchange the failed processor to a new processor and to return to a triple construction. To return to the triple construction, after completion of the synchronization of the clock level of the exchange processor, it is necessary to copy the contents in a memory of the processor of the TMR unit to a memory of the exchange processor and to make them coincide. However, when the multiplexing operation is executed during the copying operation into the memory, the contents in the memory on the copy source side which were copied are rewritten and the coincidence of the memory contents cannot be guaranteed. Therefore, until the memory copy is completed, the multiplexing operation as a TMR unit cannot help being inhibited. During such a period of time, the system enters a stop state.

According to the invention, therefore, an information processor of a high reliability which can minimize a system stop time from the exchange of the failed processor to the start of the multiplexing operation is provided.

According to the information processor of a high reliability of the invention, a wake-up mode is set by a mode setting unit when, for example, the processor disconnected from the TMR unit due to a failure is exchanged to a new processor and the synchronization of the clock level with the processor constructing the TMR unit is executed. In the set state of the wake-up mode, a memory control unit of the master processor allows an internal memory access to be executed via the bus and a memory control unit of each of the slave processor and the exchange processor allows an internal memory access to be executed by fetching the data on the bus. Specifically speaking, a read access is as follows in the set state of the wake-up mode. In the case where there is a read access from the processor to the memory, the memory control unit of the master processor transfers read data of the memory to the bus and, at the same time, fetches the read data from the bus and transfers to the processor. In the case where there is a read access to the memory, the memory control unit of each of the slave processor and the exchange processor fetches the read data transferred by the master processor from the bus and transfers to the processor. A write access in the set state of the wake-up mode is as follows. When there is a write access from the processor to the memory, the memory control unit of the master processor transfers write data of the memory to the bus and, at the same time, fetches the write data from the bus and transfers to the memory and writes therein. When there is a write access to the memory, the memory control unit of each of the slave processor and the exchange processor fetches the write data transferred by the master processor from the bus and writes into the memory. In the set state of the wake-up mode after the failed processor was exchanged as mentioned above, all of the data by the memory access of the master processor is transferred onto the bus and is reflected to the memory of each of the slave processor and the exchange processor. Therefore, even when the multiplexing operation and the memory copying operation are executed in parallel, a situation such that the memory contents which were copied by the memory rewriting operation by the multiplexing operation don't coincide doesn't occur. Thus, a time of the system stop as a TMR unit can be suppressed to the minimum time from the exchange of the failed processor to the accomplishment of the synchronization of the clock level. When the synchronization of the clock level is obtained, even if the memory copy is not completed, the multiplexing operation as a TMR unit can be restarted. Further, when the memory copy is completed, the system can be shifted to the multiplexing operation due to the reconstruction of the TMR unit including the exchange processor.

(Directory system)

The TMR unit of the invention uses a memory system of a directory system in order to cope with an increase in memory capacity, an increase in number of processors, and a common bus performance. According to the directory method, the memory is divided on a certain block unit basis and information indicating in which state each memory block is is held in a directory memory by an entry (address) corresponding to a block address. As a memory block state of the main memory, there are a shared state indicative of a state in which the same data is held in caches of one or a plurality of processors, a dirty state indicative of a state in which the newest data to be held in the cache and the memory contents are different, an invalid state in which the data in the main memory is newest and doesn't exist in the caches of all processors, and the like. The directory memory needs a capacity corresponding to a value in which the size of memory to be managed is divided by the block size and has a fairly large memory capacity. In the TMR unit as a high reliable system of the invention, when the failed processor is exchanged to a new processor without shutting off the power source of the system, the system operation as a TMR unit is stopped and a synchronizing state and an internal state of the clock level are set to the same states between the failed processor and the exchanged processor. Subsequently, the system is activated and the contents in the memory of the existing processor are copied into the exchange processor. After that, the TMR unit is reconstructed and the multiplexing operation as an inherent TMR unit is restarted. When the internal states are set to the same state between the processors in association with the exchange of the processor, it is necessary to invalidate all of the contents in the directory memory. Namely, when the system is stopped, with respect to the master processor and the slave processor, all of the blocks each of which enters the dirty state in the directory memory and in each of which the newest data exists in the cache are written back into the main memory and are set into the invalid state. After that, the contents in the directory memories of all of the processors including the exchange processor are invalidated and are set into an initial state. It is necessary to finish the invalidation of the directory memories in this case in a short time by executing the invalidating process at a high speed. That is, in the invalidating process, the processor sequentially writes the value indicative of the invalidation every entry into the directory memory via a directory memory control unit. Therefore, in the case where the processor executes the writing operations of all of the entries and invalidates, the system operation of the TMR unit is stopped for a period of time of the invalidation. In the information processor of a high reliability of the invention, there is a case where an influence is exerted on the operation even due to the stop of the system of a short time such as a few milliseconds.

According to the invention, the information processing system of a high reliability which can instantaneously complete the invalidation of the directory memory is provided. According to each of the processors constructing the TMR unit, directory information indicative of the state of each memory block in the main memory which was divided into a predetermined block size is stored into the directory memory, and upon initial setting of the system by the turn-on of the power source, a specific value α is written into a specific bit of the directory information. An instructing register in which the same value α as that of the specific bit of the directory information has been stored is prepared. A data control unit of the directory memory compares the value of the specific bit with the instructed register value when reading the directory memory. When they coincide, the directory information is made valid. When they differ, the directory information is updated into a value indicative of the invalidation showing that the data in the main memory is newest and doesn't exist in the other portions. Therefore, at the time of the exchange of the processor, by merely changing the value of the instructing register to another value by the invalidating unit, all of the contents in the directory memory can be instantaneously invalidated by the data control unit. It is also possible to provide a control register for inhibiting the invalidation of the directory memory by the data control unit and to make the directory information valid even when the value of the instructing register and the value of the specific bit of the directory information don't coincide. Such a construction can be used in the case where the invalidation during the operation is unnecessary as in the case where the processor disconnected from the TMR unit due to a failure is used as a processor other than the TMR unit after the repair of the failure or the like. In the TMR unit, there is also a case where the user wants to invalidate a plurality of number of times. In this case, when the invalidation is once performed, the specific bit of the directory memory is changed to the value which was changed by the instructing register. Therefore, in the case where the instructing register is returned to the original value by the end of the invalidation and the value of the instructing register is again changed by the next invalidation, the specific bit of the directory memory has already been changed by the previous invalidation and coincides with the value of the instructing register, so that it becomes valid and cannot be invalidated. Therefore, after completion of the invalidation, it is necessary to perform a reinitialization for returning a value β of the specific bit of the directory memory to the original value α. However, the initialization during the operation becomes a burden of the processor. Therefore, in the invention, the following initializing function is provided for the control unit of the directory memory. That is, an initialization activating register and an initialization completion display register are provided and when a predetermined value is written into the initialization activating register from the processor, an initialization control unit allows the data control unit to start the initializing operation of the directory memory.

During the initializing operation, the same value α as that in the instructing register is written into the specific bit of the directory memory and a value indicative of the invalidating state is written into the other bits. After completion of the writing into all of the regions (all entries) in the directory memory, a value indicative of the completion of the initialization is written into the completion display register. By executing such an initialization of the directory memory after the invalidation, the invalidation of a plurality of number of times is enabled. In the initializing operation of the directory memory, when a processing interval of every entry is short, an access from the processor becomes busy and becomes a cause of a deterioration of the performance. Therefore, a time interval instructing register is provided, a time interval of the initializing operation of an entry unit of the directory memory by the initialization control unit is designated, a busy for the access of the processor is reduced, and the deterioration of the performance is suppressed. The main memory has an arbitrary installing state in a maximum installation possible range. The directory memory has entries of the number obtained by dividing the maximum capacity of the maximum installation of the main memory by the block size. However, when the initialization of the entries of the uninstalled main memory is executed at the time of the initializing process, the time for the initialization is increased more than it is needed. Therefore, an initialization entry number register for instructing the number of initialization entries according to the installation number in the main memory is provided and, in an address comparing unit, when the initialization target address to be updated during the initializing operation coincides with the number of entries which is instructed by the initialization entry number register, the end of the initializing operation is instructed to the initialization control unit. Thus, the initialization of only the entries of the directory memory corresponding to the installation number in the main memory is enabled. Since there is also a case where the installation in the main memory is intermittently executed, the initialization entry number which is instructed by the initialization entry register is added to a start address which is instructed by an initialization start address register by an address adding unit, thereby obtaining an initialization end address. In the address comparing unit, when the initialization target address to be updated during the initializing operation coincides with the address from the adding unit, the end of the initializing operation is instructed, thereby enabling the initialization of discrete installation entries in the directory memory corresponding to the installation number in the main memory. In this case, it is also possible to provide an end address register to instruct an initialization end address without using the address adding unit.

The above and other objects, features, and advantages of the present invention will become more apparent from the following detailed description with reference to the drawings.

BRIEF DESCRIPTION OF THE DRAWINGS

FIG. 9 is an explanatory diagram of judgment contents of the failed portion according to the embodiment of FIG. 8;

FIGS. 12A and 12B are block diagrams of an embodiment of the invention for disconnecting a failed processor from a TMR unit;

FIG. 18 is an explanatory diagram of an updating of a master processor number according to FIG. 17;

FIGS. 22A and 22B are block diagrams of an embodiment of the invention for instructing a retransfer of the holding information when a failure occurs;

FIGS. 26A to 26I are timing charts showing the operation of FIG. 25;

FIGS. 38A and 38B are block diagrams of a TMR unit having a function for turning off the existence processor display flag when a failure is detected;

FIG. 43 is a block diagram of a bus output enable forming circuit in FIGS. 40A and 40B;

FIG. 45 is a block diagram of a master information register circuit in FIGS. 44A and 44B;

FIG. 47 is a block diagram of a master information register circuit in FIGS. 46A and 46B;

FIG. 53 is an explanatory diagram of a bus failure pattern in FIGS. 52A to 52C;

FIGS. 61A, 61B, and 61C are block diagrams of a TMR unit for turning off a bus output enable flag when a bus failure is detected and for disconnecting a failed bus;

FIGS. 68A, 68B, and 68C are block diagrams of a TMR unit having a bus failure display flag;

FIG. 84 is a flowchart for an initializing process of the directory memory when a power source is turned on;

DETAILED DESCRIPTION OF THE PREFERRED EMBODIMENT

[TMR construction]

Figure 1:
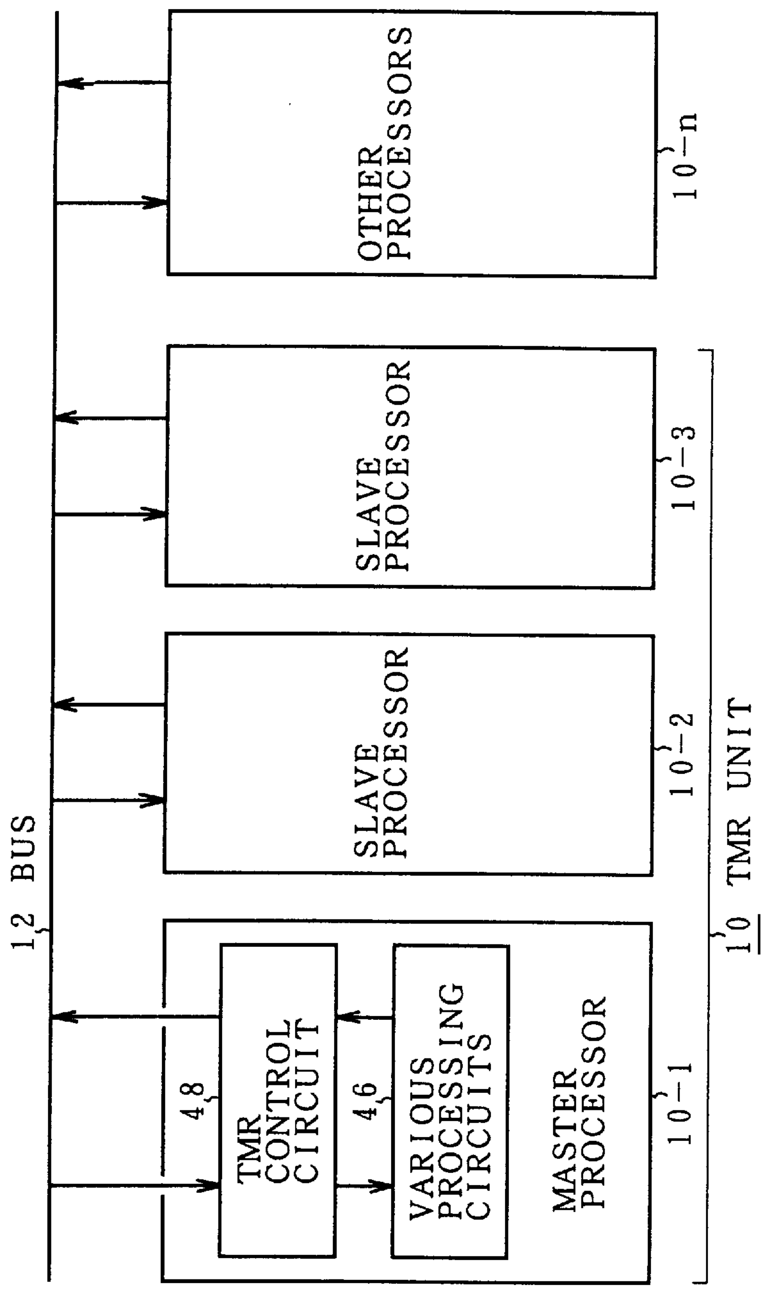
FIG. 1 is an explanatory diagram of a principle of the invention.

FIG. 1 is a diagram showing a TMR construction in an information processing system of a high reliability according to the invention. A TMR unit 10 has at least three processors 10-1, 10-2, and 10-3. The processors 10-1, 10-2, and 10-3 constructing the TMR unit 10 are connected to a bus 12 in order to transmit and receive information. A processor 10-n other than the TMR unit 10 is also connected to the bus 12. In the following description, the processor denotes the processors 10-1 to 10-3 constructing the TMR unit 10 unless otherwise specially explained.

As for the processors 10-1 to 10-3 constructing the TMR unit 10, during the operation in the TMR construction, one of the processors 10-1 to 10-3 operates as a master processor and the remaining two processors operate as slave processors. Ordinarily, the master processor outputs information necessary for the bus 12, all of the processors (one master processor and two slave processors) check the information on the bus 12, thereby detecting a failure.

Figure 2:
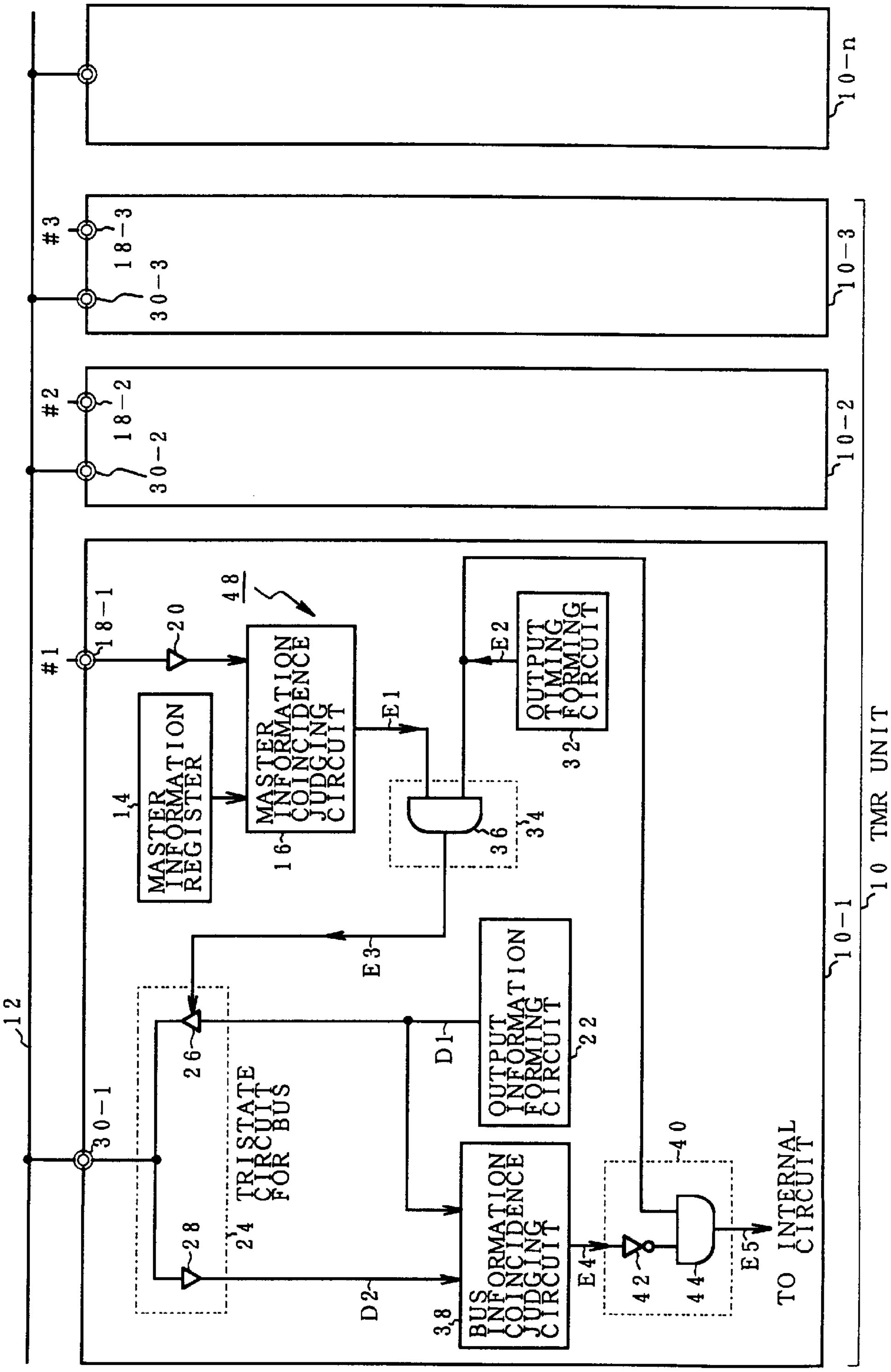
FIG. 2 is a block diagram of an embodiment for detecting a failure of a TMR system according to the invention.

FIG. 2 is a diagram showing the details of the TMR unit 10 in FIG. 1. A construction and the operation will now be described with respect to a TMR control circuit 48, as an example, provided for the processor 10-1. Processor numbers #1 to #3 which were set so as not to overlap among the processors constructing the TMR unit 10 are inputted to the processors 10-1 to 10-3 from the outside. The processor numbers #1 to #3 can be also set in the processors without inputting from the outside. However, by using a method of automatically inputting a fixed processor number at a time point when the processor is inserted into, for example, a back panel or the like instead of performing any special setting in the processor, a possibility of the occurrence of an erroneous setting is eliminated. It is, therefore, advantageous to set the processor number by the external input as an information processor of a high reliability. When considering the processor 10-1 as an example, a master information register 14 is prepared in the processor and a present master processor number, for example, #1 is set. The master processor number #1 is also similarly set in the master information registers 14 of the other processors 10-2 and 10-3. The processor number #1 of the self processor which was inputted from the outside through an input terminal 18-1 and a driver 20 and the master processor number #1 held in the master information register 14 are inputted to a master information coincidence judging circuit 16. The master information coincidence judging circuit 16 detects a coincidence between the two inputted processor numbers. When the processor numbers coincide, it is judged that the self processor is the master processor. A self master signal E1 is turned on. The turn-on of the signal denotes that a logic level of the signal is set to the H level. Therefore, the turn-off of the signal denotes that the signal at the H level is trailed to the L level. In the processor 10-1, since both of the two processor numbers inputted by the master information coincidence judging circuit 16 are equal to #1, the self master signal E1 is turned on. On the other hand, since the processor numbers don't coincide on the sides of the processors 10-2 and 10-3, it is judged that the self processor is a slave processor. The self master signal E1 is turned off.

An output information forming circuit 22 provided for the processor 10-1 forms output information D1 as necessary by various instructions from the internal circuit (not shown). Data, an address, and various kinds of bus control signals are included in the output information D1. The output information D1 formed by the output information forming circuit 22 is inputted to a tristate circuit 24 for a bus. An output driver 26 is provided for the tristate circuit 24 for bus. The output driver 26 outputs the output information D1 from the output information forming circuit 22 to the bus 12 from an input/output terminal 30. Simultaneously with the formation of the output information by the output information forming circuit 22, an output timing forming circuit 32 forms a bus output signal E2 as an output timing signal. The bus output signal E2 formed is inputted to a bus output enable forming circuit 34. In the embodiment, the bus output enable forming circuit 34 is realized by an AND gate 36. The self master signal E1 formed by the master information coincidence judging circuit 16 is also inputted to the bus output enable forming circuit 34. Therefore, the bus output enable forming circuit 34 turns on the bus enable signal to the driver 26 of the tristate circuit 24 for bus only in the case where both of the inputted bus output signal E2 and the self master signal E1 are ON, namely, only in the case where the processor 10-1 is the master processor. The driver 26 of the tristate circuit 24 for bus receives a bus enable signal E3 from the bus output enable forming circuit 34 by an enable terminal. Only when the bus enable signal E3 is ON, the driver 26 outputs the output information D1 from the output information forming circuit 22 to the bus 12. The I/O terminal 30 of the tristate circuit 24 for bus is connected to the external bus 12 and is connected to the other slave processors 10-2 and 10-3 constructing the TMR unit 10 and to the processor 10-n other than the TMR unit 10.

The information on the bus 12 is inputted to the processor 10-1 and is inputted as bus information D2 to a bus information coincidence judging circuit 38 via an input driver 28 of the tristate circuit 24 for bus. The information D1 formed by the internal output information forming circuit 22 is also inputted to the bus information coincidence judging circuit 38. The bus information coincidence judging circuit 38 judges whether the two inputted information D1 and D2 coincide or not. When the two information D1 and D2 coincide, the bus information coincidence judging circuit 38 turns on a bus normal signal E4. When the two information D1 and D2 don't coincide, the bus normal signal E4 is turned off. A bus information failure detecting circuit 40 is constructed by an inverter 42 and an AND gate 44. The bus normal signal E4 outputted from the bus information coincidence judging circuit 38 and the bus output signal E2 formed by the output timing forming circuit 32 are inputted to the bus information failure detecting circuit 40. Only when the bus output signal E2 is ON and the bus normal signal E4 is OFF, the bus information failure detecting circuit 40 turns on a dissidence occurrence signal E5 which means the detection of a failure of bus information. The dissidence occurrence signal E5 is supplied to each circuit in the processor, which will be clearly described hereinlater. When the dissidence occurrence signal E5 is ON, each of the internal circuits which received the dissidence occurrence signal E5 judges that a failure occurred in any one of the processors 10-1 to 10-3 constructing the TMR unit 10 (also including a failure of the bus 12 itself), so that a necessary failure process is executed.

In the TMR construction of FIG. 2 as mentioned above, excluding the three processors 10-1 to 10-3 constructing the TMR unit 10, another apparatus for performing a majority decision or the like of the bus information formed by each of the processors 10-1 to 10-3 is unnecessary. A high reliable function due to the TMR construction can be economically realized by only the three same processors 10-1 to 10-3.

[Multiple bus construction]

Figure 3:
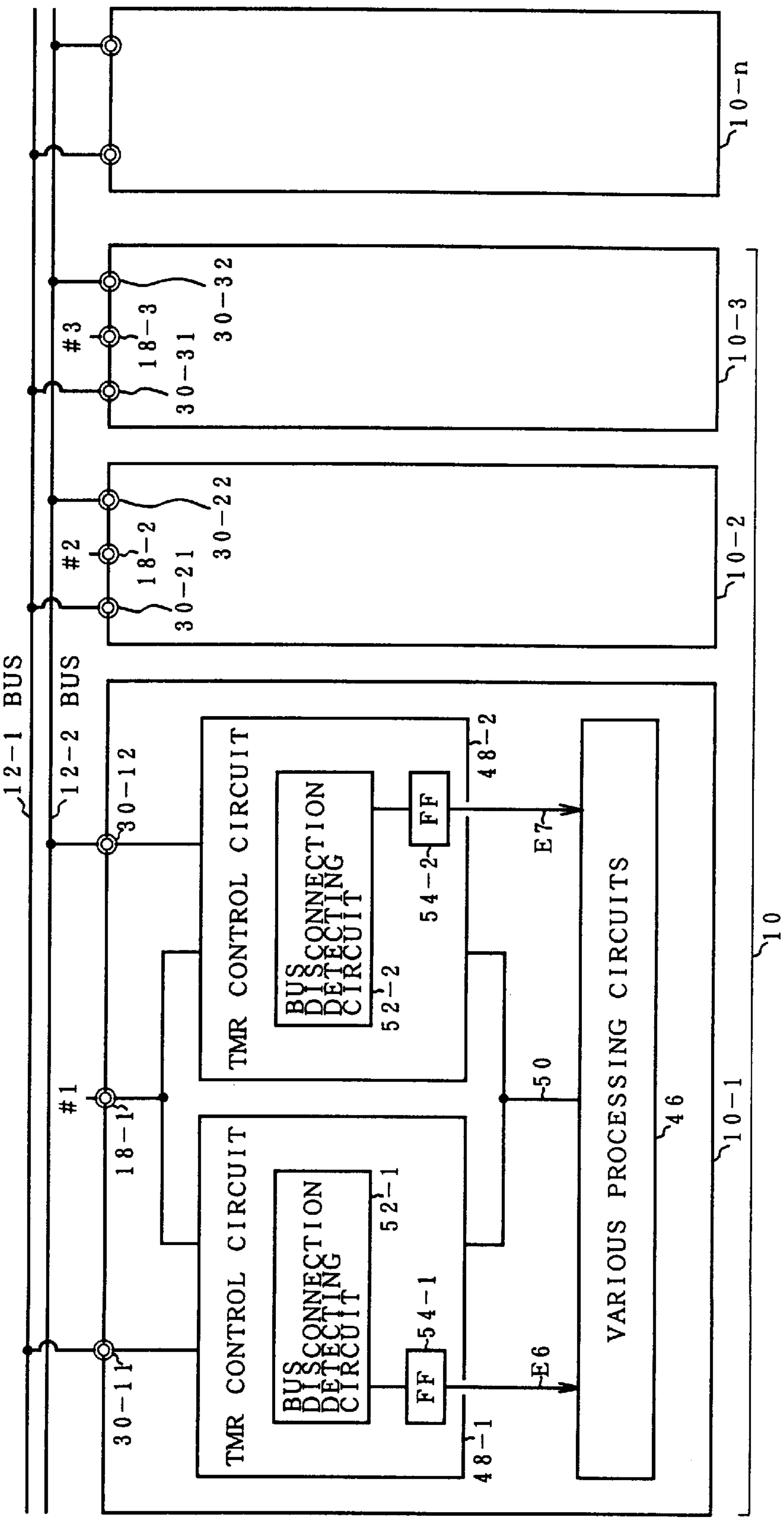
FIG. 3 is a block diagram showing an embodiment of a multiple bus construction.

FIG. 3 is a diagram showing an embodiment of a high reliable information processor of the invention with the multiple bus construction. First, the processors 10-1 to 10-3 constructing the TMR unit 10 are connected by a plurality of buses, for example, in the embodiment, by two buses 12-1 and 12-2 and execute the transmission and reception of data. The processor 10-n other than the TMR unit 10 is also connected to the buses 12-1 and 12-2. As for the processors 10-1 to 10-3, during the operation by the TMR construction, one of the processors 10-1 to 10-3 operates as a master processor and the remaining two processors operate as slave processors. Ordinarily, the master processor generates necessary information to either one of the buses 12-1 and 12-2 and all of the processors (one master processor and two slave processors) check the output information of the bus 12-1 or 12-2, thereby detecting a failure. In the multiple bus construction due to the two buses 12-1 and 12-2, each of the processors 10-1 to 10-3 has a failure detecting function as shown in the embodiment of FIG. 2 for each of the buses 12-1 and 12-2. An internal construction of each of the processors 10-1 to 10-3 of the TMR unit 10 in the multiple bus construction will now be described hereinafter with respect to the processor 10-1 as an example.

The internal circuit of each of the processors 10-1 to 10-3 of the TMR unit 10 is mainly constructed by three circuits as shown in the processor 10-1 as a representative. One of the three circuits is various processing circuits 46 to realize the inherent function of the processor other than the TMR processing function. The remaining two circuits are TMR control circuits 48-1 and 48-2 to realize the TMR processing function. Fundamentally, the circuits having the same function are provided in correspondence to the external buses 12-1 and 12-2. Namely, the TMR control circuit 48-1 is provided in correspondence to the external bus 12-1. The TMR control circuit 48-2 is provided in correspondence to the external bus 12-2. The various processing circuits 46 and TMR control circuits 48-1 and 48-2 are connected by a signal line 50 for data/control. In the embodiment, although the signal line 50 for data/control is commonly used for the two TMR control circuits 48-1 and 48-2, the signal line 50 can be also individually provided for each of the TMR control circuits 48-1 and 48-2. Signal lines of disconnection notification signals E6 and E7 are connected from the TMR control circuits 48-1 and 48-2 to the various processing circuits 46. In the embodiment, the case of outputting the disconnection notification signals E6 and E7 of a bus failure is explained as an example. However, it is also possible to construct in a manner such that the bus disconnection information is held in the TMR control circuits 48-1 and 48-2 and the various processing circuits 46 get the bus disconnection information as necessary. The bus disconnection information can be also held in the various processing circuits 46 for a necessary period of time instead of the inside of the TMR control circuits 48-1 and 48-2. In the case where the various processing circuits 46 transmit and receive information to/from the external buses 12-1 and 12-2 in a normal operating state, the necessary information is transmitted and received to/from the TMR control circuit 48-1 or 48-2 corresponding to the bus 12-1 or 12-2 which is used. The corresponding TMR control circuit 48-1 or 48-2 transmits and receives the necessary information to/from the external bus 12-1 or 12-2 for the information in which a process was requested from the various processing circuits 46. In this instance, for example, in the case where a failure regarding the bus 12-1 occurs and the failure about the bus 12-1 is detected by a bus disconnection detecting circuit 52-1 in the TMR control circuit 48-1, a flip-flop (FF) 54-1 to hold a detection result is turned on. The FF 54-1 holds the ON state of the failure detection result until a resetting instruction is received. When FF 54-1 is turned on, the corresponding bus disconnection notification signal E6 is turned on and the failure detection of the bus 12-1 is notified to the various processing circuits 46. Due to the turn-on of the disconnection notification signal E6, the various processing circuits 46 recognize the occurrence of the failure on the side of the corresponding bus 12-1. The process corresponding to the occurrence of the failure of the bus 12-1 is executed. After that, in case of using the external bus, only the remaining normal bus 12-2 is used and the process is continued in a reduction state in which the failed bus 12-1 was disconnected. Such a bus failure is also similarly applied to the bus 12-2 side. When a failure about the bus 12-2 is detected by a bus disconnection detecting circuit 52-2 of the TMR control circuit 48-2, an FF 54-2 to hold the detection result is turned on. The occurrence of failure is notified to the various processing circuits 46 by the bus disconnection notification signal E7. The process corresponding to the occurrence of the failure of the bus 12-2 and a reducing process for disconnecting the failed bus 12-2 are executed.

[Realization of high failure detecting speed]

Figure 4:
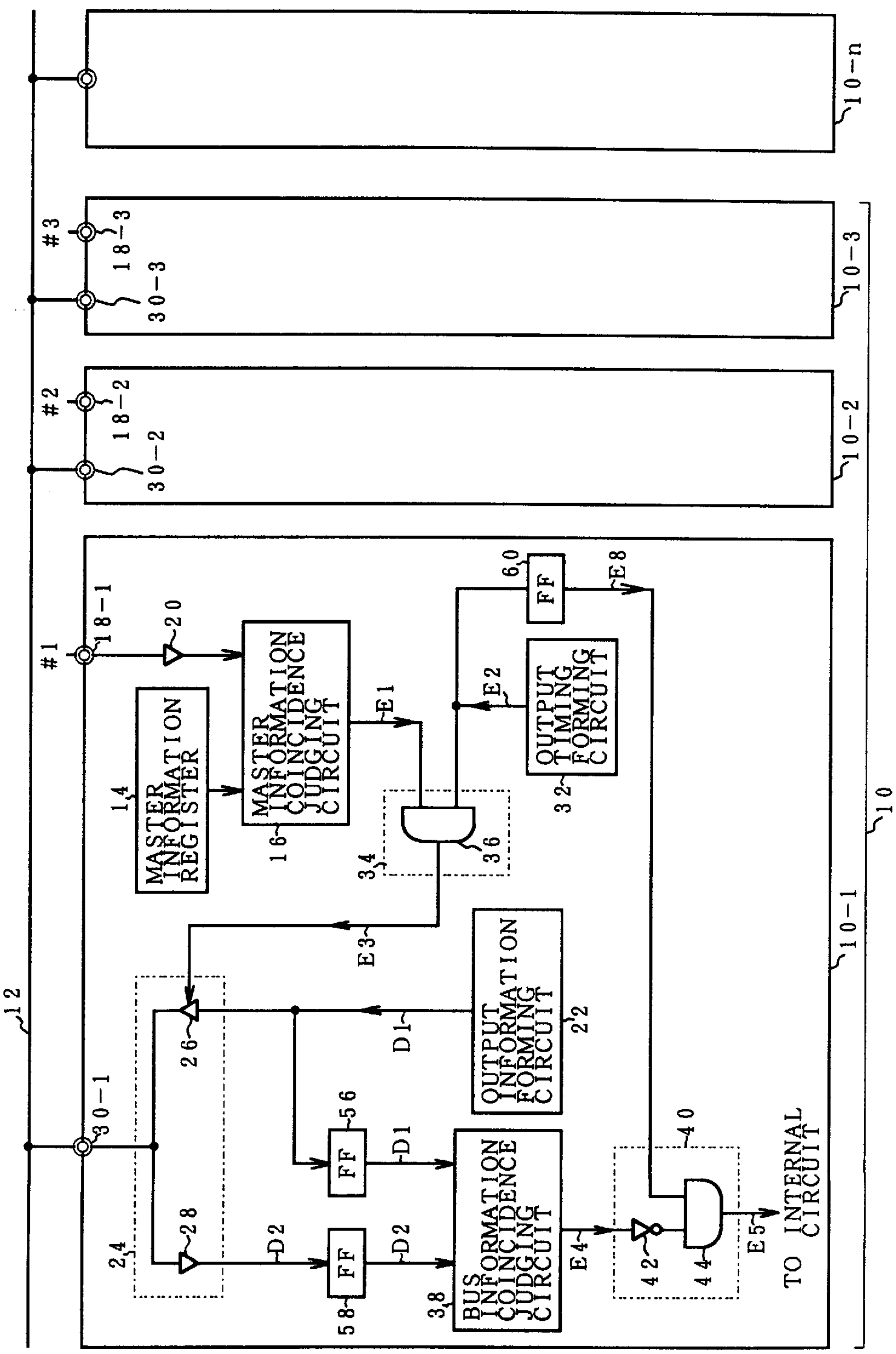
FIG. 4 is a block diagram of an embodiment for executing a failure detection at a high speed.

FIG. 4 shows a construction such that the TMR unit 10 is constructed by three processors 10-1 to 10-3 and is connected by the single external bus 12, information is transmitted and received, and further the other processor 10-n without the TMR construction is also connected. The three processors 10-1 to 10-3 constructing the TMR unit 10 has an internal construction shown in the processor 10-1 as a representative. The internal construction of the processor 10-1 is substantially the same as that in the embodiment of FIG. 2. However, in order to further raise a failure detecting speed, an FF 56 to hold the information D1 that is outputted to the bus 12, an FF 58 to hold the information D2 outputted onto the bus 12, and further an FF 60 to hold the bus output signal E2 from the output timing forming circuit 32 are newly provided. By providing the FFs 56, 58, and 60 as mentioned above, the process of the internal circuit for the bus 12 side can be finished without waiting for a judging process in the subsequent circuit unit. The high speed of the failure detection of the bus 12 can be realized. Specifically speaking, when the output information D1 is formed by the output information forming circuit 22 and is outputted to the bus 12 through the tristate circuit 24 for bus, the output information D1 is held in the FF 56. Although the bus output signal E2 is also generated from the output timing forming circuit 32 simultaneously with the formation of the output information D1, it is also held in the FF 60. Further, the information on the bus 12 is held as bus information D2 into the FF 58 through the tristate circuit 24 for bus. The information D1 and D2 held in the FFs 56 and 58 are compared and judged by the bus information coincidence judging circuit 38. On the basis of the judgment result, a failure of the bus information is detected by the bus information failure detecting circuit 40 by using a bus output signal E8 held in the FF 60. In the case where the holding operation by the FF is not performed, like shown in FIG. 2, until the judgment result by the bus information coincidence judging circuit 38 and the detection result by the bus information failure detecting circuit 40 are obtained, the output state of the output information D1 for the external bus 12 and the output state of the bus output signal E2 from the internal output timing forming circuit 32 have to be held. A slightly longer time is needed as a time of one cycle of the bus because of the failure detection. On the other hand, by providing the FFs 56, 58, and 60, the continuation time of the output state of the output information D1, bus information D2, and bus output signal E2 can be reduced to a short time until the holding timing of the FF. The high failure detecting speed can be realized. In this case, although the number of bus cycles increases, a reduction of the cycle time is larger.

In FIG. 4, the operation in the case where the high failure detecting speed is realized by providing the FFs 56, 58, and 60 will now be described. The output information D1 formed by the output information forming circuit 22 is supplied to the tristate circuit 24 for bus. Since the processor 10-1 is a master processor, the bus enable signal E3 from the bus output enable forming circuit 34 is turned on, thereby setting the driver 26 into an enable state. The output information D1 is outputted to the bus 12 via the output driver 26 and I/O terminal 30. In this instance, the bus output signal E2 generated from the output timing forming circuit 32 is once held in the FF 60 and is supplied as a bus output signal E8 to the bus information failure detecting circuit 40. The information outputted to the bus 12 is inputted to the processor 10-1 and is once held in the FF 58 via the tristate circuit 24 for bus. In this instance, the output information D1 formed by the internal output information forming circuit 22 has been held in another FF 56. The output information D1 and bus information D2 held in the FFS 56 and 58 are inputted to the bus information coincidence judging circuit 38. The bus information coincidence judging circuit 38 judges whether the two inputted information D1 and D2 coincide or not. When they coincide, the bus normal signal E4 is turned on. When they differ, the bus normal signal E4 is turned off. The bus information failure detecting circuit 40 receives the bus normal signal E4 outputted from the bus information coincidence judging circuit 38 and the bus output signal E8 held in the FF 60 and turns on the dissidence occurrence signal E5 indicative of the failure detection of the bus information only in the case where the bus output signal E8 is ON and the bus normal signal E4 is OFF. The dissidence occurrence signal E5 from the bus information failure detecting circuit 40 is inputted to an internal circuit (not shown) of the processor 10-1. It is judged that a failure occurred in any one of the processors 10-1 to 10-3 constructing the TMR unit 10 in addition to the failure of the bus 12 itself. A necessary failure process is executed. With regard to each of the processors 10-1 to 10-3 constructing the TMR unit 10 as mentioned above, the output information outputted to the bus 12, the output information formed by itself, and further the output timing formed by itself are held every bus. A failure of the bus information is detected by using those information held in the apparatus. Thus, although the number of accessing cycles of the bus 12 slightly increases, a speed in the cycle time itself of the bus 12 can be raised. The bus performance can be improved as a whole.

[Notification of the failure detecting timing]

Figure 5:
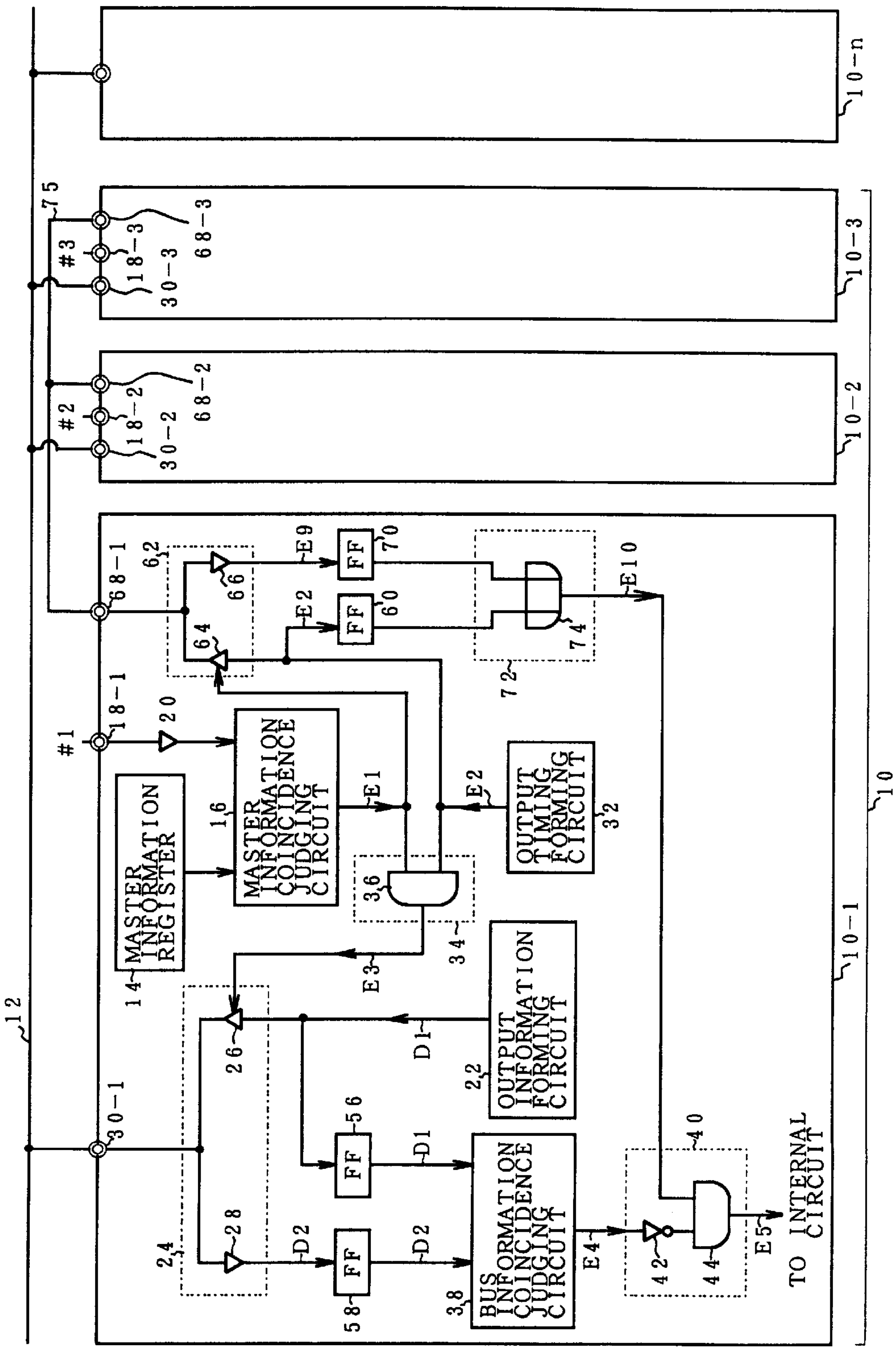
FIG. 5 is a block diagram of an embodiment of the invention for notifying a failure detecting timing.

FIG. 5 is characterized in that a function to detect a failure about an output timing of information output to the bus 12 is further provided for the embodiment of FIG. 4. In the embodiment of FIG. 5, as representatively shown in the processor 10-1 among the processors 10-1 to 10-3 constructing the TMR unit 10, in addition to the circuits provided in the embodiment of FIG. 4, further, a tristate circuit 62 for output timing, an FF 70, and a bus information check timing forming circuit 72 are provided. Namely, the bus output signal E2 formed by the output timing forming circuit 32 is inputted to an output driver 64 provided for the tristate circuit 62 for output timing. The self master signal E1 outputted from the master information coincidence judging circuit 16 is inputted to an enable terminal of the output driver 64. Since the processor 10-1 is a master processor, the self master signal E1 is ON, the output driver 64 is in an enable state, and the bus output signal E2 is outputted to an input/output terminal 68-1 from the output driver 64. Terminals corresponding to the I/O terminal 68-1 are also provided as I/O terminals 68-2 and 68-3 for the other processors 10-2 and 10-3. The I/O terminals 68-1 to 68-3 are connected by an exclusive-use signal line 75. Therefore, the bus output signal E2 of the processor 10-1 outputted from the output driver 64 of the tristate circuit 62 for output timing is supplied to the I/O terminals 68-2 and 68-3 of the other processors 10-2 and 10-3 through the signal line 75. On the other hand, an input driver 66 is provided for the tristate circuit 62 for output timing. The input driver 66 receives a bus output signal inputted from the signal line 75 through an I/O terminal 68-1, thereby obtaining an output timing signal E9. The bus output signal E2 formed by the processor 10-1 itself for the tristate circuit 62 for output timing is held in the FF 60. The output timing signal E9 generated from the input driver 66 of the tristate circuit 62 for output timing is held in the FF 70. Outputs of the FFs 60 and 70 are inputted to the bus information check timing forming circuit 72 having an OR gate 74. The bus information check timing forming circuit 72 outputs a bus check signal E10 through the OR gate 74 as an OR output of the holding signal by the FF 60 of the bus output signal E2 formed by the processor 10-1 itself and the holding signal by the FF 70 of the output timing signal inputted through the signal line 75. The bus check signal E10 is inputted to the bus information failure detecting circuit 40 together with the bus normal signal E4 from the bus information coincidence judging circuit 38. In the normal operating state, the holding output of the internal bus output signal E2 by the FF 60 and the holding output by the FF 70 of the output timing signal by the signal line 75 are simultaneously obtained. On the other hand, when there are deviations of the output timings among the processors 10-1 to 10-3 which are executing the same operation, in the processors 10-2 and 10-3 as slave processors, either one of the holding outputs of the FFs 60 and 70 is first obtained. For example, it is now assumed that the output timing signal from the master processor 10-1 is first turned on by the FF 70 and the bus check signal E10 that is outputted from the bus information check timing forming circuit 72 is turned on. In this instance, in the processor 10-2 or 10-3, since the bus output signal E2 from the output timing forming circuit 32 is not ON and the output information D1 from the output information forming circuit 22 is not transmitted, the bus normal signal E4 from the bus information coincidence judging circuit 38 is OFF. Since only the bus check signal E10 is turned on, the dissidence occurrence signal E5 is turned on. A fact that a failure regarding the information output timing occurred among the processors 10-1 to 10-3 can be recognized.

The operation of the processor 10-1 in the embodiment of FIG. 5 will now be described. The master information coincidence judging circuit 16 of the processor 10-1 compares the processor number of the master information register 14 with the self processor number inputted from the outside. Since they coincide, the self master signal E1 is turned on, thereby setting the output buffer 64 of the tristate circuit 62 for output timing into an enable state. The output information forming circuit 22 forms the output information D1 as necessary by various kinds of instructions from an internal circuit. The formed information D1 is supplied to the output driver 26 of the tristate circuit 24 for bus. At the same time, the bus output signal E2 is formed by the output timing forming circuit 32 and is turned on. The enable signal E3 from the bus output enable forming circuit 34 is turned on. The output driver 26 is set into an enable state. Therefore, the output information D1 from the output information forming circuit 22 is outputted to the bus 12 by the output driver 26. The bus output signal E2 generated from the output timing forming circuit 32 is inputted to the output driver 64 of the tristate circuit 62 for output timing. At this time, since the self master signal E1 from the master information coincidence judging circuit 16 is turned on, the output driver 64 is in an enable state and outputs the inputted bus output signal E2 to the signal line 75 through the I/O terminal 68. At the same time, the bus output signal E2 from the output timing forming circuit 32 is held in the FF 60. In this instance, the input driver 66 of the tristate circuit 62 for output timing receives the bus output signal E2 outputted from the output driver 64 as an output timing signal E9 and allows the FF 70 to hold it. By getting the OR of the holding outputs of the FFs 60 and 70, the bus information check timing forming circuit 72 turns on the bus check signal E10. The bus information coincidence judging circuit 38 judges whether the output information D1 held in the FF 56 and the bus information D2 which was simultaneously held in the FF 58 coincide or not. When both of the information D1 and D2 coincide, the bus normal signal E4 is turned on. When they differ, the bus normal signal E4 is turned off. The bus normal signal E4 is inputted to the bus information failure detecting circuit 40 together with the bus check signal E10. Only when the bus normal signal E4 from the bus information coincidence detecting circuit is OFF, the bus information failure detecting circuit 40 turns on the dissidence occurrence signal E5 indicative of the failure detection of the bus information at a timing when the bus check signal E10 is turned on. The dissidence occurrence signal E5 outputted from the bus information failure detecting circuit 40 is supplied to each of the internal circuits (not shown). It is judged that a failure occurred in any one of the processors 10-1 to 10-3 constructing the TMR unit 10 including the failure of the bus 12 itself. A necessary failure process is executed.

[Notification of failure detection result]

Figure 6A:
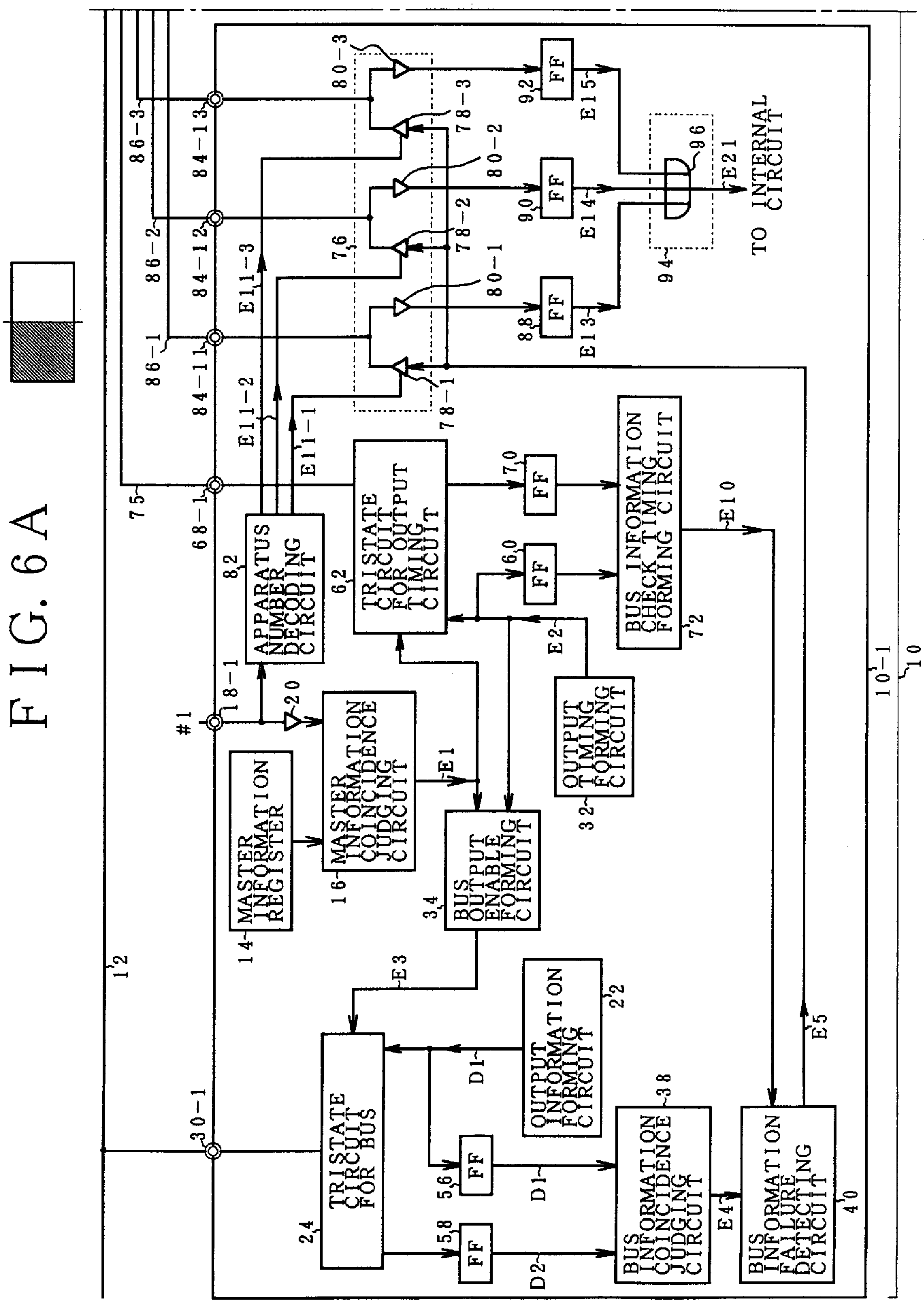
FIGS. 6A and 6B are block diagrams of an embodiment of the invention for mutually notifying failure detection results.
Figure 6B:
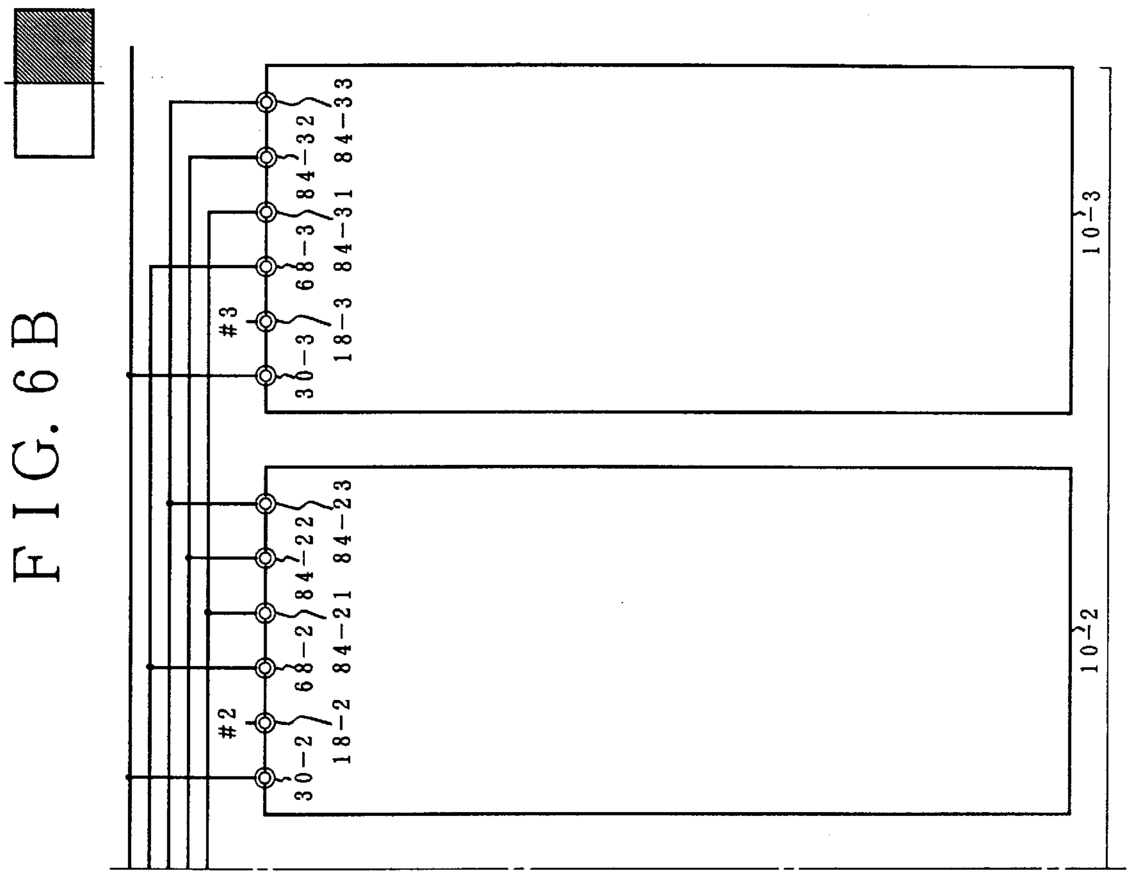

When the dissidence of the bus information is detected, the processors 10-1 to 10-3 constructing the TMR unit 10 in FIGS. 6A and 6B individually output signals indicative of the detection of the dissidence as bus information failure detection signals every processors 10-1 to 10-3. The processors 10-1 to 10-3 receive the bus information failure detection signal which is sent from the other processors through exclusive-use signal lines 86-1, 86-2, and 86-3, thereby judging the occurrence of a failure. Thus, the failure occurring in any one of the processors 10-1 to 10-3 constructing the TMR unit 10 can be detected by all of the processors. As representatively shown in the processor 10-1 in FIGS. 6A and 6B, in order to notify of such a failure detection result, in addition to the construction of FIG. 5, a tristate circuit 76 for coincidence detection, an apparatus number decoding circuit 82, FFs 88, 90, and 92, and a bus information failure notification signal forming circuit 94 are newly provided. Three tristate circuits corresponding to the processors 10-1 to 10-3 are provided for the tristate circuit 76 for coincidence detection. Namely, an output driver 78-1 with an enable terminal and an input driver 80-1 are provided in correspondence to the processor 10-1. An output driver 78-2 with an enable terminal and an input driver 80-2 are provided in correspondence to the processor 10-2. Further, an output driver 78-3 with an enable terminal and an input driver 80-3 are provided in correspondence to the processor 10-3. The apparatus number decoding circuit 82 decodes the processor number inputted from the outside and turns on any one of decoding signals E11-1, E11-2, and E11-3. The decoding signal E11-1 is turned on by decoding the processor number #1. The decoding signal E11-2 is turned on by decoding the processor number #2. Further, the decoding signal E11-3 is turned on by decoding the processor number #3. The decoding signals E11-1 to E11-3 from the apparatus number decoding circuit 82 are supplied to the enable terminals of the output drivers 78-1 to 78-3 of the tristate circuit 76 for coincidence detection. Thus, since the apparatus number decoding circuit 82 turns on only the decoding signal E11-1 for the processor number #1 which was set from the outside, only the output driver 78-1 is set into the enable state. The bus information failure detection signal E5 indicative of the dissidence of the bus information by the bus information failure detecting circuit 40 is inputted in parallel to the output drivers 78-1 to 78-3. Outputs of the output drivers 78-1 to 78-3 are connected to input/output terminals 84-11, 84-12, and 84-13, respectively, and are connected to the other processors 10-2 and 10-3 through the exclusive-use signal lines 86-1, 86-2, and 86-3. In a manner similar to the processor 10-1, the processors 10-2 and 10-3 have corresponding I/O terminals 84-21 to 84-23 and 84-31 to 84-33 and are connected to the exclusive-use signal lines 86-1 to 86-3, respectively. Outputs of the input drivers 80-1 to 80-3 provided for the tristate circuit 76 for coincidence detection are connected to the FFs 88, 90, and 92, respectively. The FFs 88, 90, and 92 are provided in consideration of a delay of the bus information failure detection signal. When a delay doesn't cause any problem, there is no need to provide the FFs 88, 90, and 92. The bus information failure detection signals held in the FFs 88, 90, and 92 are inputted to the bus information failure notification signal forming circuit 94 using an OR gate 96 as holding signals E13, E14, and E15, respectively. The bus information failure notification signal forming circuit 94 gets the OR of the holding signals E13, E14, and E15 of the bus information failure detection signals corresponding to the processors 10-1, 10-2, and 10-3 and outputs a bus information failure judgment signal E21 indicating that the failure was detected by any one of the processors 10-1 to 10-3 to the internal circuit.

The operation of the processor 10-1 in FIGS. 6A and 6B will now be described separately with respect to the external output of the failure detection result and the failure detection in the processor. As described in the embodiment of FIG. 5, when the output information formed by the processor 10-1 and the bus information on the bus 12 don't coincide, the bus information failure detection signal E5 from the bus information failure detecting circuit 40 is turned on and is inputted to the tristate circuit 76 for coincidence detection. The processor number #1 inputted from the outside is decoded by the apparatus number decoding circuit 82 and only the decoding signal E11-1 corresponding to the processor number #1 is turned on. Therefore, only the output driver 78-1 corresponding to the processor 10-1 of the tristate circuit 76 for coincidence detection is set into an enable state. The bus information failure detection signal E5 is outputted to the signal line 86-1 and is sent to the other processors 10-2 and 10-3 and is held in the FF 88. On the other hand, in the other processors 10-2 and 10-3, when the bus information failure detection signal has been similarly outputted to the signal line 86-2 or 86-3, the reception signal of the bus information failure detection signal is derived from the input drivers 80-2 and 80-3 of the tristate circuit 76 for coincidence detection and is held in the FFs 90 and 92. Thus, the bus information failure detection signal E5 detected by the processor 10-1 is held in the FF 88. The bus information failure detection signal sent from the processor 10-2 through the signal line 86-2 is held in the FF 90. Further, the bus information failure detection signal sent from the processor 10-3 through the signal line 86-3 is held in the FF 92. Those signals are inputted as holding signals E13, E14, and E15 into the bus information failure notification signal forming circuit 94, respectively. The bus information failure notification signal forming circuit 94 gets the OR of the holding signals E13, E14, and E15 indicative of the bus information failure detection of the processors 10-1 to 10-3 and forms the bus information failure judgment signal E21 indicating that it is detected that the failure occurred in any one of the processors 10-1 to 10-3 and outputs to the internal circuit, thereby allowing the necessary failure process to be executed.

[Judgment of failed portion]

Figure 7A:
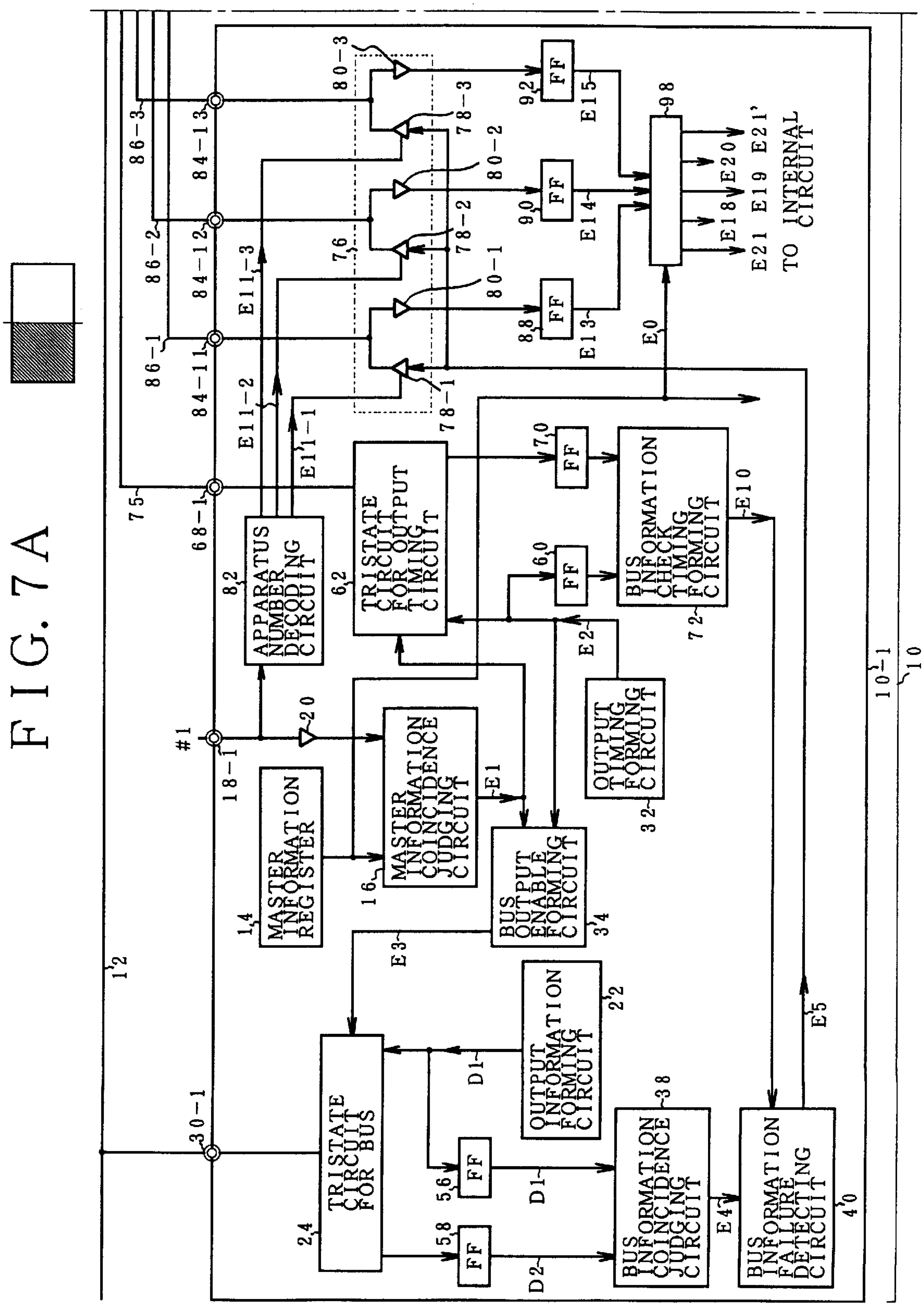
FIGS. 7A and 7B are block diagrams of an embodiment of the invention for judging a failed portion of bus information.
Figure 7B:
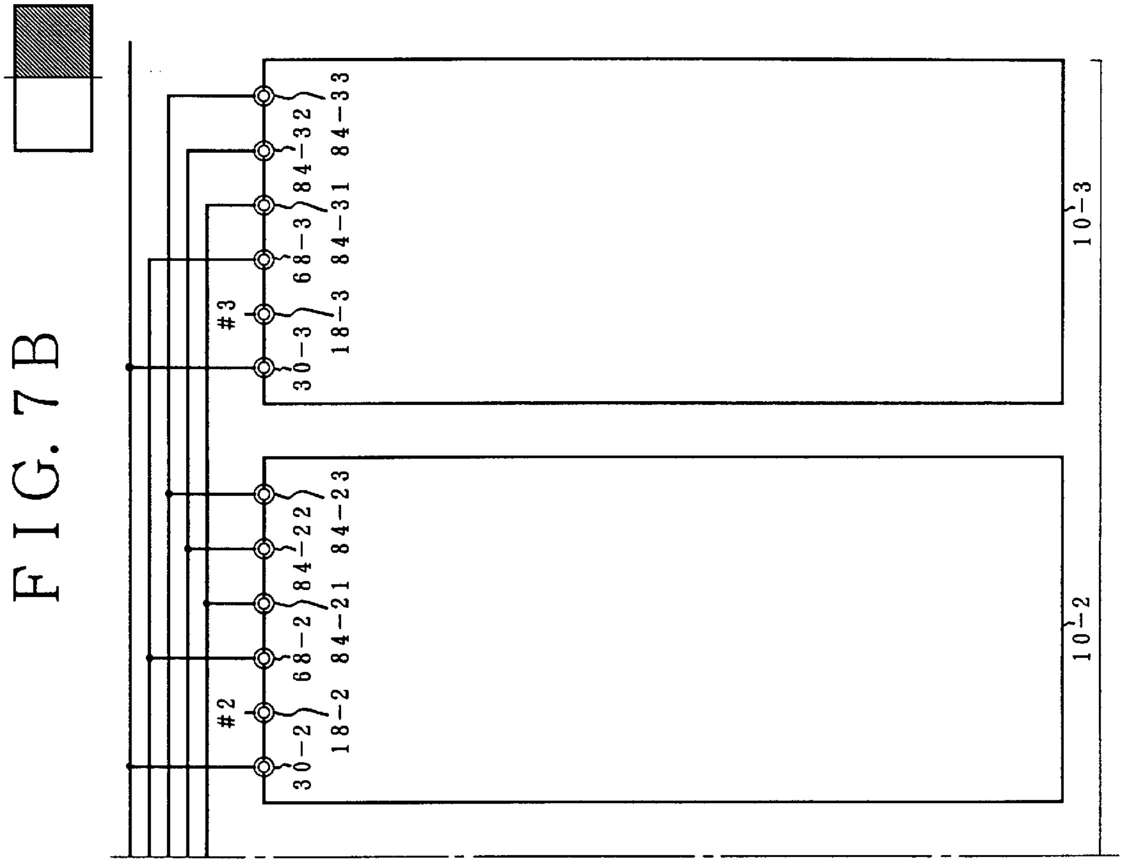

FIGS. 7A and 7B show an embodiment in which in the case where a failure of the processor including the failure of the bus 12 is detected in any one of the processors 10-1 to 10-3 constructing the TMR unit 10, the location of the failure occurred is judged. For such a judgment of the failed portion, as representatively shown in the processor 10-1, a bus information failure (processor) judging circuit 98 for newly judging the failed processor is provided in place of the bus information failure notification signal forming circuit 94 provided in FIGS. 6A and 6B. The bus information failure detection signals E13, E14, and E15 of every processors 10-1, 10-2, and 10-3 held in the FFs 88, 90, and 92 are inputted to the bus information failure judging circuit 98, respectively. Further, a register signal E0 from the master information register 14 in which the processor number set as a master processor at present has been set is inputted to the bus information failure judging circuit 98. Now, assuming that the processor numbers of the processors 10-1 to 10-3 are set to #1, #2, and #3, the register signal E0 is expressed by a 2-bit signal. In case of setting the processor 10-1 to a master processor, "01", corresponding to the master processor number #1 is outputted. In case of setting the processor 10-2 to the master processor, 2-bit data "10" corresponding to the processor number #2 is outputted. Further, in case of setting the processor 10-3 to the master processor, 2-bit data "11" indicative of the processor number #3 is outputted. Each of the 2-bit data is inputted as a register signal E0. The bus information failure judging circuit 98 turns on any one of judgment signals E18, E19, E20, and E21' indicative of the failed portion on the basis of the bus information failure detection signals E13 to E15 from the processors 10-1 to 10-3 and the register signal E0 from the master information register 14.

Figure 8:
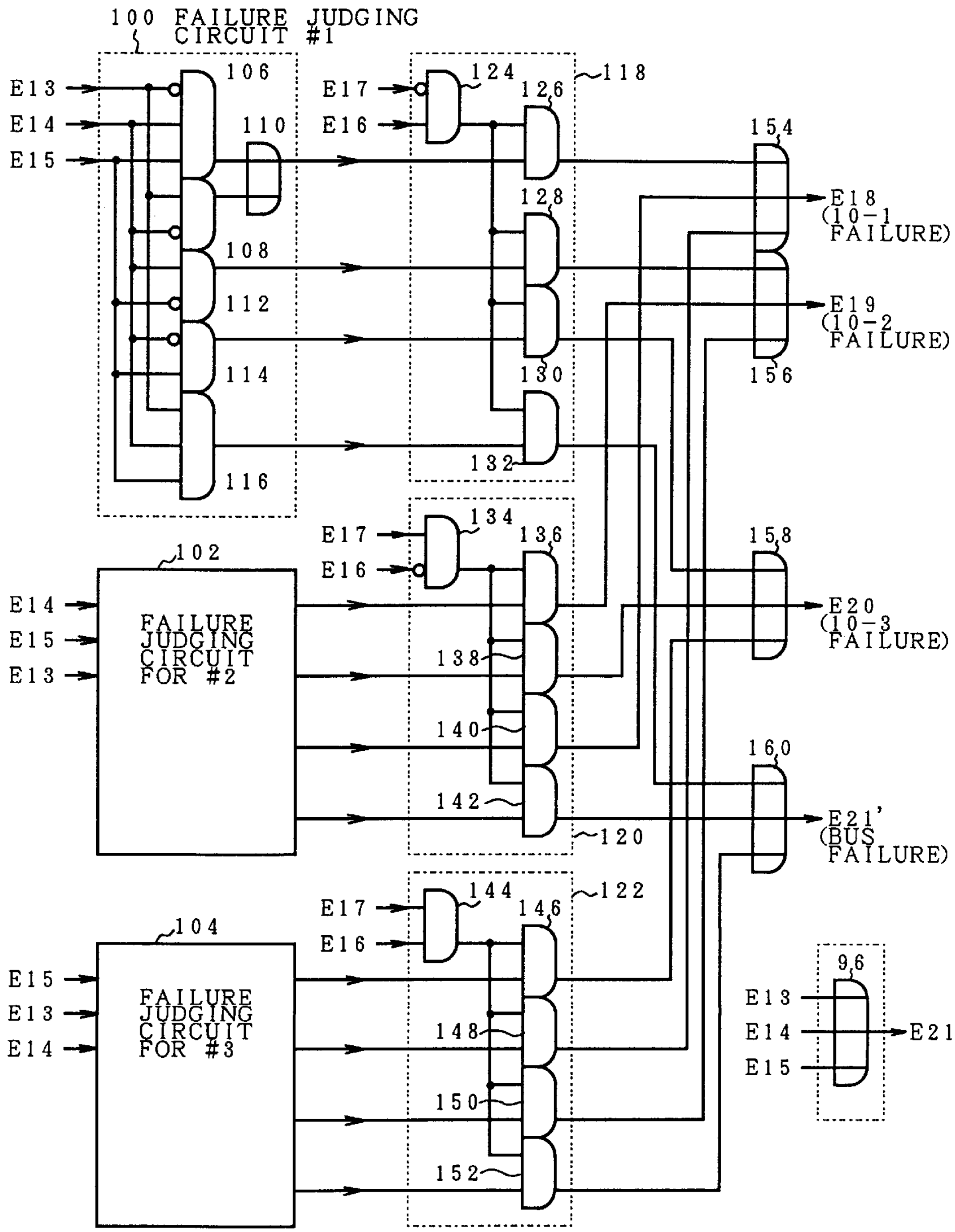
FIG. 8 is a circuit diagram showing an embodiment of a failed processor judging circuit in FIGS. 7A and 7B.

FIG. 8 is a circuit block diagram of the bus information failure judging circuit 98 in FIGS. 7A and 7B. In FIG. 8, the bus information failure judging circuit 98 has a failure judging circuit 100 for #1, a failure judging circuit 102 for #2, and a failure judging circuit 104 for #3 in correspondence to the master processor numbers #1, #2, and #3 to decide the master processor, respectively. Namely, when the processor 10-1 is set to the master processor, an output signal of the failure judging circuit 100 for #1 is used for judgment. When the processor 10-2 is set to the master processor, an output signal of the failure judging circuit 102 for #2 is used for judgment. On the other hand, when the processor 10-3 is set to the master processor, an output signal of the failure judging circuit 104 for #3 is used for judgment. The failure judging circuit 100 for #1 is constructed by AND gates 106, 108, 112, 114, and 116 and an OR gate 110. Each of the failure judging circuit 102 for #2 and the failure judging circuit 104 for #3 also has the same gate circuits as those of the failure judging circuit 100 for #1. As differences among the failure judging circuits 100, 102, and 104, input positions of the input signals E13, E14, and E15 are different. The input signal E13 is the bus information failure detection signal of the processor 10-1. The input signal E14 is the bus information failure detection signal of the processor 10-2. Further, the input signal E15 is the bus information failure detection signal of the processor 10-3. The signals are sequentially inputted to the failure judging circuit 100 for #1 in accordance with the order of the input signals E13, E14, and E15. The signals are sequentially inputted to the failure judging circuit 102 for #2 in accordance with the order of the input signals E14, E15, and E13. Further, the signals are sequentially inputted to the failure judging circuit 104 for #3 in accordance with the order of the input signals E15, E13, and E14. Subsequent to the failure judging circuits 100, 102, and 104, selecting circuits 118, 120, and 122 are provided. The selecting circuit 118 has AND gates 126, 128, 130, and 132 in correspondence to four signal outputs from the failure judging circuit 100 for #1. The AND gates 126, 128, 130, and 132 are selected by an AND gate 124 which received the register signals E16 and E17 of two bits as a register signal E0 from the master information register 14.

The master information register signals E16 and E17 in case of setting the processor 10-1 to the master processor are set to "01" in which the processor number #1 is expressed by two bits. Therefore, by inverting the register signal E17 as an upper bit and inputting the inverted signal, an output is set to "1" by inputting the register signal "01", thereby setting the AND gates 126, 128, 130, and 132 into a permission state. Each of the selecting circuits 120 and 122 also has a construction similar to that of the selecting circuit 118 except that input states to AND gates 134 and 144 to form a permission state by the 2-bit data of the register signals E16 and E17 differ. That is, in the selecting circuit 120, the register signal E16 is inverted and inputted in a manner such that the output is set to 1 by the 2-bit register signal "10" of the processor number #2 in case of setting the processor 10-2 to the master processor. The selecting circuit 122 directly inputs the register signals E16 and E17 to the AND gate 144 in a manner such that the output is set to 1 by the 2-bit data "11" corresponding to the processor number #3 when the processor 10-3 is set to the master processor.

Four OR gates 154, 156, 158, and 160 to get the OR of outputs of the selecting circuits 118, 120, and 122 are provided at the final stage. The output signals E18, E19, E20, and E21 of the OR gates 154, 156, 158, and 160 are judgment signals of the failed portions. When the judgment signal E18 is turned on, the failure of the processor 10-1 is shown. When the judgment signal E19 is turned on, the failure of the processor 10-2 is shown. When the judgment signal E20 is turned on, the failure of the processor 10-3 is shown. Further, when the judgment signal E21' is turned on, the failure of the bus 12 is shown.

FIG. 9 shows the failure judgment contents in the embodiment of FIG. 8 when the master processor is set to the processor 10-1 of the processor number #1. In FIG. 9, a mark o relates to the case where the processors 10-1 to 10-3 are normal and the bus information failure detection signals E13, E14, and E15 are turned off and no failure is detected. A mark x relates to the case where the bus information failure detection signals of the processors 10-1 to 10-3 are turned on and a failure is detected. First in mode 1, no failure is detected in any one of the processors 10-1 to 10-3 and the judgment result of the failed processor in this case indicates that all processors are normal. Mode 2 relates to the case where the processor 10-3 as a slave processor fails. Mode 3 relates to the case where the processor 10-2 as a slave processor fails. Mode 4 relates to the case where the processor 10-1 as a master processor is normal and failures are detected in both of the processors 10-2 and 10-3 as slave processors. In this case, it is judged such that the two processors 10-2 and 10-3 as slave processors don't fail but the processor 10-1 as a master processor fails. Mode 5 relates to the case where the processor 10-1 fails. Mode 6 relates to the case where a failure is detected in the processor 10-1 as a master processor and a failure is detected in the processor 10-3 in the two slave processors. In this case, it is judged that there is a double failure. Mode 7 also relates to the case where a failure is detected in the processor 10-1 as a master processor and a failure is detected in the processor 10-2 in the two slave processors. In this case, it is also judged that there is what is called a double failure. Mode 8 relates to the case where a failure is detected in all of the processors 10-1 to 10-3. In this case, it is judged that the processors 10-1 to 10-3 don't fail but the bus 12 fails.

The failure judging circuit 100 for #1 in FIG. 8 logically executes the judgment of each failed portion in modes 4, 5, 3, 2, and 8 in FIG. 9, respectively. First, the three bus information failure detection signals E13, E14, and E15 are inputted to the AND gate 106. Among them, the signal E13 indicative of the failure detection of the processor 10-1 is inverted and inputted. Therefore, an output of the AND gate 106 is turned on in mode 4 of "E13, E14", E15"="011". The AND gate 108 receives the failure detection signal E13 of the processor 10-1. The failure detection signal E14 of the processor 10-2 is inverted and inputted to the AND gate 108. Therefore, an output of the AND gate 108 is turned on when "E13, E14"="10". In this instance, the failure detection states of the processors 10-1 and 10-2 in mode 5 in FIG. 9 are judged. At this time, the failure detection state of the processor 10-3 is ignored, thereby simplifying the circuit construction. Since the processor 10-1 fails in both of modes 4 and 5 in FIG. 9, the OR gate 110 gets the OR of them and turns on the judgment signal E18 indicating that the processor 10-1 corresponds to the failed portion through the selecting circuit 118 and OR gate 154. The AND gate 112 receives the failure detection signal E14 of the processor 10-2. The failure detection signal E15 of the processor 10-3 is inverted and inputted to the AND gate 112. Therefore, when "E14, E15"="10", an output of the AND gate 112 is turned on. This state relates to the case where the processor 10-2 in mode 3 in FIG. 9 fails. Therefore, the judgment signal E19 is turned on through the selecting circuit 118 and OR circuit 156, thereby showing the failure judgment result in mode 3, namely, indicating that the processor 10-2 is the failed portion. The failure detection signal E14 of the processor 10-2 is inverted and inputted to the AND gate 114. The failure detection signal E15 of the processor 10-3 is inputted as it is to the AND gate 114. Therefore, when "E14, E15"="01", an output of the AND gate 114 is turned on. This state relates to the case where the processor 10-3 in mode 2 in FIG. 9 fails. The judgment signal E20 is turned on through the selecting circuit 118 and OR gate 158, thereby indicating that the processor 10-3 in mode 2 is the failed portion. Further, the AND gate 116 gets the AND of the three failure detection signals E13, E14, and E15. This state relates to the case where a failure is detected in all of the processors 10-1 to 10-3 in mode 8 in FIG. 9. The judgment signal E21 is turned on through the selecting circuit 118 and OR gate 160, thereby indicating that the bus 12 fails. The failure judging circuit 102 for #2 in FIG. 8 is made effective in the case where the processor 10-2 is set to the master processor and the remaining two processors 10-1 and 10-3 are set to the slave processors. At this time, it is sufficient to set the judging conditions such that the master processor in FIG. 9 is set to the processor 10-2 and the first slave processor is set to the processor 10-3 and the second slave processor is set to the processor 10-1. Similarly, the failure judging circuit 104 for #3 is made effective in the case where the processor 10-3 is set to the master processor. In this case, it is sufficient to set the judging conditions such that the master processor in FIG. 9 is set to the processor 10-3 and the first slave processor is set to the processor 10-1 and the second slave processor is set to the processor 10-2.

[Suppression of updating of various resources when failure occurs]

Figure 10A:
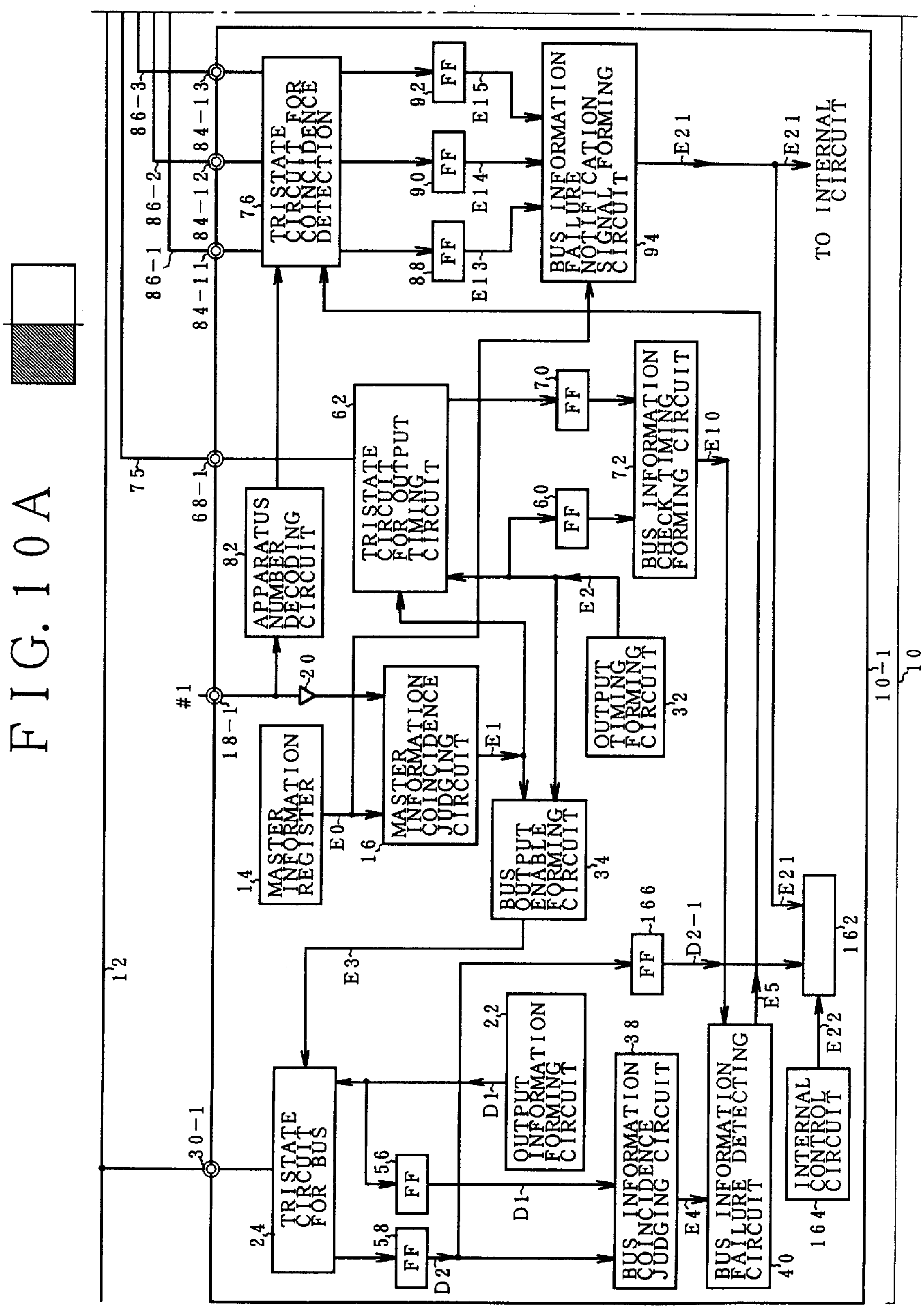
FIGS. 10A and 10B are block diagrams of an embodiment of the invention for suppressing an updating of various resources when a failure occurs.
Figure 10B:
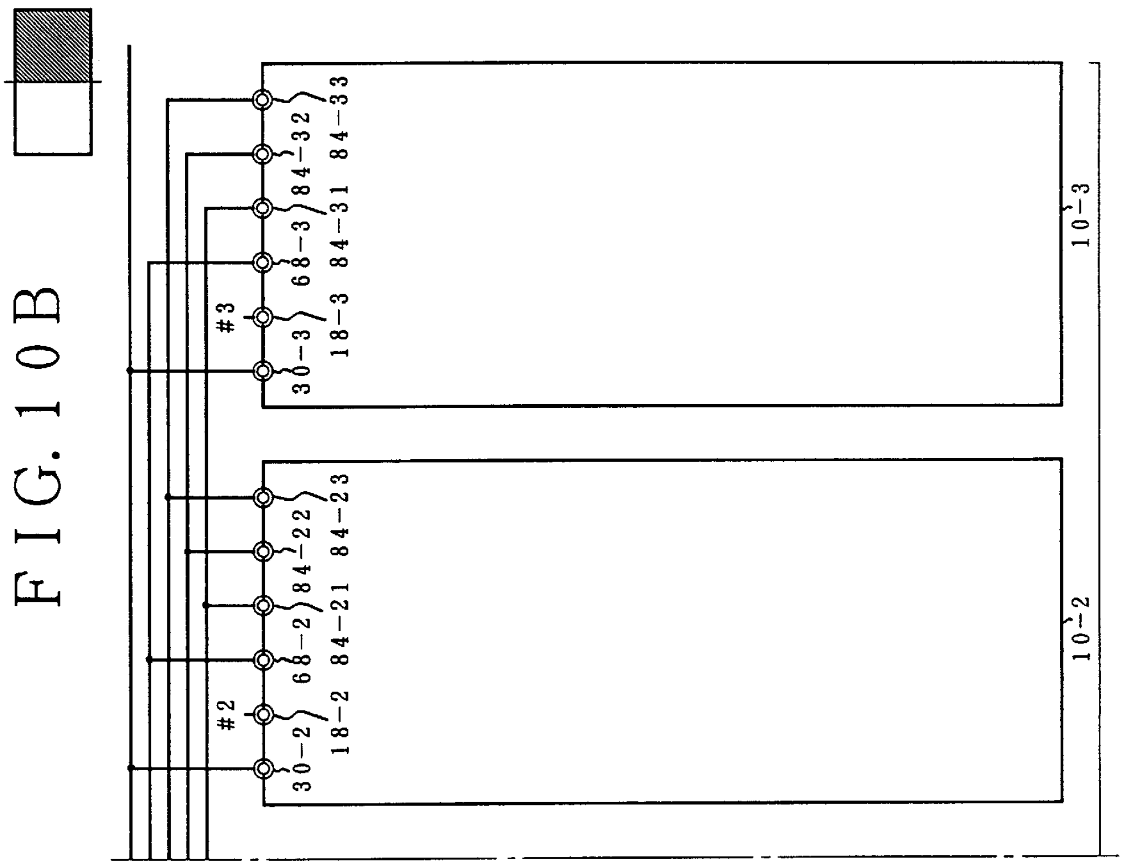

FIGS. 10A and 10B show an embodiment in which in the case where a failure is detected in each of the processors 10-1 to 10-3 of the TMR unit 10, it is intended to suppress the updating of various resources in the processor due to the information of a cycle at which the failure occurred. In addition to the embodiment for detecting the failure in FIGS. 6A and 6B as representatively shown in the processor 10-1, the embodiment newly shows a part 162 of an internal circuit as a target of the suppression of the updating, an internal control circuit 164, and an FF 166 to hold the data from the bus 12. Although the embodiment of FIGS. 10A and 10B relate to the failure detection according to the embodiment of FIGS. 6A and 6B as an example, it can be also similarly applied to the failure detection shown in FIG. 2, 4, or 5 other than such a failure detection. In this case, the number of stages of the FFs for holding the bus information is changed as necessary.

As described in the embodiment of FIGS. 6A and 6B, when a failure of the bus information is detected by the processor 10-1, the bus information failure notification signal E21 is generated from the bus information failure notification signal forming circuit 94. On the other hand, the information inputted from the bus 12 is sequentially held in two cycles by the two FFs of the FF 58 provided subsequent to the tristate circuit 24 for bus and the FF 166 provided in a path reaching a part 162 of the next internal circuit. The FF 166 is provided for forming the bus information failure notification signal E21 in the bus information failure notification signal forming circuit 94 and for matching the timing of the information from the bus 12. It is now assumed that the bus information held in the FF 58 is set to D2 and the bus information held in the next FF 166 is set to D2-1. The bus information D2-1 held in the FF 166 is sent to a part 162 of the internal circuit.

Figure 11:
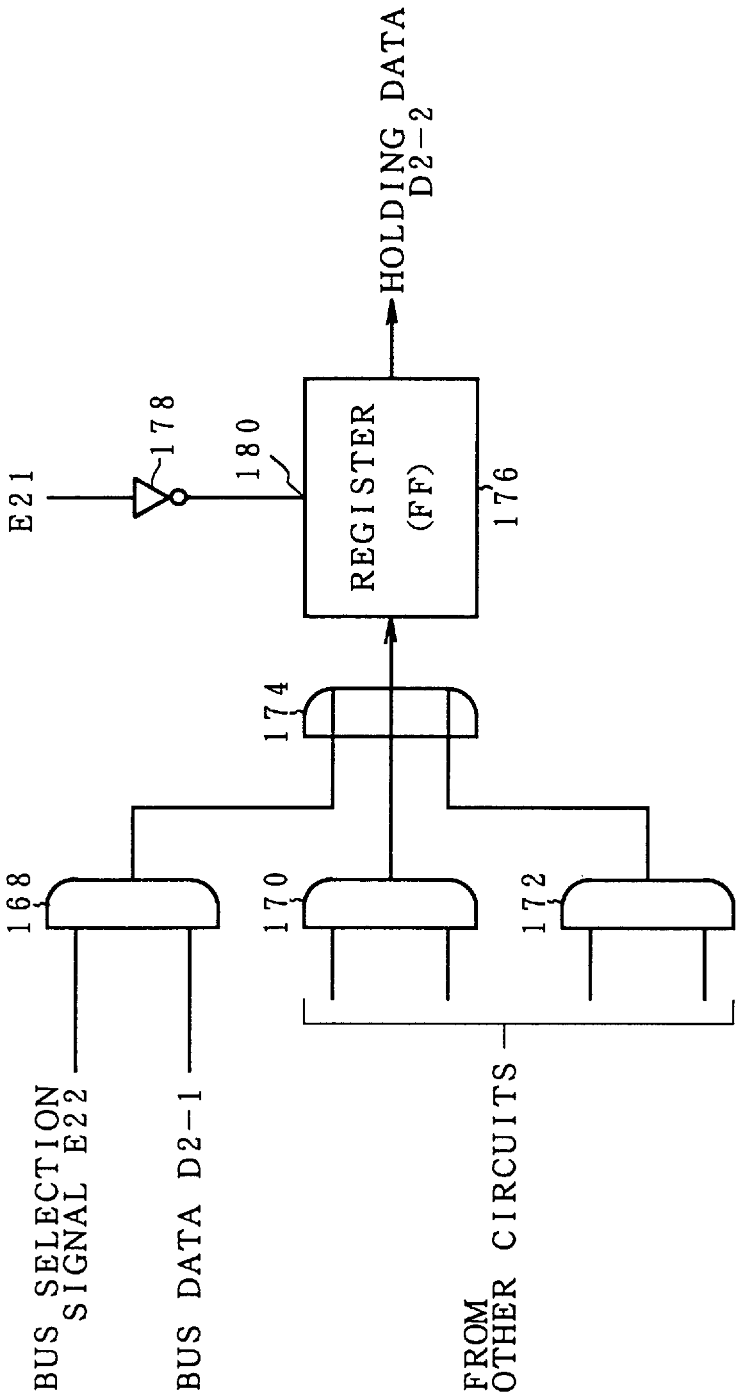
FIG. 11 is a circuit diagram showing an embodiment of a part of an internal circuit in which the updating suppression in FIGS. 10A and 10B is executed.

The suppression of the updating at the time of occurrence of a failure will now be described with respect to a register, as an example, of the internal circuit which is updated by the data which was read from a processor other than the TMR unit 10 as resources as a target of the suppression of the updating. FIG. 11 shows an example of a part 162 of the internal circuit of FIGS. 10A and 10B. A part of the internal circuit has a register 176 using an FF. A multiplexer circuit using AND gates 168, 170, and 172 and an OR gate 174 is provided on the data input side of the register 176. The register 176 has an enable terminal 180 and inputs the bus information failure notification signal E21 in FIGS. 10A and 10B through an inverter 178. In case of reading the data from the processor other than the TMR unit 10 in order to update the register 176, the data on the bus 12 is inputted as bus data D2-1 to the AND gate 168 of the input multiplexer circuit for the register 176 after two cycles. A bus selection signal E22 is inputted to the AND gate 168 from the internal control circuit 164 in FIGS. 10A and 10B. The bus selection signal E22 is turned on simultaneously with the input of the data D2-1 from the bus 12. In this instance, the selection signals for the other AND gates 170 and 172 are OFF. The data D2-1 outputted from the AND gate 168 of the input multiplexer circuit by the turn-on of the bus selection signal E22 is inputted to the register 176 through the OR gate 174. In the ordinary state, the bus information failure notification signal E21 is OFF and the register 176 is in the enable state, so that the data on the bus 12 is set into the register 176 after two cycles. However, when the failure of the bus information is detected, the bus information failure notification signal E21 is turned on after two cycles. Therefore, the enable terminal 180 which received the signal inverted by the inverter 178 is turned off at the timing after two cycles, thereby suppressing the writing of the data D2-1 into the register 176. Thus, the breakage of the contents of the register 176 due to the data at the time of the occurrence of a failure of the bus information can be suppressed. The suppression of the updating of various resources in the embodiment has been described above with respect to the control of the register as an example. However, it is also possible to execute a similar control as necessary with respect to the other internal circuits and to suppress the breakage of the internal resources by the bus information when the failure occurs. With respect to the internal circuit in FIG. 11, although the suppressing cycle period when the failure is detected is set to one cycle, the updating can be also suppressed for necessary continuous cycle periods of time as necessary.

[Disconnection of failed processor]

Figure 12A:
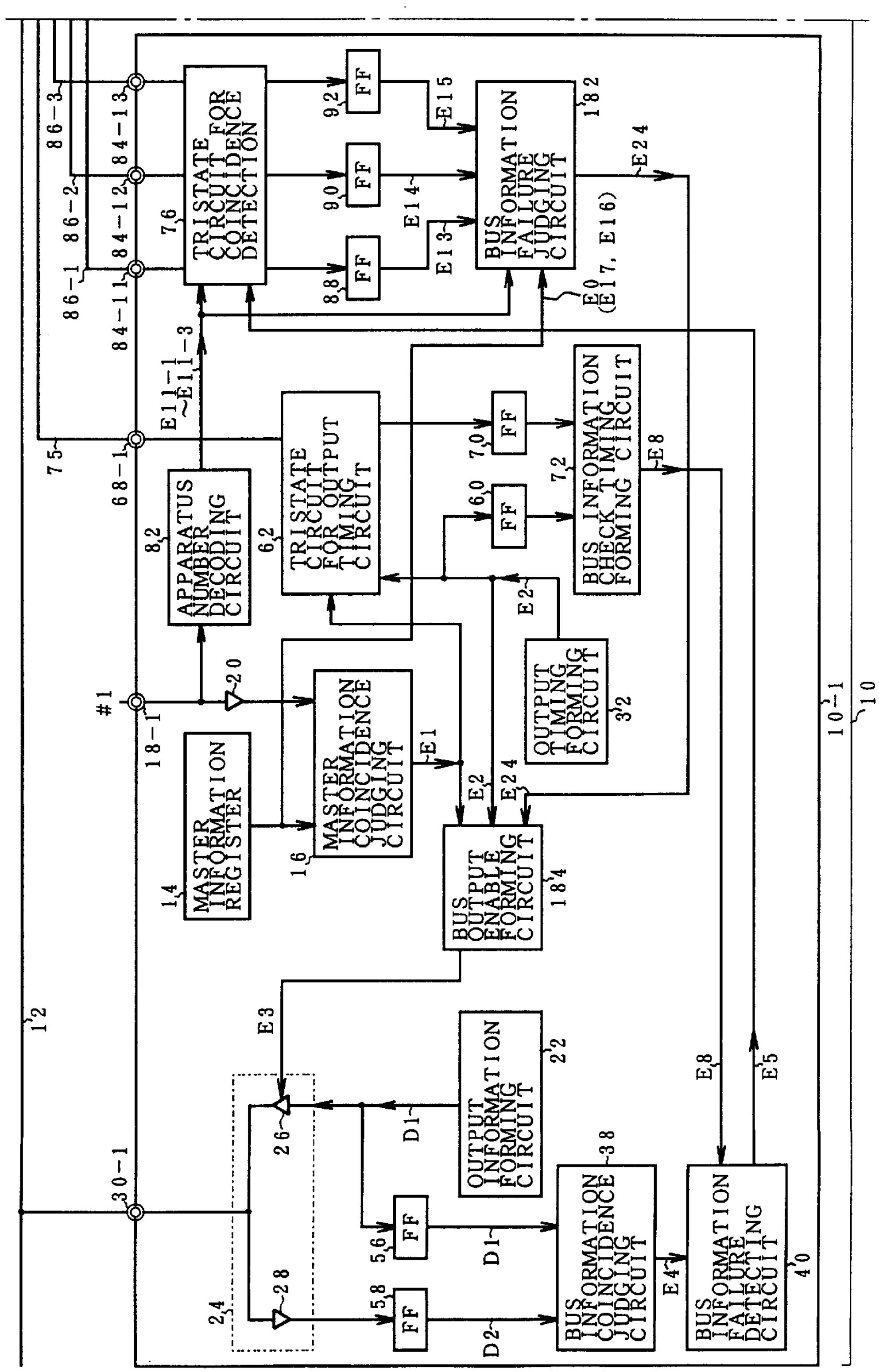

FIGS. 12A and 12B show an embodiment having a construction for disconnecting the failed portion from the TMR unit 10 so as not to exert an adverse influence on the other processors through the bus when the failure occurs. Although the processor representatively shown in the processor 10-1 constructing the TMR unit 10 in the embodiment has substantially the same construction as that of FIGS. 7A and 7B with regard to the failure detection, a bus information failure judging circuit 182 is provided in place of the bus information failure judging circuit 98 in FIGS. 7A and 7B and a bus output enable forming circuit 184 is provided in place of the bus output enable forming circuit 34 in FIGS. 7A and 7B. In a manner similar to the embodiment of FIGS. 7A and 7B, the signals E13, E14, and E15 held in the FFs 88, 90, and 92 of the bus information failure detection signals of the every processors 10-1, 10-2, and 10-3 are inputted to the bus information failure judging circuit 182. The decoding signals E11-1, E11-2, and E11-3 by the decoding of the processor number #1 from the outside which were decoded by the apparatus number decoding circuit 82 are inputted. In the processor 101, since the processor number #1 is inputted, only the decoding signal E11-1 in the three decoding signals which are outputted from the apparatus number decoding circuit 82 is turned on. Further, the master processor number signal E0 indicative of the processor number #1 of the present master processor held in the mater information register 14 is also inputted to the bus information failure judging circuit 182. The master processor number signal E0 comprises the signals E16 and E17 of two bits. In case of the processor number #1, "E17, E16"= "01". The bus information failure judging circuit 182 judges whether the failed processor is the own processor or not on the basis of the inputted bus information failure detection signals E13, E14, and E15, the decoding signals E11-1 to E11-3 of the processor number, and the master processor number signal E0 ("two-bit signals of E16 and E17"). When it is judged that the failed processor is the own processor, a failed processor judgment signal E24 is turned on. The bus output enable forming circuit 184 has a bus output permission flag which is turned on in the normal state. In a state in which the bus output permission flag is ON and the self master signal El from the master information coincidence judging circuit 16 is ON, when the bus output signal E2 formed by the output timing forming circuit 32 is turned on synchronously with the formation of the output information D1 by the output information forming circuit 22, the enable signal E3 for the output driver 26 of the tristate circuit 24 for bus is turned on.

Figure 13:
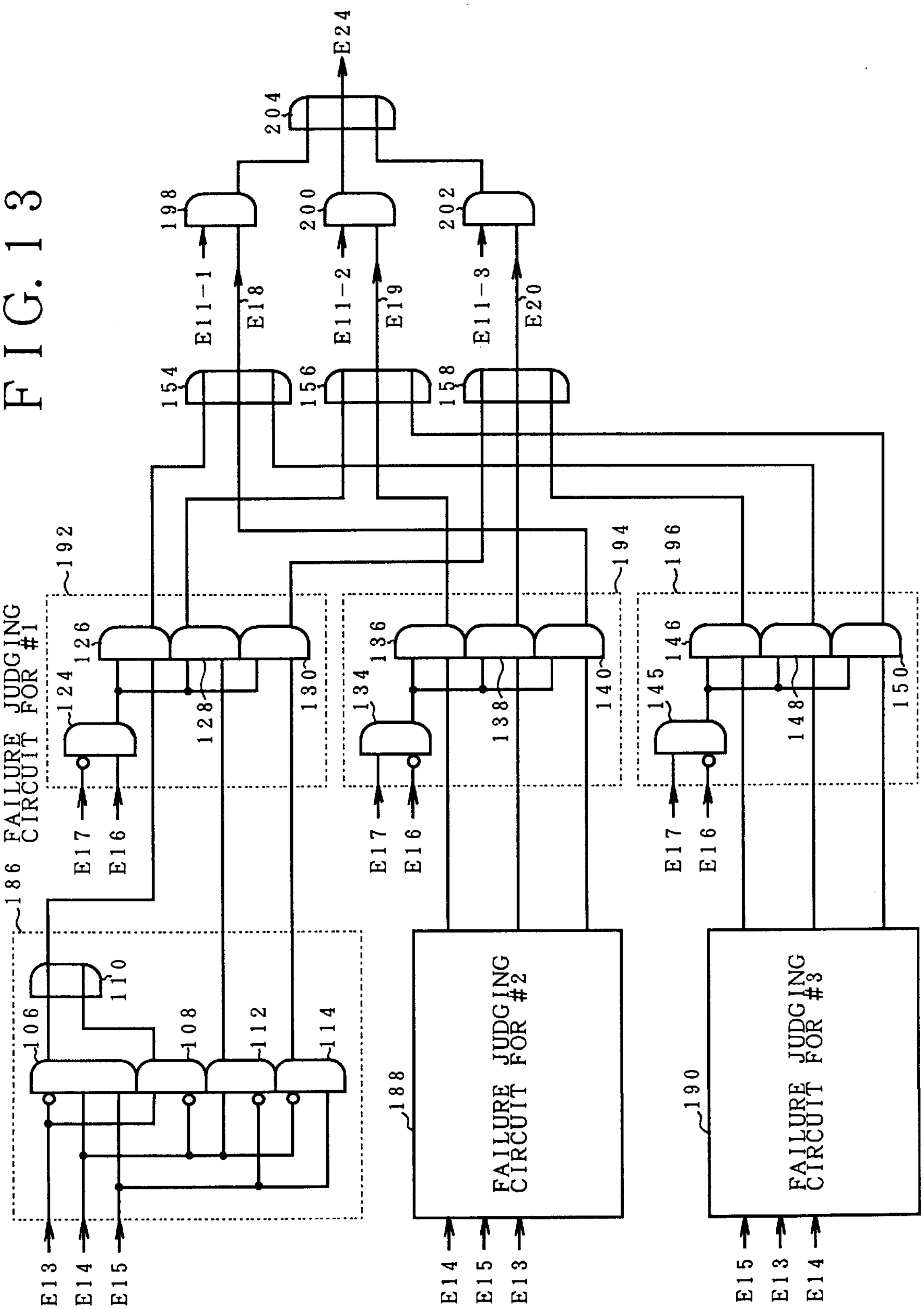
FIG. 13 is a circuit diagram showing an embodiment of a failed processor judging circuit in FIGS. 12A and 12B.

FIG. 13 shows an embodiment of the bus information failure judging circuit 182 in FIGS. 12A and 12B. The bus information failure judging circuit 182 comprises: a failure judging circuit 186 for #1 for judging the failed portion when the processor 10-1 is set to the master processor; a failure judging circuit 188 for #2 for judging the failed portion when the processor 10-2 is set to the master processor; and a failure judging circuit 190 for #3 for judging the failed portion when the processor 10-3 is set to the master processor. The failure judging circuits 186, 188, and 190 for #1, #2, and #3 have the same circuit construction as representatively shown in the failure judging circuit 186 for #1. That is, the failure judging circuit has the four AND gates 106, 108, 112, and 114 and the OR gate 110. This circuit is a circuit which is obtained by excluding the AND gate 116 of the failure judging circuit 100 for #1 in FIG. 8 showing the embodiment of the bus information failure judging circuit 98 in FIGS. 7A and 7B. Subsequent to the failure judging circuits 186, 188, and 190 for #1, #2, and #3, selecting circuits 192, 194, and 196 are provided. The selecting circuits 192, 194, and 196 are also the same circuits as those obtained by excluding AND gates 132, 142, and 152 in the selecting circuits 118,, 120, and 122 in FIG. 8. Subsequently, the OR gates 154, 156, and 158 are provided and they are the same circuits as those obtained by excluding the OR gate 160 at the final stage in FIG. 8. Further, an output circuit unit of AND gates 198, 200, and 202 and OR gate 204 is provided. The failure judging circuit 186 for #1 in FIG. 13 inputs the failure detection signals E13, E14, and E15 of the processors 10-1, 10-2, and 10-3 and logically executes the judgment of the failed processor in accordance with the Table of FIG. 9. Namely, the AND gate 106 turns on an output in the case where the processor 10-1 as a master processor in mode 4 in FIG. 9 is normal and a failure is detected in the two processors 10-2 and 10-3 as slave processors, thereby judging the failure of the processor 10-1 as a master processor. The AND gate 108 turns on an output in the case where the processor 10-1 as a master processor in mode 5 in FIG. 9 fails and the two processors 10-2 and 10-3 as slave processors are normal, thereby judging the failure of the processor 10-1. Even in the case where the output of either one of the AND gates 106 and 108 is ON, the processor 10-1 fails, so that the OR of the outputs of the AND gates 106 and 108 is got by the OR gate 110 and is outputted. The AND gate 112 turns on an output when the processor 10-2 as a slave processor in mode 3 in FIG. 9 fails, thereby judging the failure of the processor 10-2. Further, the AND gate 114 turns on an output when the processor 10-3 as a slave processor in mode 2 in FIG. 9 fails, thereby judging the failure of the processor 10-3. The selecting circuit 192 which is subsequently provided turns on an output of the AND gate 124 by "E17, E16"="01" as a combination of the signals E16 and E17 of two bits corresponding to the master processor number #1 which was set into the master information register 14 and sets the three AND gates 126, 128, and 130 into a permission state, thereby allowing a judgment signal from the failure judging circuit 186 for #1 to be outputted. Therefore, when the output signal E18 of the OR gate 154 is turned on, a failure of the processor 10-1 as a master processor is shown. When the output signal E19 of the OR gate 156 is turned on, a failure of the processor 10-2 as a slave processor is shown. Further, when the output signal E20 of the OR gate 158 is turned on, a failure of the processor 10-3 as a slave processor is shown. The decoding signals E11-1, E11-2, and E11-3 from the apparatus number decoding circuit 82 in FIGS. 12A and 12B are inputted to the subsequent AND gates 198, 200, and 202, respectively. Since the processor number #1 has been set into the processor 10-1 from the outside, only the decoding signal E11-1 is turned on. Only the signal E18 indicative of the failure of the processor 10-1 from the OR gate 154 is selected and is outputted to the bus output enable forming circuit 184 in FIGS. 12A and 12B as a failed processor judgment signal E24 through the OR gate 204.

Figure 14:
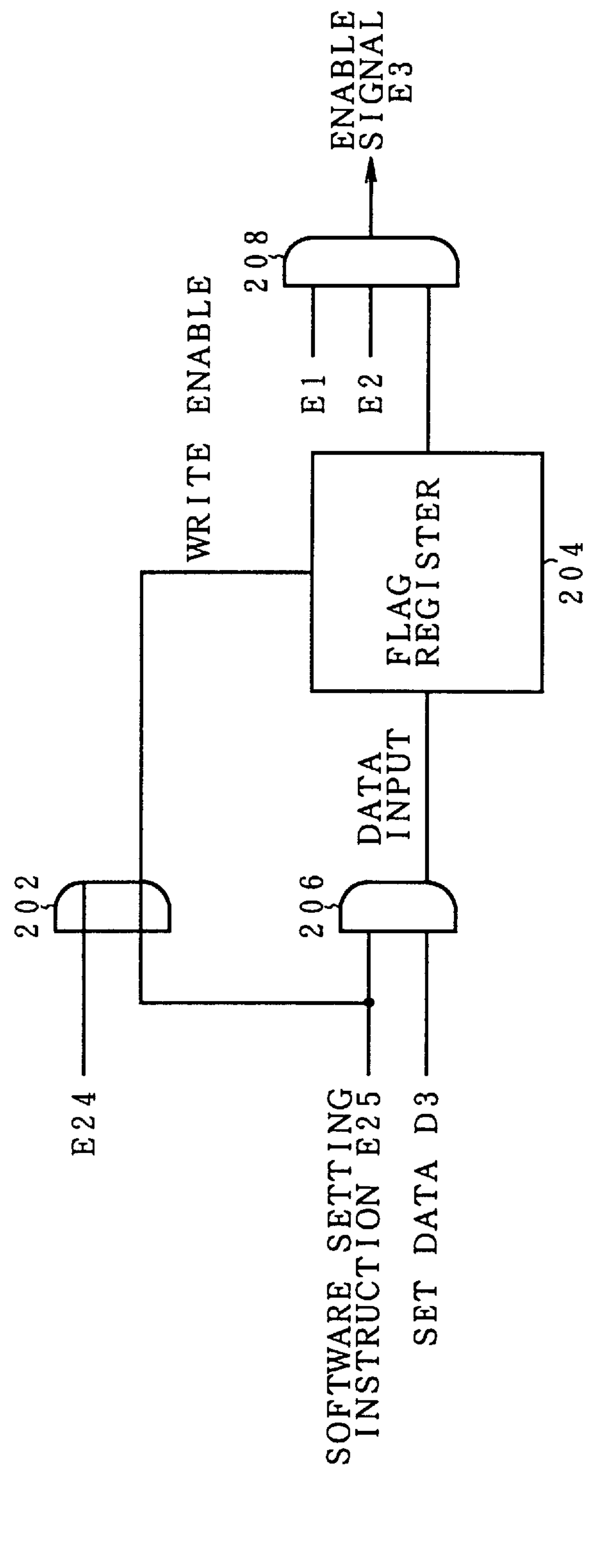
FIG. 14 is a circuit diagram showing an embodiment of a bus output enable forming circuit in FIGS. 12A and 12B.

FIG. 14 shows an embodiment of the bus output enable forming circuit 184 in FIGS. 12A and 12B. The bus output enable forming circuit 184 is constructed by: a flag register 205; an AND gate 206 for inputting data to the flag register 205; an OR gate 203 for controlling a write-enable and a reset of the flag register 205; and an AND gate 208 for outputting. A bus output permission flag is prepared for the flag register 205. As for the bus output permission flag, by supplying set data D3 for turning on the flag and a software setting instruction signal E25 by a process of a software at the start of the operation of the processor, "1" is set to the bus output permission flag as an initial value. After that, the flag 1 is held in the ordinary operation. When the failed processor judgment signal E24 is turned on on the basis of the failure detection by the own processor by the bus information failure judging circuit 182 in FIG. 13, the flag register 205 is reset through the OR gate 203 and the bus output permission flag is reset to "0". When the bus output permission flag 1 has been set and held in the flag register 205, a flag signal E26 for the AND gate 208 is ON. In case of the master processor, the self master signal E1 which is outputted from the master information coincidence judging circuit 16 in FIGS. 12A and 12B is also ON. Therefore, when the bus output signal E2 from the output timing forming circuit 32 in FIGS. 12A and 12B is turned on, the enable signal E3 which is outputted from the AND gate 208 in FIG. 14 is turned on. The output driver 26 provided for the tristate circuit 24 for bus is set into an enable state. The output information from the output information forming circuit 22 can be transmitted to the bus 12. On the other hand, when the flag of the flag register 205 is reset to "0" by the turn-on of the failed processor judgment signal E24 based on the failure detection of the own processor, the flag signal E26 is also turned off and the AND gate 208 is set into an inhibition state, thereby fixing the enable signal E3 to OFF. Thus, the transmission of the output information to the bus 12 from the failed processor is inhibited, thereby disconnecting the failed processor from the bus 12. By disconnecting the failed processor from the bus 12, it is possible to prevent that an adverse influence is exerted on the other processors.

[Re-decision of master processor]

Figure 15A:
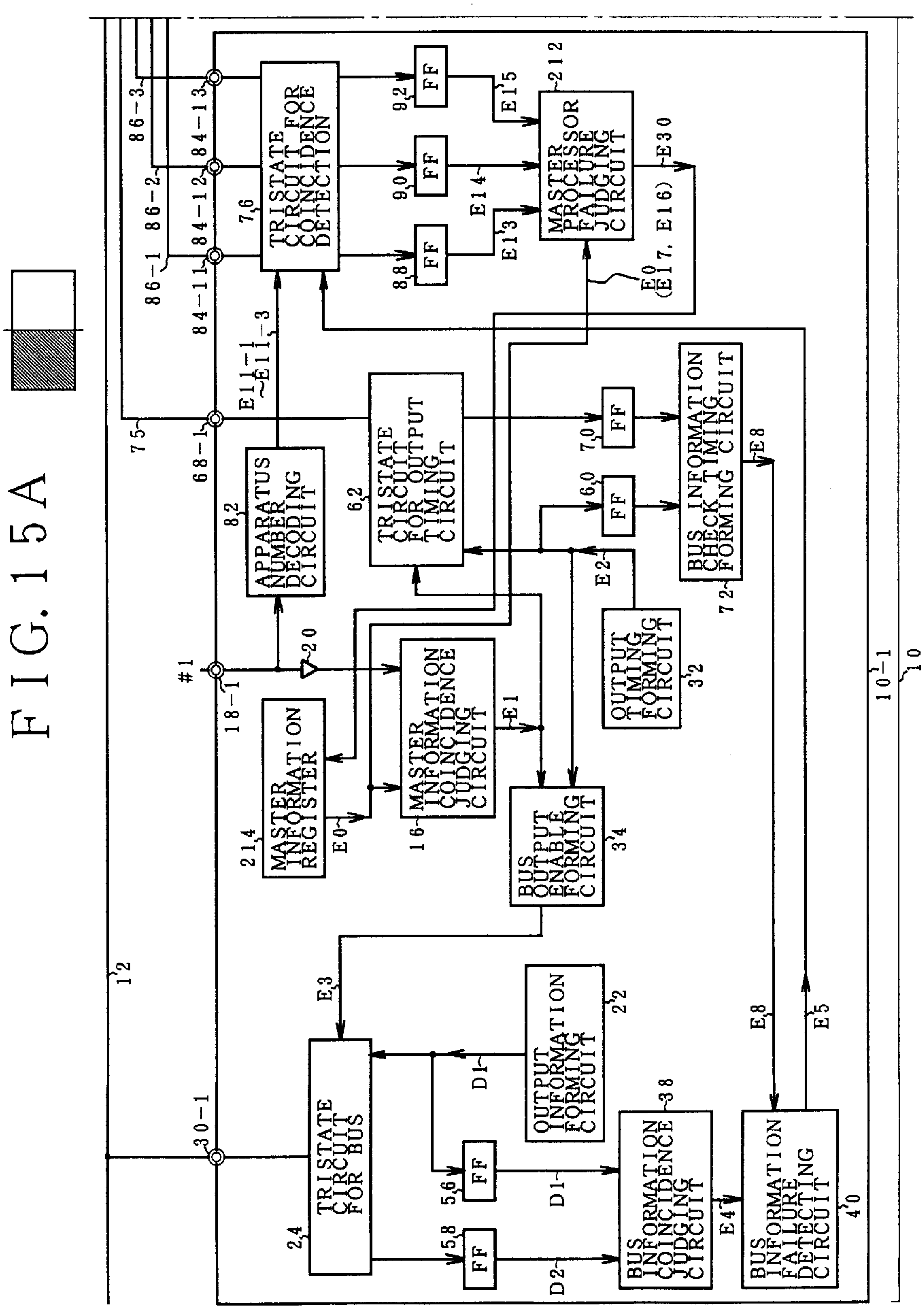
FIGS. 15A and 15B are block diagrams of an embodiment of the invention for re-deciding a master processor when a failure is detected.
Figure 15B:
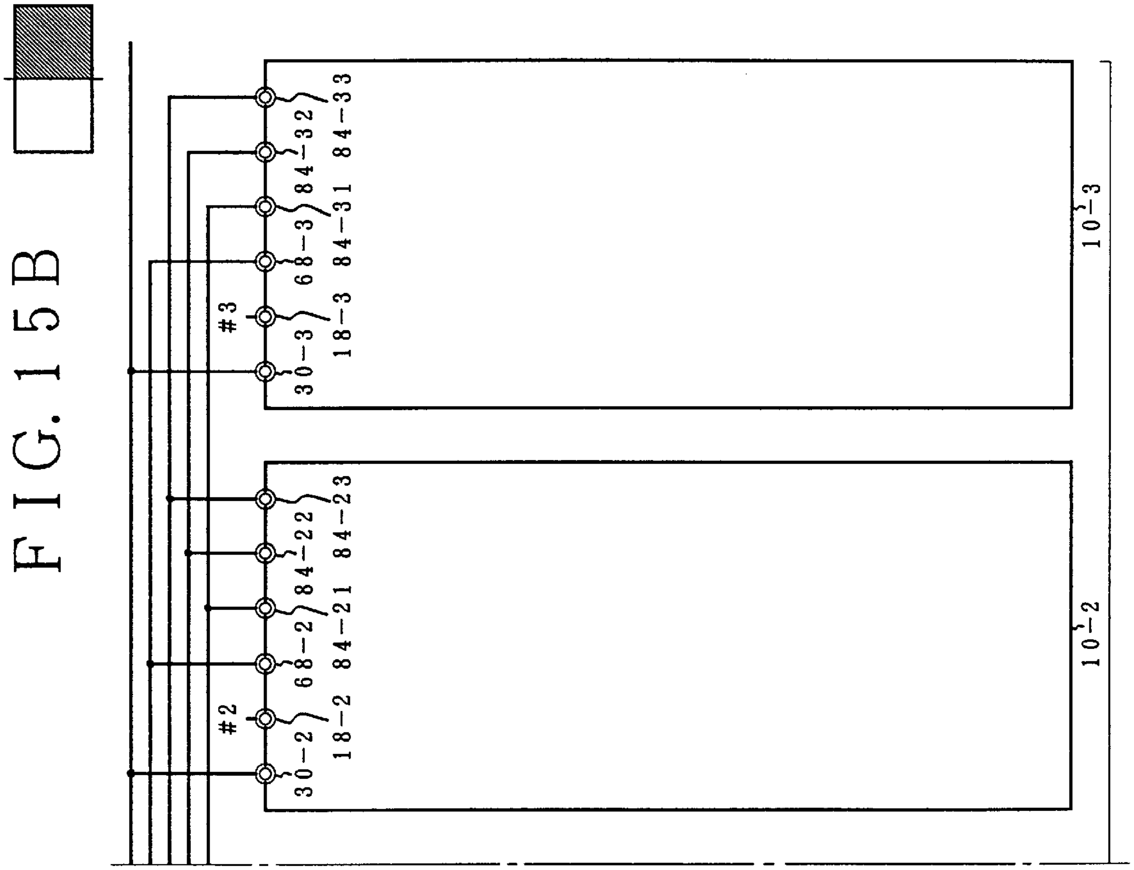

FIGS. 15A and 15B show an embodiment in which in the case where the processor which is at present the master processor is disconnected from the bus by the occurrence of the failure, the master processor is newly determined in the remaining normal processors constructing the TMR unit 10, thereby again deciding the master processor to continue the process. The processors 10-1, 10-2, and 10-3 constructing the TMR unit 10 have the same construction as that shown representatively in the processor 10-1 which is the master processor at present. The construction of the processor 10-1 is characterized in that a master processor failure judging circuit 212 is provided in place of the bus information failure judging circuit 98 provided in the embodiment of FIGS. 7A and 7B and, further, a master information register 214 having another construction is provided in place of the master information register 14 in FIGS. 7A and 7B. The other construction is substantially the same as that of the embodiment of FIGS. 7A and 7B.

The master processor failure judging circuit 212 to judge the failure of the master processor is provided for the processor 10-1. The signals based on the failure detection results of the processors 10-1 to 10-3 obtained by the tristate circuit 76 for coincidence detection are held in the FFs 88, 90, and 92 and are inputted as failure detection signals E13, E14, and E15 to the master processor failure judging circuit 212. The master number signal E0 indicative of the present master processor number held in the master information register 214, namely, the processor number #1 of the processor 10-1 is also inputted to the circuit 212. The master number signal E0 is a signal of two bits of the signals E17 and E16. For the master processor numbers #1, #2, and #3, the 2-bit signals "E17, E16" are set to, for example, "01", "10", or "11". The master processor failure judging circuit 212 judges the failure of the master processor on the basis of the inputted failure detection signals E13, E14, and E15 and the master number signal E0 "the 2-bit data of E17, E16".

Figure 16:
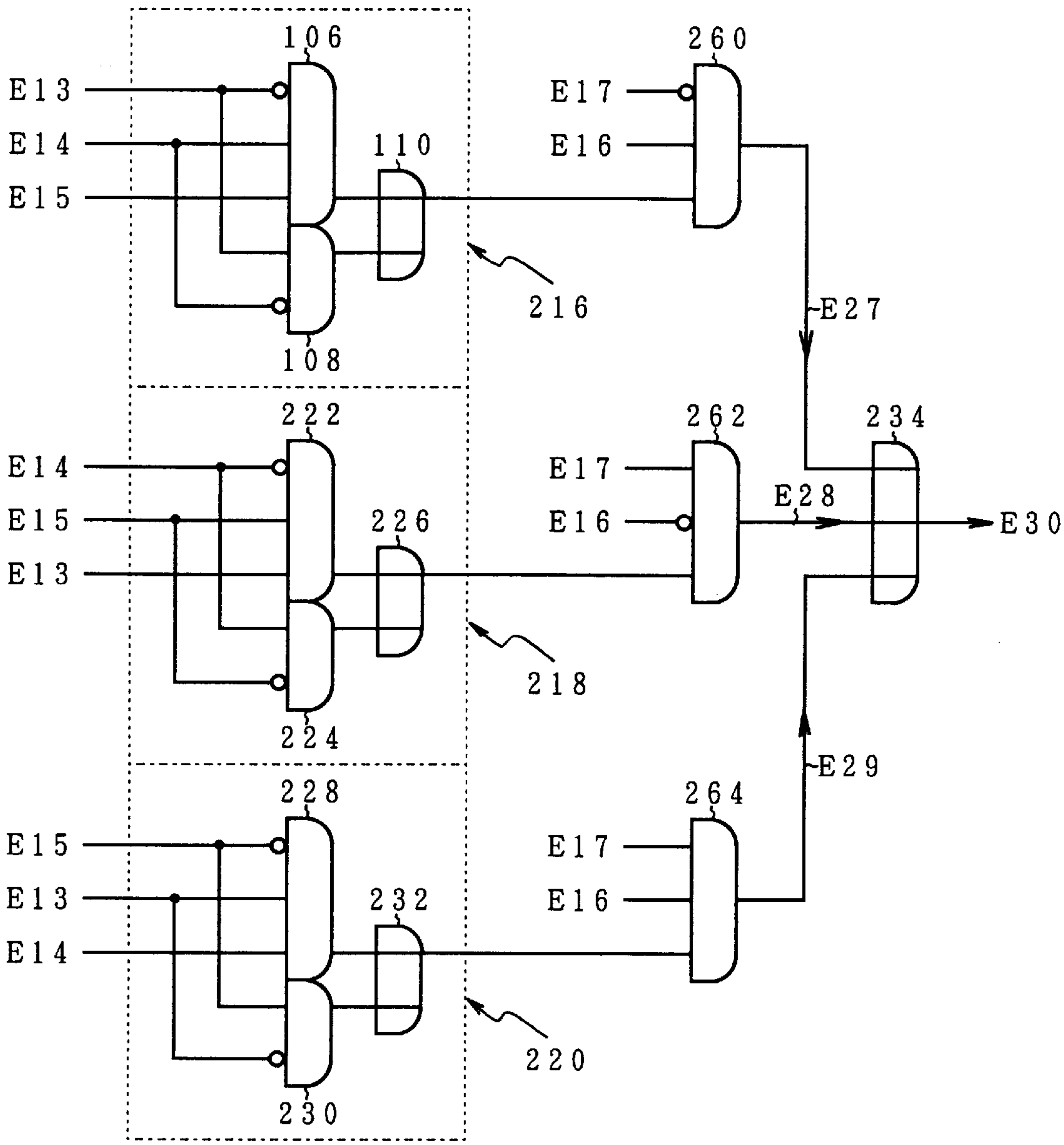
FIG. 16 is a block diagram showing an embodiment of a master processor failure judging circuit in FIGS. 15A and 15B.

FIG. 16 shows an embodiment of the master processor failure judging circuit 212 in FIGS. 15A and 15B. The failure judgment when the processor 10-1 is set to the master processor is executed by a failure judging circuit 216 for #1. The failure judgment when the processor 10-2 is set to the master processor is executed by a failure judging circuit 218 for #2. Further, the failure judgment when the processor 10-3 is set to the master processor is executed by a failure judging circuit 220 for #3. The failure judging circuit 216 for #1 comprises the AND gates 106 and 108 and OR gate 110. The judging conditions in the failure judging circuit 216 for #1 are based on the Table of FIG. 9. Namely, an output of the OR gate 110 is turned on on the basis of the inputs of the failure detection signals E13, E14, and E15 in the patterns in modes 4 and 5 in FIG. 9. That is, mode 4 relates to the case where the processor 10-1 as a master processor is normal and the failure is detected in the two processors 10-2 and 10-3 as slave processors. In this case, it is judged that the processor 10-1 as a master processor fails. In this instance, the failure detection signal E13 is OFF and the two failure detection signals E14 and E15 are ON. Therefore, the output of the AND gate 106 is turned on. Mode 5 in FIG. 9 is judged by the AND gate 108. Mode 5 relates to the case where the processor 10-1 as a master processor fails and the processor 10-2 as a slave processor is normal. In this case, it is judged that the processor 10-1 as a master processor fails. At this time, since the failure detection signal E13 is ON and the failure detection signal E14 is OFF, the output of the AND gate 108 is turned on. With respect to the failure judging circuit 218 for #2 and failure judging circuit 220 for #3 in the case where the master processor is set to the processors 10-2 and 10-3, although the circuit constructions are the same, the input positions of the failure detection signals E13, E14, and E15 are different. The failure judging circuit 218 for #2 detects the failure of the processor 10-2 which has been set in the master processor and turns on the output. When the processor 10-3 is set to the master processor, the failure judging circuit 220 for #3 detects the failure and turns on the output. Subsequent to the failure judging circuits 216, 218, and 220 for #1, #2, and #3, AND gates 260, 262, and 264 of three inputs are provided. The AND gate 260 is constructed by the AND gates 124 and 126 provided for the selecting circuit 118 in FIG. 8. The AND gate 262 is also constructed by AND gates 134 and 136 provided for the selecting circuit 120 in FIG. 8. Similarly, the AND gate 264 is also constructed by AND gates 145 and 146 provided for the selecting circuit 122 in FIG. 8. The AND gate 260 is set into the permission state when the 2-bit data "01" corresponding to the processor number #1 of the processor 10-1 is set into the master information register 214 in FIGS. 15A and 15B as a master processor and the signal E17 is OFF and the signal E16 is ON. The AND gate 260 generates the output of the failure judging circuit 216 for #1 as a master processor failure judgment signal E27. The AND gate 262 is set to the permission state by the turn-on of the signal E17 and the turn-off of the signal E16 when the 2-bit data "10" in the case where the master processor is set to the processor 10-2 is set into the master information register 214 in FIGS. 15A and 15B. The AND gate 262 generates a failure judgment signal E28 based on the judgment of the processor 10-2 as a master processor by the failure judging circuit 218 for #2. Further, the AND gate 264 is set to the permission state by the turn-on of both of the signals E17 and E16 when the 2-bit data "11" which was set in accordance with the processor number #3 in case of setting the master processor to the processor 10-3 is set into the master information register 214 in FIGS. 15A and 15B. The AND gate 264 generates a failure judgment signal E29 of the processor 10-3 as a master processor from the failure judging circuit 220 for #3. The failure judgment signals regarding the master processor from the AND gates 260, 262, and 264 are collected by an OR gate 234. An output signal of the OR gate 234 is generated as a master processor failure judgment signal E30. The signal E30 is supplied to the master information register 214 in FIGS. 15A and 15B.

The 2-bit data "01" corresponding to the master processor number as an initial value, for example, the processor number #1 is set into the master information register 214 in FIGS. 15A and 15B by an instruction from the software at the start of the operation of the processor. In this state, it is assumed that the failure of the processor 10-1 as a master processor at present is judged in the master processor failure judging circuit 212 and the master processor failure judgment signal E30 is turned on. In this case, the master information register 214 increases a built-in 2-bit register by one bit, thereby updating to a new master processor number. For example, now assuming that the processor number is at present equal to the master processor number #1, it is updated to a new master processor number #2 by the failure judgment.

Figure 17:
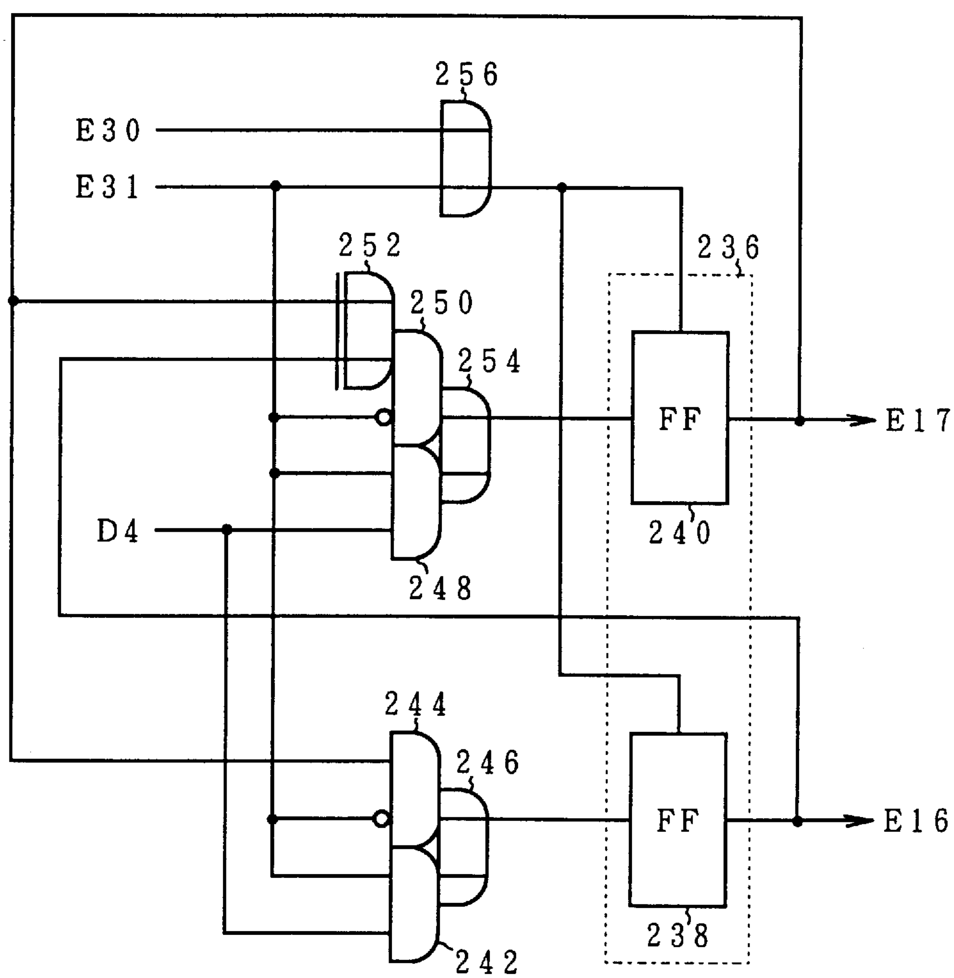
FIG. 17 is a circuit diagram showing an embodiment of a master information register in FIGS. 15A and 15B.

FIG. 17 shows an embodiment of the master information register 214 in FIGS. 15A and 15B. A 2-bit register 236 having FFs 238 and 240 is provided for the master information register 214. The 2-bit register 236 forms the first bit (lower bit) by the FF 238 and forms the second bit (upper bit) by the FF 240. Outputs of the FFs 238 and 240 are set to the 2-bit signals E16 and E17, respectively. An input multiplexer circuit comprising AND gates 242 and 244 and an OR gate 246 is provided at the input stage of the FF 238 of the first bit of the 2-bit register 236. An input multiplexer circuit comprising AND gates 248 and 250, an EX-OR gate 252, and an OR gate 254 is also provided at the input stage of the FF 240 of the second bit. Further, a software setting instruction signal E31 or the master processor failure judgment signal E30 from the master processor failure judging circuit 212 in FIGS. 15A and 15B is supplied from an OR gate 256 to write enable terminals of the FFs 238 and 240 provided for the 2-bit register 236. Further, set data D4 by the software is supplied to one input of each of the AND gates 242 and 248. In the initial state just after the power source was turned on, both of the FFs 238 and 240 of the 2-bit register 236 are reset to zero outputs. In this state, when the set data D4 is set to 01 and the software setting instruction signal E31 is turned on by the software, "1" is written into the FF 238 of the first bit of the 2-bit register 236 in accordance with the set data D4. "0" is written into the FF 240 of the second bit in accordance with the set data D4. In the initial state, therefore, the 2-bit signals E17 and E16 of the 2-bit register 236 are set to "01" and shows the master processor number #1 as a decimal number. In a state in which the first processor 10-1 in which "1" was set in the FF 238 of the 2-bit register 236 and "0" was set in the FF 240 has been set to the master processor, an output of the EX-OR 252 is set to 1 by a feedback output of the FF 238 and a feedback output of the FF 240. An input port of the FF 240 is set to 1. On the other hand, an input port of the FF 238 is set to 0. In a holding state of the 2-bit data "01" in which the processor number #1 of such a processor 10-1 has been set into the 2-bit register 236, it is assumed that the failure is detected in the processor 10-1 set to the master processor and the failure judgment signal E30 is turned on. The failure judgment signal E30 turns on the write enable terminals of the FFs 238 and 240 in the 2-bit register 236 through the OR gate 256. Since the input of the FF 238 is equal to 0, the FF 238 is set from 1 to 0. Since the input of the FF 240 is equal to 1, the FF 240 is set from 0 to 1. The 2-bit signals E17 and E16 are changed to "10". The 2-bit data "10" indicates the processor number #2 as a decimal number showing the processor 10-2. In this manner, on the basis of the failure judgment signal in the processor as a master processor at present, the updating to the processor number #2 of the processor 10-2 indicative of the new master processor is executed for the master information register 214. FIG. 18 shows a table of the updating contents of the master processor number by the master information register 214 in FIGS. 15A and 15B. In case of the processor number #1, it is updated to #2. In case of #2, it is updated to #3. Further, in case of #3, it is updated to #1.

[Retransfer of holding information]

Figure 19A:
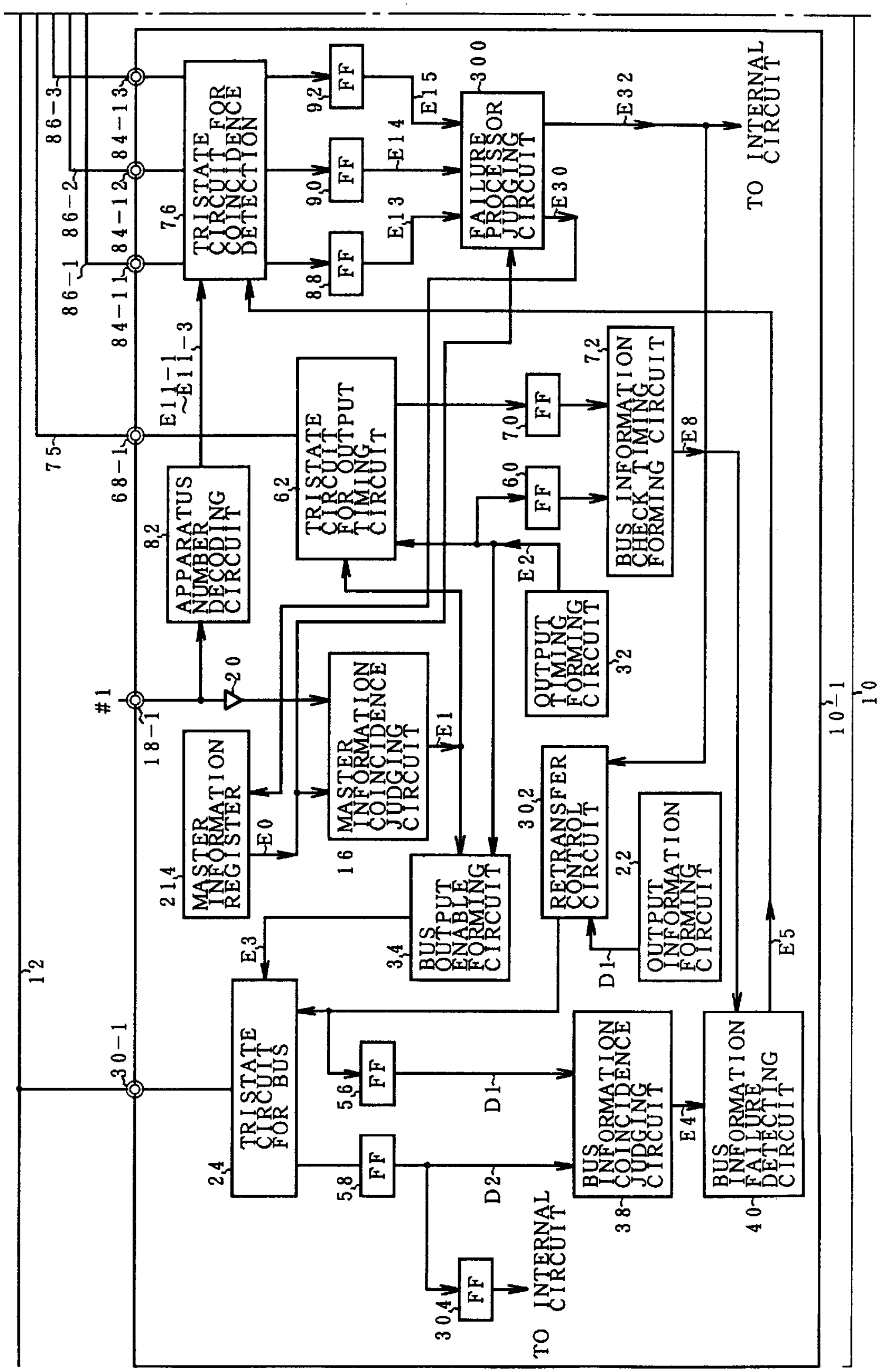
FIGS. 19A and 19B are block diagrams of an embodiment of the invention for retransferring holding information at the time of a failure.
Figure 19B:
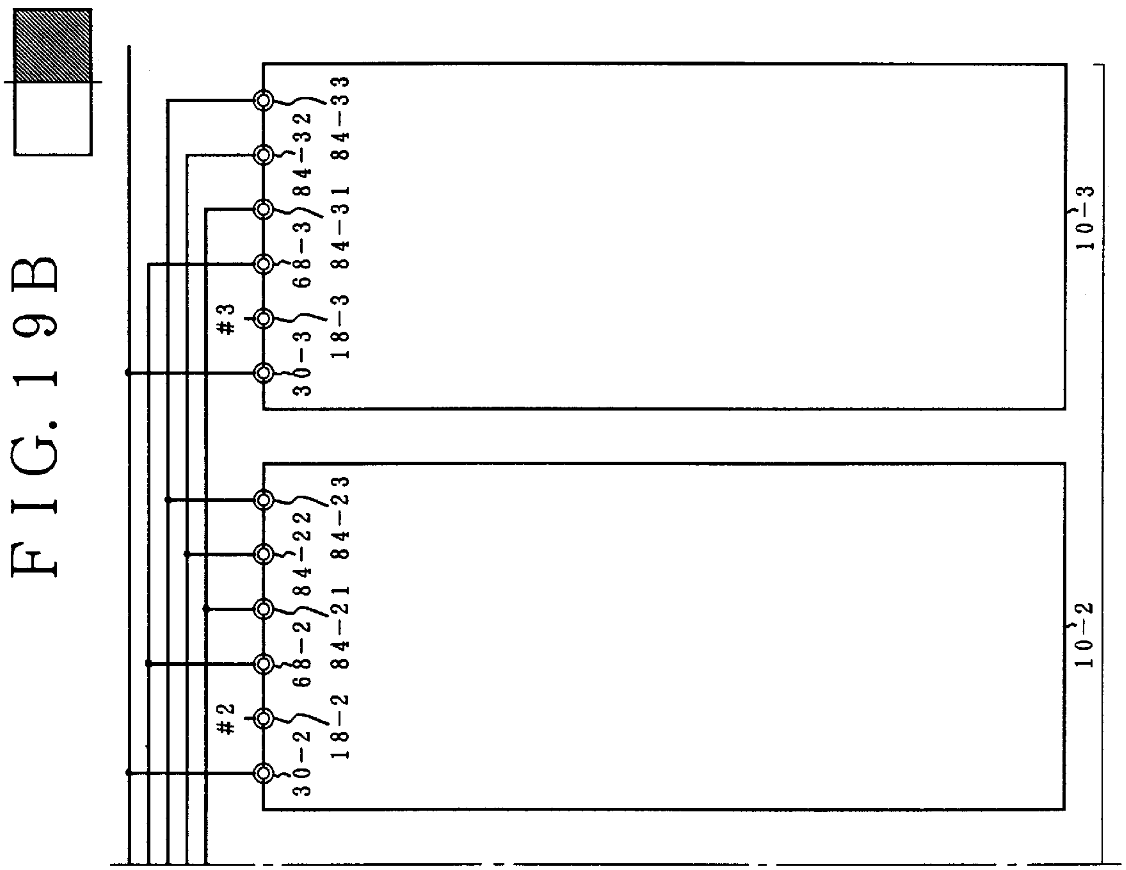

FIGS. 19A and 19B show an embodiment in which after a failure occurred and the new master processor was again decided as necessary, various information formed by the processors after the occurrence of the failure held in each processor including the processor other than the TMR unit 10 is again outputted to the bus by a processor system which was newly reconstructed. By such a retransfer of the holding information after reconstruction after the failure had been detected, by performing a retry from the failure occurrence process by the reduced TMR construction, the reliability can be guaranteed. In the embodiment, as representatively shown in the processor 10-1 among the processors 10-1 to 10-3 constructing the TMR unit 10, the processor 10-1 has a bus information failure judging circuit 300 in place of the master processor failure judging circuit 212 in the embodiment in FIGS. 15A and 15B. A retransfer control circuit 302 is also newly provided on the side of the output information forming circuit 22.

In a manner similar to that described in the embodiment of FIGS. 15A and 15B, the failure detection signals formed by the processors 10-1 to 10-3 constructing the TMR unit 10 are inputted to the tristate circuit 76 for detecting the coincidence and pass through the FFs 88, 90, and 92 and are inputted to the bus information failure judging circuit 300 as failure detection signals E13, E14, and E15 corresponding to the processors 10-1 to 10-3, respectively. The master number signal E0 indicative of the 2-bit register information "01" corresponding to the master processor number set in the master information register 214, for example, the master processor number #1 is also further inputted to the bus information failure judging circuit 300. The master number signal E0 is constructed by the signals E16 and E17 of two bits. On the basis of the input of the failure detection signals E13, E14, and E15 held in the FFs 88, 90, and 92 and the master number signal E0 from the master information register 214, the bus information failure judging circuit 300 outputs the processor failure judgment signal E30 indicative of the failure of the master processor to the master information register 214 as necessary in order to decide a new master processor. A control signal (3-cycle on signal) E32 to retransfer the output information held at the time of the failure detection to the bus 12 is outputted to the retransfer control circuit 302.

Figure 20:
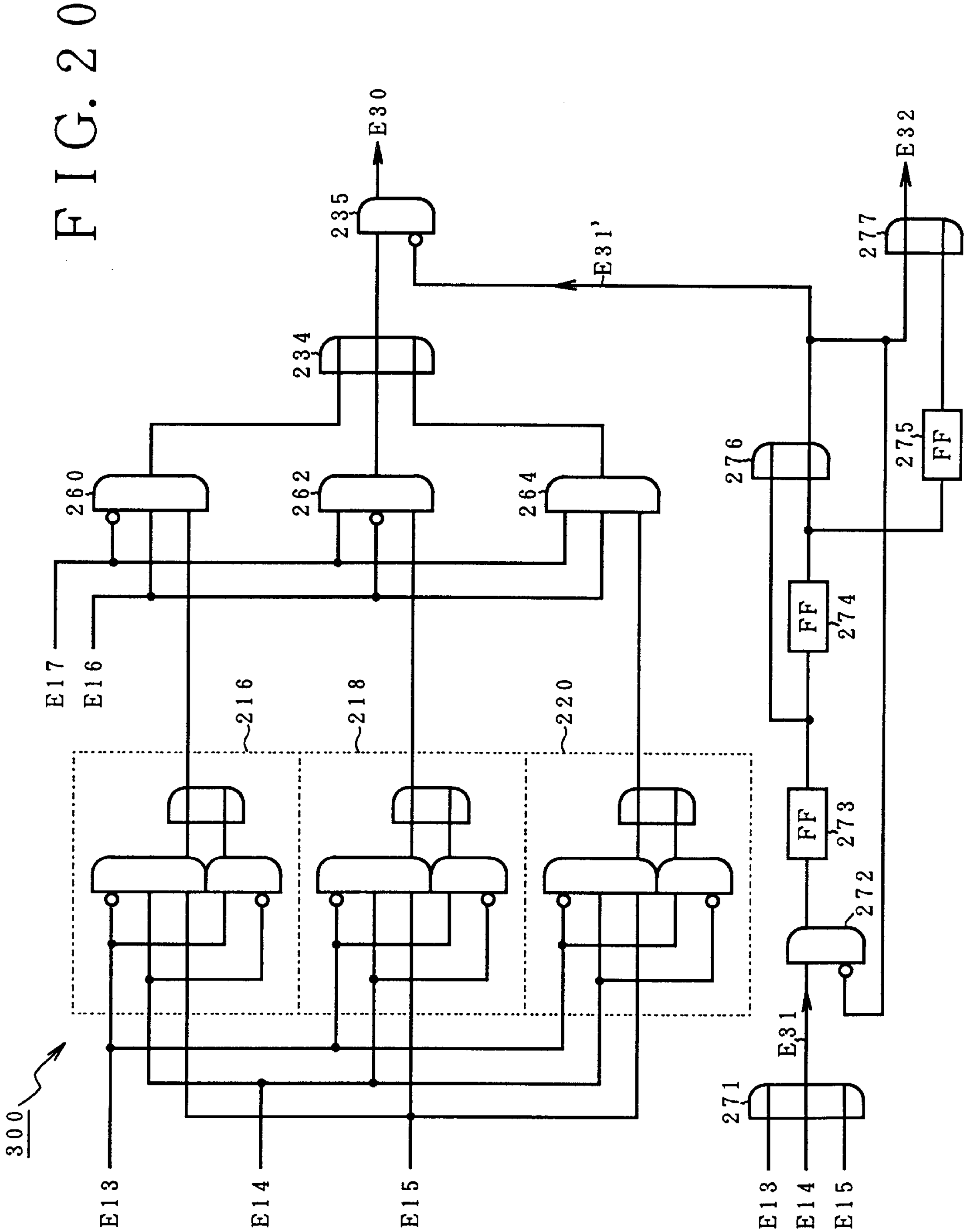
FIG. 20 is a circuit diagram showing an embodiment of a failed processor judging circuit in FIGS. 19A and 19B.

FIG. 20 shows an embodiment of the bus information failure judging circuit 300 in FIGS. 19A and 19B. The circuit 300 has the failure judging circuit 216 for #1, failure judging circuit 218 for #2, and failure judging circuit 220 for #3. The failure judging circuits 216, 218, and 220 for #1, #2, and #3 are the same as those in FIG. 16 showing the embodiment of the master processor failure judging circuit 212 in FIGS. 15A and 15B. The circuit comprising the AND gates 260, 262, and 264 and OR gate 234 provided subsequently is also the same as the circuit in FIG. 16. An output of the OR gate 234 is inputted to an AND gate 235 together with an inversion signal of a 2-cycle on signal E31', which will be explained hereinlater. By this circuit unit, the processor failure judgment signal E30 indicative of the failure occurrence of the processor which is at present the master processor is formed and is supplied to the master information register 214 in FIGS. 19A and 19B, thereby updating the master processor number when the failure of the master processor occurs. As a master information register 214 for this purpose, the circuit of FIG. 17 is used. The reason why the inversion signal of the 2-cycle on signal E31' is inputted to the AND gate 235 is because in the case where the failure by the bus information is once detected, since there is a possibility such that the failure by the same processor continuously occurs for a period of time until the failed processor is disconnected from the construction of the TMR unit 10, the detection of the continuous failure is suppressed. In this case, when the failure continuously occurs due to another cause, the failure detection is again performed upon retransfer based on the present failure by the retransfer control circuit 302. The failure detection signals E13, E14, and E15 are collected by an OR gate 271. The 1-cycle on signal E31 which is turned on for a period of time of one cycle at the time of the failure detection is formed by an output of the OR gate 271. The 1-cycle on signal E31 which is turned on upon failure detection from the OR gate 271 is inputted to an AND gate 272 together with the inversion signal of the 2-cycle on signal E31', which will be explained hereinlater. An output of the AND gate 272 is sequentially latched into FFs 273, 274, and 275. By getting the OR of outputs of the FFs 273 and 274 by an OR gate 276, the 2-cycle on signal E31' which is turned on for a period of time of two cycles from the failure detection is formed. Similarly, by getting the OR of the 2-cycle on signal E31' and an output of the FF 275 by an OR gate 277, the 3-cycle on signal E32 which is turned on for a period of time of three cycles from the failure detection is formed. The 3-cycle on signal E32 is outputted to the retransfer control circuit 302 in FIGS. 19A and 19B.

The output data D1 for the bus 12 formed by the output data forming circuit 22 is inputted to the retransfer control circuit 302 provided for the processor 10-1 in FIGS. 19A and 19B and the 3-cycle on signal E32 from the bus information failure judging circuit 300 is also inputted. In the normal state in which the 3-cycle on signal E32 is OFF, the output information D1 passes through the retransfer control circuit 302 and is transferred to the external bus 12 from the tristate circuit 24 for bus. When the failure occurs, the output data D1 of the first to third cycles is held in the retransfer control circuit 302. The output information D1 held is retransferred to the bus 12 by the 2-cycle on signal E32 that is outputted from the bus information failure judging circuit 300 and that is turned on from the fourth cycle.

Figure 21:
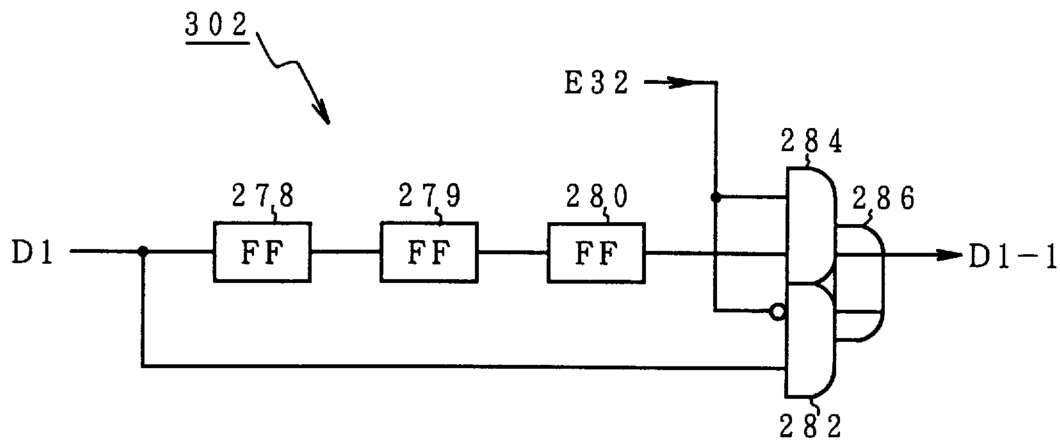
FIG. 21 is a circuit diagram showing an embodiment of a retransfer control circuit in FIGS. 19A and 19B.

FIG. 21 is an embodiment of the retransfer control circuit 302 in FIGS. 19A and 19B. The retransfer control circuit 302 has a multiplexer circuit in which FFs 278, 279, and 280 are serially connected and AND gates 282 and 284 and an OR gate 286 are used at the final stage. The 3-cycle on signal E32 based on the failure detection is directly inputted to the AND gate 284 of the multiplexer circuit. An inversion signal of the 3-cycle on signal E32 is inputted to the AND gate 282.

In the normal state, since the 3-cycle on signal E32 is OFF, the AND gate 284 is in an inhibition state and the AND gate 282 is in a permission state. The inputted output information D1 passes through the AND gate 282 and OR gate 286 and is directly outputted as output information D1-1. On the other hand, the input data D1 is held in the FF 278 at the first cycle, is held in the FF 279 at the second cycle, and is held in the FF 280 at the third cycle. Therefore, the output information of an amount corresponding to three cycles including the information which was outputted to the bus 12 is held in the retransfer control circuit 302 in a real-time manner. When the failure of the bus information occurs, the failed processor judgment signal E30 is outputted from the bus information failure judging circuit 300 to the master information register 214 after the elapse of two cycles. When the master processor fails, the processor is switched to the new master processor due to the updating of the new master processor number. Subsequently, the 3-cycle on signal E32 from the bus information failure judging circuit 300 is turned on after the elapse of three cycles from the failure occurrence. Thus, the AND gate 284 of the retransfer control circuit 302 in FIG. 21 is set into a permission state. The output information of three cycles which were sequentially held in the FFs 280, 279, and 278 is again transferred to the bus 12 from the failure detection. If necessary, the new TMR unit 10 which was switched to the new master processor is constructed, namely, the TMR unit 10 is constructed by two processors such as processors 10-2 and 10-3. The retry by the retransfer in a state in which the processor 10-2 is set to the master processor is executed. In this case, the transfer of the output information of three cycles held by the function of the retransfer control circuit 302 is executed from the processor 10-2 serving as a new master processor. The failed processor 10-1 which has been the master processor so far has been disconnected from the bus 12. When the slave processor fails, the failed slave processor is disconnected from the bus 12. The TMR unit 10 is constructed by the conventional master processor and the remaining slave processor, thereby performing a retry by the master processor. In the embodiment of FIGS. 19A and 19B, the retransfer control at the time of the failure detection in the processors 10-1 to 10-3 constructing the TMR unit 10 has been described. However, in the case where the processor other than the TMR unit 10 has already outputted the information to the bus 12 until the switching of the master processor based on the failure detection, the other processor again outputs the data held therein to the bus 12 at the relevant cycle. This is because all of the processors having a function to output the information to the bus 12 as well as the processors 101 to 10-3 of the TMR unit 10 have therein a transmission information holding circuit for retransfer. All of the processors having a function to receive the information from the bus 12 has therein: a function to detect the occurrence of a failure in any one of the processors 10-1 to 10-3 constructing the TMR unit 10 or the bus 12; and a function to suppress the updating of internal resources due to the failure data when the failure is detected. By the retransfer of the holding information after completion of the switching to the new master processor as necessary at the time of the failure detection as mentioned above, not only in the case where there is an error in the bus information at the normal timing but also in the case where the bus information is transmitted at a wrong timing, for example, in the case where the processor constructing the TMR unit, namely, the master processor erroneously outputs the bus information at the timing when the processor other than the TMR unit 10 transmits the bus information, the inherent processor which should transmit the bus information again transmits the normal bus information, thereby finally enabling the transfer of the correct bus information to be normally finished.

[Formation of retransfer instruction signal]

Figure 22A:
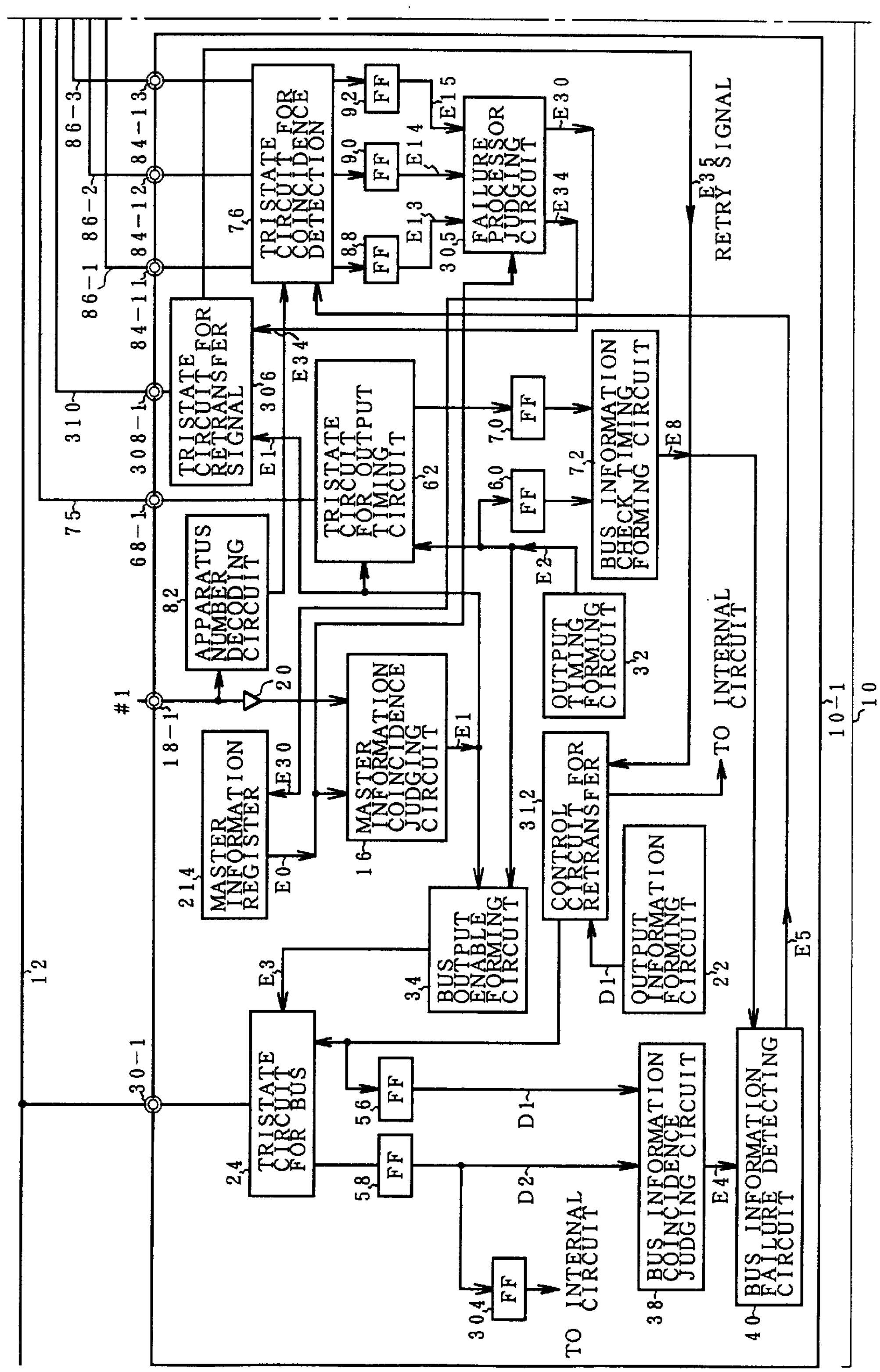

FIGS. 22A and 22B show an embodiment in which in the case where a failure occurs in the processors 10-1 to 10-3 constructing the TMR unit 10 including the bus, a signal indicative of the instruction for retransfer is sent from the master processor to the slave processor, further, to the processors other than the TMR unit 10 and the information is again outputted to the bus in the reduced construction of the new TMR unit after the occurrence of the failure. The embodiment has a construction which is representatively shown in the processor 10-1 set at present to the master processor with respect to the processors 10-1 to 10-3 constructing the TMR unit 10. Although the failure detection of the processors 10-1 to 10-3 including the failure of the bus 12 in the processor 10-1 is substantially the same as that of the embodiment of FIGS. 19A and 19B, in order to form the signal to instruct the retransfer, a bus information failure judging circuit 305 and a retransfer control circuit 312 having a construction which is slightly different from that of the bus information failure judging circuit 300 and retransfer control circuit 302 in the embodiment of FIGS. 19A and 19B are used. Further, a tristate circuit 306 for a retransfer signal to transmit the signal for instructing the retransfer is newly provided for the other processors 10-2 and 10-3 constructing the TMR unit 10 and, further, for the processors other than the TMR unit 10.

The tristate circuit 76 for detecting the coincidence provided for the processor 10-1 receives the signal based on the failure detection result formed by each of the processors 10-1 to 10-3 and supplies the failure detection signals E13, E14, and E15 to the bus information failure judging circuit 305 via the FFs 88, 90, and 92 in a manner similar to the embodiment of FIGS. 19A and 19B. The master number signal E0 as 2-bit data indicative of the present master processor which was set in the master information register 214 is inputted to the bus information failure judging circuit 305. In this case, since the processor 10-1 is set to the master processor at present, the master number signal E0 becomes an input of the 2-bit data "01" corresponding to the processor number #1. The 2-bit data is expressed by the signals E17 and E16 and "E17, E16"="01".

Figure 23:
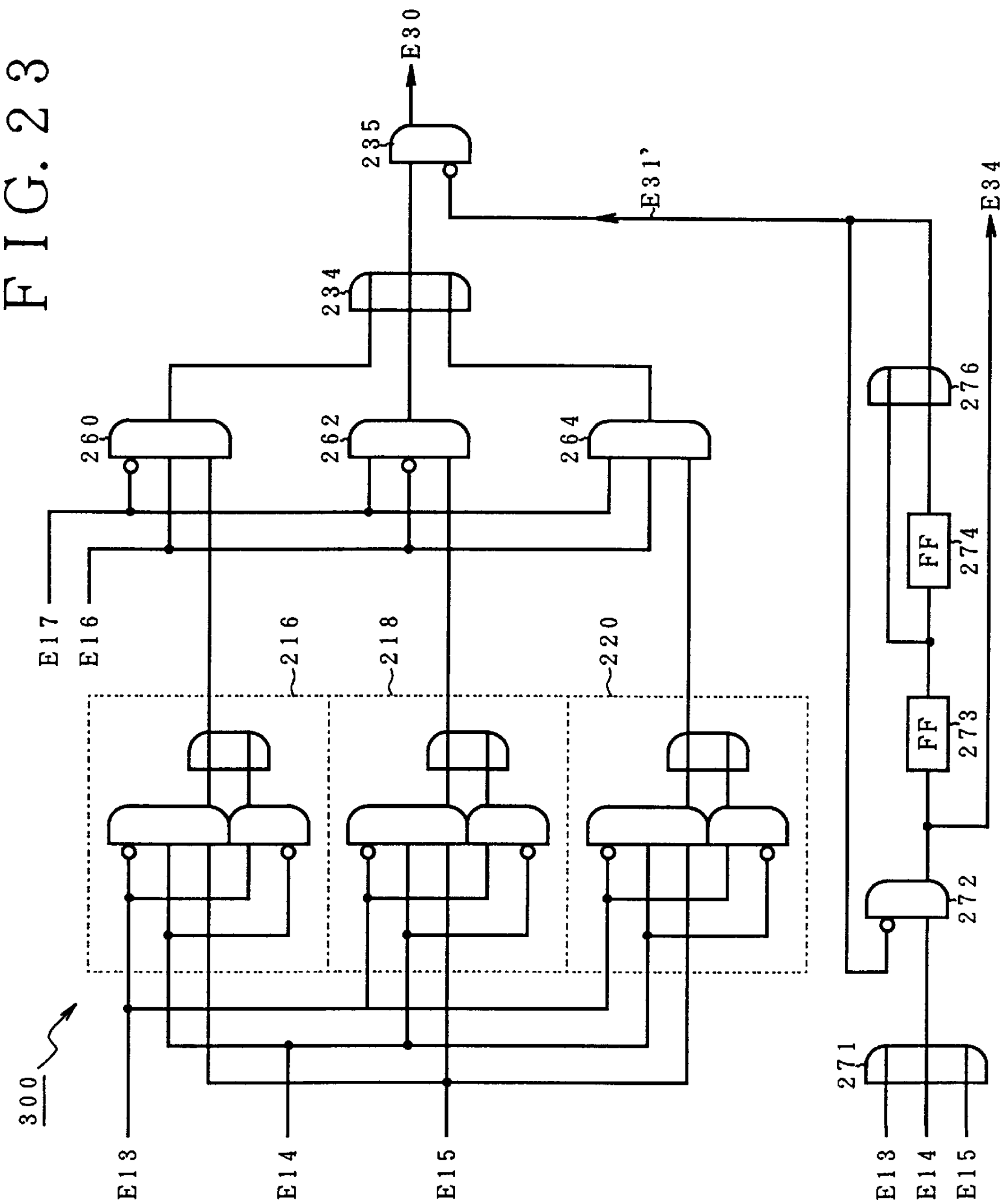
FIG. 23 is a circuit diagram showing an embodiment of a failed processor judging circuit in FIGS. 22A and 22B.

FIG. 23 shows an embodiment of the bus information failure judging circuit 305 in FIGS. 22A and 22B. The failure detection signals E13, E14, and E15 are inputted to the OR gate 271. An output of the OR gate 271 is inputted to the AND gate 272 together with the inversion signal of the 2-cycle on signal E31', which will be explained hereinlater, thereby forming a TMR system failure detection signal E34 showing the occurrence of the failure in any one of the processors 10-1 to 10-3 constructing the TMR unit 10.

The TMR system failure detection signal E34 is outputted to the tristate circuit 306 for the retransfer signal in FIGS. 22A and 22B. An output of the AND gate 272 is sequentially held in the FFs 273 and 274. Outputs of the FFs 273 and 274 are inputted to the OR gate 276 and the OR is got, thereby forming the 2-cycle on signal E31' which is turned on for a period of time of two cycles after the elapse of two cycles of the failure occurrence. The reason why the inversion signal of the 2-cycle on signal E31' is inputted to the AND gate 272 is because in the case where the failure of the bus information is once detected, there is a possibility such that the failure continuously occurs until the failed processor is disconnected from the TMR unit 10. Therefore, in order to suppress the detection of the continuous failure, the TMR system failure detection signal E34 is turned off by the inversion signal of the 2-cycle on signal E31'. There is provided a circuit comprising: the failure judging circuits 216, 218, and 220; AND gates 260, 262, and 264 and OR gate 234 which are controlled by the signals E17 and E16 that give the 2-bit data corresponding to the processor number #1 of the master processor from the master information register 214; and AND gate 235. This circuit unit is the same as the circuit at the output stage in FIG. 20 as an embodiment of the bus information failure judging circuit 300 in FIGS. 19A and 19B. By the circuit at the output stage, the failed processor judgment signal E30 indicative of the occurrence of a failure in the processor which is at present the master processor in the TMR unit 10 is outputted to the master information register 214 in FIGS. 22A and 22B. When the processor failure judgment signal E30 is turned on, the master information register 214 updates the processor number of the master processor set at present. Specifically speaking, the register 214 has the circuit construction shown in FIG. 17 and updates the processor number of the master processor according to the Table of FIG. 18.

The TMR system failure detection signal E34 formed by the bus information failure judging circuit 305 is inputted to the tristate circuit 306 for the retransfer signal. The self master signal E1 formed by the master information coincidence judging circuit 16 is further inputted to the tristate circuit 306 for the retransfer signal. Since the processor 10-1 is the master processor, the self master signal E1 is ON. The tristate circuit 306 for the retransfer signal outputs the signal to instruct the retransfer to an exclusive-use signal line 310 through an input/output terminal 308-1. The signal line 310 is connected to input/output terminals 308-2 and 308-3 (not shown) connecting tristate circuits for the retransfer signal (not shown) provided for the other processors 10-2 and 10-3 constructing the TMR unit 10. Further, the signal line 310 is also connected to input/output terminals of tristate circuits for the retransfer signal provided in the processors (not shown) other than the TMR unit 10.

Figure 24:
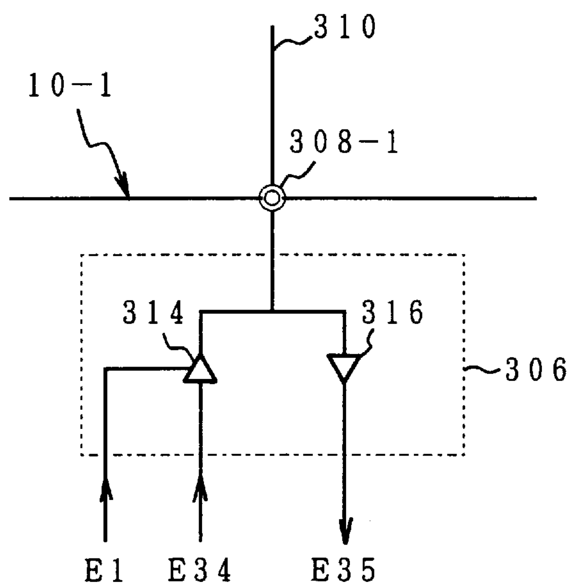
FIG. 24 is a circuit diagram showing an embodiment of a tristate circuit for a retransfer signal in FIGS. 22A and 22B.

FIG. 24 shows an embodiment of the tristate circuit 306 for the retransfer signal. An output driver 314 with an enable terminal and an input driver 316 are provided for the tristate circuit 306 for the retransfer signal. The output driver 314 is set into an enable state by the turn-on of the self master signal E1 from the master information coincidence judging circuit 16. The TMR system failure detection signal E34 from the bus information failure judging circuit 305 is sent to the signal line 310 through the I/O terminal 308-1. A signal to instruct the retransfer is sent to the other processors 10-2 and 103 constructing the TMR unit 10 and, further, to the processors other than the TMR unit 10. The input driver 316 inputs the signal to instruct the retransfer which was sent from the other processors constructing the TMR unit 10 via the signal line 310 and outputs as a retry signal E35 to the retransfer control circuit 312 in FIGS. 22A and 22B.

The retry signal E35 based on the signal to instruct the retransfer from the other processors constructing the TMR unit 10 which was received by the tristate circuit 306 for the retransfer signal is inputted to the retransfer control circuit 312 in FIGS. 22A and 22B. In the normal state in which the retry signal E35 is OFF, the output information D1 formed by the output information forming circuit 22 directly passes through the retransfer control circuit 312 and is sent to the bus 12 by the tristate circuit 24 for bus. When the retry signal E35 is turned on, the retransfer control by the retransfer control circuit 312 is executed.

Figure 25:
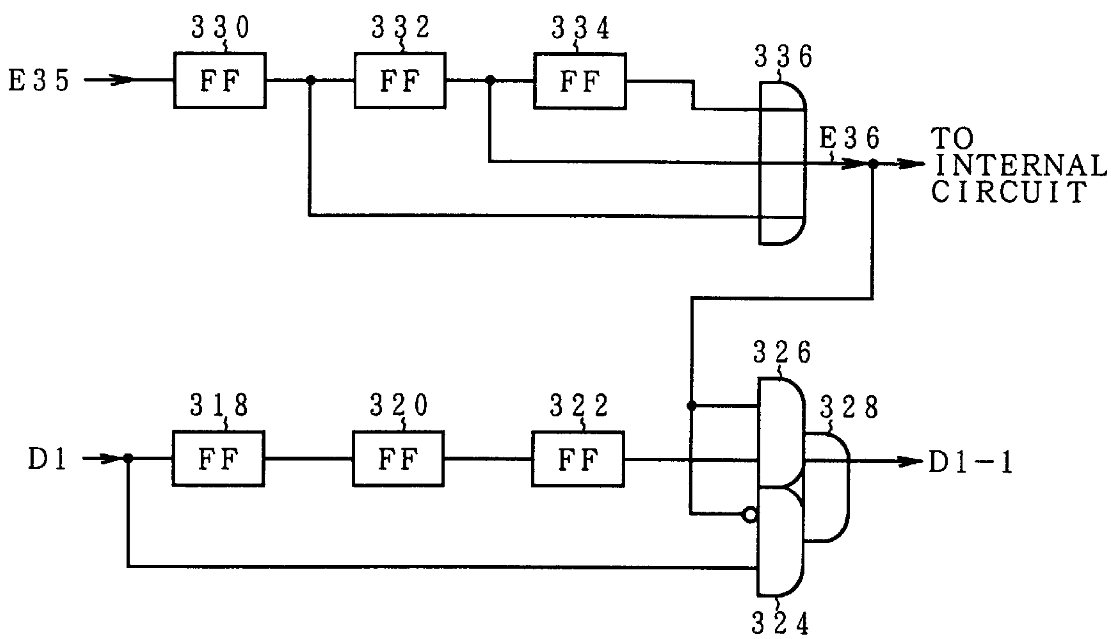
FIG. 25 is a circuit diagram showing an embodiment of a retransfer control circuit in FIGS. 22A and 22B.

FIG. 25 shows an embodiment of the retransfer control circuit 312 in FIGS. 22A and 22B. The retry signal E35 is inputted to an FF 330 at the first stage of FFs 330, 332, and 334 connected at three stages. Outputs of the FFs 330, 332, and 334 are collected to an OR gate 336, thereby forming a 3-cycle on signal E36. The 3-cycle on signal E36 is also sent to an internal circuit (not shown) and is used for a suppression control of the updating of internal resources at the time of the failure occurrence. The output information D1 formed by the output information forming circuit 22 in FIGS. 22A and 22B is inputted to an AND gate 324 and is also inputted to an FF 318 at the first stage of FFs 318, 320, and 322 which are cascade connected at three stages. An inversion signal of the 3-cycle on signal E36 from the OR gate 336 is inputted to the AND gate 324. The 3-cycle on signal E36 is directly inputted to an AND gate 326. An output of the FF 322 at the final stage is also inputted to the AND gate 326. Outputs of the AND gates 324 and 326 are collected by an OR gate 328 and an output signal of the OR gate 328 is generated as output information D1-1 to the tristate circuit 24 for bus in FIGS. 22A and 22B.

FIGS. 26A to 26I are timing charts of the retransfer control circuit 312 in FIG. 25. First, when the retry signal E35 in FIG. 26A is turned on, the signal is sequentially held in the FFs 330, 332, and 334 as shown in FIGS. 26B to 26D. Therefore, the 3-cycle on signal E36 which is outputted from the OR gate 336 of FIG. 26E becomes a signal that is turned on for a period of time of three cycles from the next cycle at which the retry signal E35 is turned on. On the other hand, the data D1 which was inputted upon occurrence of the failure is held in the FF 318 as shown in FIG. 26F. In this instance, since the 3-cycle on signal E36 is OFF, the AND gate 326 is in an inhibition state and directly generates the output information D1. The output information D1 held in the FF 318 is sequentially held in the FFs 320 and 322 as shown in FIGS. 26G to 26H. When the output information D1 is held in the FF 322 at the third cycle, the holding output is sequentially again transferred from the AND gate 326 in a permission state through the OR gate 328 for a period of time of three cycles. In such a retransfer control circuit 312, the output information formed for a period of time until the start of the retransfer after the occurrence of the failure in the bus information is held and is again newly transferred to the bus 12 as necessary from the processor which is at present the master processor. In the case where the processor other than the processors constructing the TMR unit 10 has outputted the information to the bus 12 before the start of the retransfer, the data held in such a processor is again outputted to the bus 12 by the relevant cycle. To realize such a function, all of the processors other than the processors 10-1 to 10-3 constructing the TMR unit 10 also have therein a transmission data holding circuit for retransfer. Even in the processors other than the TMR unit 10, all of the processors having the function for receiving the information from the bus 12 also have a function for receiving the signal to instruct the retransfer which was sent from the master processor of the TMR unit 10, recognizing a failure detection, and suppressing the updating of the internal resources.

[Existence processor display flag]

Figure 27A:
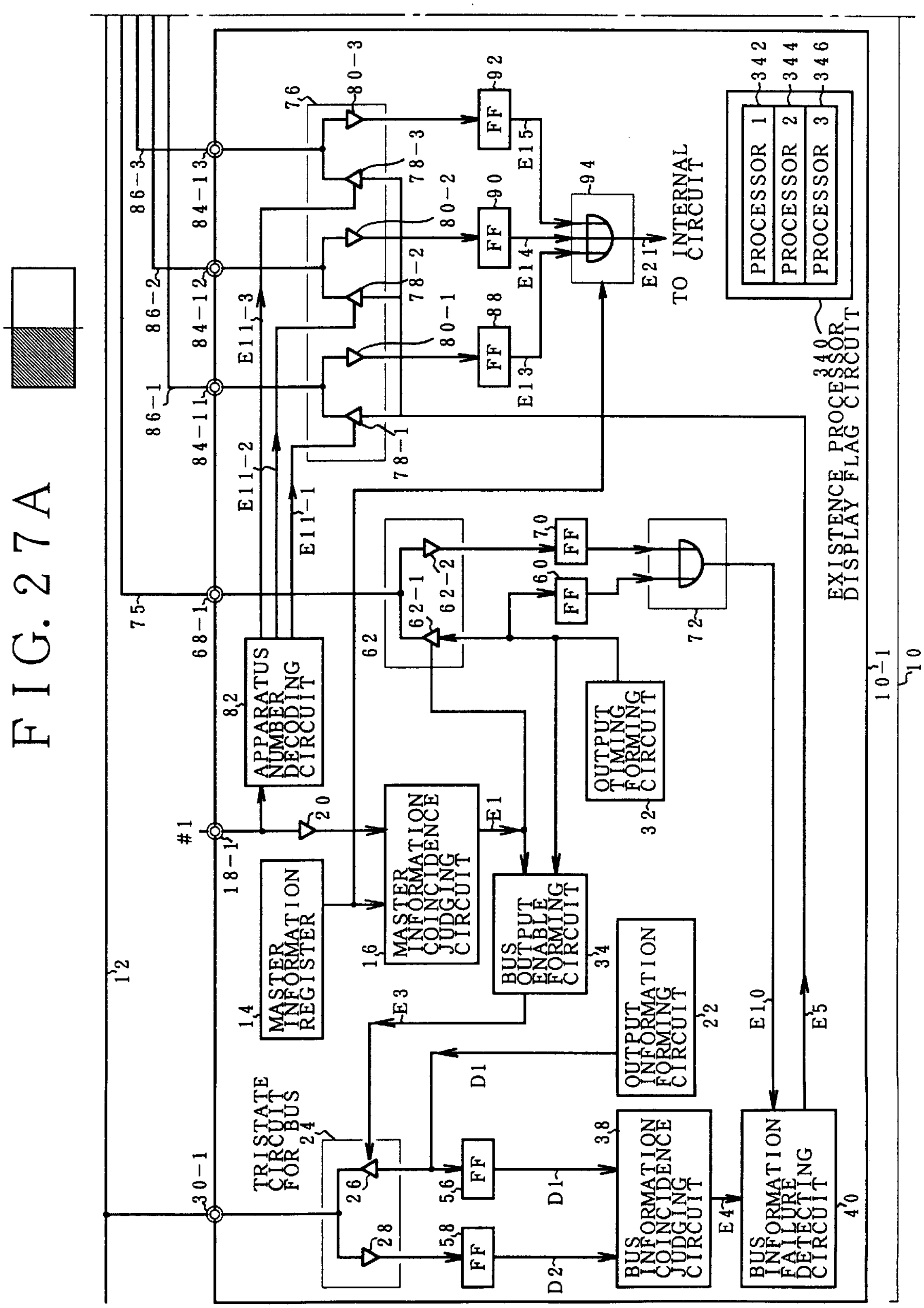
FIGS. 27A and 27B are block diagrams of an embodiment having an existence processor display flag circuit.
Figure 27B:
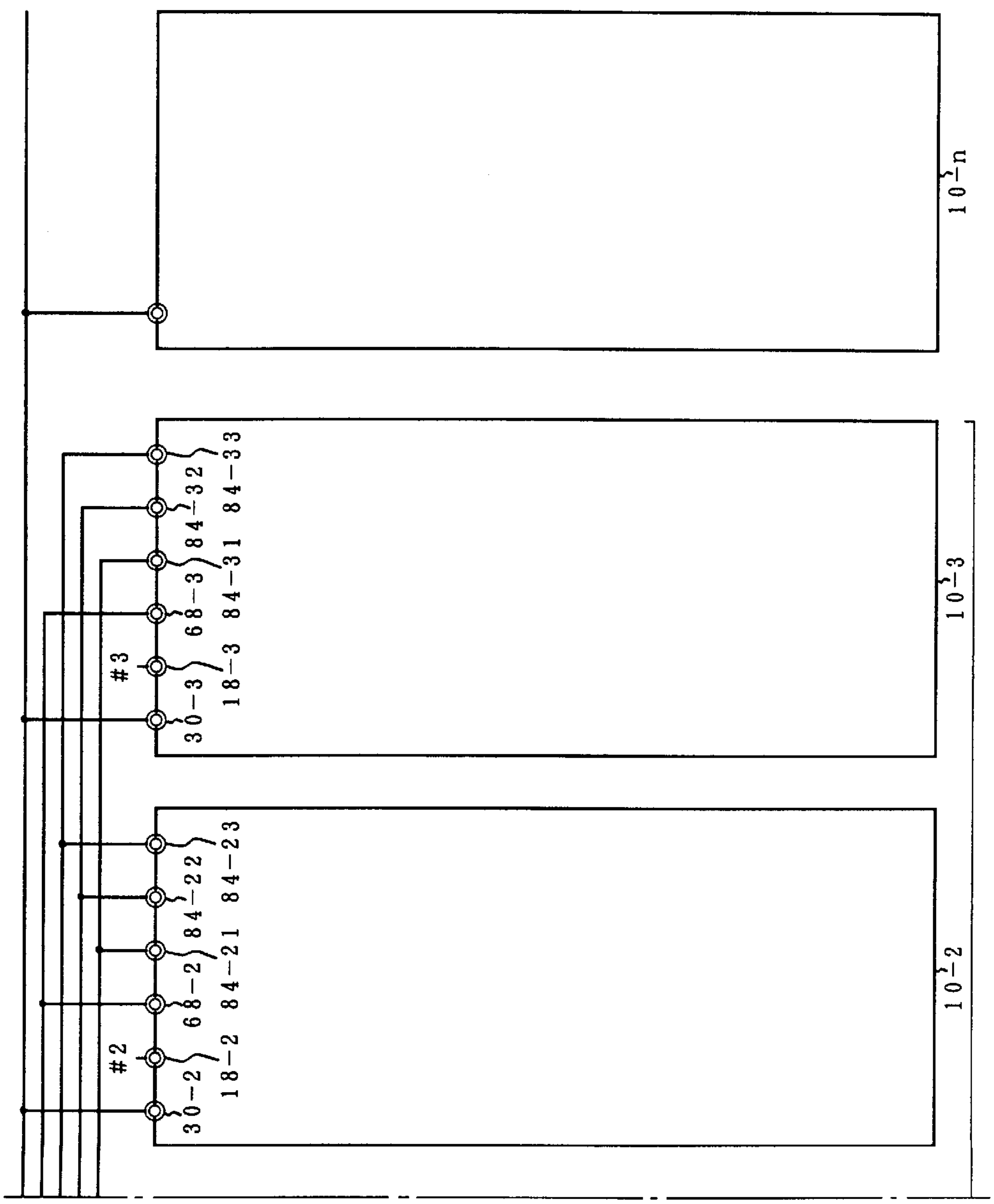

An embodiment of FIGS. 27A and 27B is characterized by providing an existence processor display flag indicating which processor is normally operating among the processors 10-1 to 10-3 constructing the TMR unit 10 or, contrarily, which processor is disconnected from the TMR unit due to a failure or the like. The embodiment has the construction of the processor 10-1 of the TMR unit 10 in FIGS. 6A and 6B as an example. An existence processor display flag circuit 340 is provided for the processor 10-1. Flag registers 342, 344, and 346 are provided for the existence processor display flag circuit 340 in correspondence to the three processors 10-1 to 10-3 constructing the TMR unit 10. The flag register 342 has an existence processor display flag of the processor 10-1. The flag register 344 has an existence processor display flag of the processor 10-2. The flag register 346 has an existence processor display flag of the processor 10-3. Similarly, the existence processor display flag circuit 340 is also provided for each of the other processors 10-2 and 10-3. A software of the processor 10-1 can recognize the operating states of the processors 10-1 to 10-3 constructing the TMR unit 10 by reading the flag registers 342 to 346 of the existence processor display flag circuit 340 as necessary.

Figure 28A:
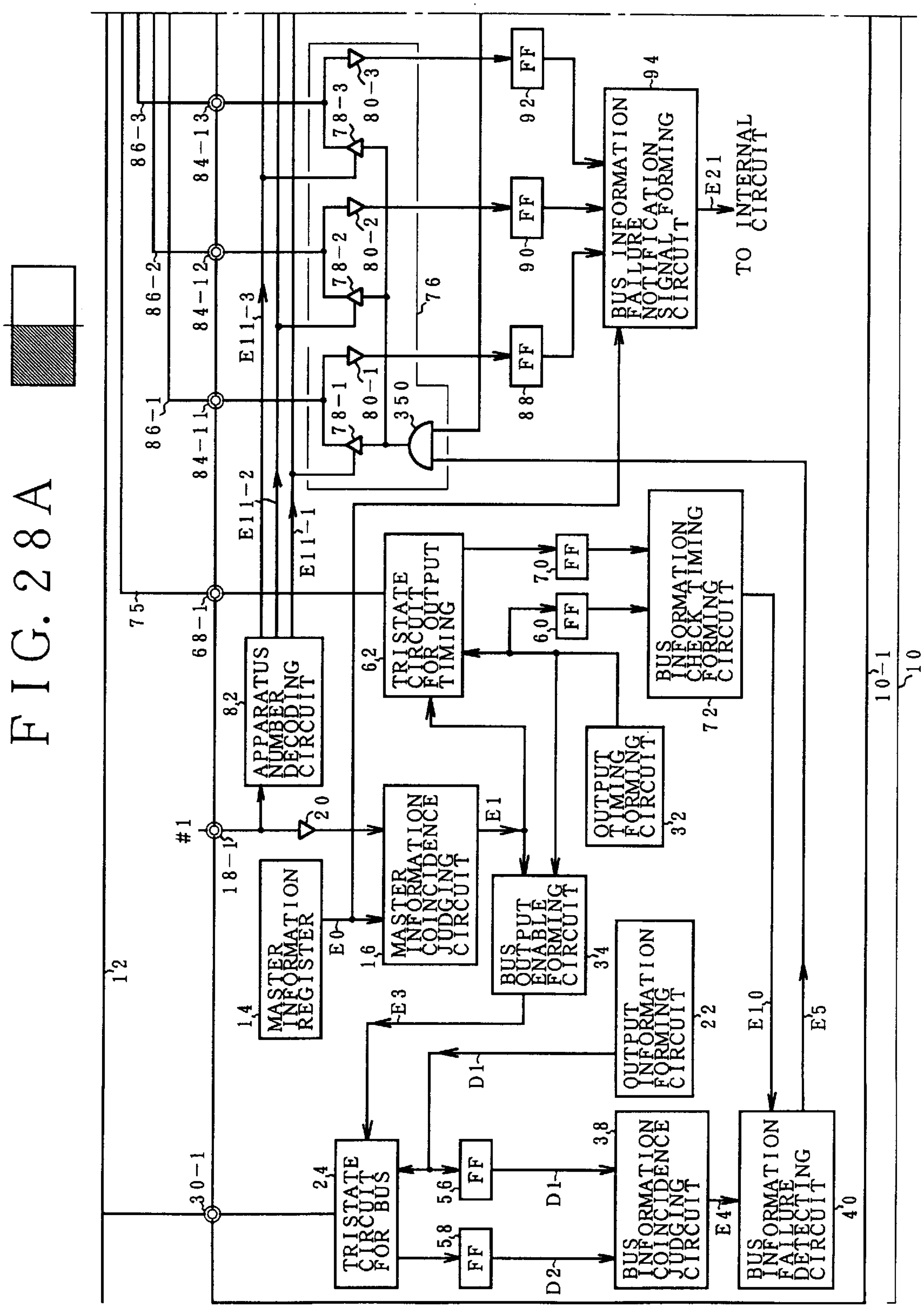
FIGS. 28A and 28B are block diagrams of a mask output of a bus information failure detection result according to an existence processor display flag.
Figure 28B:
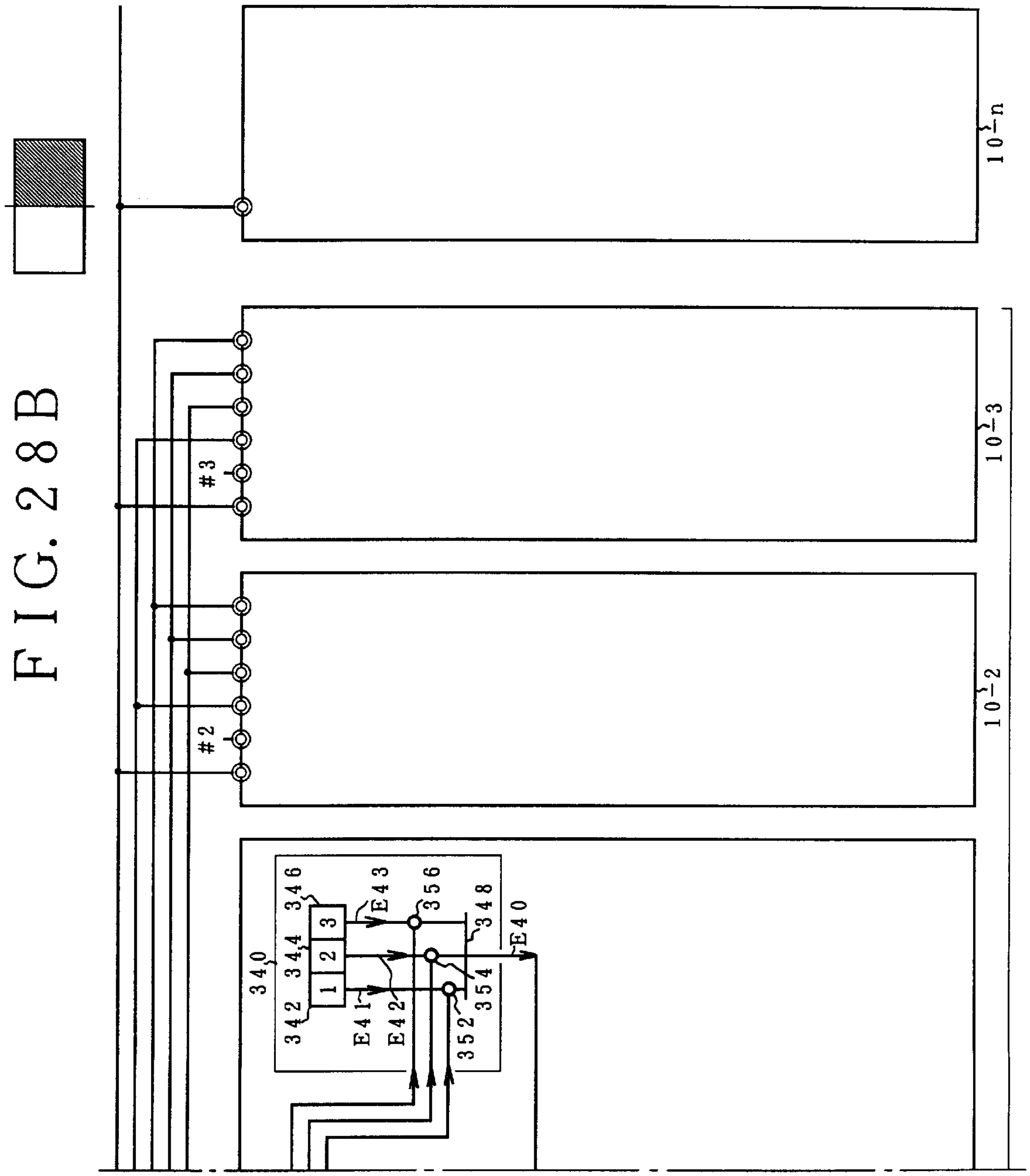

FIGS. 28A and 28B show an embodiment in which with respect to the processors 10-1 to 10-3 constructing the TMR unit 10, when the processor itself is disconnected from the TMR unit 10 due to a failure or the like, a dissidence occurrence signal due to a bus information failure detection is not erroneously transmitted to the other processor. The existence processor display flag circuit 340 has the flag registers 342, 344, and 346 corresponding to the processors 10-1 to 10-3. When the processors in the TMR unit 10 are normally operating, the flag registers 342 to 346 are turned on. When the processor in the TMR unit 10 is disconnected due to a failure or the like, they are turned off. Subsequent to the flag registers 342, 344, and 346, AND gates 352, 354, and 356 are provided. The decoding signals E11-1, E11-2, and E11-3 from the apparatus number decoding circuit 82 are inputted to the AND gates 352, 354, and 356, respectively. The ANDs of the decoding signals E11-1 to E11-3 and flag signals E41, E42, and E43 from the flag registers 342, 344, and 346 are got, respectively. The apparatus number decoding circuit 82 decodes the processor number #1 from the input terminal 18-1 and turns on only the decoding signal E1-1. Therefore, only the AND gate 352 is set into a permission state. The flag signal corresponding to the existence processor display flag about the processor 10-1 from the flag register 342 is outputted as an output signal E40 through an OR gate 348. An AND gate 350 constructing a mask output circuit is provided for the tristate circuit 76 for detecting the coincidence. The dissidence detection signal E5 from the bus information failure detecting circuit 40 is inputted to the AND gate 350. The output signal E40 from the existence processor display flag circuit 340 is inputted to another input of the AND gate 350. Therefore, in the AND gate 350, an output of the dissidence occurrence signal E5 for the other processors 10-2 and 10-3 by the bus information failure detecting circuit 40 is masked by the output signal E40 from the existence processor display flag circuit 340 and, after that, it is outputted. Namely, when the processor 10-1 is normally operating in the TMR unit 10, the output signal E40 from the existence processor display flag circuit 340 is turned on, thereby setting the AND gate 350 into a permission state. In this instance, if the dissidence occurrence signal E5 is turned on due to a failure detection by the bus information failure detecting circuit 40, the signal passes through the AND gate 350 for masking and bus information failure detection result is notified to the other processors 10-2 and 10-3 through the exclusive-use signal line 86-1 by the output driver 78-1. On the other hand, when the processor 10-1 is disconnected from the TMR unit 10 by a failure or the like, since the flag of the flag register 342 is OFF, the output signal E40 is also turned off, thereby setting the AND gate 350 for masking into an inhibition state. Therefore, even if the dissidence occurrence signal from the bus information failure detecting circuit 40 is OFF on the basis of the bus failure detection, the notification of the bus failure detection result for the other processors 10-2 and 10-3 can be inhibited. The processor disconnected from the TMR unit 10 due to such a mask output always notifies the other processors of a state in which the bus information failure is not detected. It is possible to avoid that the failed processor exerts an adverse influence on the whole TMR unit 10.

Figure 29A:
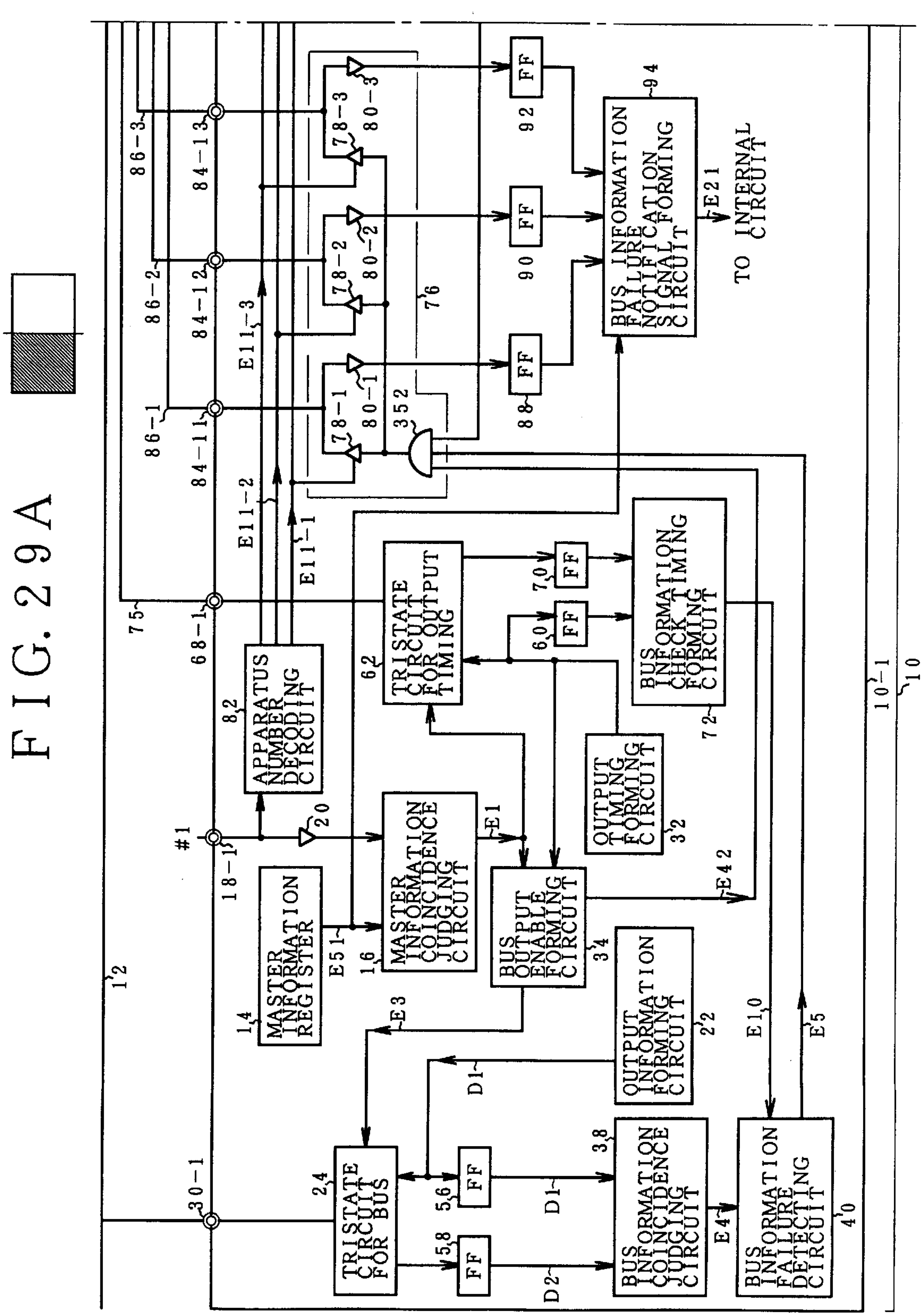
FIGS. 29A and 29B are block diagrams of a masked output of the bus information failure detection result according to a bus output permission flag.
Figure 29B:
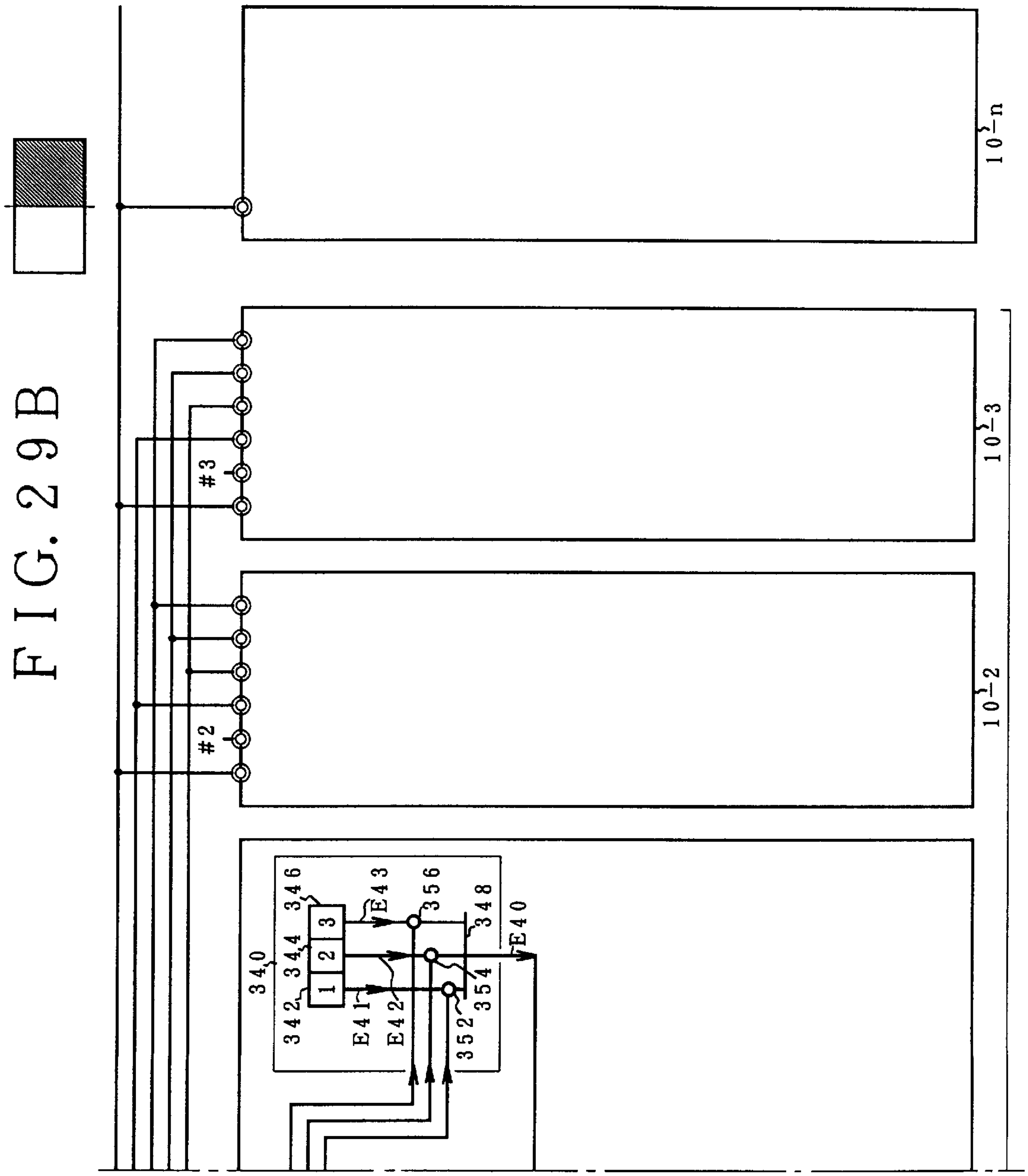

FIGS. 29A and 29B show another embodiment for preventing that the processor disconnected from the TMR unit 10 due to a failure or the like erroneously transmits the bus information failure detection result to the other processors. The embodiment is characterized in that the AND gate 350 as a mask output circuit provided for the tristate circuit 76 for detecting the coincidence in FIGS. 28A and 28B is further replaced to the AND gate 352 of three inputs and in addition to the recording signal E40 from the existence processor display flag circuit 340, the flag signal E42 based on a bus output permission flag set in the bus output enable forming circuit 34 is inputted. First, the bus output enable forming circuit 34 has the AND gate 36 as shown in FIG. 2, permits an output of the bus output signal E2 from the output timing forming circuit 32 by the self master signal E1 from the master information coincidence judging circuit 16, and supplies as an enable signal to the output driver of the tristate circuit 24 for bus. Therefore, in addition to the AND gate 36, a flag register to set the bus output permission flag by the turn-on of the self master signal E1 is provided and it is sufficient to input an output of the flag register as a flag signal E42 to the AND gate 352 for a mask output provided for the tristate circuit 76 for detecting the coincidence as shown in FIGS. 29A and 29B. By using such a flag signal E42 based on the bus output permission flag for a mask output, in the processor 10-1 disconnected from the TMR unit 10 due to a failure, if at least one of the existence processor display flag of the existence processor display flag circuit 340 and the bus output permission flag of the bus output enable forming circuit 34 is normal, it is possible to inhibit the transmission of the dissidence occurrence signal E5 in the off state based on the failure detection result from the bus information failure detecting circuit 40 for the other processors 10-2 and 10-3 which construct the TMR unit 10 and are normally operating from the processor 10-1 disconnected. Namely, the mask output function to inhibit the output for the other processors 10-2 and 10-3 of the unnecessary bus information failure detection result of the processor 10-1 disconnected from the TMR unit 10 due to the failure is doubled, thereby further improving the reliability.

Figure 30A:
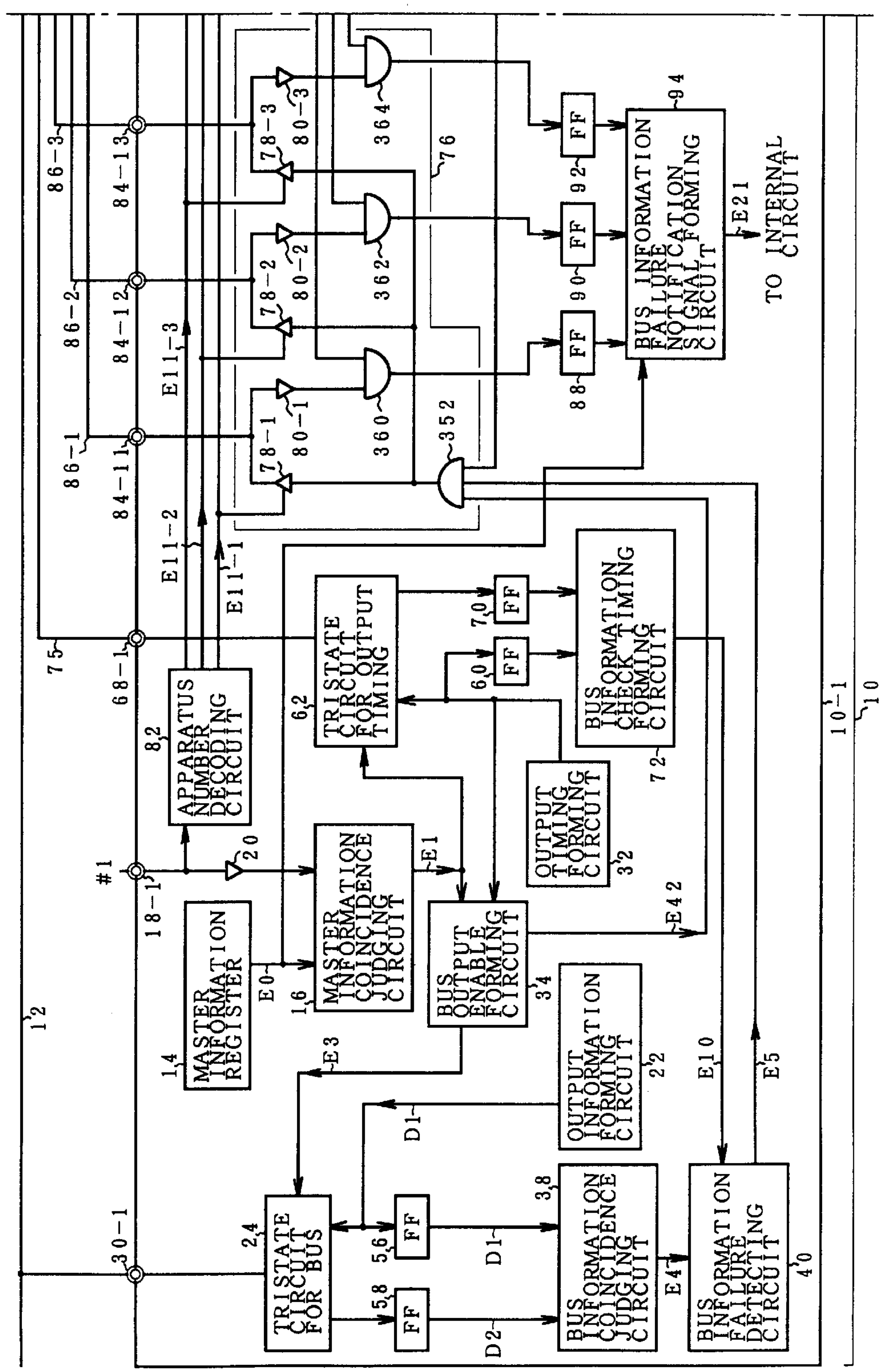
FIGS. 30A and 30B are block diagrams of a masked input of the bus information failure detection result according to the existence processor display flag.
Figure 30B:
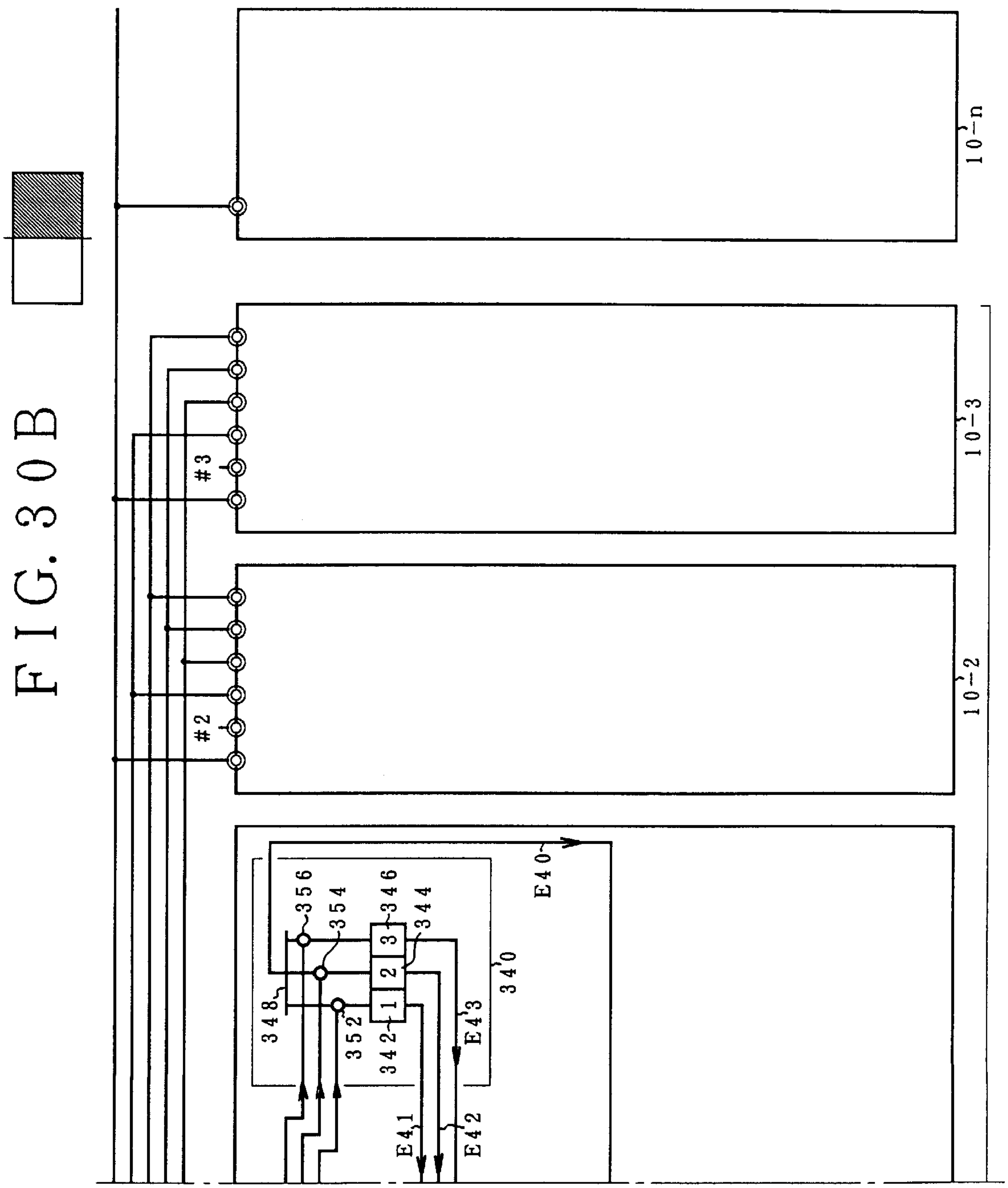

FIGS. 30A and 30B show an embodiment in which even if the coincidence detection signal indicative of the bus information failure detection result is erroneously transmitted from the processor disconnected due to the failure or the like in the processors 10-1 to 10-3 constructing the TMR unit 10, a mask input is executed so as not to erroneously operate. In addition to the AND gate 352 for mask output in FIGS. 29A and 29B, AND gates 360, 362, and 364 for mask input are provided on the output side of the input drivers 80-1, 80-2, and 80-3 for the tristate circuit 76 for detecting the coincidence. The flag signals E41, E42, and E43 of the flag registers 342, 344, and 346 provided for the existence processor display flag circuit 340 are directly inputted to the other inputs of the AND gates 360, 362, and 364. Therefore, since the existence processor display flag of the corresponding one of the flag registers 342, 344, and 346 is turned off, the corresponding one of the AND gates 360, 362, and 364 is set into an inhibition state. The processor disconnected from the TMR unit 10 due to the failure or the like inhibits the output to the FFs 88, 90, and 92 of the dissidence detection signal E5 which is sent from the processor disconnected from the TMR unit 10 and is made valid by the off state based on the bus information failure detection result. By such a mask input of the bus information failure detection result, even if the dissidence detection signal E5 indicative of the bus information failure detection result is erroneously sent from the other processor disconnected from the TMR unit 10, this signal can be ignored. It is possible to avoid that the failed processor exerts an adverse influence on the whole TMR unit 10.

[Guarantee of master information]

Figure 31A:
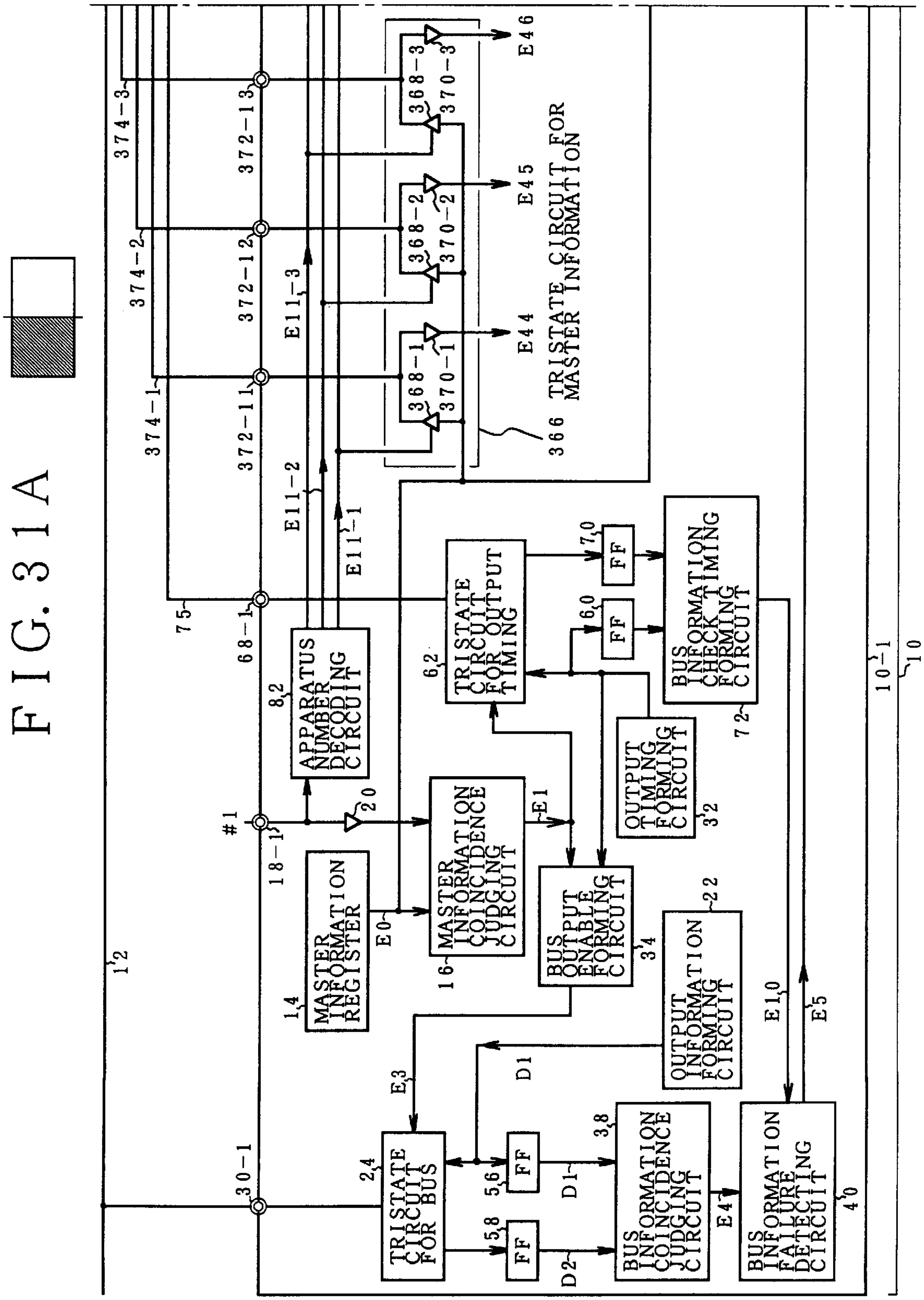
FIGS. 31A and 31B are block diagrams of a TMR unit having a master information notifying function.
Figure 31B:
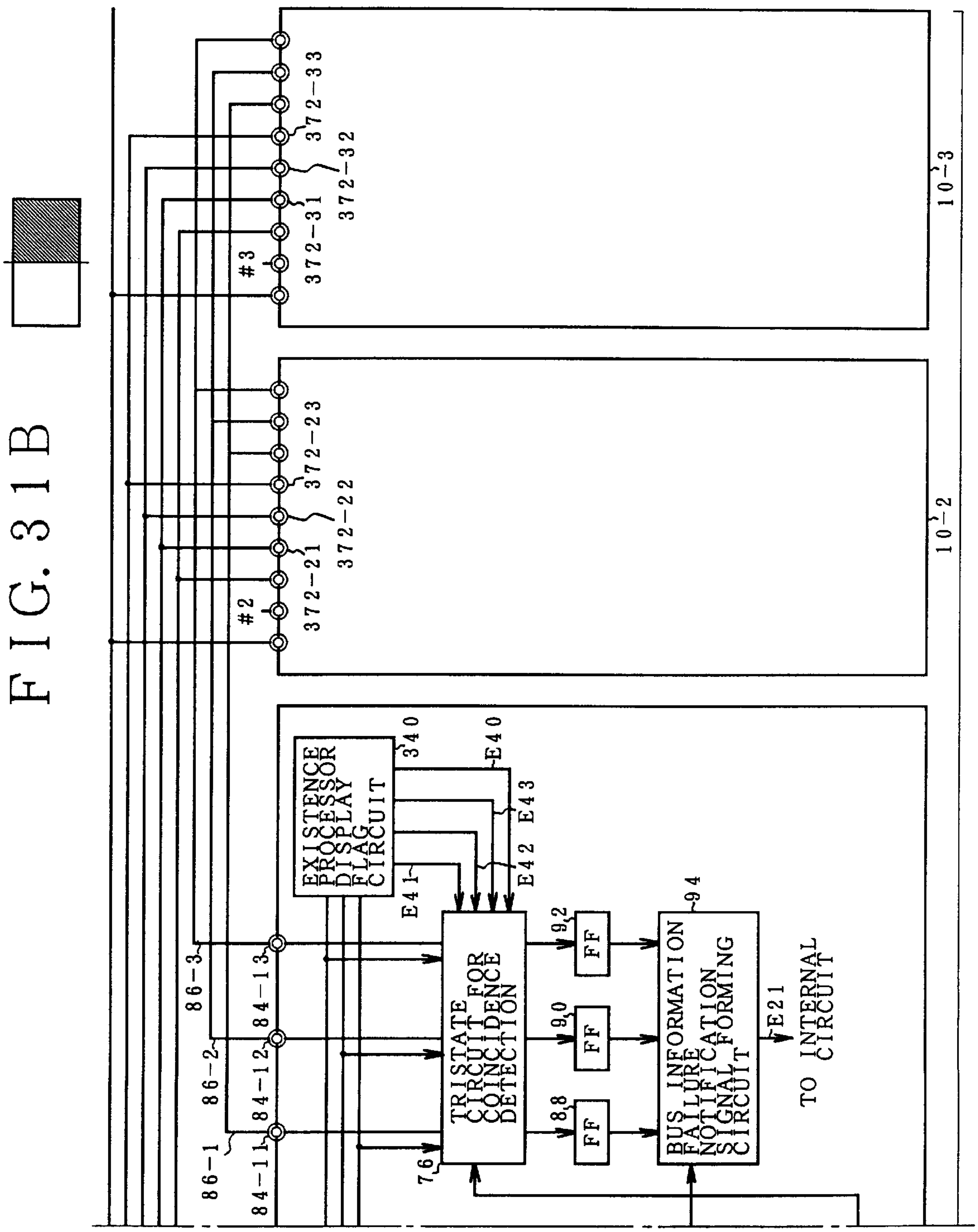

FIGS. 31A and 31B show an embodiment in which master information indicating which processor among the processors 10-1 to 10-3 constructing the TMR unit 10 is recognized as a master processor is mutually notified, thereby preventing the erroneous recognition of the master information. Among the processors 10-1 to 10-3 constructing the TMR unit 10, as representatively shown in the processor 10-1, the master processor is determined by the setting for the master information register 14. For example, it is assumed that the master processor is allocated to the processor 10-1 and the slave processors are allocated to the other processors 10-2 and 10-3. The master information register 14 outputs the self master signal E0 on the basis of the master information held. In order to mutually notify the processors 10-1 to 10-3 of the master information, a tristate circuit 366 for master information is provided. The tristate circuit 366 for master information has three tristate output drivers 368-1, 368-2, and 368-3 and input drivers 370-1, 370-2, and 370-3 in correspondence to the processors 10-1 to 10-3. Outputs of three tristate circuits of the tristate circuit 366 for master information are connected to corresponding terminals 372-21 to 372-23 and 372-31 to 372-33 of the other processors 10-2 and 10-3 by exclusive-use signal lines 374-1, 374-2, and 374-3 by terminals 372-11, 372-12, and 372-13. The master processor number signal E0 from the master information register 14 is commonly inputted to the output drivers 368-1, 368-2, and 368-3 provided for the tristate circuit 366 for master information. The decoding signals E11-1 to E11-3 from the apparatus number decoding circuit 82 are inputted to enable terminals of the output drivers 368-1 to 368-3, respectively. The apparatus number decoding circuit 82 decodes the processor number #1 for the input terminal 18-1 and turns on only the decoding signal E11-1. Therefore, only the output driver 368-1 is enabled and the master processor number signal E0 from the master information register 14 is notified to the other processors 10-2 and 10-3 by the signal line 374-1 for control. At the same time, the processor itself fetches the master processor number signal E0 of the master information register 14 as a signal E44 by the input driver 370-1. The similar tristate circuit 366 for master information is also provided for the other processors 10-2 and 10-3. Therefore, the master processor number signal based on the master information held in the master information register 14 of the processors 10-2 and 10-3 is notified by the exclusive-use signal lines 374-2 and 374-3. Master processor number signals E45 and E46 notified from the processors 10-2 and 10-3 can be obtained from the input drivers 368-2 and 368-3. By judging the master information which were mutually notified by the notifying function of the master information register among the processors 10-1 to 10-3 constructing the TMR unit 10 by the tristate circuit 366 for master information as mentioned above, it is possible to avoid a situation such that in spite of the fact that the processor itself is the master processor, it is erroneously recognized as a slave processor and the master processor is extinguished from the TMR unit 10. It is also possible to avoid a situation such that, on the contrary, in spite of the fact that the processor itself is the slave processor, it is erroneously recognized as a master processor and a plurality of master processors exist in the TMR unit 10.

Figure 32A:
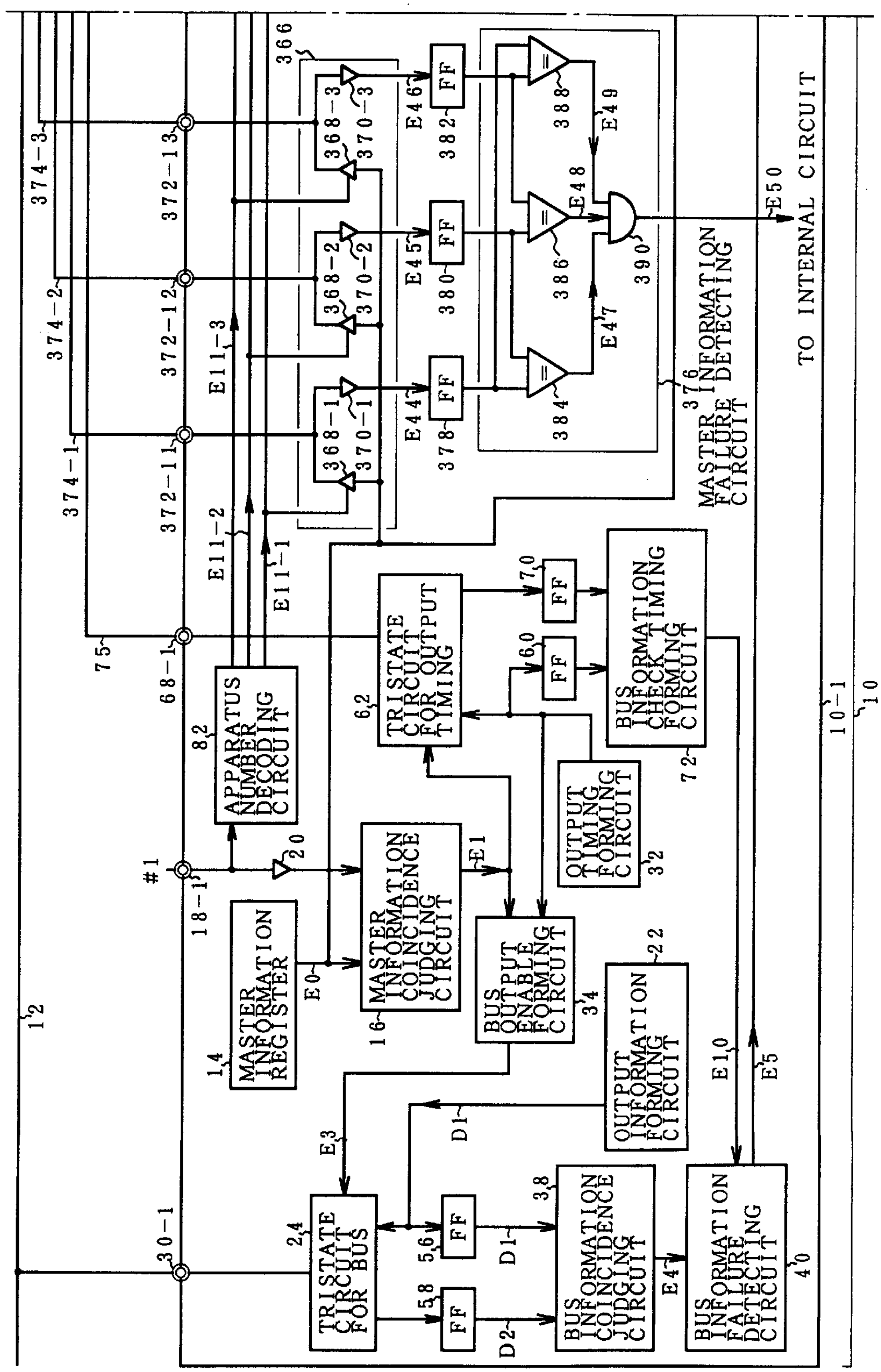
FIGS. 32A and 32B are block diagrams of a TMR unit having a failure detecting function of master information.
Figure 32B:
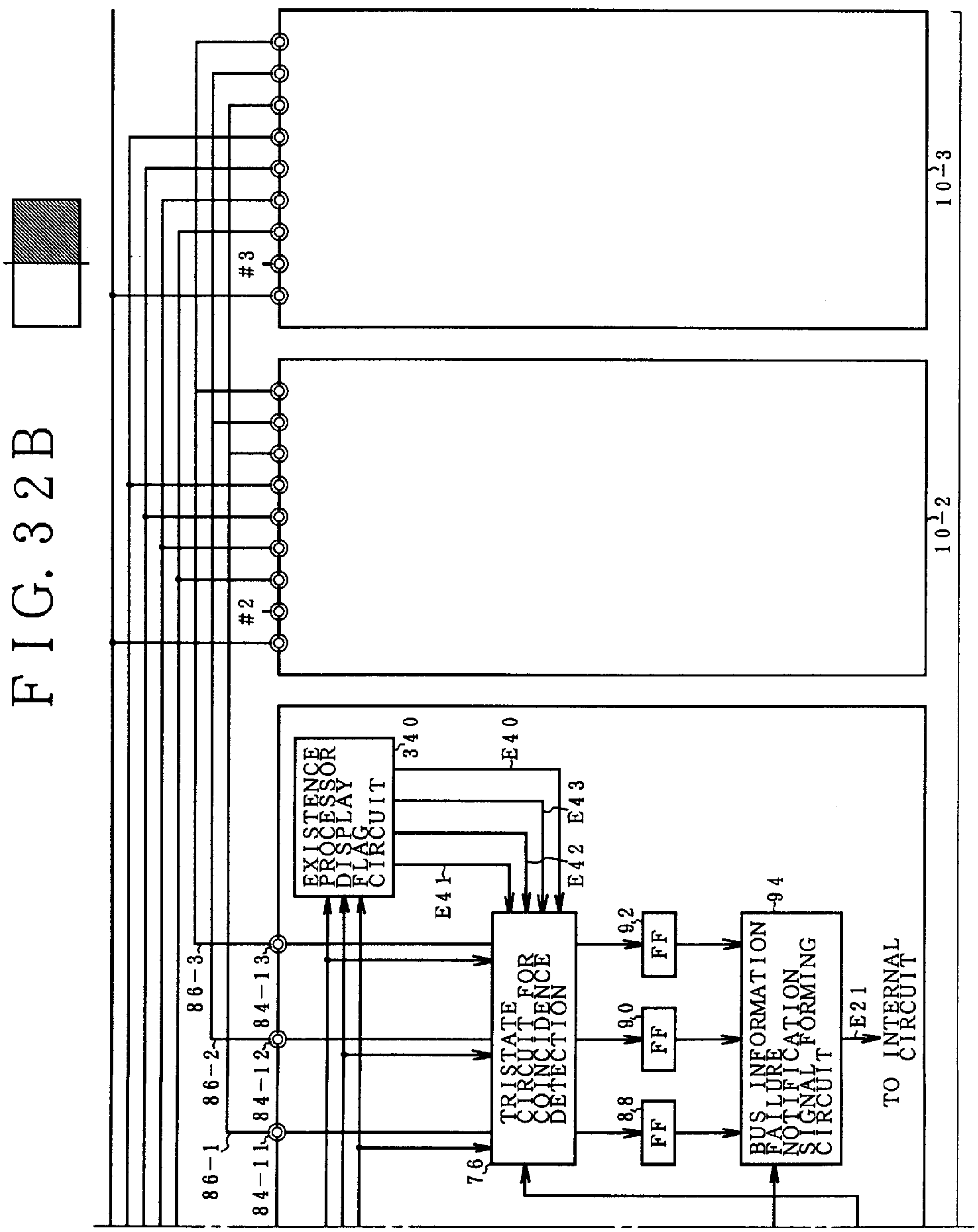

FIGS. 32A and 32B are characterized in that in addition to FIGS. 31A and 31B, the processors 10-1 to 10-3 constructing the TMR unit 10 mutually notify themselves of the master processor number that is recognized by the self processor, thereby detecting a failure of the master information. Subsequent to the tristate circuit 366 for master information, a master information failure detecting circuit 376 is provided to detect the failure of the master information. The master information failure detecting circuit 376 has three comparators 384, 386, and 388 in correspondence to the processors 10-1 to 10-3 and supplies three comparison outputs to an NAND gate 390. The master processor number signal E44 based on the master information by the processor 10-1 is inputted to the comparator 384 from the input driver 370-1 through an FF 378. The master processor number signal E45 notified from the processor 10-2 is inputted to the comparator 386 by the input driver 370-2 through an FF 380. Further, the master processor number signal E46 notified from the processor 10-3 is inputted to the comparator 388 by the input driver 370-3 through an FF 382. The comparator 384 compares the master processor number signals E44 and E45 of the processors 10-1 and 10-2. The comparator 386 compares the master processor number signals E45 and E46 of the processors 10-2 and 10-3. Further, the comparator 388 compares the master processor number signals E46 and E44 of the processors 10-3 and 10-1. When the two master processor number signals coincide, an output of each of the comparators 384, 386, and 388 is turned on. When they don't coincide, the output is turned off. When the correct master information has been set in all of the processors 10-1 to 10-3, since all of the master processor number signals E44, E45, and E46 are equal, all of the outputs of the comparators 384, 386, and 388 are turned on. A master information failure occurrence signal E50 as an output of the NAND gate 390 is turned off. On the other hand, when any one of the master processor number signals doesn't coincide, an output of any two of the three comparators 384, 386, and 388 is turned off. Therefore, the master information failure occurrence signal E50 which is outputted from the NAND gate 390 is turned on. Thus, the occurrence of a failure of the master information is recognized by any one of the processors 10-1 to 10-3 constructing the TMR unit 10 and a necessary failure process can be executed. The FFs 378, 380, and 382 are provided between the tristate circuit 366 for master information and master information failure detecting circuit 376 and the three master processor number signals are held once. This is because the time which is required from the occurrence of the bus information failure until the detection thereof and the time which is required from the occurrence of the failure of the master information until the detection thereof are set to the same timing. The number of stages of FFs on the master information failure detecting side also changes depending on the number of FFs 56 and 58 provided on the bus information failure detecting circuit 40 side.

Figure 33A:
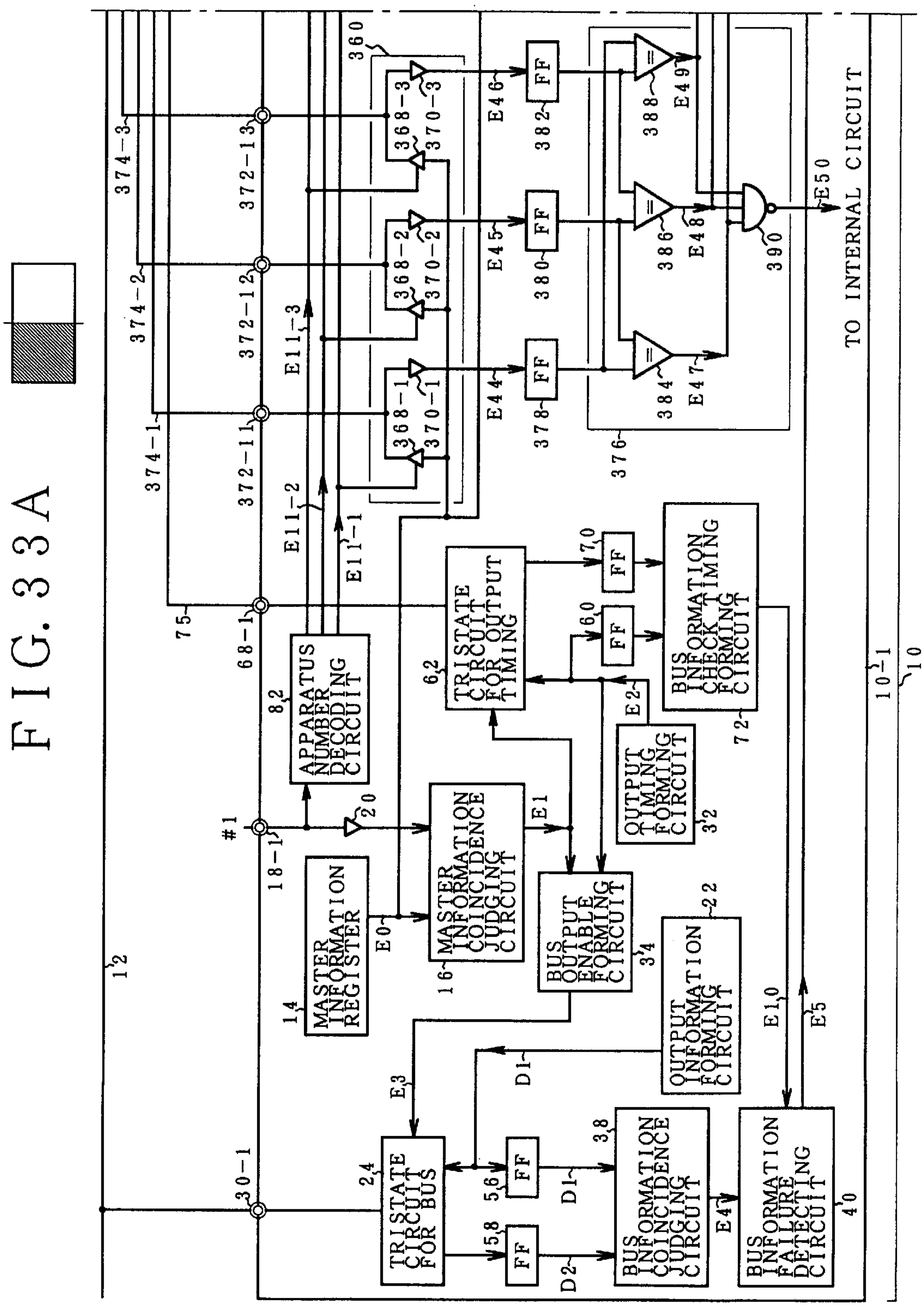
FIGS. 33A and 33B are block diagrams of a TMR unit having a judging function of a processor in which a failure detection of the master information occurs.
Figure 33B:
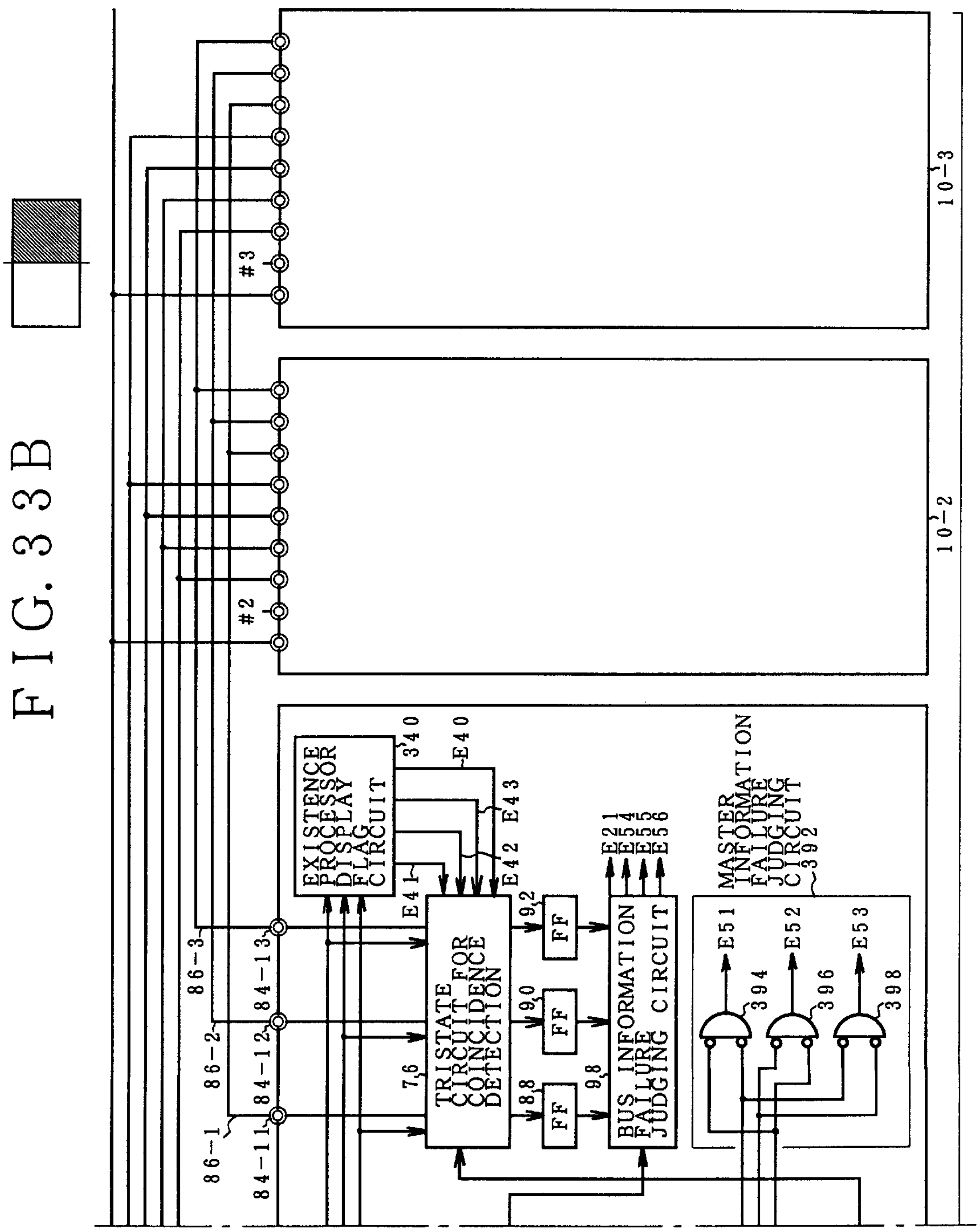

FIGS. 33A and 33B are characterized in that in the case where the processors 10-1 to 10-3 constructing the TMR unit 10 majority compare the master processor number that is mutually recognized by the self processor, thereby detecting the failure of the master information, the master information of which processor failed is judged. In order to judge the processor in which the master information failed, a master information failure judging circuit 392 is further newly provided for FIGS. 32A and 32B. AND gates 394, 396, and 398 having inverting inputs are provided for the master information failure judging circuit 392 in correspondence to the processors 10-1, 10-2, and 10-3. Outputs of the comparators 384 and 388 of the master information failure detecting circuit 376 are inputted to the AND gate 394. The outputs of the comparators 386 and 384 are inputted to the AND gate 396. Further, the outputs of the comparators 386 and 388 are inputted to the AND gate 398. When the failure of the master information of the processor 10-1 is judged, the AND gate 394 turns on a master information failure signal E51. When the failure of the master information of the processor 10-2 is detected, the AND gate 396 turns on a master information failure signal E52. Further, when the failure of the master information of the processor 10-3 is detected, the AND gate 398 turns on a master information failure signal E53. For example, it is assumed that the master information of the processor 10-2 failed. Therefore, in the master information failure detecting circuit 376, outputs of the comparators 384 and 386 to which the master processor number signal E45 based on the failed master information is inputted are turned off and an output of the comparator 388 irrespective of them is ON. The outputs of the comparators 384 and 386 are inputted to the AND gate 396 of the master information judging circuit 392. Therefore, the master information failure judgment signal E52 is also turned on. It is possible to judge that the master information of the processor 10-2 failed. With respect to the other processors 10-1 and 10-3 as well, when a failure of the master information occurs, the master information of which processor failed can be judged by a similar logic. Further, the bus information failure judging circuit 98 regarding the bus information failure is provided for the tristate circuit 76 for coincidence detection through the FFs 88, 90, and 92. The bus information failure judging circuit 98 has the same construction of the embodiment of FIGS. 7A and 7B and its details are as shown in the circuit of FIG. 8. Namely, the processors 10-1, 10-2, and 10-3 output the judgment signals E18, E19, and E20 indicative of the processor which caused the bus failure and the bus information failure judgment signal E21 to judge the occurrence of a failure of the bus information in any one of the processors. Each of the judgment signals of the bus information failure judging circuit 98 is used in a double construction of FIGS. 37A to 37C, which will be obviously explained hereinlater.

Figure 34A:
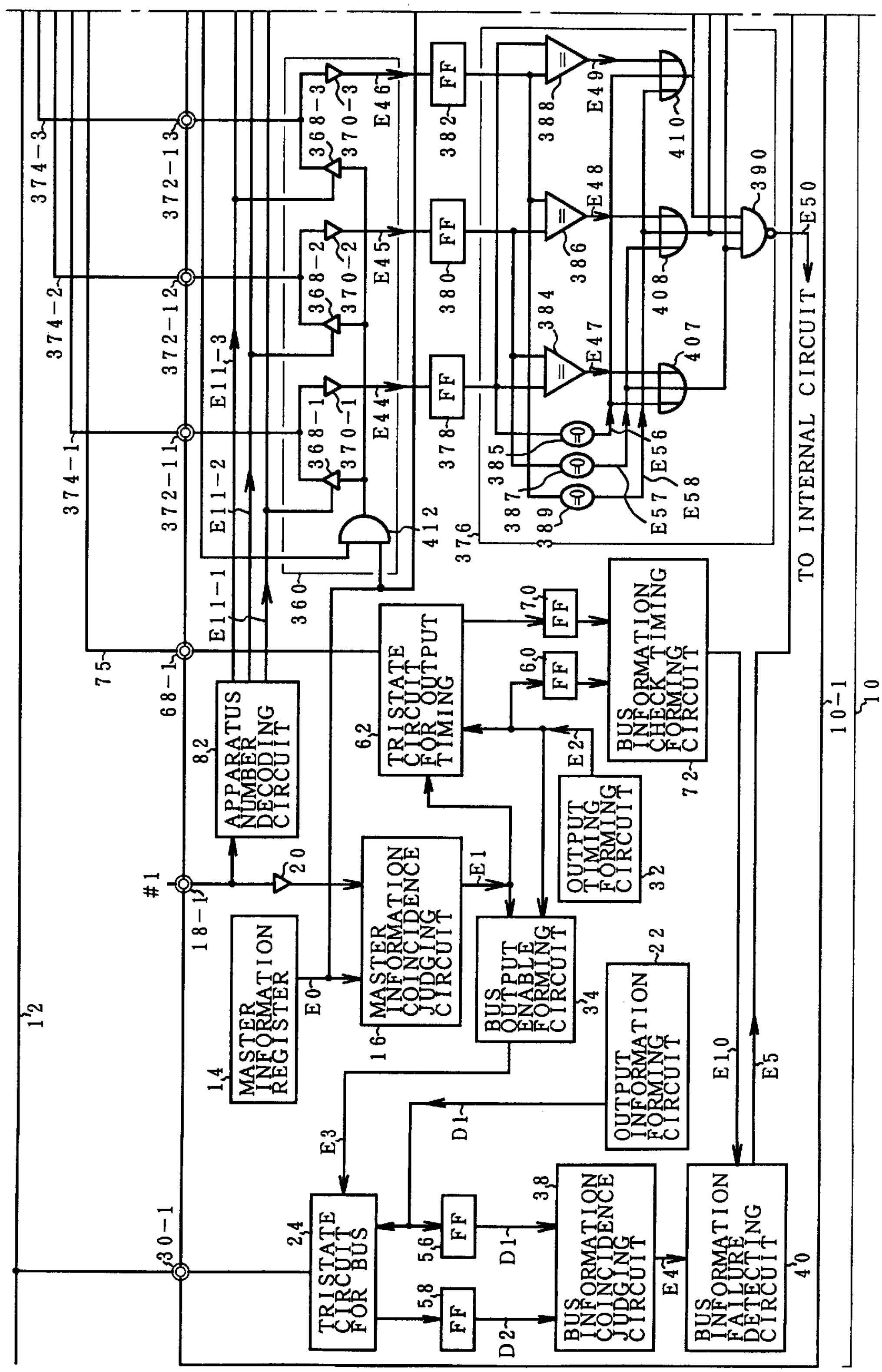
FIGS. 34A and 34B are block diagrams of a TMR unit for mask outputting the master information by the existence processor display flag of the processor itself.
Figure 34B:
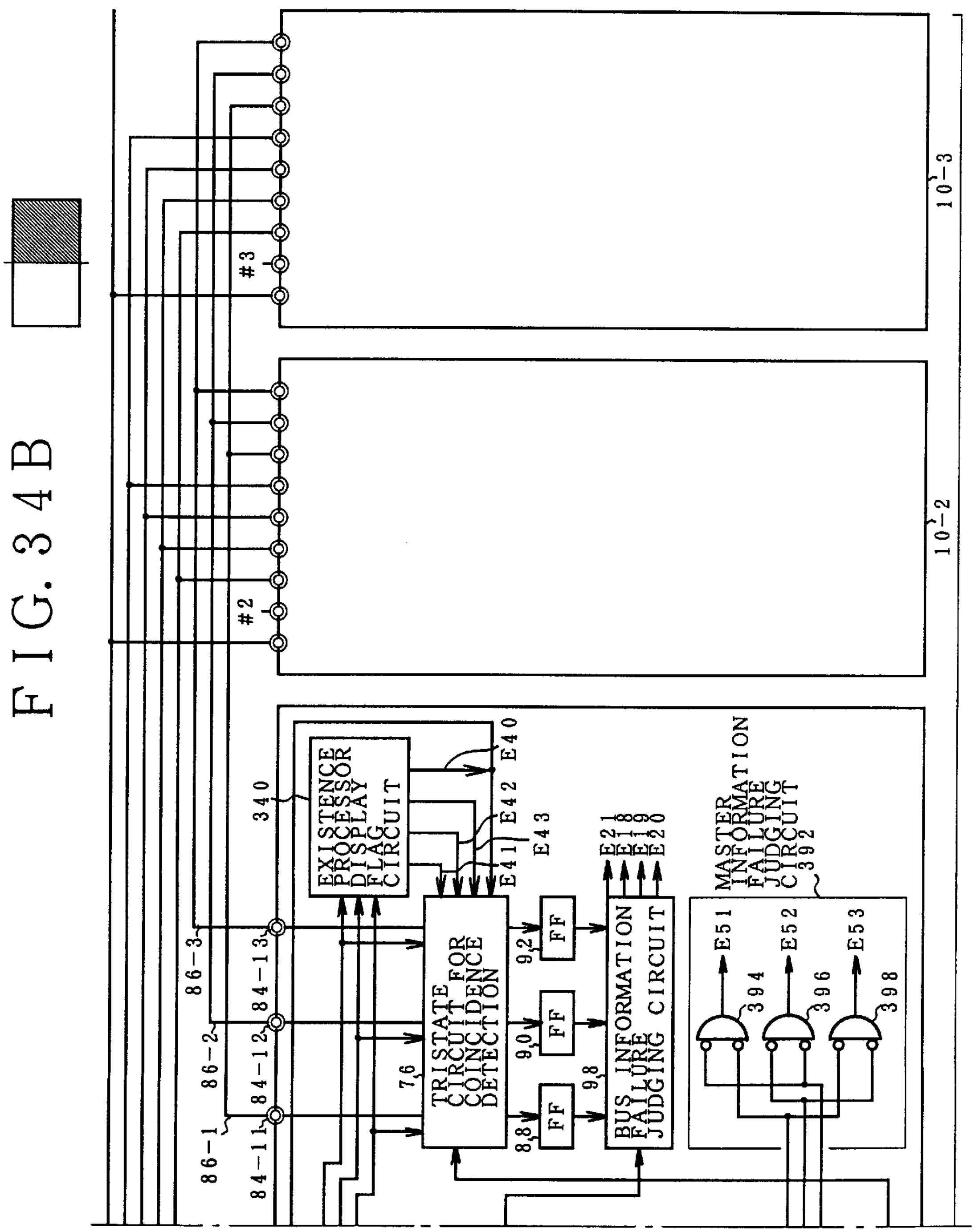

FIGS. 34A and 34B show an embodiment in which when the processors 10-1 to 10-3 constructing the TMR unit 10 are disconnected from the TMR unit 10 due to a failure of the processors themselves, it is prevented that the erroneous master information is not notified to the other processors constructing the TMR unit. In the embodiment of FIGS. 33A and 33B, even when any one of the processors 10-1 to 10-3 is disconnected from the TMR unit 10 due to a failure or the like, the master information is directly outputted to the other processors constructing the TMR unit 10, so that there is a fear such that the other processors erroneously recognize. To avoid such a situation, in FIGS. 34A and 34B, since the processors disconnected from the TMR unit 10 use the processor numbers which don't exist as master information, in the embodiment, the processor numbers #1, #2, and #3, the processor number #0 which doesn't exist is generated. In response to the notification of the processor number #0, when the processor number #0 which doesn't exist is notified as master information from the other processor, the processors constructing the TMR unit 10 recognize that it is normal, thereby avoiding the erroneous operation. In order to notify the other processor of the processor number #0 which doesn't exist in a state in which the processor is disconnected from the TMR unit 10 as master information, an AND gate 412 for mask output is provided for the tristate circuit 360 for master information. The master processor number E0 from the master information register 14 is inputted to one input of the AND gate 412. The flag signal E40 indicative of the existence of the processor itself from the existence processor display flag circuit 340 is inputted to another input of the AND gate 412. As shown in the existence processor display flag circuit 340 in FIGS. 28A and 28B, the flag signal E40 is turned on on the basis of the turn-on of the existence processor display flag for the flag register 342 corresponding to the processor 10-1 and the decoding signal E11-1 corresponding to the processor number #1 of the processor 10-1 which is outputted from the apparatus number decoding circuit 82. When the processor 10-1 constructs the TMR unit 10, since the existence processor display flag is ON, the flag signal E40 is also turned on, the AND gate 412 is set into a permission state, and the master information to the other processors 10-2 and 10-3 is notified. On the other hand, when the processor 10-1 is disconnected from the TMR unit 10 due to a failure or the like, the existence processor display flag of the processor itself is turned off and the flag signal E40 is also turned off, thereby setting the AND gate 412 into an inhibition state. Therefore, the notification of the processor number #1 as master information to the other processors 10-2 and 10-3 by the output driver 368-1 is inhibited, so that this state is the same as the state in which the processor number #0 of the processor which doesn't exist was notified. When the processor is disconnected from the TMR unit 10, therefore, it is possible to notify the other processors of a fact that the processor number #0 which doesn't exist as master information is recognized as a master processor. On the other hand, when the processor number #0 which doesn't exist is notified as master information from the other processor disconnected from the TMR unit 10, the processor which constructs the TMR unit 10 and is operating must ignore the notification of such master information. Therefore, master processor number detectors 385, 387, and 389 for detecting that the processor number which is recognized as a master processor and is respectively inputted to the comparators 384, 386, and 388 is the processor number #0 which doesn't exist as a processor and for turning on outputs are provided for the master information failure detecting circuit 376. The outputs of the detectors 385, 387, and 389 are inputted to OR gates 407, 408, and 410 together with outputs of the comparators 384, 386, and 388. Outputs of the OR gates 407, 408, and 410 are supplied to the NAND gate 390 and master information failure judging circuit 392. For example, when the processor 10-2 is disconnected from the TMR unit 10 and the processor number #0 which doesn't exist is notified as master information, the outputs of the comparators 384 and 386 to which the notification of the processor number #0 was inputted in the master information failure detecting circuit 376 are turned off. At the same time, the master processor number detecting circuits 387 corresponding to the processor 10-2 among the three master processor number detecting circuits 385, 387, and 389 detects the notified processor number #0 and turns on its output. Therefore, although the outputs of the comparators 384 and 386 are turned off by the processor number #0 which doesn't exist, since the output of the master processor number detecting circuit 387 is turned on, outputs of the OR gates 407 and 408 can be turned on. In this instance, since an output of the OR gate 410 is ON, the master information failure occurrence signal E50 that is outputted from the NAND gate 390 is turned off. Even if there is a notification of the processor number #0 which doesn't exist from the processor 10-2 disconnected from the TMR unit 10, it is ignored and the detection of the master information failure can be suppressed.

Figure 35A:
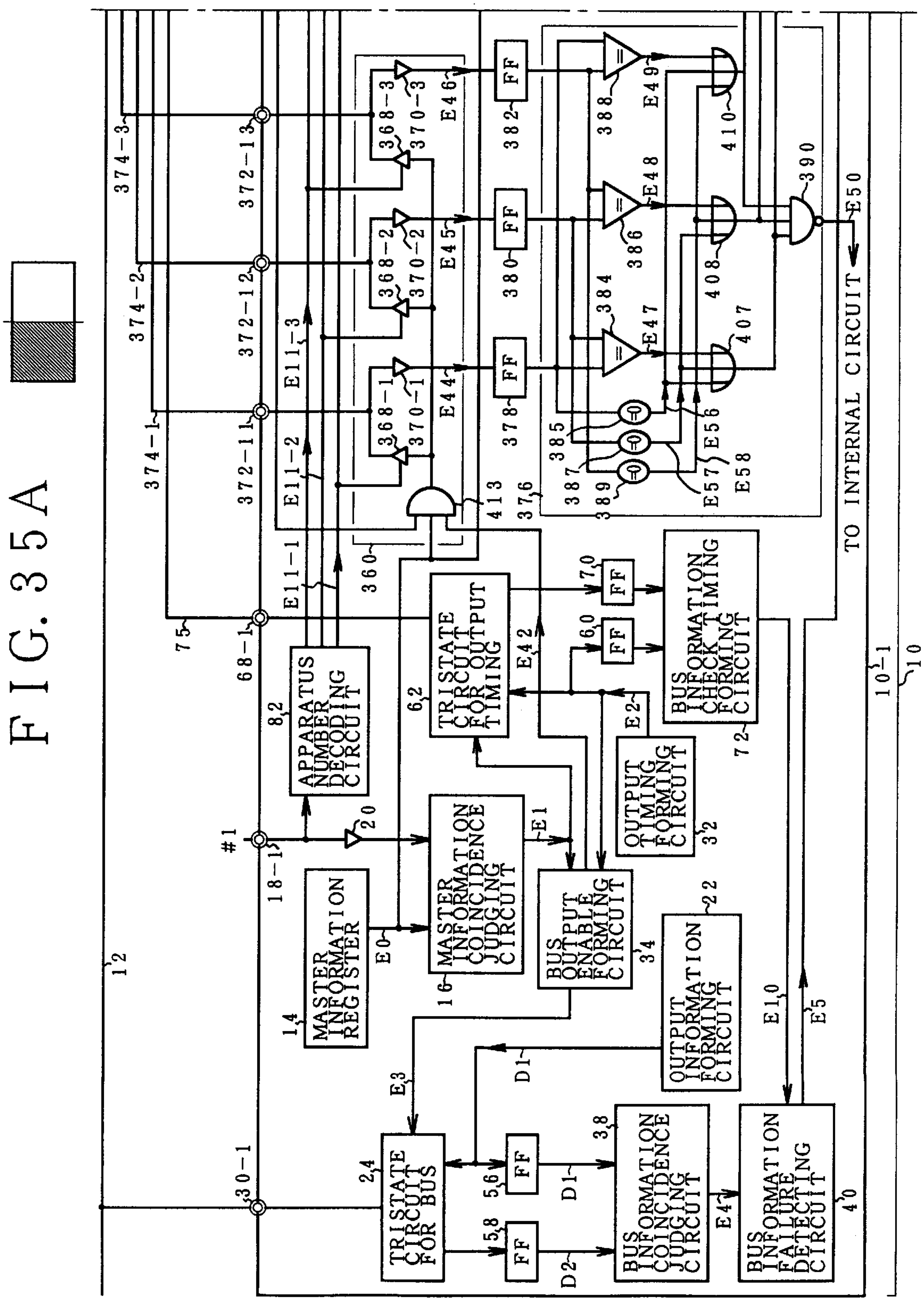
FIGS. 35A and 35B are block diagrams of a TMR unit for mask outputting the master information by a bus output permission flag.
Figure 35B:
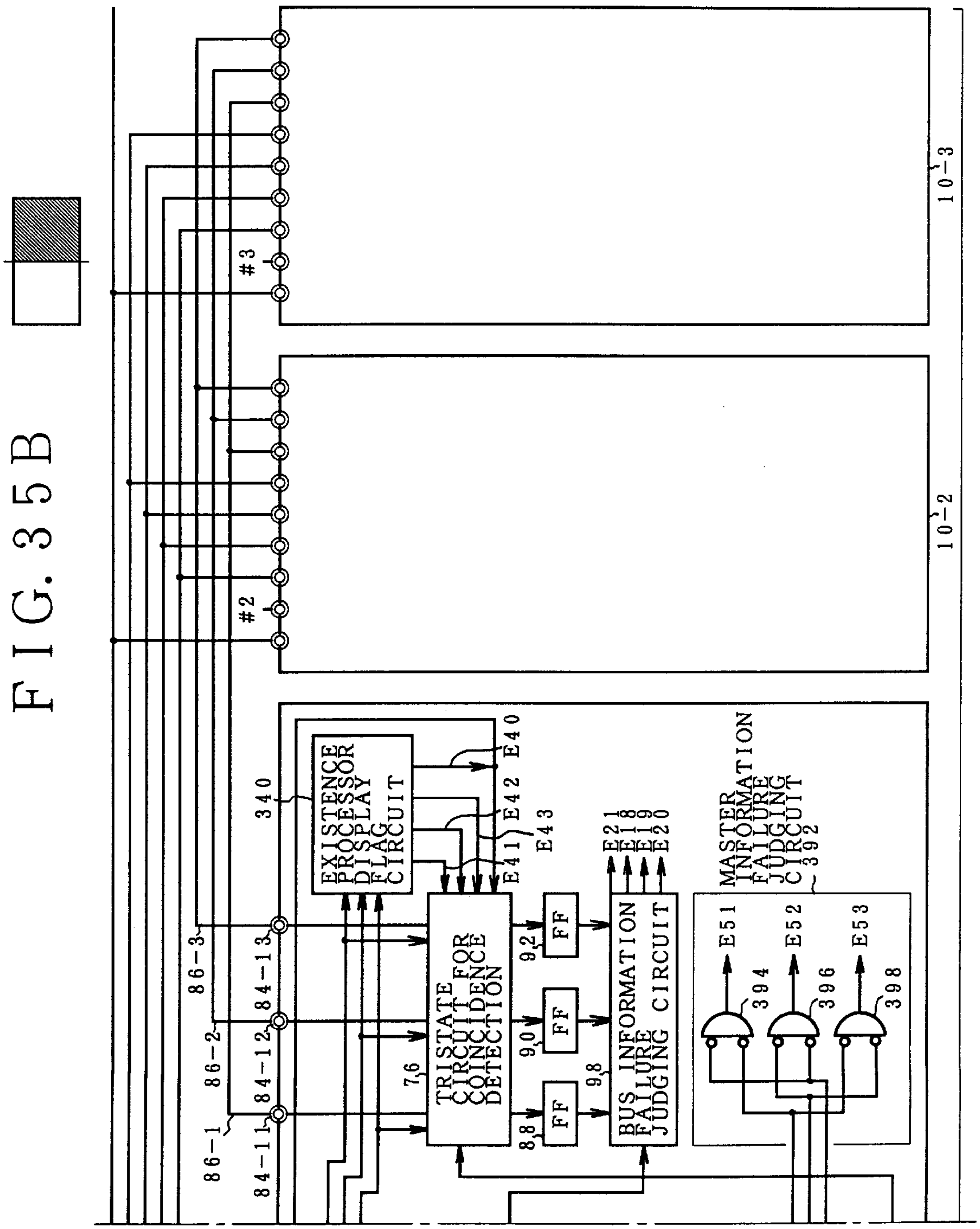

FIGS. 35A and 35B show an embodiment in which when a certain processor is disconnected from the TMR unit 10 due to a failure or the like, it is prevented that the erroneous master information is notified to the other processors constructing the TMR unit. The embodiment is characterized in that the mask output of the master information is executed by using the bus output permission flag in addition to the existence processor display flag in FIGS. 35A and 35B. In the embodiment, an AND gate 413 of three inputs for mask output is provided for the tristate circuit 360 for master information. In a manner similar to FIGS. 34A and 34B, the master processor number signal E0 from the master information register 14 and the flag signal E40 indicative of the connection and disconnection to/from the TMR unit 10 from the existence processor display flag circuit 340 are inputted to the AND gate 413. The flag signal E42 based on the bus output permission flag set in the bus output enable circuit 34 is further inputted to the AND gate 413. The flag signal E42 based on the bus output permission flag is the same as that used for mask output of the bus information failure detection result in FIGS. 29A and 29B. By providing such an AND gate 413 for mask output, if at least either one of the circuit units of the flag signal E40 from the existence processor display flag circuit 340 and the flag signal E42 based on the bus output permission flag provided for the bus output enable forming circuit 34 is normal, the processor disconnected from the TMR unit 10 can output the processor number #0 which doesn't exist as master information. By such a double structure, it is possible to certainly avoid that the failed processor exerts an adverse influence on the whole TMR unit.

Figure 36A:
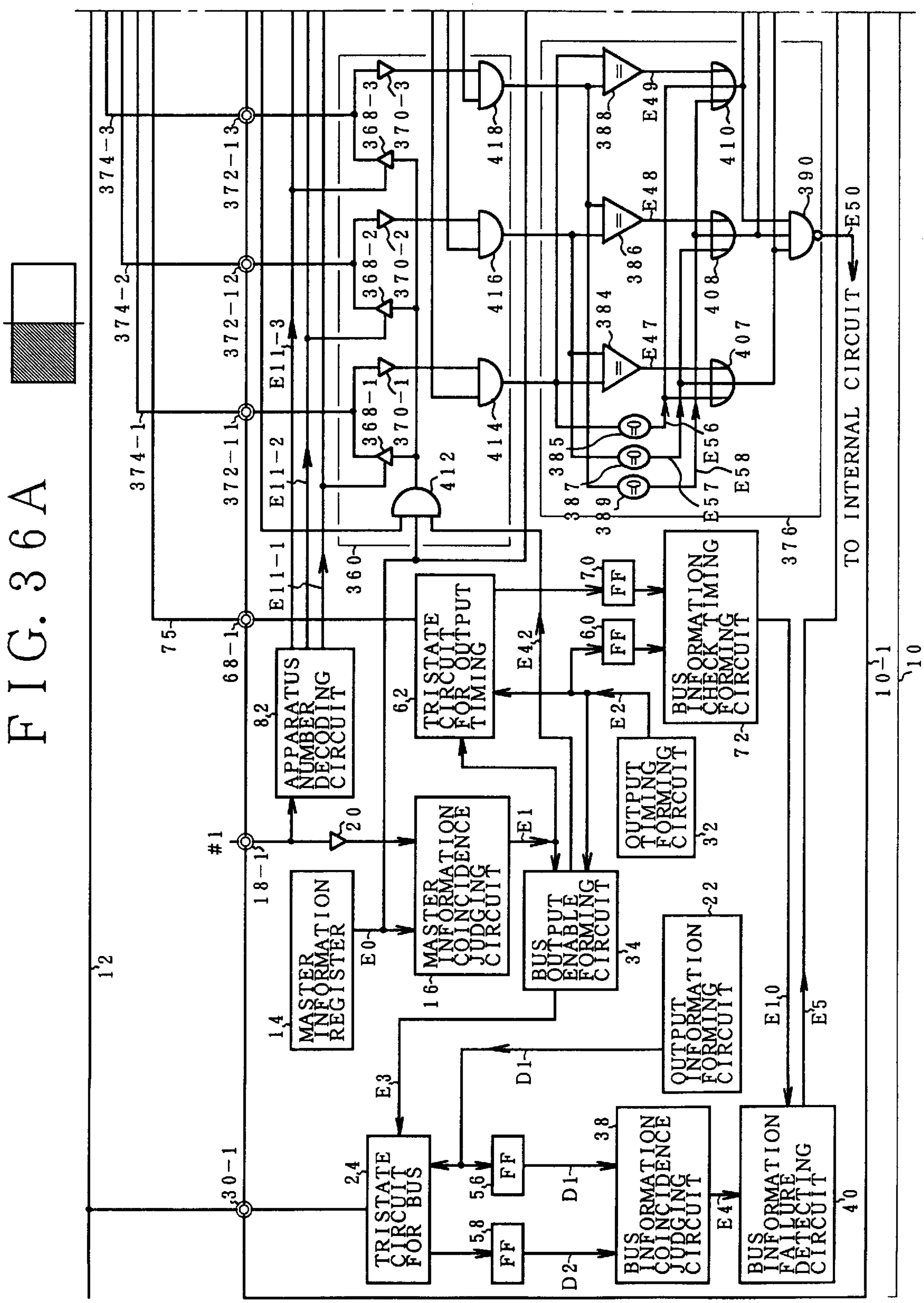
FIGS. 36A and 36B are block diagrams of a TMR unit for mask inputting the master information from another processor by the existence processor display flag of each processor.
Figure 36B:
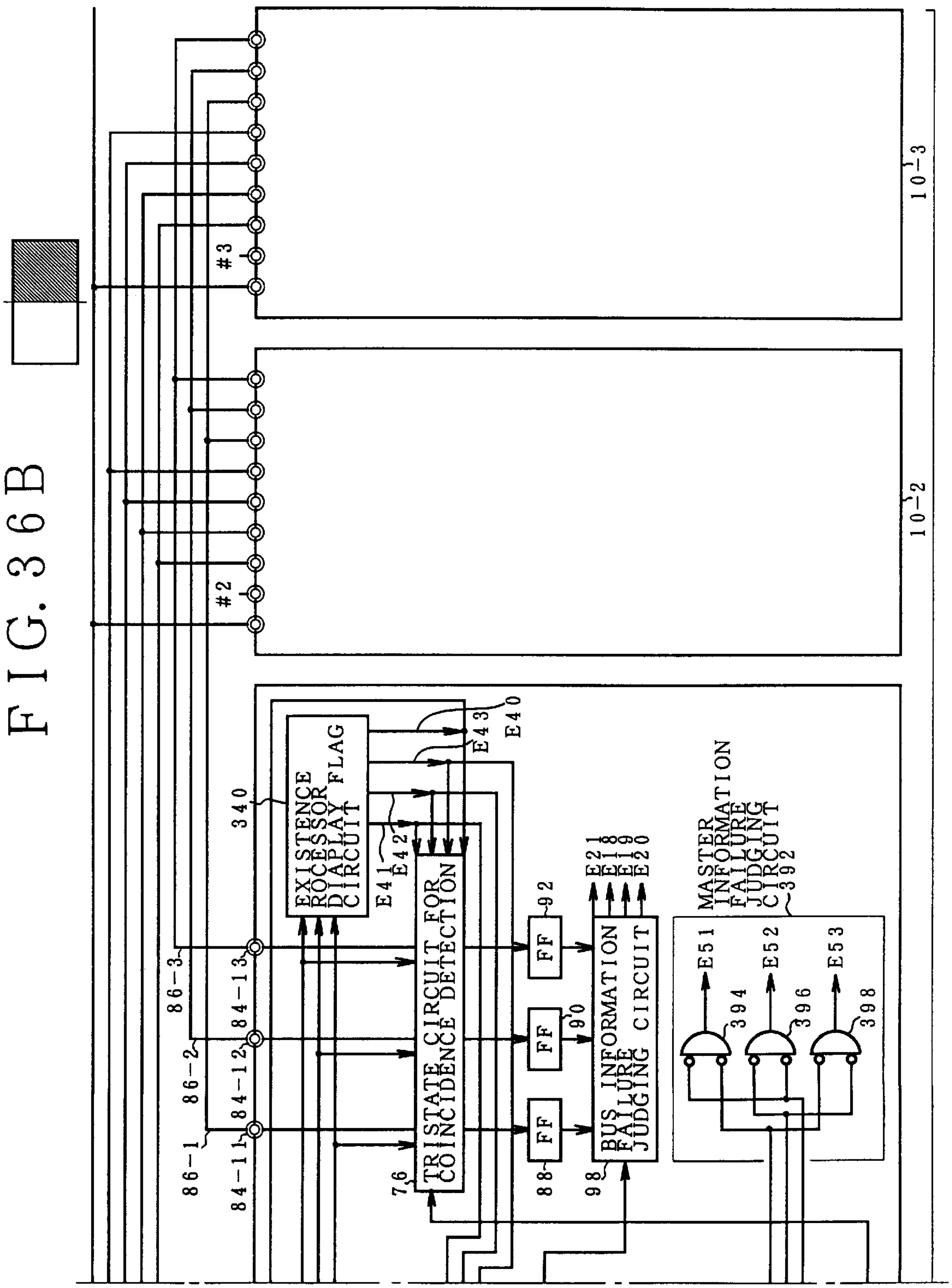

FIGS. 36A and 36B show an embodiment in which even when the erroneous master information is notified from the processor disconnected from the TMR unit 10 due to a failure or the like to the other processors constructing the TMR unit 10, an input is masked so as not to cause an erroneous operation. In the processor 10-1, the signals regarding the processor number of the master information notified from the other processors 10-2 and 10-3 by the exclusive-use signal lines 374-2 and 374-3 are fetched by the input drivers 370-1, 370-2, and 370-3 including the self processor. AND gates 414, 416, and 418 for input mask are provided at the output stage. Flag signals E41, E42, and E43 for the processors 10-1 to 10-3 which are outputted from the existence processor display flag circuit 340 are inputted to the other inputs of the AND gates 414, 416, and 418, respectively. Therefore, since one of the flag signals E41 to E43 corresponding to the processor disconnected from the TMR unit 10 is OFF, the corresponding one of the AND gates 414, 416, and 418 is set into an inhibition state, thereby inhibiting the input of the processor number signal indicative of the master information to the master information failure detecting circuit 376. The processor number signal whose input was masked by the AND gates 414, 416, and 418 is handled as a processor number #0. Since the processor number #0 is a processor number which doesn't exist, the master information failure circuit 376 can avoid that the processor disconnected from the TMR unit due to a failure exerts an adverse influence on the whole TMR unit by the masking of the input inhibition by the AND gates 414, 416, and 418 for input mask.

Figure 37A:
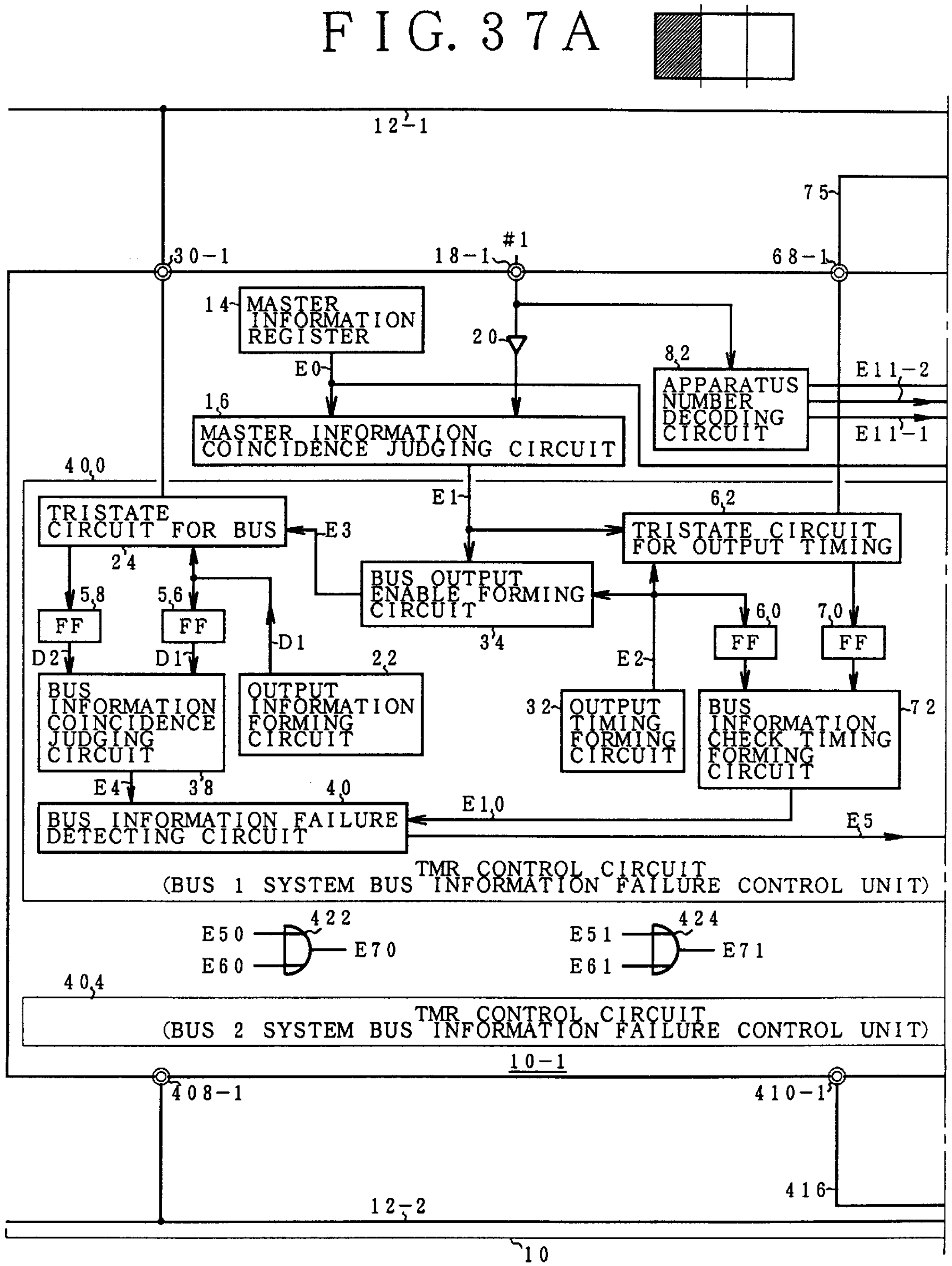
FIGS. 37A, 37B, and 37C are block diagrams of a TMR unit with a multiple bus construction having a failure detection judging function by a notification of the master information.
Figure 37B:
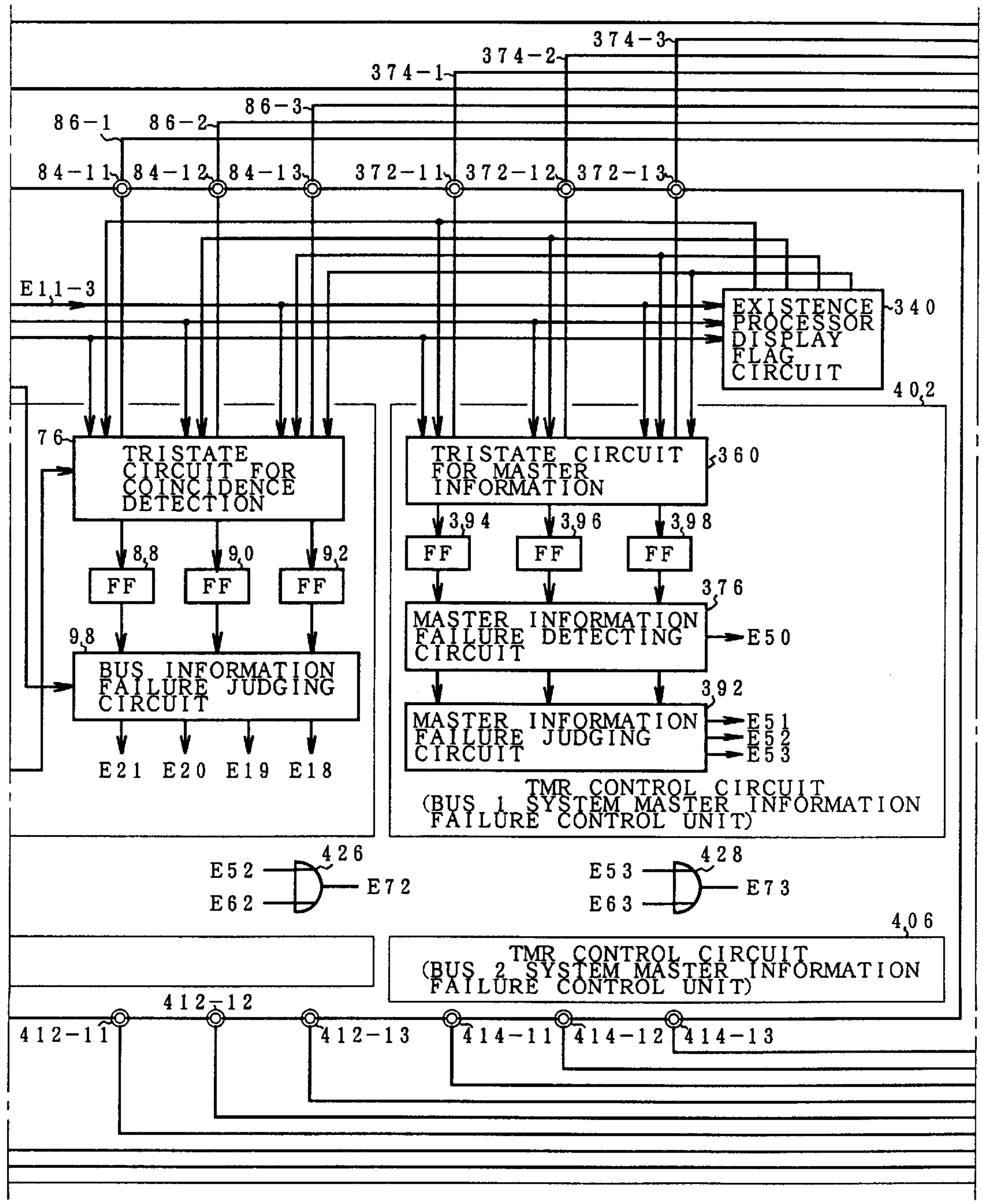
Figure 37C:
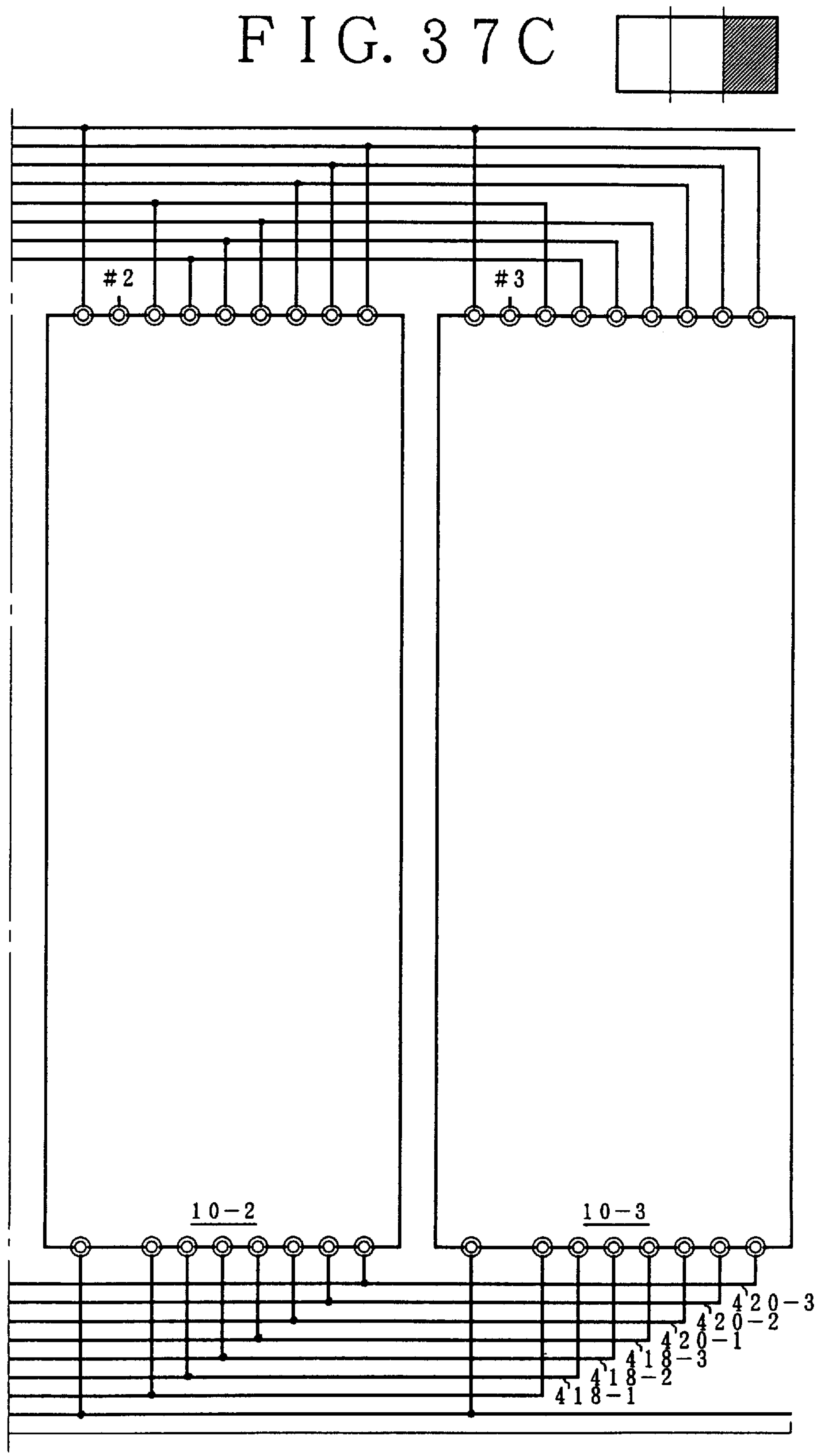

FIGS. 37A to 37C show an embodiment of a high reliability information processor with a multi-bus construction. In the multi-bus construction, the processors 10-1, 10-2, and 10-3 constructing the TMR unit 10 are connected to a plurality of buses, in the embodiment, to the buses 12-1 and 12-2, thereby transmitting and receiving data. In this case, the master processor number recognized by the processors 10-1 to 10-3 is also notified to the other processors every buses 12-1 and 12-2. In this case, although an application such that the different master processors are used for the buses 12-1 and 12-2 can be also considered, by setting the same processor to the master processor for all of the buses 12-1 and 12-2, the control is very simplified. In the embodiment, the case where the bus 12-1 side has the embodiment of FIGS. 33A and 33B is shown as an example. With respect to the bus 12-1 side, a multiplex control circuit of the processor 10-1 is shown divisionally with respect to a TMR control circuit 400 constructing the bus information failure control unit and a TMR control circuit 402 constructing the master information failure control unit. The same circuit construction is provided for a TMR control circuit 404 as a bus information failure control unit on the bus 12-2 side and a TMR control circuit 406 is provided as a master information failure control circuit unit of the bus 12-2. As for the bus 12-2 side, signal lines are obviously connected among the processors 10-1, 10-2, and 10-3 in substantially the same manner as the bus 12-1 side. The master information failure judgment signal E50 indicative of the master information failure in the TMR unit 10 is derived in the TMR control circuits 402 and 406 by the master information failure detecting circuit 376 shown on the TMR control circuit 402 side. In the master information failure judging circuit 392, the judgment signals E51, E52, and E53 of the processors in which the master information fails are derived. Similar judgment signals are also obtained in the TMR control circuit 406 on the bus 12-2 side. Therefore, with respect to the failure detection and judgment signals regarding the master information of both of them, OR gates 422, 424, 426, and 428 are provided and the OR of the corresponding signals between the buses 12-1 and 12-2 is got. Thus, it is possible to judge the occurrence of the failure of the master information and in which processor the failure of the master information occurred. Namely, a master information failure detection signal E60 and master information failure judgment signals E61, E62, and E63 corresponding to the processors 10-1 to 10-3 are obtained from the TMR control circuit 406 as a master information failure control unit for the bus 12-2. Therefore, the ANDs of the signals E61 to E63 and the signals E50 to E53 obtained from the TMR control circuit 402 on the bus 12-1 side are got by the OR gates 422, 424, 426, and 428, respectively. A master information failure detection signal E70 as a whole for the buses 12-1 and 12-2 as targets and judgment signals E71, E72, and E73 of the processors in which a failure of the master information occurs can be obtained. In the multi-bus construction of FIGS. 37A to 37C, although the case in which the TMR control circuit of each bus system of the processor 10-1 has used the embodiment of FIGS. 33A and 33B has been shown as an example, it is also possible to use the circuit construction of any one of the embodiments of FIGS. 34A, 34B, 35A, 35B, 36A, and 36B.

Figure 38A:
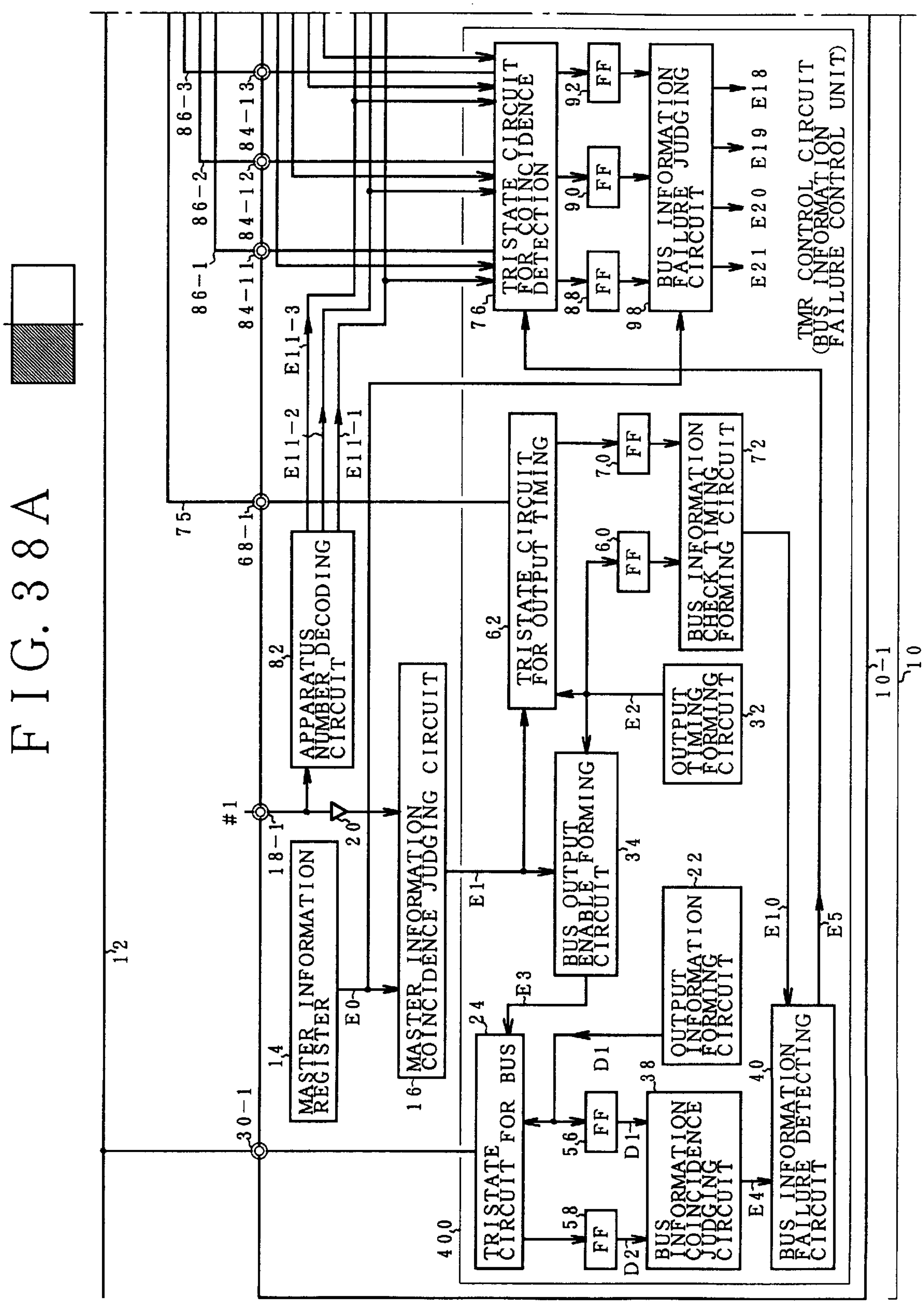

FIGS. 38A and 38B show an embodiment in which when it is judged that any one of the processors 10-1 to 10-3 constructing the TMR unit 10 failed due to the dissidence of the bus information or master information, in order to disconnect the failed processor from the TMR unit, the existence processor display flag of the relevant processor is controlled so as to be turned off.

In FIGS. 38A and 38B, an existence processor display flag control circuit 341 having therein the existence processor display flag circuit 340 is provided for the processor 10-1. The judgment signals E18, E19, and E20 indicative of the bus information failure processors from the bus information failure judging circuit 98 provided for the TMR control circuit 400 as a bus information failure control unit are inputted to the existence processor display flag control circuit 341. The judgment signals E51, E52, and E53 indicative of the processors in which the master information failure occurs from the master information failure judging circuit 392 provided for the TMR control circuit 402 as a master information failure control unit are also inputted. The existence processor display flag control circuit 341 has a construction shown in FIG. 39.

Figure 39:
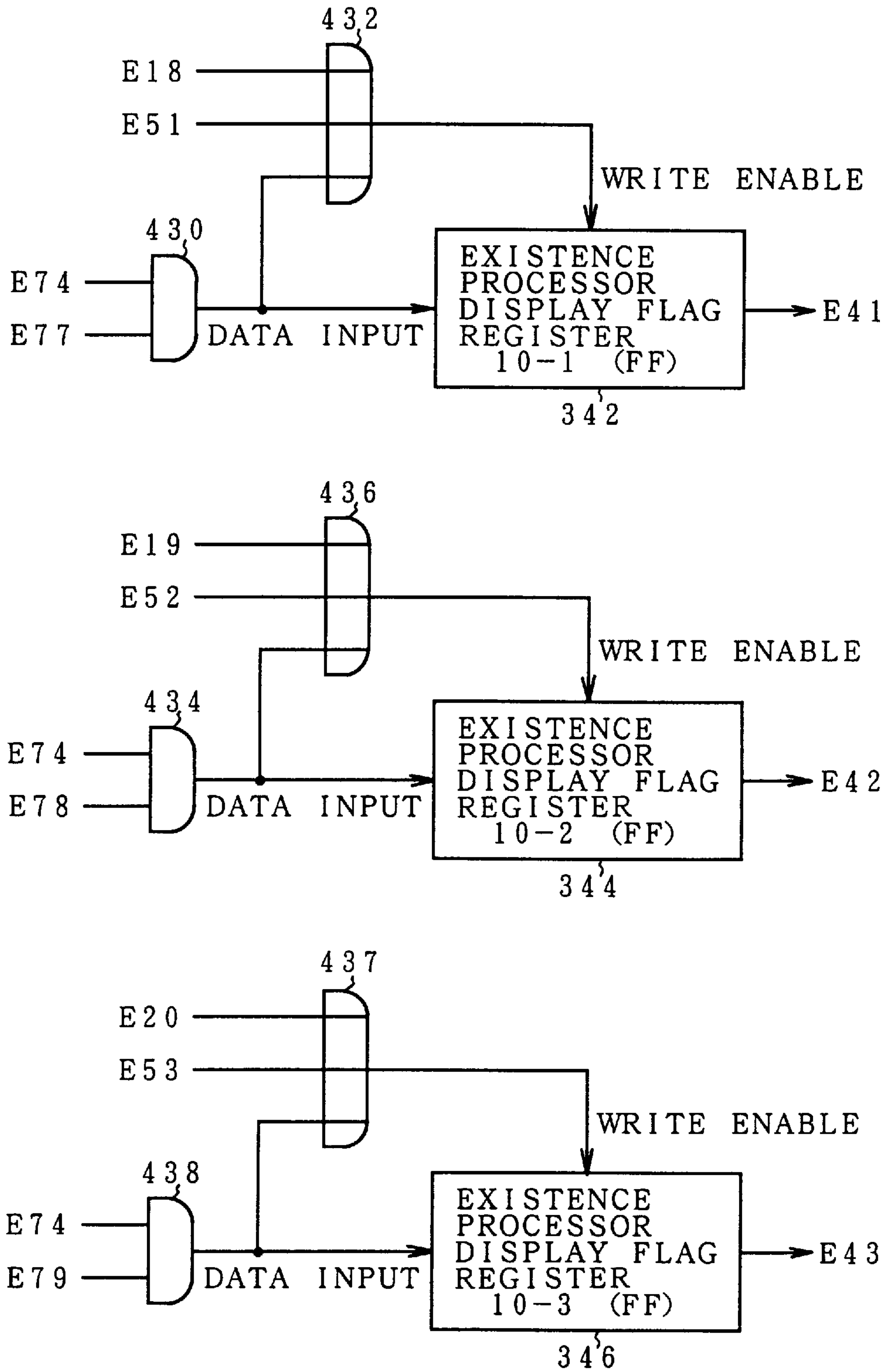
FIG. 39 is a block diagram of an existence processor display flag control circuit in FIGS. 38A and 38B.

In FIG. 39, the flag registers 342, 344, and 346 to store the existence processor display flags of the processors are provided in correspondence to the processors 10-1, 10-2, and 10-3, respectively. Generally, FFs are used as flag registers 342, 344, and 346. Outputs of AND gates 430, 434, and 438 are connected to data input terminals of the flag registers 342, 344, and 346. The AND gates 430, 434, and 438 are the AND gates of two inputs. A software setting instruction signal E74 is commonly inputted to the AND gates 430, 434, and 438 and set data E77, E78, and E79 are also inputted to those AND gates in correspondence to the processors 10-1 to 10-3. That is, the corresponding existence processor display flag can be arbitrarily set or reset to the flag registers 342, 344, and 346 by a program. Outputs of OR gates 432, 436, and 437 of three inputs are connected to write enable terminals of the flag registers 342, 344, and 346. The judgment signals E18, E19, and E20 indicative of the processors in which the bus failure information detection result was obtained from the bus information failure judging circuit 98 in FIGS. 38A and 38B are inputted to the OR gates 432, 436, and 437. The judgment signals E51, E52, and E53 indicative of the processors in which the master information failure occurred and which are outputted from the master information failure judging circuit in FIGS. 38A and 38B are also inputted to the OR gates 432, 436, and 437. In FIGS. 38A, 38B, and 39, for example, assuming that a failure occurs in the processor 10-3, with respect to the case of the bus information failure, the judgment signal E20 of the bus information failure corresponding to the processor 10-3 is turned on. Thus, the display flag of the flag register 346 in FIG. 39 is turned off. Even in case of the master information failure, similarly, the judgment signal E53 showing a master information failure of the processor 10-3 is turned off and the display flag of the flag register 346 is turned off. As mentioned above, in all of the processors, the existence processor display flag corresponding to the processor disconnected from the TMR unit 10 due to a failure is turned off, thereby making it possible to avoid that the failed processor exerts an adverse influence on the other processors which construct the TMR unit 10 and are normally operating.

Figure 40A:
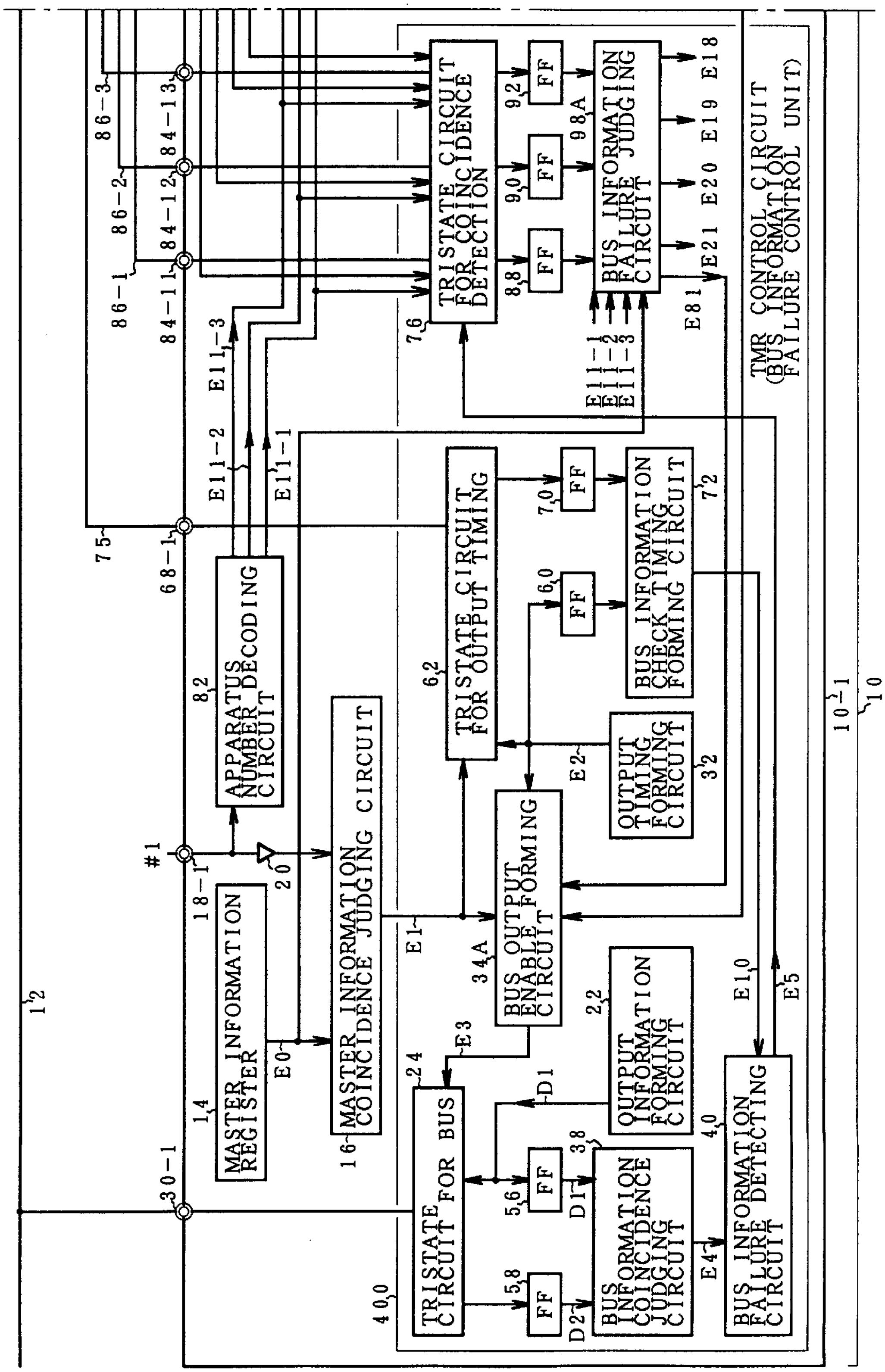
FIGS. 40A and 40B are block diagrams of a TMR unit having a function for turning off a bus output permission flag when a failure is detected.
Figure 40B:
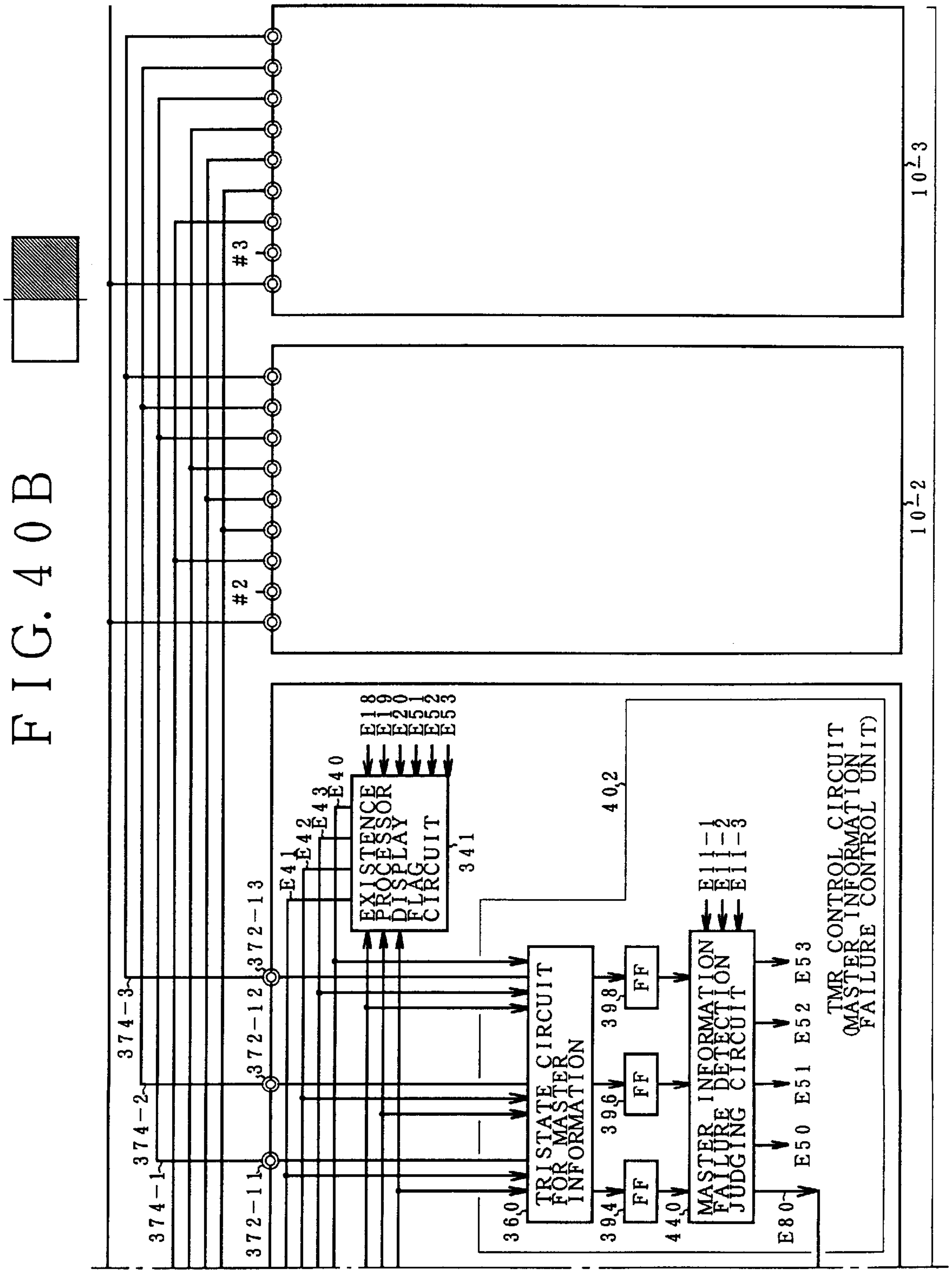

FIGS. 40A and 40B show an embodiment characterized in that when a failure occurs, in order to prevent that the failed processor exerts an adverse influence on the other processors constructing the TMR unit through the bus, by inhibiting the bus output, the failed processor is disconnected from the TMR unit 10. When a failure occurs in the TMR unit 10, in case of the bus information failure, the bus information failure detection signal E21 which is outputted from a bus information failure processor judging circuit 98A is turned on and any one of the judgment signals E18, E19, and E20 indicative of the processor in which the bus information failure occurs is turned on. In addition to it, the bus information failure judging circuit 98A generates a self processor failure judgment signal E81 which is turned on when the bus information failure occurs in the self processor. The self processor failure judgment signal E81 is formed by using the decoding signals E11-1 to E11-3 from the apparatus number decoding circuit 82 for the bus information failure judging circuit 98A.

Figure 41:
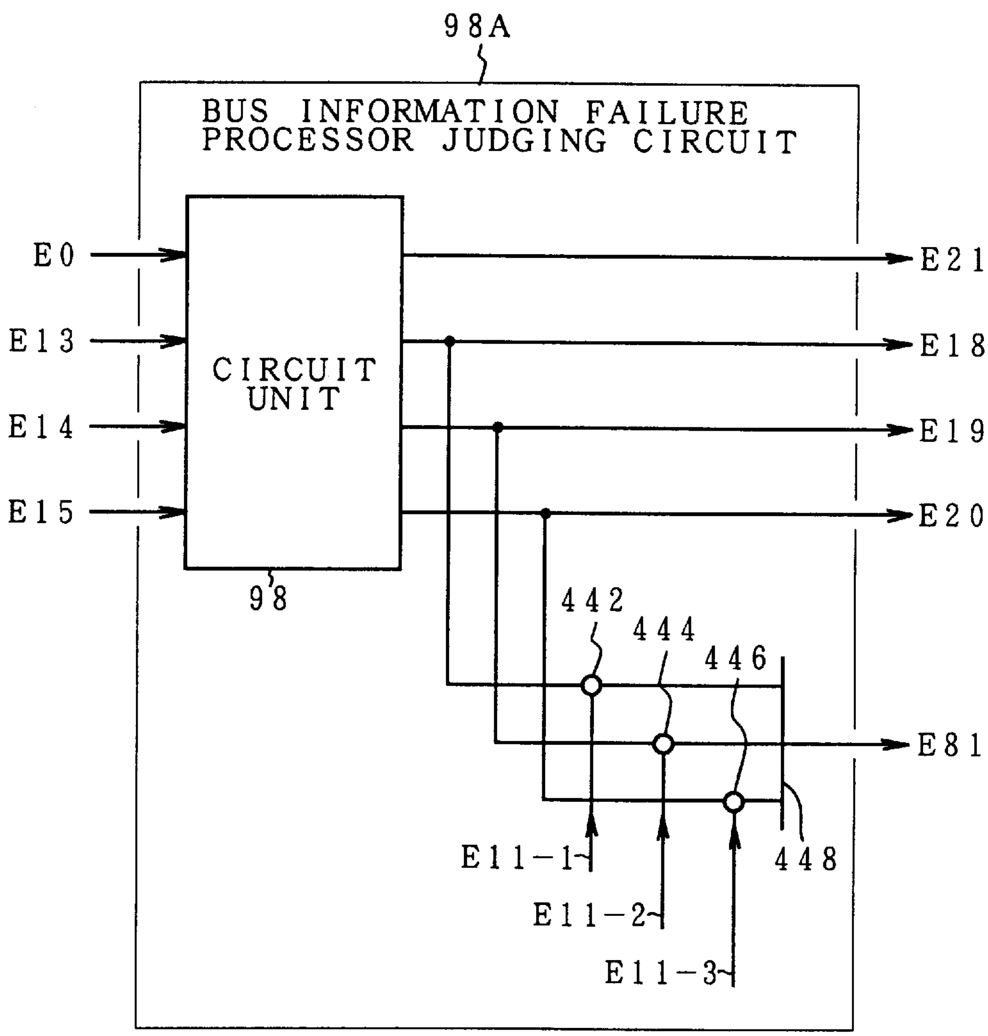
FIG. 41 is a block diagram of a bus information failure judging circuit in FIGS. 40A and 40B.

FIG. 41 shows an embodiment of the bus information failure judging circuit 98A in FIGS. 40A and 40B. First, the circuit 98 has the circuit construction shown in the embodiment of FIGS. 7A, 7B and 8. The bus information failure detection signals E13, E14, and E15 for the processors 10-1 to 10-3 from the FFs 88, 90, and 92 are inputted to the circuit 98. Further, the master processor number signal EO from the master information register 14 is inputted. The bus information failure detection signal E21 and the judgment signals E18, E19, and E20 showing the processors 10-1 to 10-3 in which the bus information failure occurs are outputted from the circuit 98. The judgment signals E18, E19, and E20 indicative of the processors of the bus information failure are inputted to the AND gates 442, 444, and 446 and the ANDs of the judgment signals E18 to E20 and the decoding signals E11-1, E11-2, and E11-3 from the apparatus number decoding circuit 82 are got, respectively. Output signals of the AND gates 442, 444, and 446 are collected by an OR gate 448 and the self processor failure judgment signal E81 regarding the bus information failure is generated. Therefore, when the failed processor is, for example, the processor 10-1 itself, the judgment signal E18 indicative of the processor 10-1 from the circuit 98 is turned on. Since the decoding signal E11-1 from the apparatus number decoding circuit 82 is also ON in this instance, an output of the AND gate 442 is turned on. The self processor failure judgment signal E81 is outputted to a bus output enable forming circuit 34A through the OR gate 448. The bus output permission flag set in an internal flag register is turned off and the bus enable signal E3 for the tristate circuit 24 for bus is turned off, thereby inhibiting the transmission of the bus information D1 from the output information forming circuit 22 to the bus 12. On the other hand, a master information failure (processor) detection judging circuit 440 is provided on the TMR control circuit 402 side serving as a master information failure control unit in FIGS. 40A and 40B. The master information failure detection judging circuit 440 is a circuit obtained by combining the master information failure detecting circuit 376 and master information failure judging circuit 392 shown in FIGS. 38A and 38B and, further, outputs the self processor failure judgment signal E80 which is turned on when the master information failure of the self processor is discriminated.

Figure 42:
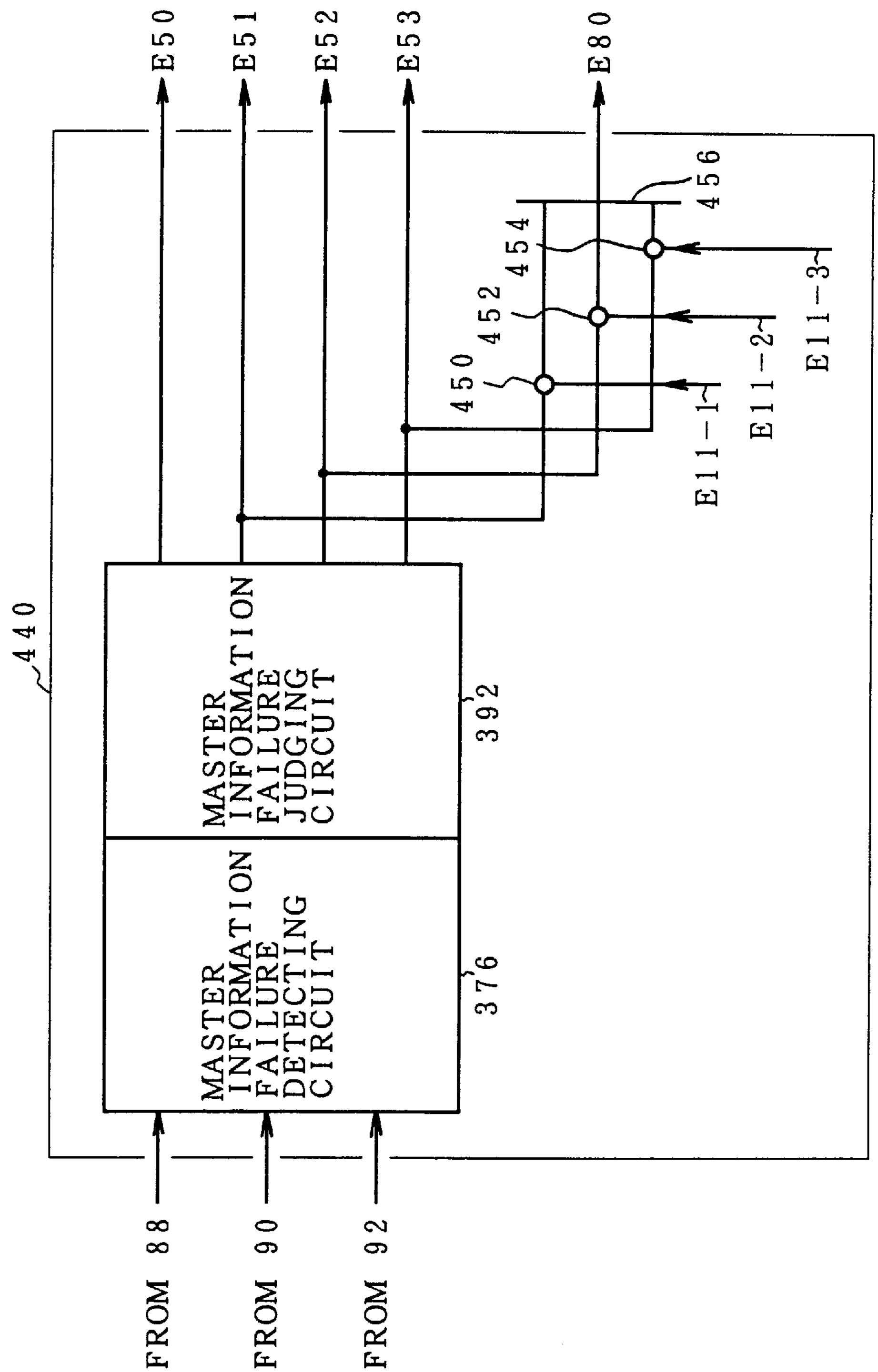
FIG. 42 is a block diagram of a master information failure detection judging circuit in FIGS. 40A and 40B.

FIG. 42 shows an embodiment of the master information failure detection judging circuit 440 in FIGS. 40A and 40B and has the master information failure detecting circuit 376 and master information failure judging circuit 392 shown in FIGS. 38A and 38B. The failure detection signal E50 of the master information and the judgment signals E51, E52, and E53 showing the processors in which the master information failure occurs are outputted from the master information failure judging circuit 392. The self processor failure judgment signal E80 showing that the master information failure occurs in the self processor is formed by a circuit unit comprising AND gates 450, 452, and 454 and an OR gate 456. That is, each of the judgment signals E51, E52, and E53 showing the processors of the master information failure from the master information failure judging circuit 392 is inputted to one input of each of the AND gates 450, 452, and 454. The decoding signals E11-1, E11-2, and E11-3 from the processor number decoding circuit 82 are inputted to the other inputs of the AND gates 450, 452, and 454, respectively. The OR of those three AND outputs is got by the OR gate 456, thereby generating the self processor failure judgment signal E80 showing that the mater information failure occurs in the processor itself. The self processor failure judgment signal E80 regarding the master information failure from the master information failure judging circuit 440 is also sent to the bus output enable forming circuit 34A as shown in FIGS. 40A and 40B. By turning off the bus output permission flag, the enable signal E3 is turned off, thereby inhibiting the output of the bus information to the bus 12 by the tristate circuit 24 for bus.

The bus output enable forming circuit 34A in FIGS. 40A and 40B has a circuit construction of FIG. 43. First, a flag register 460 for setting/resetting the bus output permission flag is provided. A software setting instruction signal E82 for outputting the AND by the AND gate 456 and set data E83 are inputted to a data input terminal of the flag register 460. An output of an OR gate 458 of three inputs is connected to a write enable terminal of the flag register 460. The self processor failure judgment signal E81 from the bus information failure judging circuit 98A in FIG. 41 and the self processor failure judgment signal E80 from the master information failure judging circuit 440 in FIG. 42 are inputted to the OR gate 458. Therefore, the bus output permission flag of the flag register 460 set by the software is forcedly reset with respect to any one of the failure of the bus information of the processor itself and the failure of the master information. As an output of the flag register 460, the self master signal E1 from the master information coincidence judging circuit 16 in FIGS. 40A and 40B and the bus output signal E2 from the output timing forming circuit 32 are inputted to the flag register 460, and when all of the three signals are ON, the bus enable signal E3 is turned on, thereby permitting the bus output. However, when the bus output permission flag of the flag register 460 is turned off by the failure of the bus information of the processor itself or the failure of the master information, an AND gate 462 is set into an inhibition state by a flag signal E84. The enable signal E3 to the tristate circuit 24 for bus is turned off, thereby inhibiting the output of the bus information to the bus 12. As mentioned above, by turning off the bus output permission flag of the processor disconnected from the TMR unit 10 due to a failure of the bus information or master information, a situation such that the failed processor accesses to the bus and exerts an adverse influence on the other processors of the TMR unit which are normally operating can be avoided.

Figure 44A:
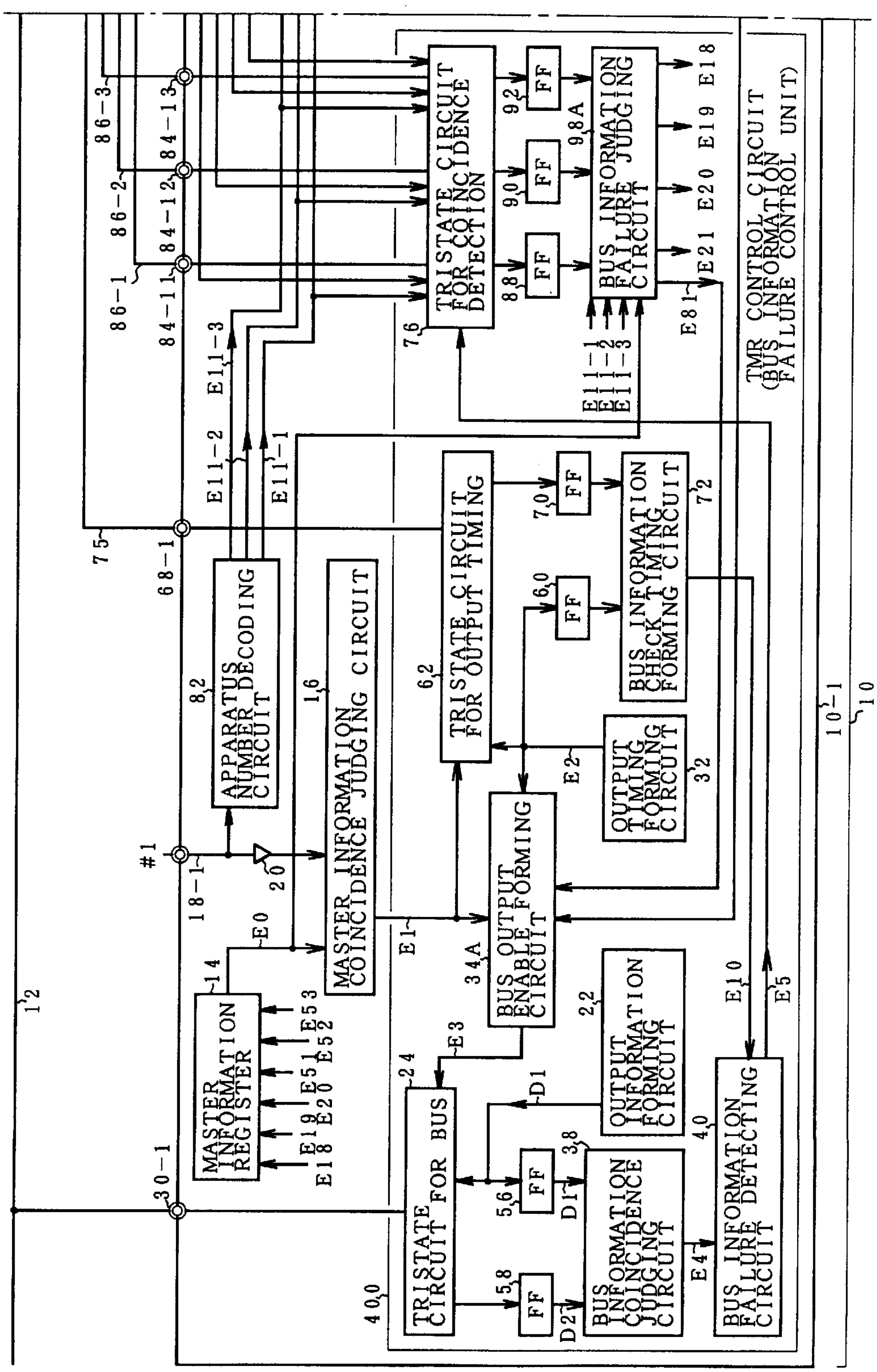
FIGS. 44A and 44B are block diagrams of a TMR unit having a function for updating master information when a failure of a master processor is detected.
Figure 44B:
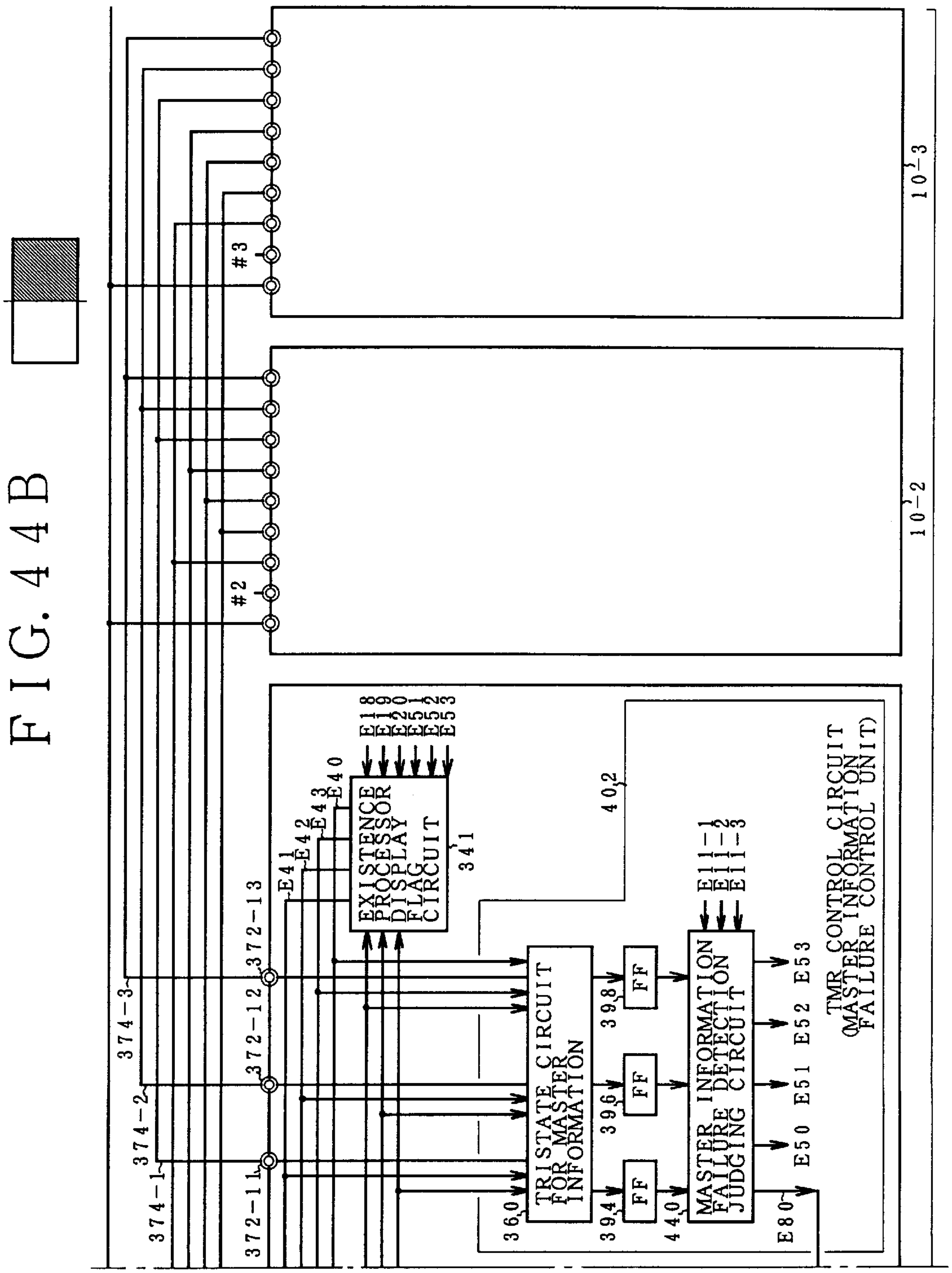

FIGS. 44A and 44B show an embodiment for redecision in which in the case where the processor serving at present as a master processor is disconnected from the bus due to a failure of the master information, a master processor is newly determined from the remaining normal processors constructing the TMR unit 10 and the process is continued. To again decide the master processor, a master information register circuit 14A is provided as representatively shown in the processor 10-1. The judgment signals E18, E19, and E20 indicative of the processors in which the bus information failure occurs from the bus information failure judging circuit 98A and the judgment signals E51, E52, and E53 of the processors in which the master information failure occurs from the master information failure detection judging circuit 440 are inputted to a master information register circuit 14A.

FIG. 45 shows an embodiment of the master information register circuit 14A. First, the master information is stored into a master information register 494. The setting of the master information into the master information register 494 can be performed by a software on the basis of a software setting instruction signal E86 and software data E87 to an AND gate 486. An output of the AND gate 486 is supplied to the master information register 494 through an AND gate 488 and an OR gate 492 and sets the master information. It is not always necessary to provide the AND gate 488. An output of an OR gate 497 is sent to a write enable terminal of the master information register 494. The write enable terminal can be turned on by the software setting instruction signal E86 upon writing of the master information by the software. The write enable terminal is turned on when the failure of the bus information or master information is occurred in the master processor. The master information can be updated by an algorithm of a new master processor number forming circuit 484. The judgment signals E18, E19, and E20 for judging the processors when the bus information failure is detected are inputted to decoders 470, 472, and 474 through OR gates 464, 466, and 468. The judgment signals E51, E52, and E53 of the processors about the master information failure are inputted to the other inputs of the OR gates 464, 466, and 468. The decoders 470, 472, and 474 generate decoding signals 01, 10, and 11 corresponding to the processors in which the failure of the bus information or master information due to the turn-on of the outputs of the OR gates 464, 466, and 468 is discriminated. As decoding outputs, the same outputs as the set information of the master processor for the master information register 494 are used. Comparators 476, 478, and 480 compare the master information indicative of the master processor set in the master information register 494 and the decoding signals generated from the decoders 470, 472, and 474 and turn on outputs when they coincide, respectively. For example, now assuming that the master information 01 of the master processor 10-1 has been registered in the master information register 494 and the judgment signal E18 is turned on due to, for example, a failure of the bus information of the processor 10-1 and the decoding signal 01 is generated from the decoder 470, the output of the comparator 476 is turned on. The outputs of the comparators 476, 478, and 480 are collected by an OR gate 482. An output of the OR gate 482 is supplied to a write enable terminal of the master information register 494 through the OR gate 497 as a master information failure signal, thereby setting the master information register 494 into an enable state. At the same time, the master information failure signal is supplied to an AND gate 490, thereby setting the AND gate 490 into a permission state and enabling the master information of the new master processor to be updated by the new master processor number forming circuit 484. In the updating of the master information register 494 by the new master processor number forming circuit 484, for example, the new master processor number is set into the master information register 494 in accordance with a forming order of the new master processor shown in FIG. 17. It will be obviously understood that although the selecting order of the new master processor can be arbitrarily set, it is necessary to enable all of the processors constructing the TMR unit to be updated by the same algorithm. Thus, even if a failure of the bus information or master information occurs in the master processor, by selecting a new master processor from the remaining processors, the process by the TMR unit can be subsequently continued.

Figure 46A:
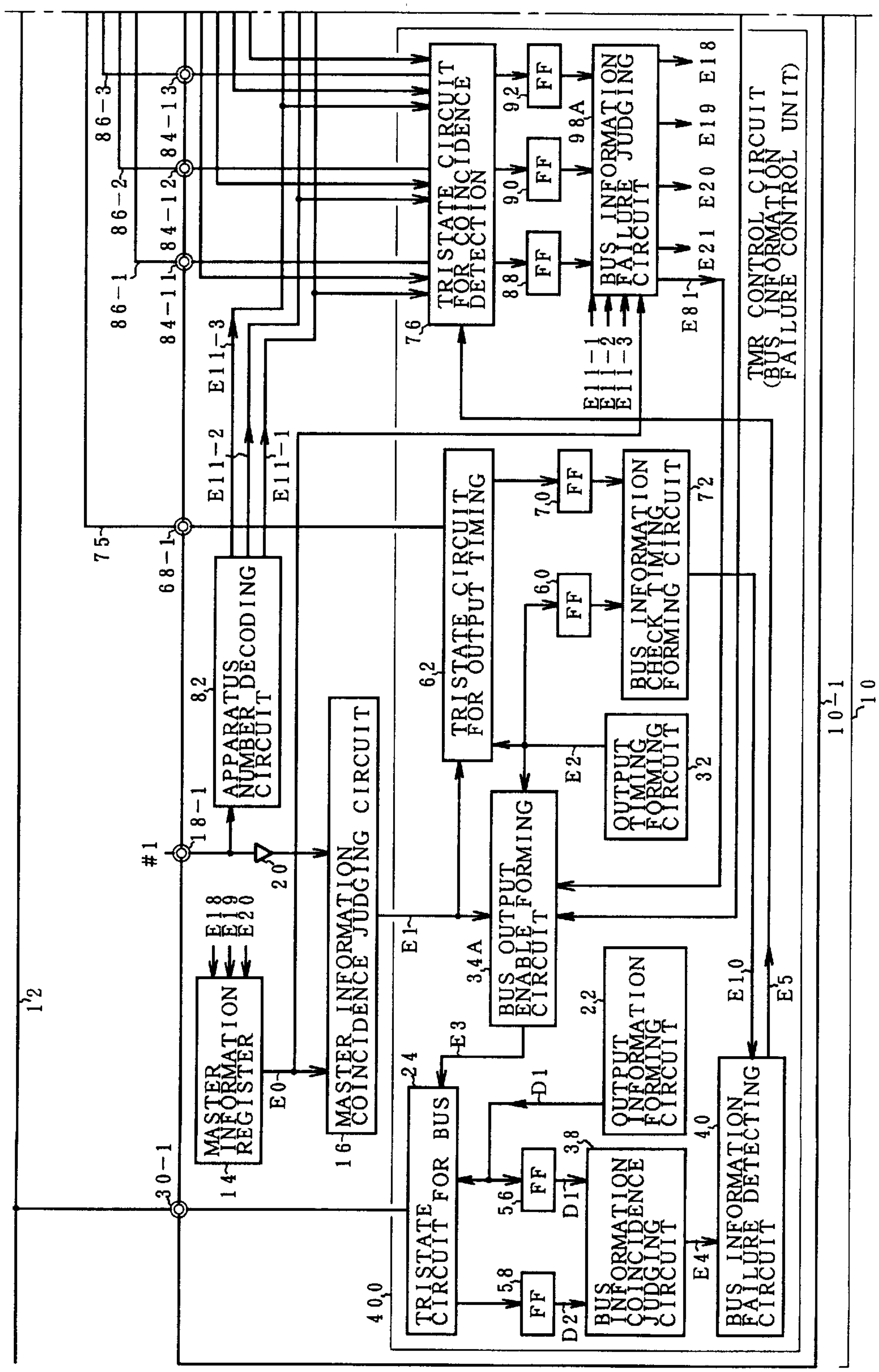
FIGS. 46A and 46B are block diagrams of a TMR unit having a function for not updating the master information when a failure of the master processor is detected.
Figure 46B:
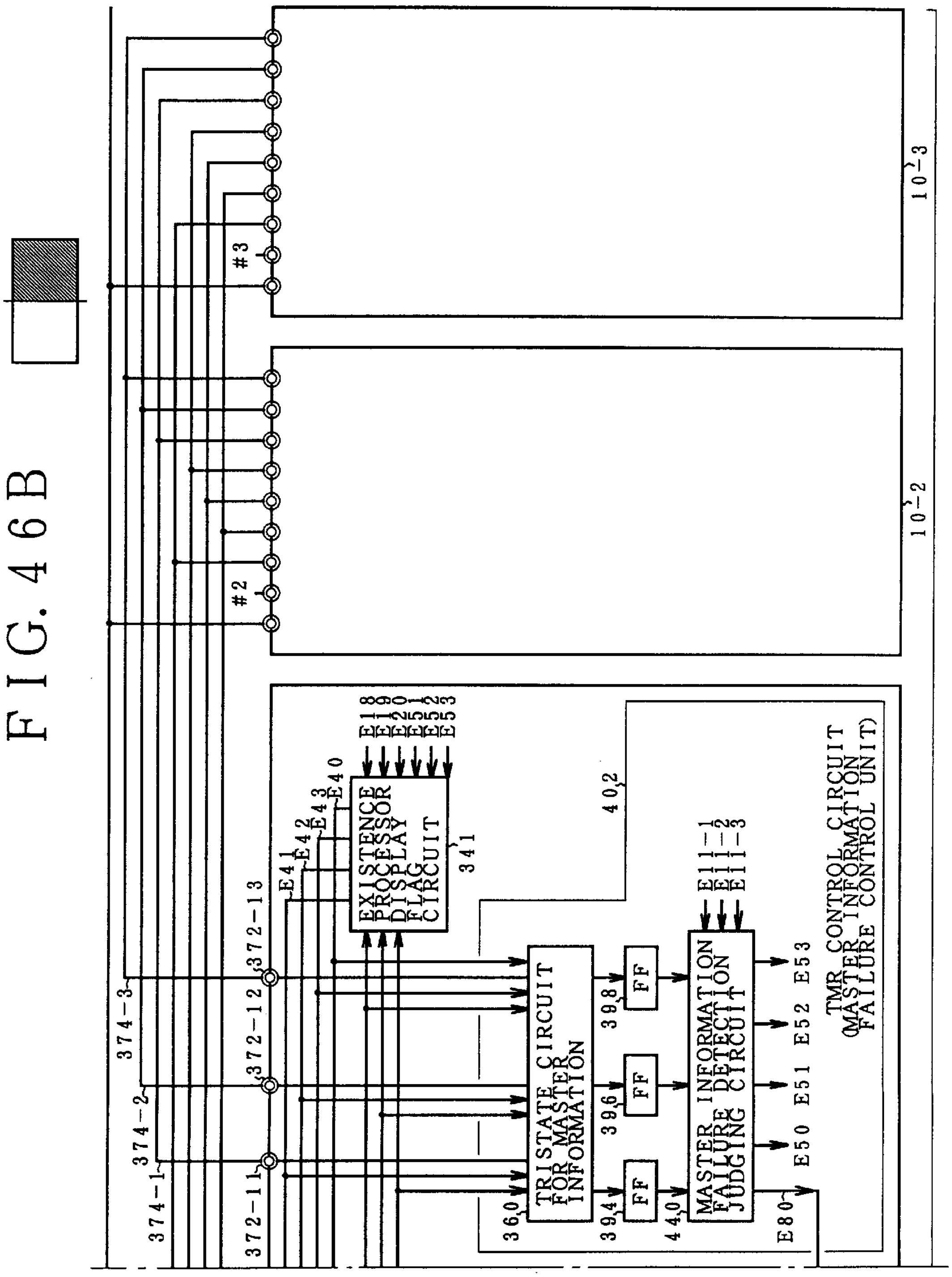

FIGS. 46A and 46B show an embodiment in which in the case where the processor serving at present as a master processor is disconnected from the bus by a failure of the master information, it is prevented that the master processor is newly decided from the remaining normal processors constructing the TMR unit 10. Namely, in the embodiment of FIG. 45, in the case where the master processor is recognized as a processor in which the master information failure occurs, the processor to which the order to become the next master processor was allocated sets the number of the processor itself to the master information register by the processor itself and becomes a new master processor. In this case, no problem will occur if the failed processor is a processor that is at present the master processor. However, on the contrary, when the master information fails in the slave processor that is a candidate of the next master processor, it is erroneously recognized that the present master processor failed, so that the failed slave processor itself tries to become the master processor. There is, consequently, a fear such that two master processors exist in the TMR unit and a system-down occurs. In the embodiment of FIGS. 46A and 46B, therefore, even if the failure of the master information is detected, the master processor is not again determined. Therefore, the judgment signals E51, E52, and E53 from the master information failure detection judging circuit 440 are not inputted to a master information register 14B representatively shown in the processor 10-1 in FIGS. 46A and 46B but only the judgment signals E18, E19, and E20 from the bus information failure judging circuit 98A are inputted.

FIG. 47 shows an embodiment of the master information register 14B. Only the judgment signals E18, E19, and E20 of the processors due to the failure of the bus information are inputted to the decoders 470, 472, and 474. The other construction is the same as that of the circuit in FIG. 45. Thus, even if the failure of the master information is judged, the master information register 494 is not updated to the new master processor. Only when the bus information failure is detected, the updating of the master information register 494 for the new master processor in the master processor based on the turn-on of any one of the judgment signals E18, E19, and E20 indicative of the processor of the bus information failure at that time is executed.

Figure 48A:
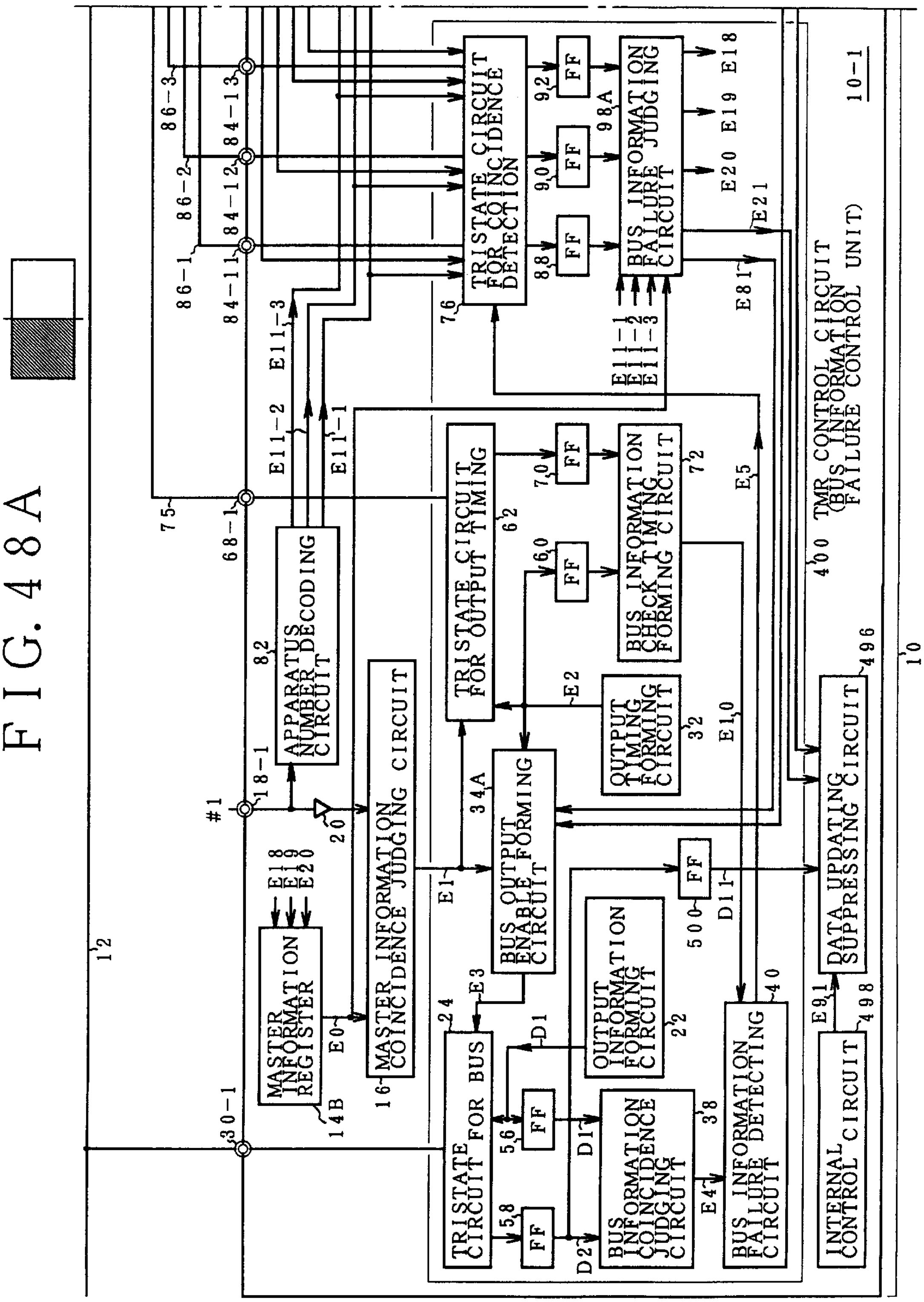
FIGS. 48A and 48B are block diagrams of a TMR unit having an updating suppressing function of various resources when a failure is detected.
Figure 48B:
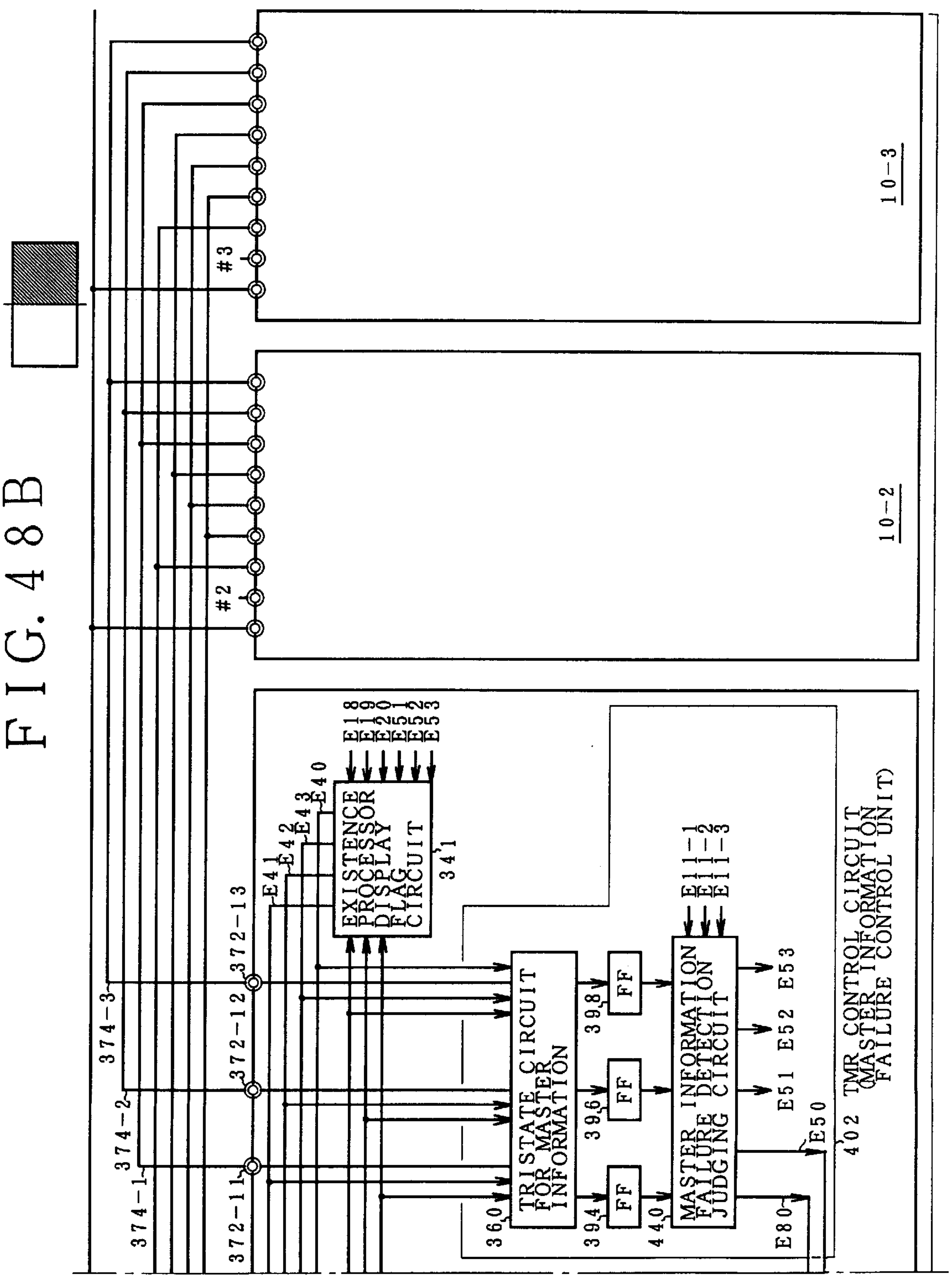

FIGS. 48A to 48C show an embodiment in which when the master information fails (also including the case of the bus information failure), the updating of various resources is suppressed so that each processor doesn't fetch the data on the bus at the time of the occurrence of the failure into the internal circuit. As already described, in the case where the failure of the bus information occurs, the bus information failure judgment signal E21 is outputted from the bus information failure judging circuit 98A. When the failure occurs in the master information, the master information failure judgment signal E50 is outputted from the master information failure detection judging circuit 440. The data fetched in the tristate circuit 24 for bus from the bus 12 is held twice in the FFs 58 and 500. This is because it is intended to match the timing with the formation of the bus information failure judgment signal E21. The data held in the FF 500 is sent to the internal circuit as bus data D11 through a data updating suppressing circuit 496. The data updating suppressing circuit 496 receives a bus selection signal E91 from the internal control circuit 498, the bus information failure judgment signal E21 from the bus information failure judging circuit 98A, and master information failure judgment signal E50 from the master information failure judging circuit 440 and controls the data updating and suppression.

Figure 49:
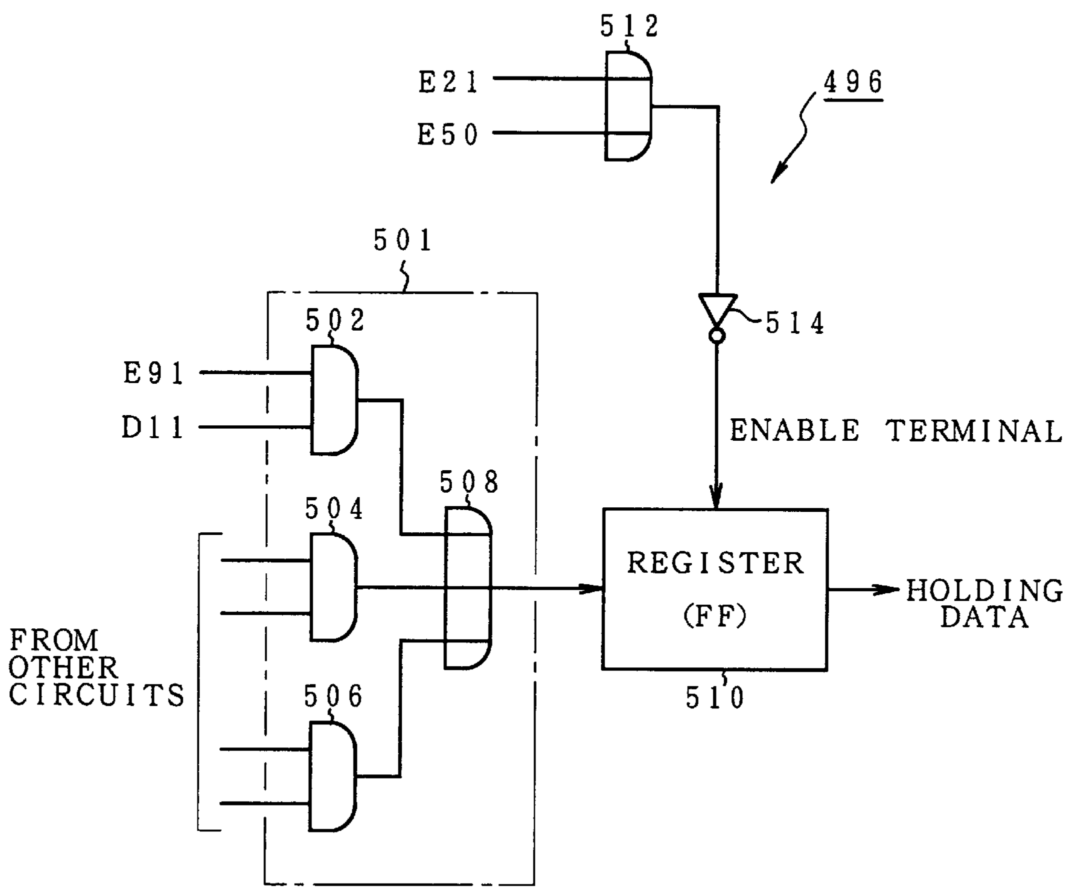
FIG. 49 is a block diagram of a data updating suppressing circuit in FIGS. 48A to 48B.

FIG. 49 is a circuit diagram of an embodiment of the data updating suppressing circuit 496. The data D11 held in the FF 500 is inputted to an AND gate 502 of a multiplexer 501. The bus selection signal E91 is inputted to the AND gate 502. The multiplexer 501 has, for example, AND gates 504 and 506 in correspondence to the other circuits. The multiplexer 501 outputs any data selected by the AND gate 502, 504, or 506 to the input data bus of a register 510. An OR gate 512 and an inverter 514 are provided for an enable terminal of the register 510. The bus information failure judgment signal E21 and master information failure judgment signal E50 are inputted to the OR gate 512. In a normal state in which the processors 10-1 to 10-3 of the TMR unit 10 are normally operating, both of the bus information failure judgment signal E21 and the master information failure signal E50 are OFF, so that an output of the inverter 514 is turned on and the register 510 is in an enable state. Therefore, the data on the bus is set into the register 510 as data D11 through the AND gate 502 and an OR gate 508 by the turn-on of the bus selection signal E91 to the multiplexer 501. On the other hand, when a failure of the bus information or master information is detected, the bus information failure judgment signal E21 or master information failure judgment signal E50 is turned on and the output of the inverter 514 is turned off, thereby setting the register 510 into a disable state. The disable state is set to a timing after the elapse of two cycles after the data had been outputted to the bus. At this time, although the data D11 on the bus is inputted from the multiplexer 501 to the register 510, since the register 510 is in a disable state, the writing of the data D11 into the register 510 is suppressed. A breakage of the contents of the register by the data on the bus at the time of the occurrence of the failure can be suppressed. Although FIG. 49 relates to the example of the prevention of the breakage of the register contents by the data on the bus at the time of the occurrence of a failure, the breakage of the resources due to the data upon occurrence of the failure can be also suppressed even in another internal circuit by performing a similar control as necessary. In FIG. 49, although the suppression cycle period has been set to one cycle, it is also possible to suppress for a period of time corresponding to only the continuous necessary number of cycles.

Figure 50A:
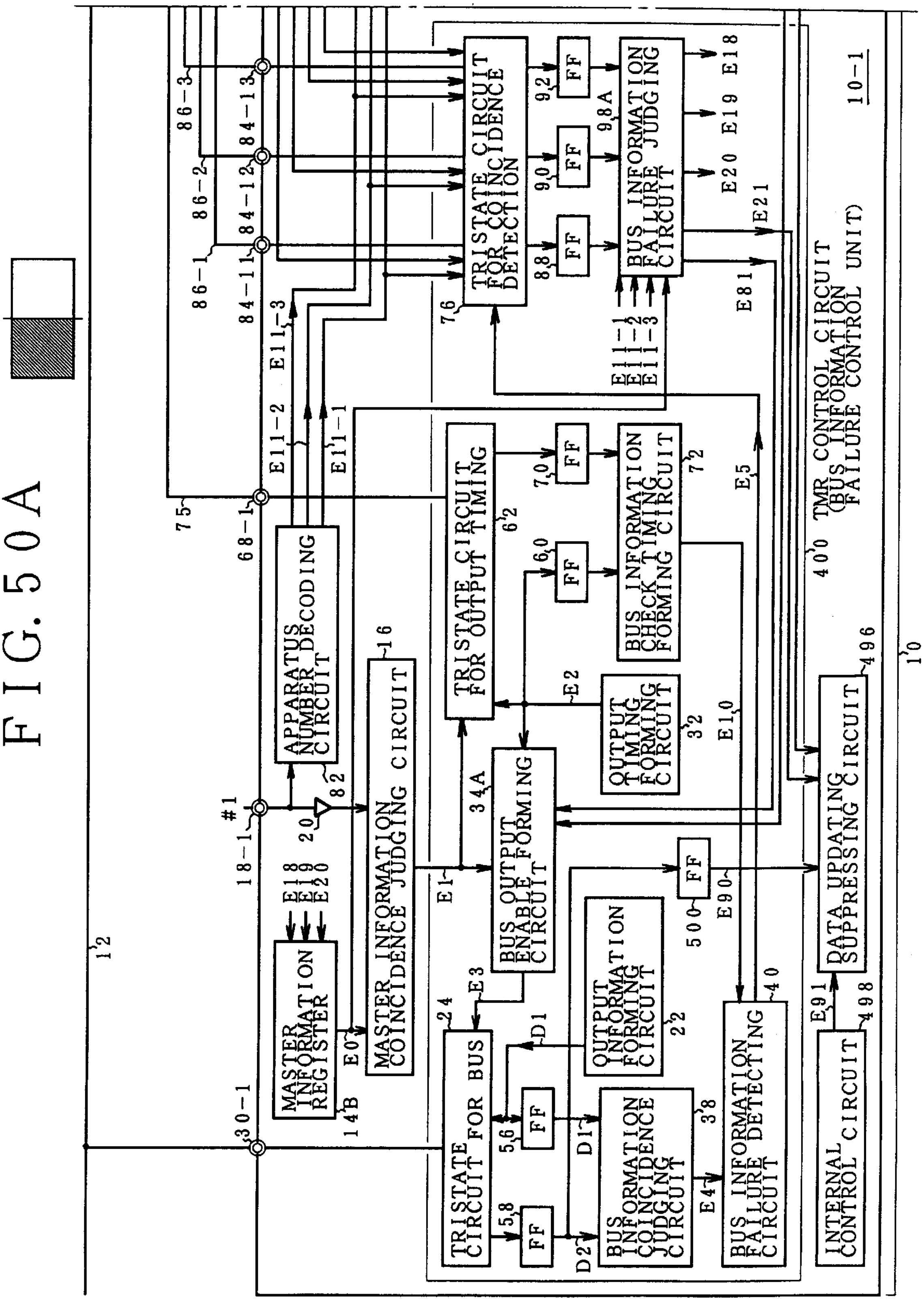
FIGS. 50A and 50B are block diagrams of a TMR unit having a function for instructing a retransfer when a failure is detected.
Figure 50B:
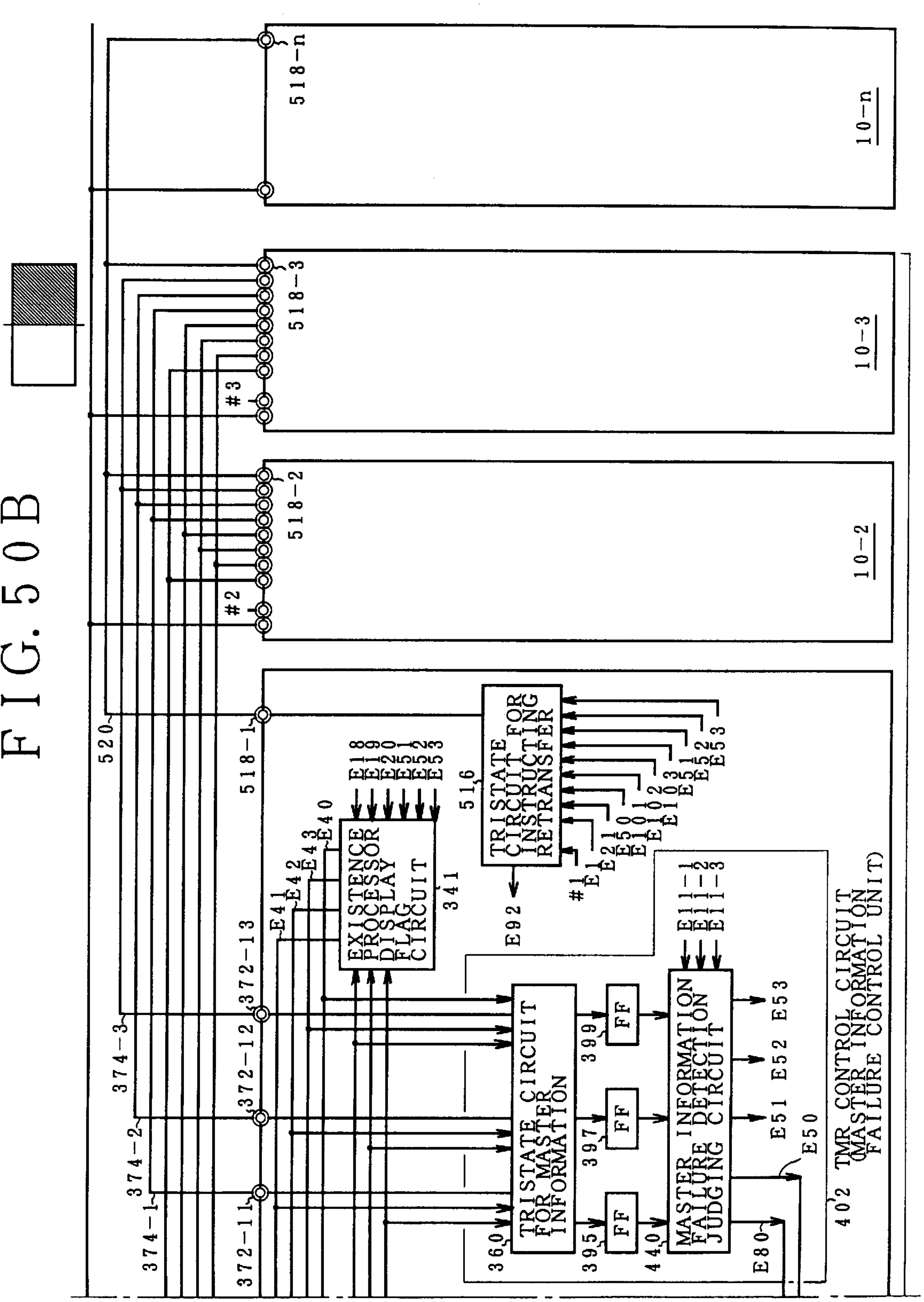

FIGS. 50A and 50B show an embodiment for instructing the retransfer by notifying all of the processors 10-1 to 10-n connected to the bus 12 of the occurrence of the failure. When a failure occurs during the operation of the TMR unit, since the data on the bus at that time cannot be trusted, after the failed processor was disconnected, it is necessary to again output the data onto the bus. Since the processors other than the TMR unit connected to the same bus cannot detect the occurrence of the failure by the processor itself, it is necessary to notify such processors of the occurrence of the failure from the processors constructing the TMR unit. In the case where the occurrence of the failure is notified, the processors other than the processors constructing the TMR unit need to again output the data to the bus after the TMR unit was again constructed if the processor itself is accessing to the bus. To instruct the retransfer at the time of the failure occurrence, as representatively shown in the processor 10-1, a tristate circuit 516 for instructing the retransfer is provided. The self master signal E1 from the master information coincidence judging circuit 16, bus information failure detection signal E21 from the bus information failure judging circuit 98A, master information failure detection signal E50 from the master information failure detection judging circuit 440, master information processor number signals E101, E102, and E103 obtained from the tristate circuit 360 for master information and held in FFs 395, 397, and 399, and further, judgment signals E51, E52, and E53 of the processors in which the master information failure occurs which are outputted from the master information failure detection judging circuit 440 are inputted to the tristate circuit 516 for instructing the retransfer, respectively. A signal from the tristate circuit 516 for instructing the retransfer is connected to the processors 10-2 and 10-3 constructing the TMR unit 10 and, further, to the processor 10-n other than the TMR unit 10 by an exclusive-use signal line 520 by a terminal 518-1.

Figure 51:
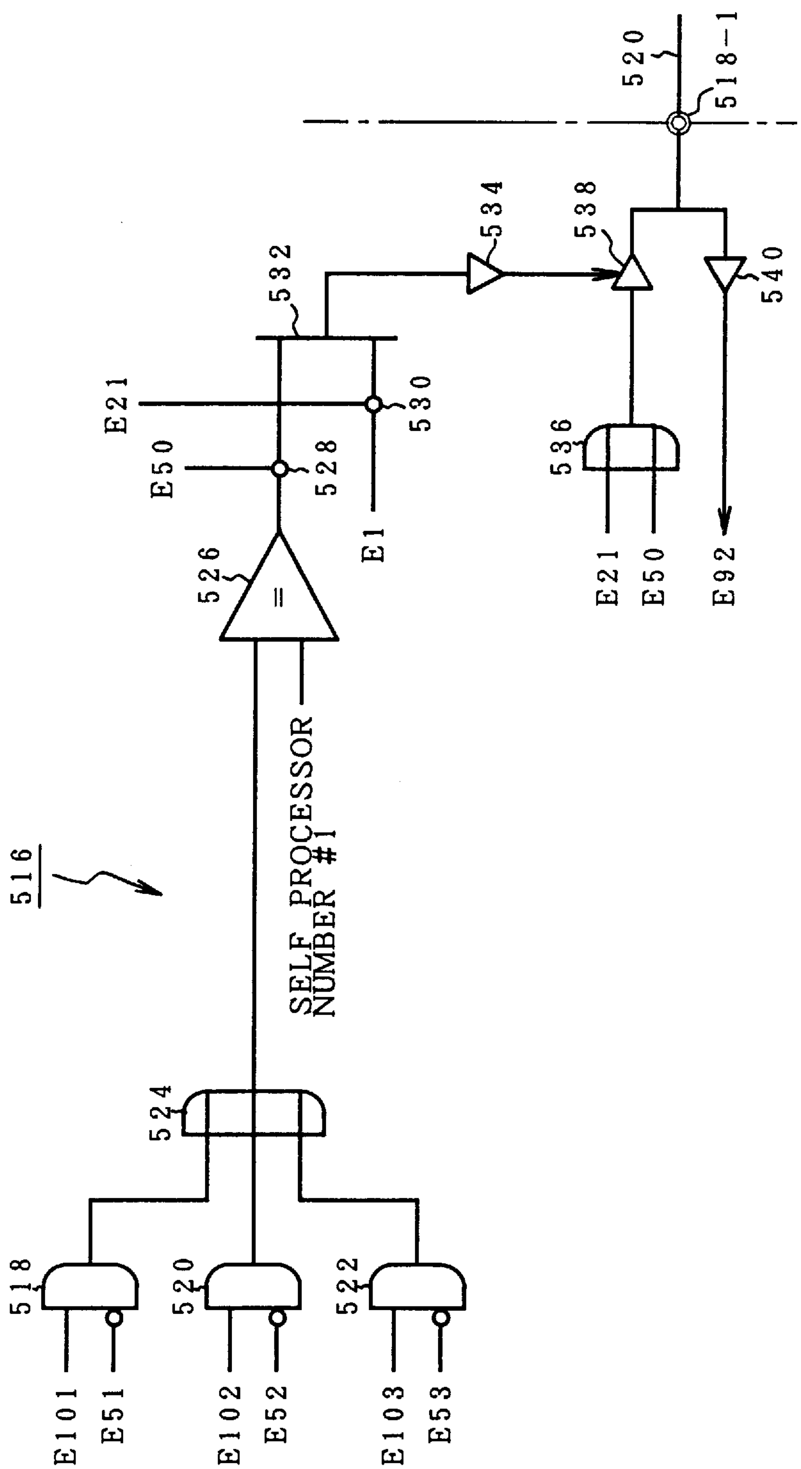
FIG. 51 is a block diagram of a tristate circuit for instructing a retransfer in FIGS. 50A and 50B.

FIG. 51 is a circuit diagram of the tristate circuit 516 for instructing the retransfer in FIGS. 50A and 50B. An output driver 538 and an input driver 540 are provided as a tristate circuit unit for the exclusive-use signal line 520. The OR of the bus information failure detection signal E21 and master information failure detection signal E50 is supplied from an OR gate 536 to the output driver 538. An enable signal by a driver 534 is supplied to an enable terminal of the output driver 538. When a failure is detected, the enable signal is turned on. In this instance, the bus information failure detection signal E21 or master information failure detection signal E50 inputted to the OR gate 536 is outputted as a retransfer instruction signal to the other processor by the exclusive-use signal line 520. At the same time, a retry signal E92 for the processor itself is formed by an input driver 540. When the failure of the bus information is detected, since the master information itself can be trusted, the retransfer instruction signal is sent to the other processor under a condition such that the self master signal E1 indicative of the master processor at a time point when the failure occurs is ON. Namely, the AND of the bus information failure detection signal E21 and self master signal E1 is got by an AND gate 530. An enable terminal of the output driver 538 is turned on by the driver 534 through an OR gate 532. The bus information failure detection information E21 obtained at that time is transmitted to the other processor as a retransfer instruction signal by the exclusive-use signal line 520. On the other hand, in case of the failure of the master information, since the master information itself of the processor itself cannot be always trusted, whether the master processor number recognized by the processor which was judged such that the failure of the master information doesn't occur coincides with the processor number of the processor itself or not is discriminated. When they coincide, the relevant processor transmits the retransfer instruction signal to the other processor in place of the master processor. Namely, the judgment signals E51, E52, and E53 indicative of the processors when the failure of the master information is detected are inverted and inputted to AND gates 518, 521, and 522. The master processor number signals E101, E102, and E103 are inputted to the other inputs of the AND gates 518, 521, and 522. It is now assumed that the tristate circuit 516 for instructing the retransfer in FIG. 51 is provided for the processor 10-1 in FIGS. 50A and 50B and a failure of the master information occurred in the processor 10-2. In this case, the judgment signal E52 indicative of the processor in which the failure of the master information occurs for the AND gate 521 is turned on. Since the inversion signal is inputted, the AND gate 521 is set into an inhibition state, thereby suppressing the input of the master processor number signal E102 as master information which was judged to be a failure. Therefore, correct master processor number signals E101 and E103 from the AND gates 518 and 522 in the permission state, for example, both of the signals E101 and E103 are the correct master processor number #01 and are set into a comparator 526 through an OR gate 524. The processor number #1 of the processor 10-1 itself has been set in the other input of the comparator 526. Therefore, since an output of the comparator 526 is turned on by the detection of the coincidence and the master information failure detection signal E50 is ON at this time, the enable signal is turned on by the driver 534 through an AND gate 528 and, further, the OR gate 532. Therefore, the master information failure detection signal E50 to the OR gate 536 is transmitted as a retransfer instruction signal to the other processor by the exclusive-use signal line 520. The other processor which received the notification of the retransfer instruction signal executes necessary failure processes such as retransfer of the data, suppression of the updating of various resources, and the like.

[Detection of bus failure]

Figure 52A:
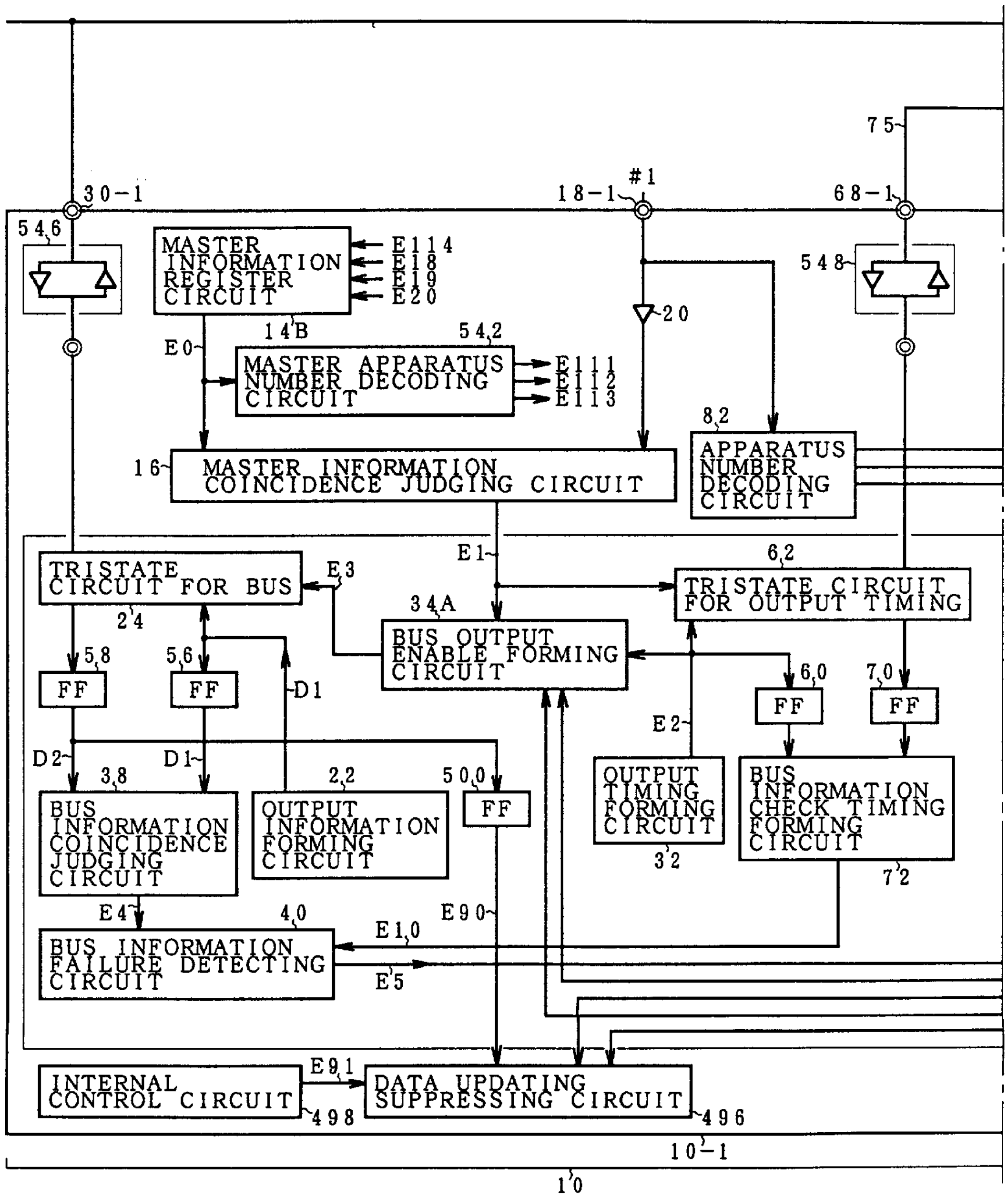
FIGS. 52A, 52B, and 52C are block diagrams of a TMR unit having a bus failure possibility flag.
Figure 52B:
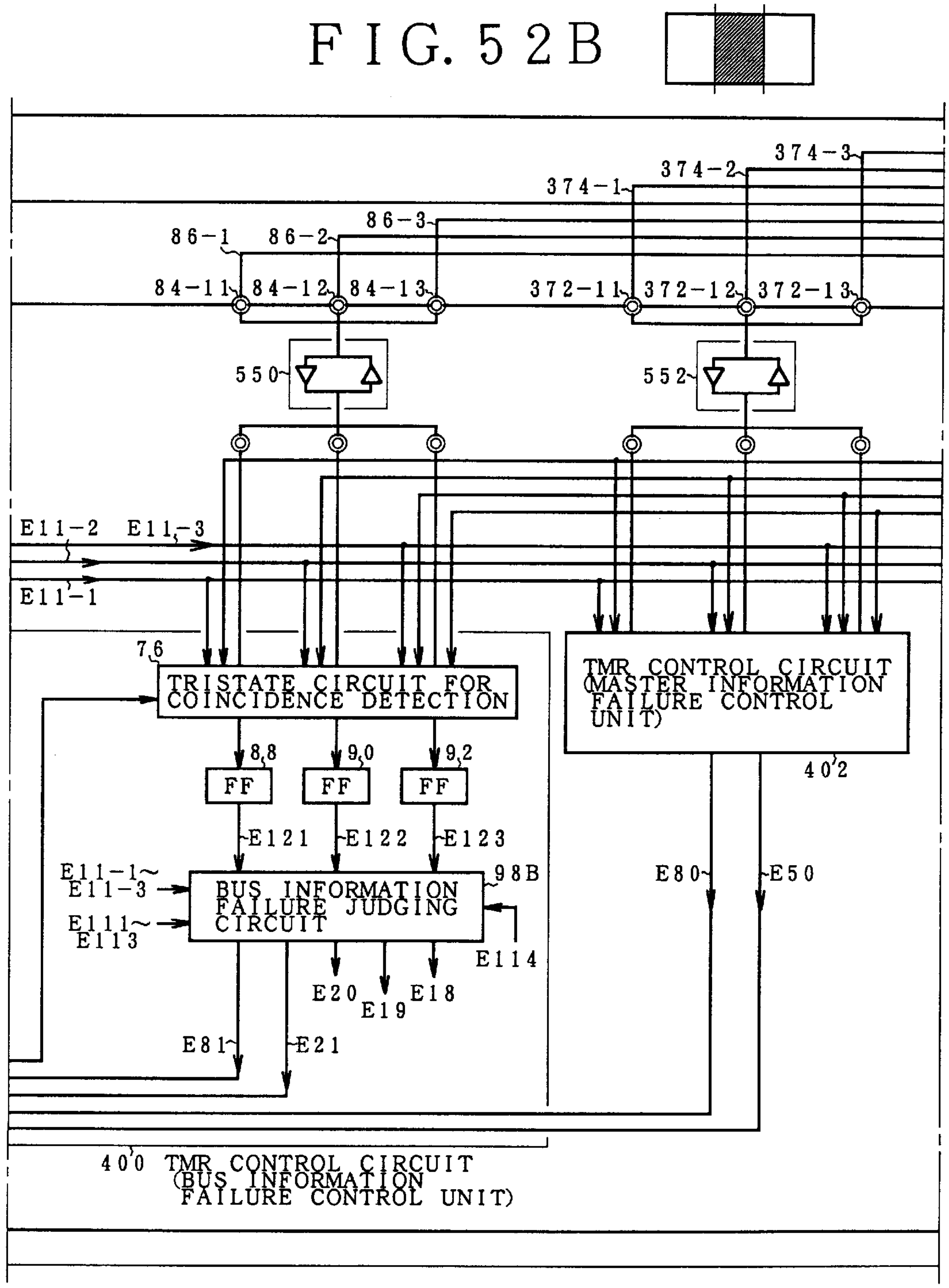
Figure 52C:
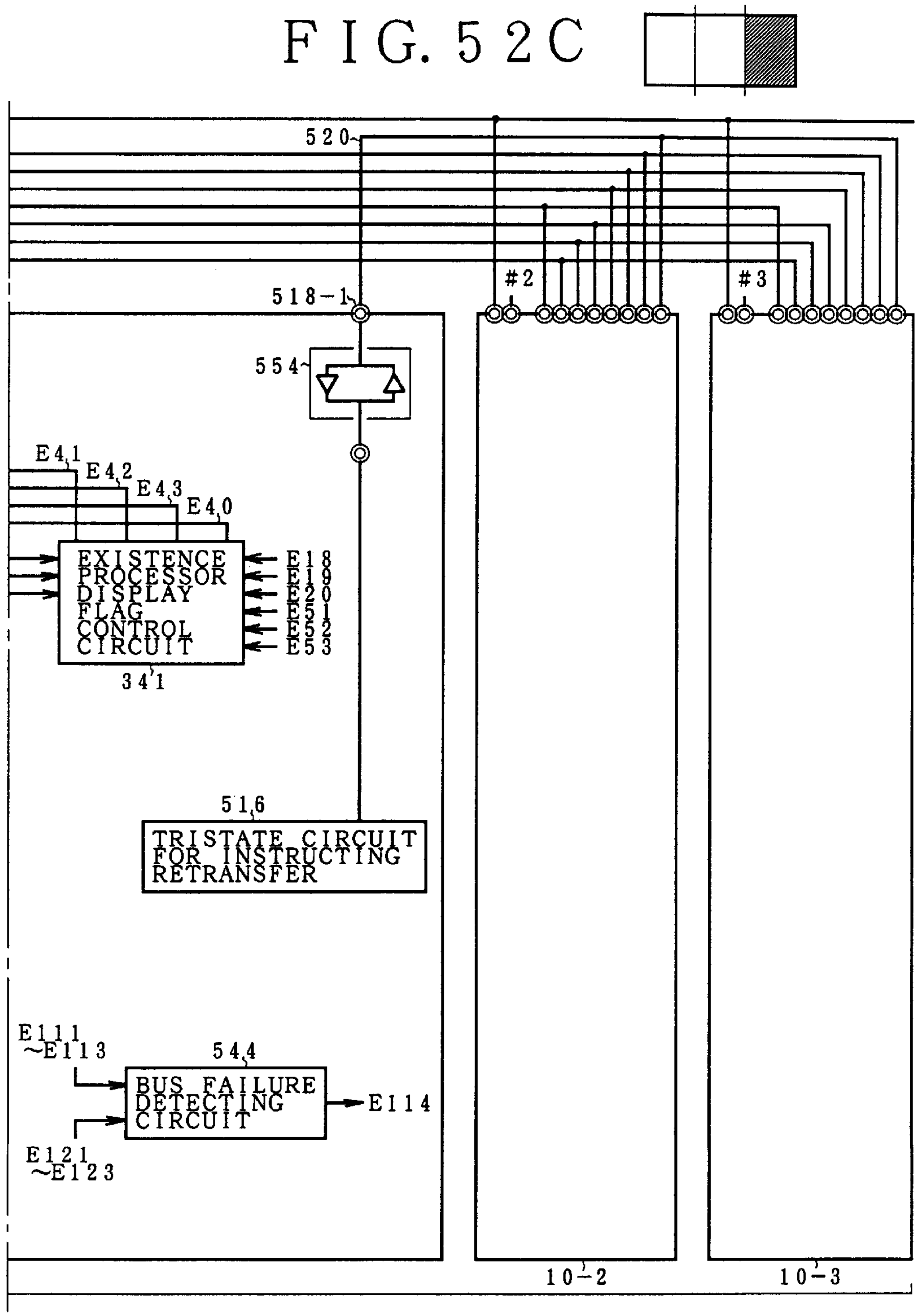

In the embodiment of the TMR unit of the invention described so far, although the number of stages of the tristate circuit between the inside of each processor and the bus has been set to one stage, in the actual system, as shown in the processor 10-1 in FIGS. 52A to 52C, in many cases, transceiver devices 546, 548, 550, 552, and 554 are further provided on a printed circuit board between a tristate input/output terminal by a logic circuit in the processor 10-1 and the bus 12. The bus transceiver device 546 is used for the bus signal. The bus transceiver device 548 is used for the output timing signal. The bus transceiver device 550 is used for the bus information failure detection signal (dissidence detection signal). The bus transceiver device 552 is used for the master information signal. Further, the bus transceiver device 554 is used for the retransfer instruction signal. Each of the bus driver devices 546 to 554 integratedly has an output driver and an input driver. In case of a construction in which the transceiver devices are further provided between the inside of the processor and the bus as mentioned above, when a failure occurs in the transceiver device of the master processor or in the bus 12 itself, wrong data is outputted to the bus 12. In the master processor, however, since the output data of the processor itself has been returned and fetched in the logic circuit or printed circuit board, the processor itself fetches the correct data. Thus, the bus information failure detection signal (dissidence detection signal) E5 which is outputted from the bus information failure detecting circuit 40 is turned off in the master processor and is turned on in all of the other slave processors. In a bus information failure judging circuit 98B, the failure of the master processor is judged by a majority decision. Therefore, in case of a construction such that the transceiver devices are further provided subsequent to the tristate input/output terminal, when a failure of the bus itself occurs, such a failure cannot be distinguished from the failure of the master processor.

FIG. 53 shows the judgment contents based on the bus information failure detection signals from the processors 10-1 to 10-3 in the bus information failure judging circuit 98B in the embodiment of FIGS. 52A to 52C, specifically speaking, dissidence detection signals E121, E122, and E123 held in the FFs 88, 90, and 92. The case where the failure of the bus information is not detected is shown by o and the case where the failure of the bus information is detected is shown by x. First, in the case where one of the processors 10-1 to 10-3 constructing the TMR unit 10 is in any one of modes 2, 3, and 5 in which the failure of the bus information was detected, the failure of the relevant processor can be decided. In case of mode 8 in which all of the processors 10-1 to 10-3 detect the failure, the failure of the master processor can be also determined. It will be obviously understood that all of the processors are normal in mode 1 in which no failure is detected in all of the processors 10-1 to 10-3. Since a double failure such that in addition to the master processor in modes 6 and 7, one of the slave processors fails is impossible, such a case is excluded from the target of the judgment. However, in the case where only the master processor doesn't detect the failure and the remaining two slave processors detect the failure of the bus information as in mode 4, it is impossible to decide that the failed portion is the master processor or the bus. Such a detection pattern in mode 4 is called a bus failure possibility pattern. Therefore, the embodiment of FIGS. 52A to 52C has a judging function such that whether the failure is the failure of the master processor or the failure of the bus can be determined as in case of mode 4 in FIG. 53. As shown in the processor 10-1 in FIGS. 52A to 52C, such a judging function can be realized by newly providing a bus failure detecting circuit 544, forming a bus failure signal E114, and supplying the bus failure detection signal E114 to the bus information failure judging circuit 98B and master information register circuit 14B, respectively.

Figure 54:
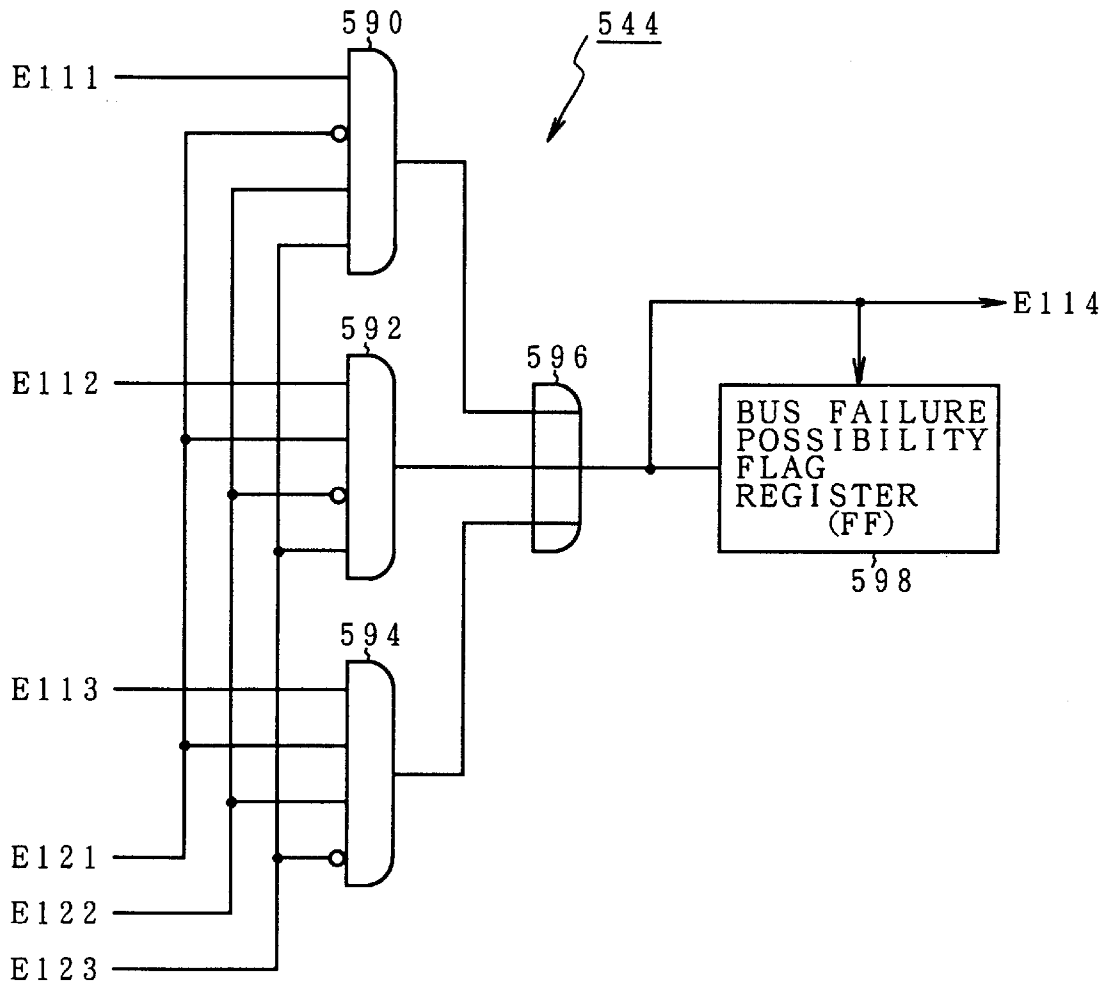
FIG. 54 is a block diagram of a bus failure detecting circuit in FIGS. 52A to 52C.

FIG. 54 is a block diagram of the bus failure detecting circuit 544 in FIGS. 52A to 52C. The bus information failure detecting circuit 544 is constructed by AND gates 590, 592, and 594 of four inputs, an OR gate 596, and a flag register 598 for setting and resetting the bus failure possibility flag. Master information decoding signals E111, E112, and E113 which were decoded by a master processor number decoding circuit 542 in FIGS. 52A to 52C are inputted to the NAND gates 590, 592, and 594, respectively. Now, assuming that the processor 10-1 is considered as an example and the master processor is allocated to the processor 10-1, only the master information decoding signal E111 is ON. The bus information failure detection signals (dissidence detection signals) E121, E122, and E123 notified from the processor 10-1 itself and the other processors 10-2 and 10-3 and held in the FFs 88, 90, and 92 provided subsequent to the tristate circuit 76 for detecting the coincidence in FIGS. 52A to 52C are inputted in parallel to the remaining three inputs of the AND gates 590, 592, and 594. Among them, each of the bus information failure detection signals E121, E122, and E123 of the corresponding processors for the AND gates 590, 592, and 594 is inverted and inputted. As for the AND gates 590, 592, and 594, only in the case where the bus information failure detection signal E121 from the master processor shown in mode 4 in FIG. 53 is OFF and the bus information failure detection signals E122 and E123 notified from the remaining two slave processors are ON, an output of the AND gate 590 is turned on. By the turn-on of the output of the AND gate 590 in mode 4, the bus failure detection signal E114 is turned on through the OR gate 596. At the same time, the bus failure possibility flag of the flag register 598 is set to 1.

Figure 55:
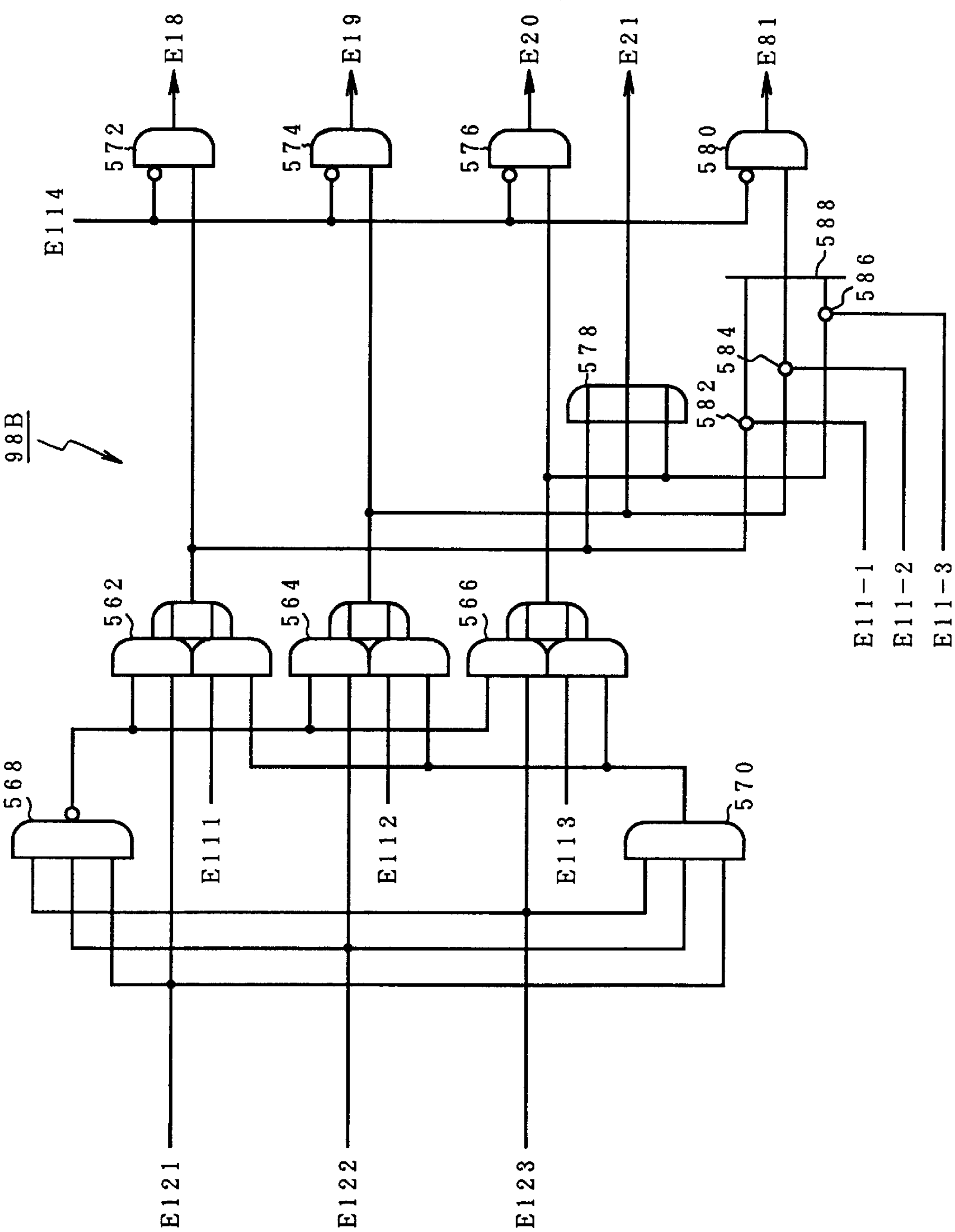
FIG. 55 is a block diagram of a bus information detection judging circuit in FIGS. 52A to 52C.

FIG. 55 is a block diagram of the bus information failure judging circuit 98B in FIGS. 52A to 52C. The bus information failure detection signals (dissidence detection signals) E121, E122, and E123 which were notified from the master processor and the remaining slave processors and were held in the FFs 88, 90, and 92 in FIGS. 52A to 52C are inputted to an NAND gate 568 provided on the upper side and an AND gate 570 provided on the lower side. The AND gate 570 on the lower side turns on an output when all of the three bus information failure detection signals E121, E122, and E123 indicate the failure detection and are turned on. That is, the output is turned on in mode 8 in FIG. 53. On the other hand, the NAND gate 568 on the upper side turns on an output when at least one of the three bus information failure detection signals E121, E122, and E123 does not indicate the failure detection and is OFF. Namely, the output is turned on in the modes other than mode 8 in FIG. 53. The bus information failure detection signals E121, E122, E123, NAND gate 568, and AND gate 570 are inputted to composite gate circuits 562, 564, and 566 each of which is constructed by two AND gates and one OR gate to which outputs of the two AND gates are collected. Further, the master information decoding signals E111, E112, and E113 outputted from the master processor number decoding circuit 542 in FIGS. 52A to 52C are respectively inputted to the composite gate circuits 562, 564, and 566. For example, when considering the composite gate circuit 562 corresponding to the processor 10-1, in case of mode 8 in which the bus information failure is notified from all of the processors in which the output of the AND gate 570 is turned on, since only the master decoding signal E111 of the processor 10-1 is ON, an output of the composite gate circuit 562 is turned on. On the other hand, when the failure detection of the bus information does not be notified from at least one of the three processors in which the output of the NAND gate 568 is turned on, only when the bus information failure detection signal E121 indicative of the failure detection of the processor 10-1 itself as a master processor is ON due to the failure detection, the output of the composite gate circuit 562 is turned on. Outputs of the composite gate circuits 562, 564, and 566 are inputted to AND gates 572, 574, and 576, respectively. The bus failure detection signal E114 outputted from the bus failure detecting circuit 544 in FIG. 54 is inputted to another inverting input of each of the AND gates 572, 574, and 576. The bus failure detection signal E114 is turned on only in case of mode 4 in FIG. 53 and is inverted and inputted to the AND gates 572, 574, and 576, so that those AND gates are set into an inhibition state. The generation of the bus information failure judgment signals E18, E19, and E20 indicative of the processors in which the failure detection of the dissidence of the bus information occurred is inhibited. In the modes other than mode 4, since the bus failure detection signal E114 is OFF, any one of the bus information failure judgment signals E18, E19, and E20 indicative of the processor in which the bus information failure at that time is detected is turned on and outputted from any one of the AND gates 572, 574, and 576. An OR gate 578 gets the OR of the outputs of the composite gate circuits 562, 564, and 566 and generates the bus information failure detection signal E21 indicative of the occurrence of the bus information failure in the TMR unit 10. Further, AND gates 582, 584, and 586, an OR gate 588, and an AND gate 580 for generating the self processor failure judgment signal E81 indicating that the bus information failure is detected in the self processor are provided. With respect to the AND gate 580 as well, the generation of the judgment signal E81 indicative of the bus information failure detection in the self processor is inhibited in the detection state in mode 4 by the inversion input of the bus failure detection signal E114 which is turned on in mode 4. By such a construction of the bus failure detecting circuit 544 in FIG. 54 and bus information failure judging circuit 98B in FIG. 55, in the case where only the master processor in mode 4 in FIG. 53 is normal and the notification of the failure detection for the bus output of the master processor is executed from the other two slave processors, a situation such that the judgment signal E18 of the bus information failure of the master processor is turned on due to the detection of the bus failure possibility pattern is prevented. As shown in FIG. 54, a process to turn on the bus failure possibility flag 598 provided for the bus information failure judging circuit 98B is executed. Thus, in the case where a failure on the bus side occurs in mode 4, a situation such that the failure judgment of the bus information dissidence in the master processor is erroneously performed can be prevented.

Figure 56:
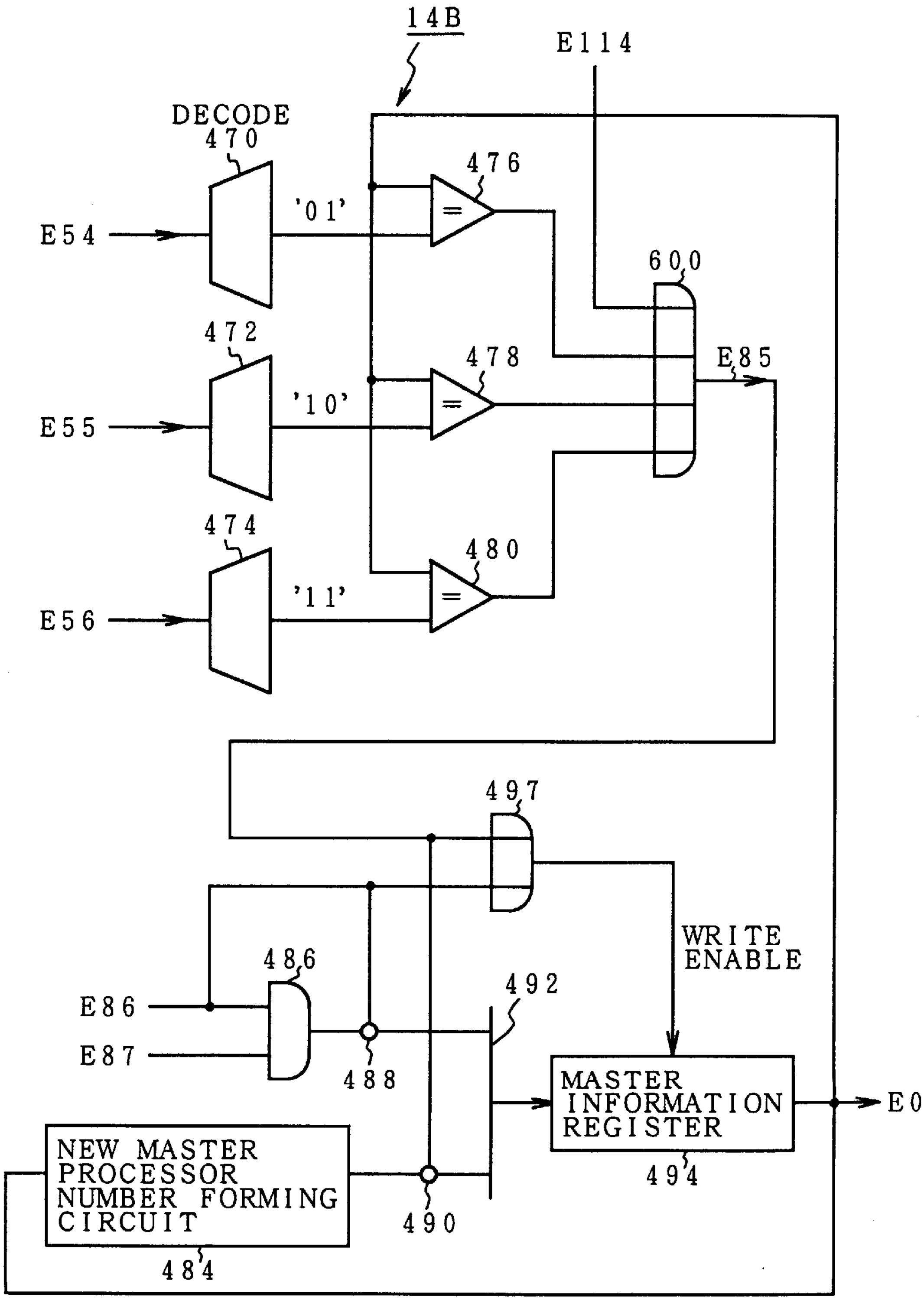
FIG. 56 is a block diagram of a master information register circuit in FIGS. 52A to 52C.

FIG. 56 shows the master information register 14B to switch the master processor when the bus failure possibility pattern is detected by the bus failure detecting circuit 544 in FIG. 54. In the master information register 14B, when the bus failure detection signal E114 which is derived from the bus failure detecting circuit 544 in FIG. 54 is turned on in mode 4 in FIG. 53, a bus failure detection signal E85 is forcedly turned on through an OR gate 600 and a write enable terminal of the master information register 494 is turned on by the OR gate 497, thereby updating the master information for switching to the next master processor according to the order of the new master processor number forming circuit 484. With respect to the existence processor display flag control circuit 341 in FIGS. 52A to 52C, the judgment signals E18, E19, and E20 indicative of the generation position of the bus information failure that is inputted from the bus information failure judging circuit 98B in FIG. 55 are masked by the failure detection signal E114 from the bus failure detecting circuit 544 in FIG. 54 in the AND gates 572, 574, and 576, respectively. Therefore, the existence processor display flag of the master processor is not turned off but only the master processor is switched by the updating of the master information register 14B. The processes as a TMR unit 10 can be continued. Further, since the bus information failure detection signal E21 which is outputted from the bus information failure judging circuit 98B is turned on, the tristate circuit 516 notifies all of the processors which transferred to the bus 12 through the exclusive-use signal line 520 of the retransfer instruction signal, thereby allowing the retransferring process to be executed. As mentioned above, after the TMR unit 10 detected the bus failure possibility pattern of the first time, the operating state is not changed from the previous state except that the master processor has been updated and the bus failure possibility flag is ON. When the ordinary bus information failure occurs in such a state, the processor which caused the bus information failure is disconnected from the TMR unit 10.

Figure 57A:
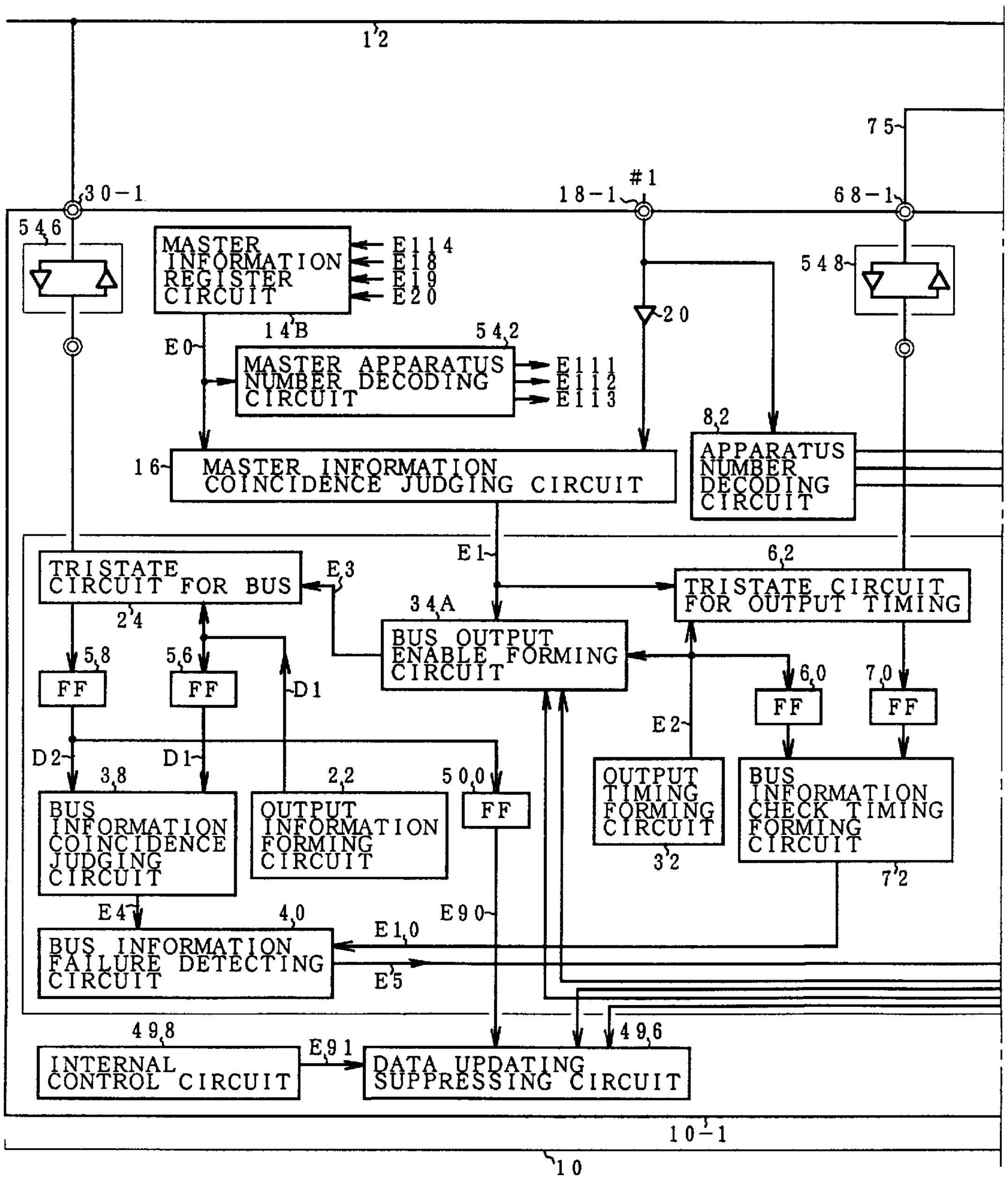
FIGS. 57A, 57B, and 57C are block diagrams of a TMR unit having a resetting function of a bus failure detection flag.
Figure 57B:
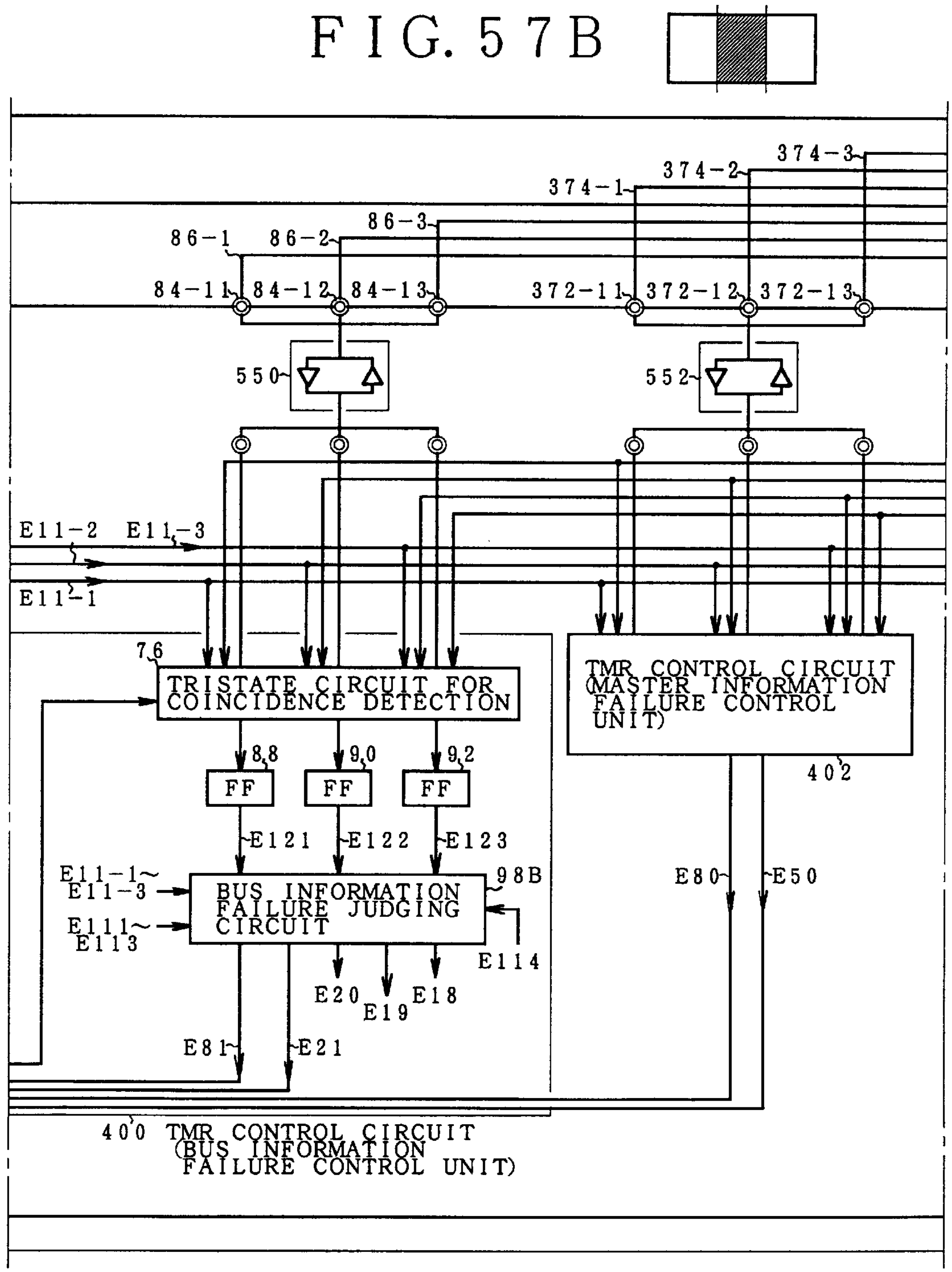
Figure 57C:
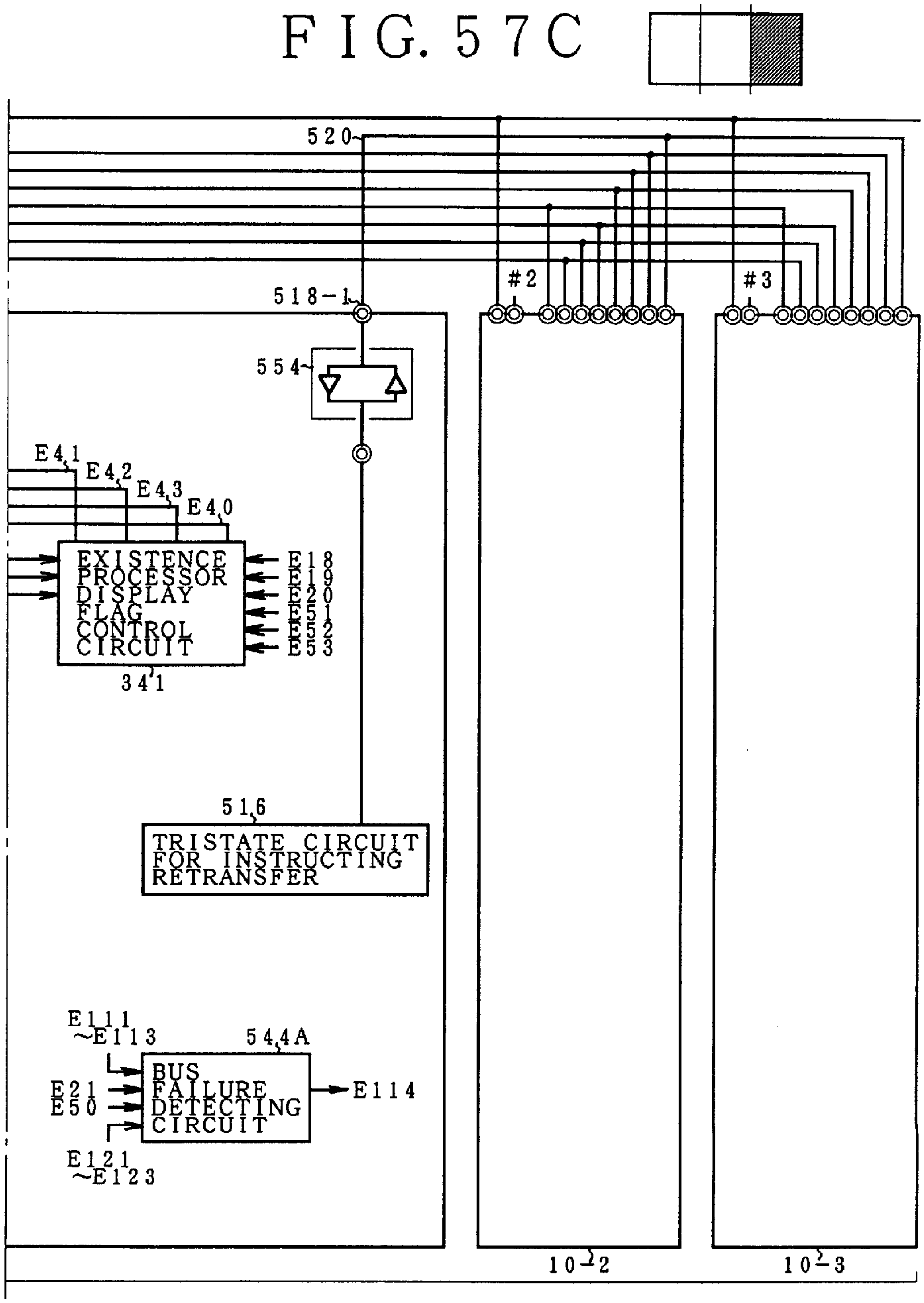
Figure 58:
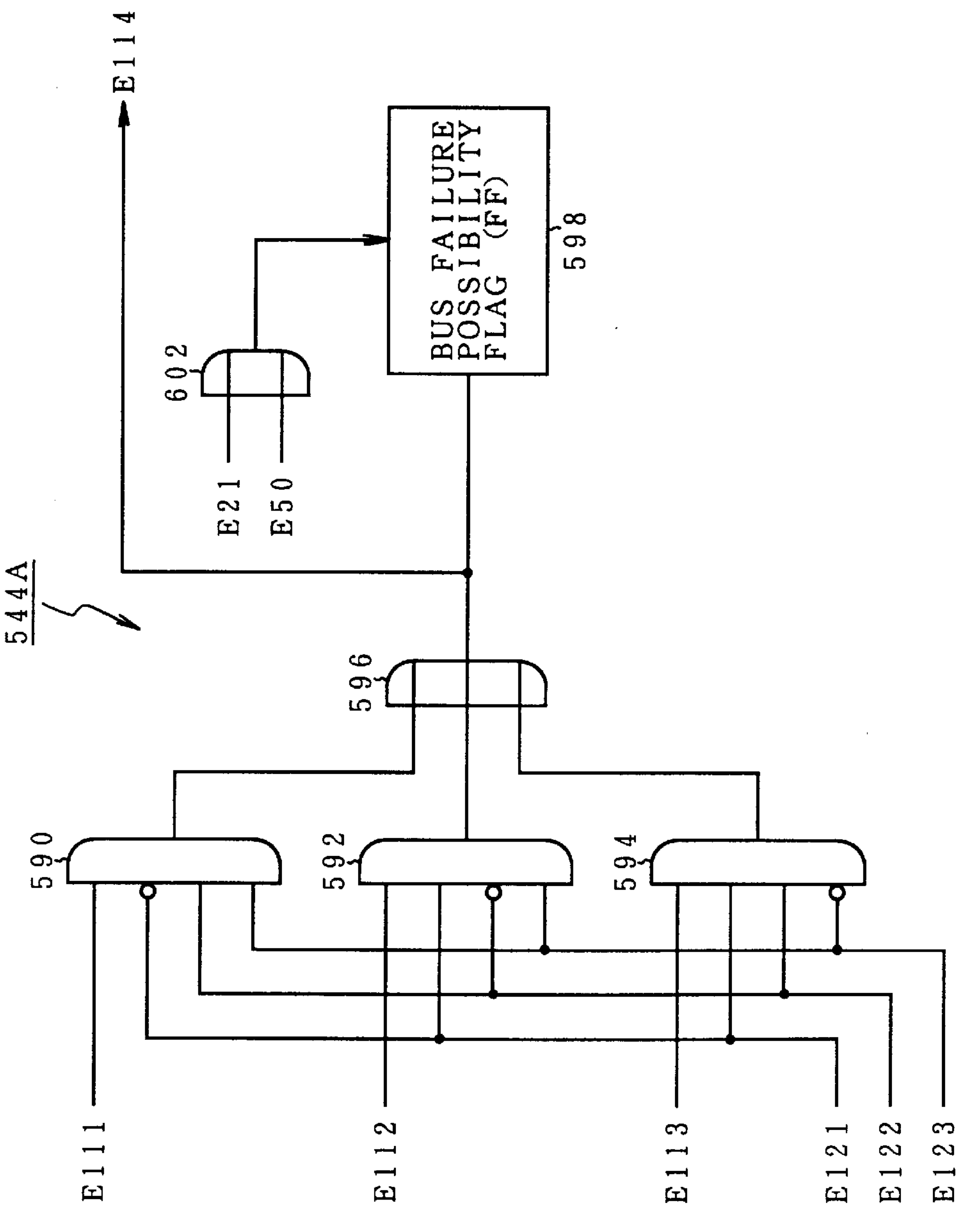
FIG. 58 is a block diagram of a bus failure detecting circuit in FIGS. 57A to 57C.

FIGS. 57A to 57C show an embodiment having a function such that after the bus failure possibility pattern of the first time was detected, the processor is not disconnected but only the master processor is updated and the processes are continued and, after that, when a failure of the old master processor is detected, the bus failure possibility flag set by the detection of the bus failure possibility pattern of the first time is reset. In the embodiment, a bus failure detecting circuit 544A representatively shown in the processor 10-1 is provided. The bus failure detecting circuit 544A has a circuit construction of FIG. 58. Although the bus failure detecting circuit 544A is fundamentally the same as that in the embodiment of FIG. 54, an output of the OR of the bus information failure detection signal E21 and the master information failure detection signal E50 is supplied from an OR gate 602 to a write enable terminal of the flag register 598 for setting/resetting the bus failure possibility flag. The other construction is substantially the same as that of FIG. 54. That is, when the bus failure possibility pattern in mode 4 in FIG. 53 is detected, the bus failure detecting circuit 544A in FIG. 58 turns on the bus failure possibility flag in the flag register 598. In this instance, the master processor is not disconnected. The master processor is updated by the master information register 14B shown in FIG. 56 and the processes are continued. When the first failure is caused by the failure of the master processor, after completion of the switching to the new master processor, the failure of the old master processor (at this time point, it becomes the slave processor) ought to be detected again. In this instance, since the detection signal E21 indicative of the bus information failure of the slave processor or the detection signal E50 indicative of the master information failure is derived, by turning on the write enable terminal of the flag register 598 through the OR gate 602, the bus failure possibility flag is turned off. At the same time, the old master processor is disconnected from the TMR unit 10. After the old master processor was disconnected by the turn-off of the bus failure possibility flag, when a failure occurs in the master processor due to another cause, a fear such that it is immediately judged as a bus information failure and the TMR unit 10 cannot be constructed can be avoided.

Figure 59A:
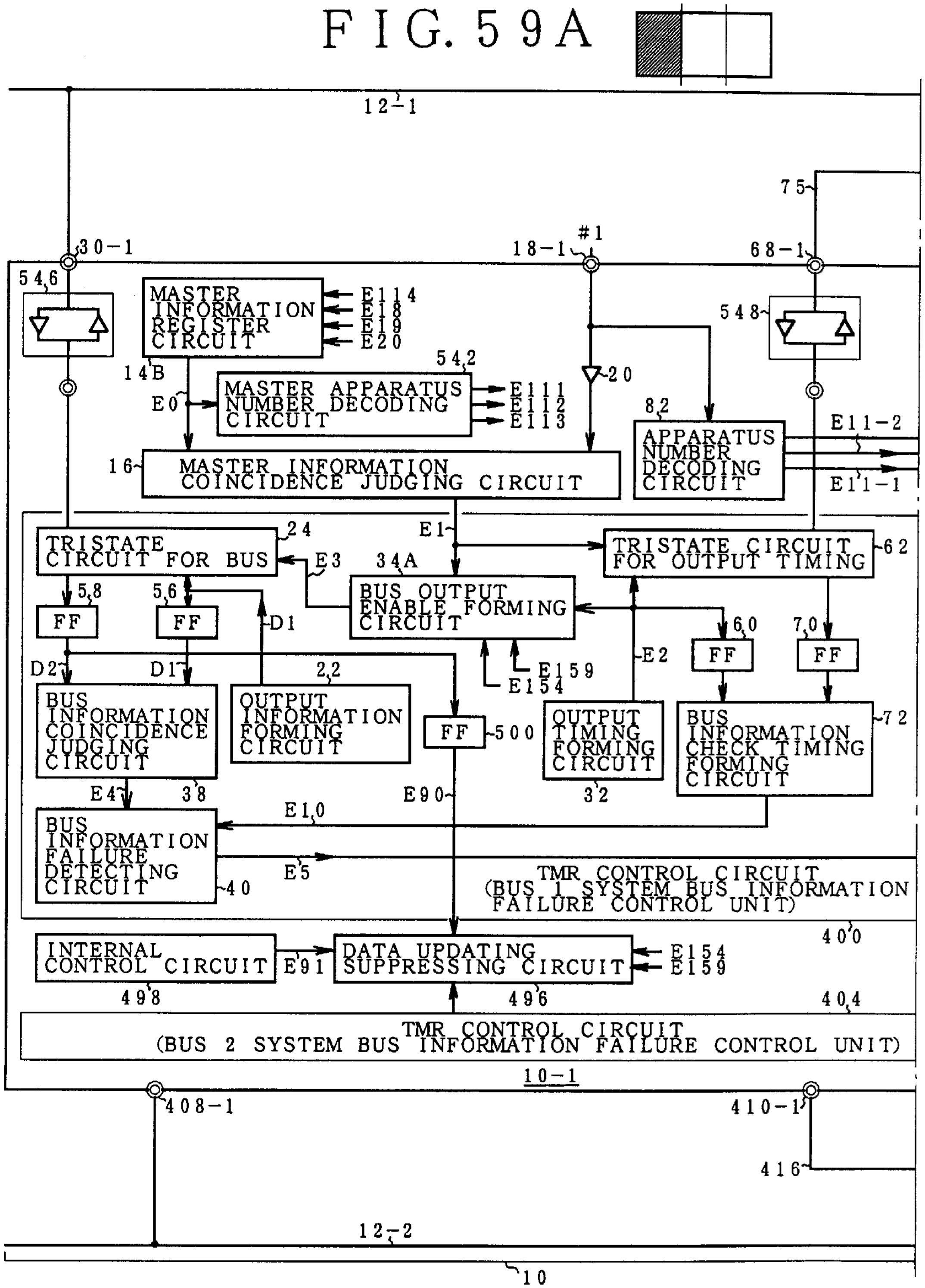
FIGS. 59A, 59B, and 59C are block diagrams of a TMR unit with a multiple bus construction having a bus failure possibility flag.
Figure 59B:
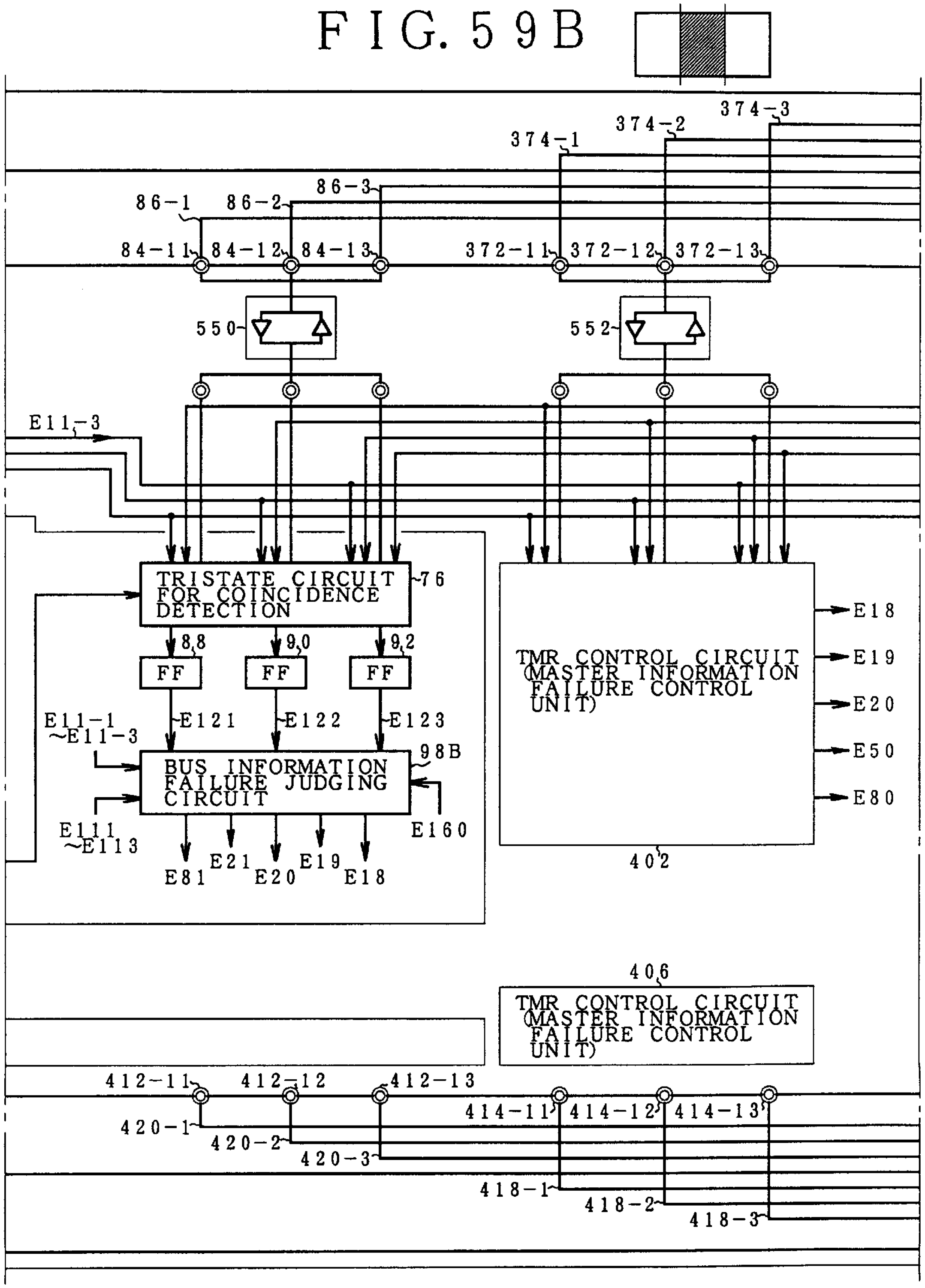
Figure 59C:
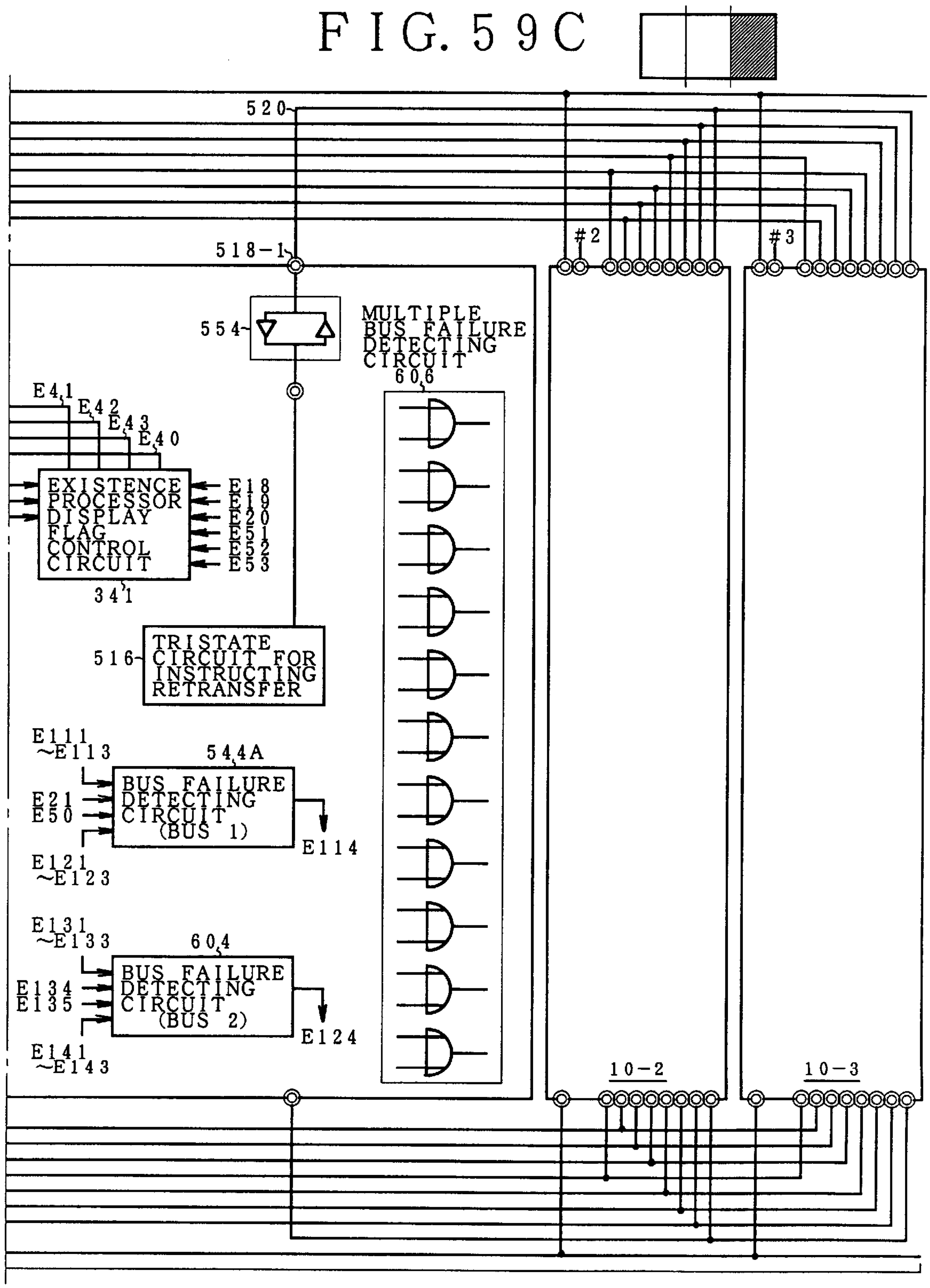
Figure 60:
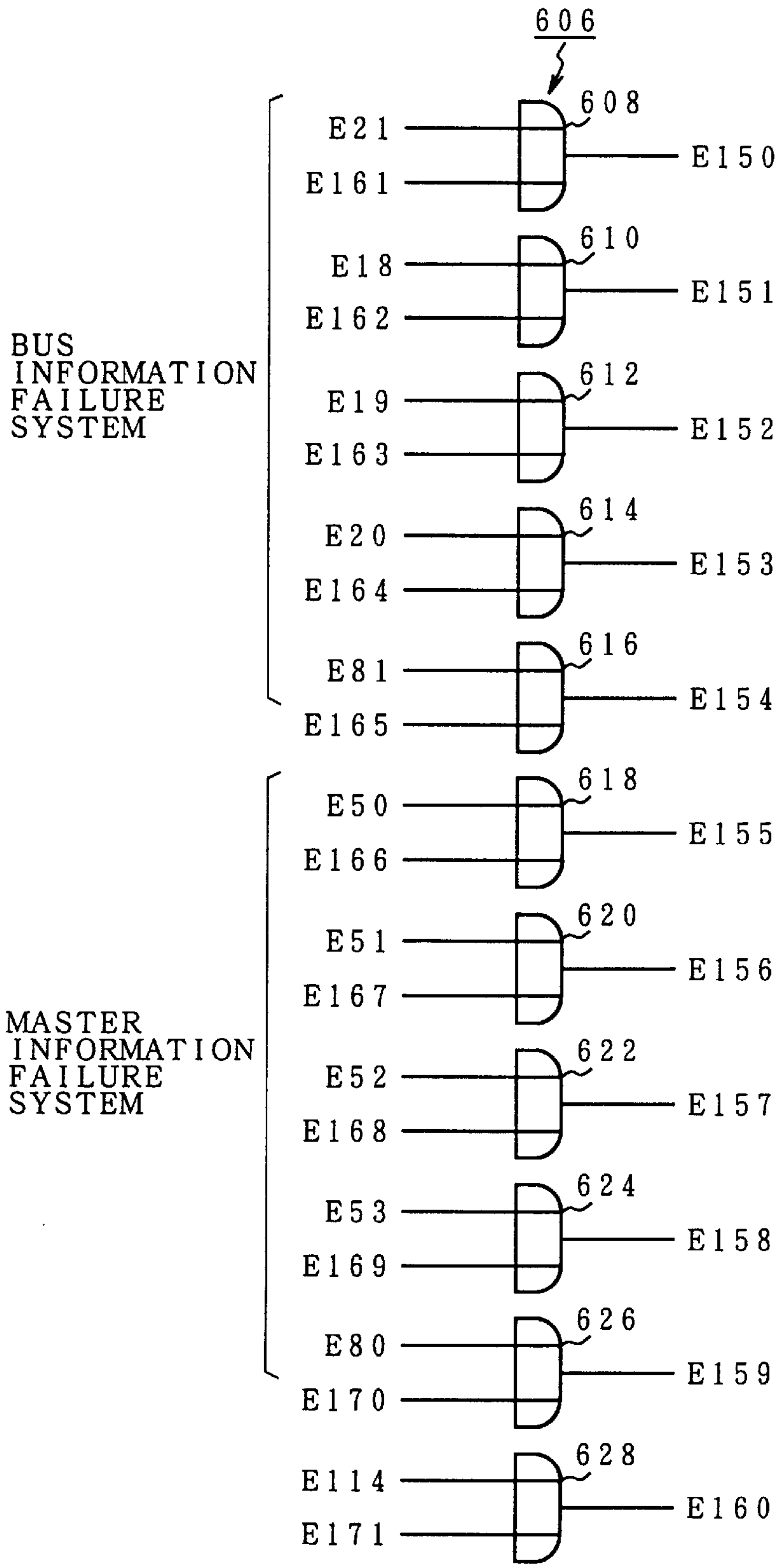
FIG. 60 is a block diagram of a multiple bus failure judging circuit in FIGS. 59A to 59C.

FIGS. 59A to 59C show an embodiment of a high reliability information processor of the invention with the multi-bus construction and are characterized in that the construction of the processors 10-1 to 10-3 in case of the single-bus construction shown in FIGS. 57A to 57C is applied to a double-bus construction of the buses 12-1 and 12-2. That is, as shown in the processor 10-1, two systems of the internal circuit shown in FIGS. 57A to 57C and the circuit having the bus transceiver devices are provided for the buses 12-1 and 12-2. For the circuit units of the two systems, the bus failure detecting circuit 544A is provided with regard to the bus 12-1 side and a bus failure detecting circuit 604 is provided with regard to the bus 12-2 side. The bus failure detecting circuit 544A is the same as that in FIG. 58. The bus failure detecting circuit 604 on the bus 12-2 side also has the same circuit construction as that in FIG. 58. Bus information failure detection signals E131 to E134 which are inputted to the bus failure detecting circuit 544A are derived from the bus information failure judging circuit of the TMR control circuit 404 provided on the bus 12-2 side. Master information failure judgment signals E135 and E141 to E143 are derived from the master information failure detection judging circuit of the TMR control circuit 406 provided on the bus 12-2 side. Further, a multiple bus failure judging circuit 606 is provided. As shown in FIG. 60, the multiple bus failure judging circuit 606 is constructed by OR gates 608 to 628. The five OR gates 608 to 616 relate to a circuit unit for detecting the bus information failure on the side of the buses 12-1 and 12-2. For example, when considering the OR gate 608 as an example, the OR of the bus information failure detection signal E21 on the bus 12-1 side and a bus information failure detection signal E161 on the bus 12-2 side is got and a bus failure detection signal E150 as a whole system is generated. The OR gates 610, 612, and 614 generate judgment signals E151, E152, and E153 indicative of the processors in which the bus information failure is detected. Therefore, for the judgment signals E18, E19, and E20 indicative of the processors in which the bus information failure is detected on the bus 12-1 side, same judgment signals E162, E163, and E164 on the bus 12-2 side as those on the bus 12-1 side are inputted to the OR gates 610, 612, and 614 as combinations of two inputs, respectively. The OR gate 616 receives self processor failure detection signals E81 and E165 of the bus information with respect to the two buses 12-1 and 12-2 and generates a self processor failure detection signal E154 of the bus information as a whole system. The five OR gates 618 to 625 execute the judgment about the detection of the master information failure of the buses 12-1 and 12-2. The OR gate 618 receives master information failure detection signals E50 and E166 of the buses 12-1 and 12-2 and generates a master information failure detection signal E155 as a whole. The OR gates 620, 622, and 624 receive two sets of judgment signals E51 and E167, E52 and E168, and E53 and E169 indicative of the processors 10-1 to 10-3 in which the master information failure occurs for each of the buses 12-1 and 12-2 and generate judgment signals E156, E157, and E158 indicative of the failure of the master information in the processors 10-1 to 10-3 by the ORs, respectively. The OR gates 626 receives the self processor failure detection signals E80 and E169 of the master information of the buses 12-1 and 12-2 and generates a self failure detection signal E159 of the master information as a whole system. The last OR gate 628 gets the OR of bus failure detection signals E114 and E124 of the bus failure detecting circuit 544A and bus failure detecting circuit 604 in FIGS. 59A to 59C and generates a bus failure detection signal E160 as a whole system. As mentioned above, when a pattern having a possibility of the failure of the bus itself is detected in either one of the buses 12-1 and 12-2, the disconnection of the master processor is not performed by the signal of the OR of the signals regarding the failure detection of the buses 12-1 and 12-2 but only the master processor is updated and the processes are continued.

Figure 61B:
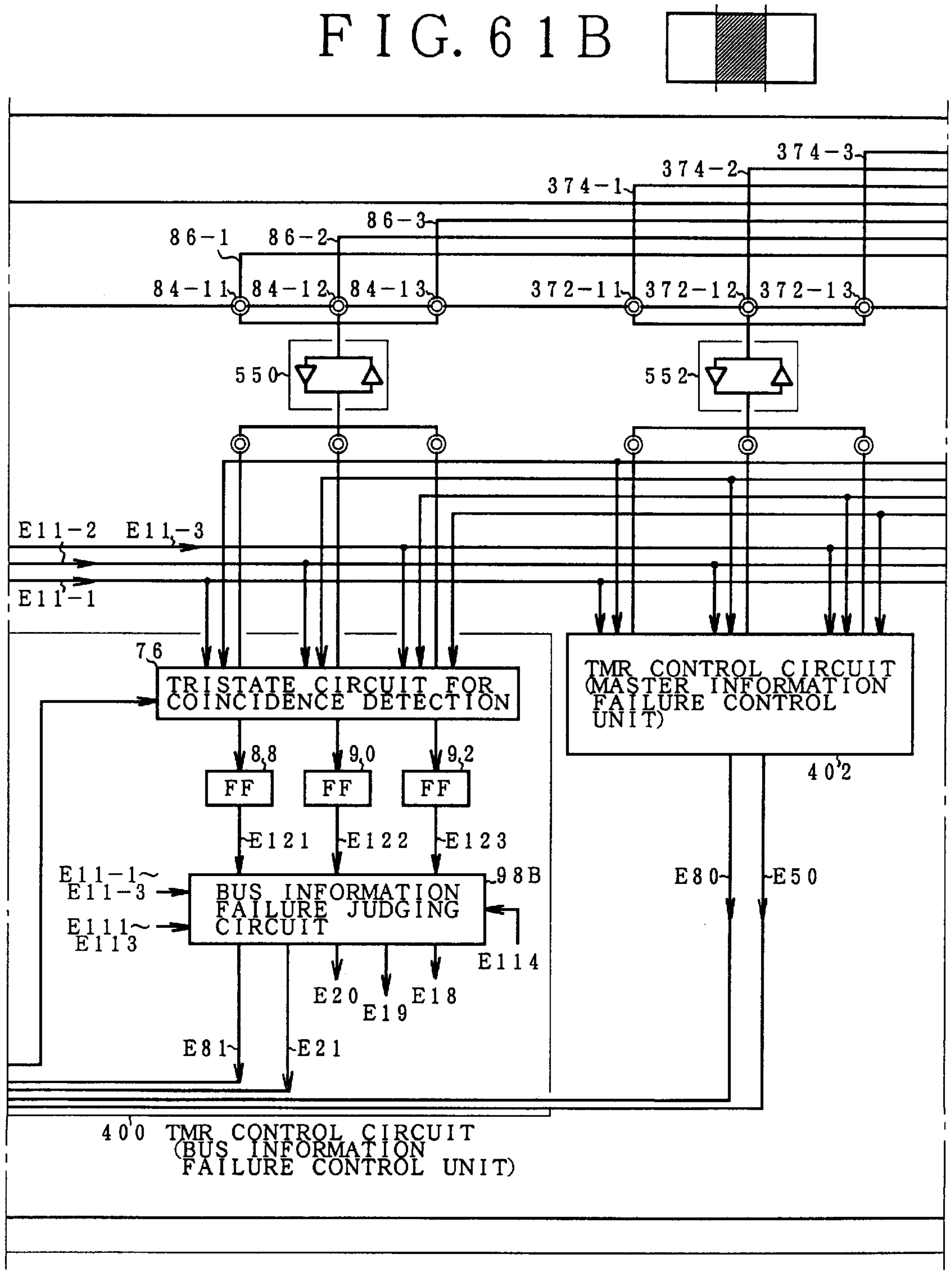
Figure 61C:
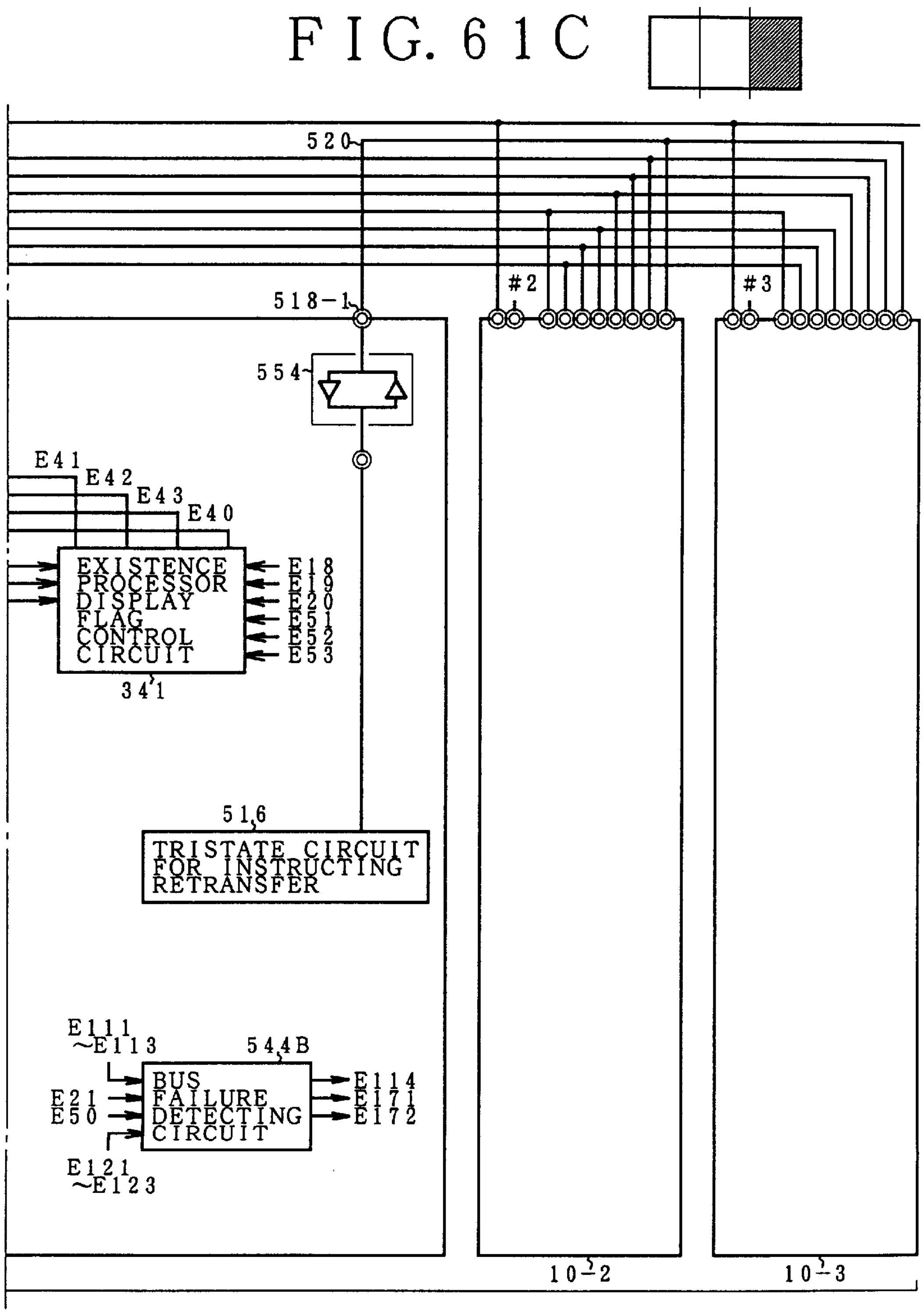

FIGS. 61A to 61C show an embodiment of the invention having a function such that after the bus failure possibility pattern of the first time was detected, the processor is not disconnected but only the master processor is updated and when the processes are continued, and when the bus failure possibility pattern is detected again, it is judged that the failure of the bus itself occurs due to the failure detection at the second time, thereby disconnecting the bus. A bus failure detecting circuit 544B generates a first bus failure detection signal E171 on the basis of the detection of the bus failure possibility pattern of the first time and generates a second bus failure detection signal E172 by the detection of the bus failure possibility pattern of the second time. The bus failure detection signal E114 is outputted at each of the first and second times. The first bus failure detection signal E171 based on the detection of the first bus failure possibility pattern outputted from the bus failure detecting circuit 554B is supplied to a master information register 14C, thereby allowing the master processor to be updated. The second bus failure detection signal E172 outputted from the bus failure detecting circuit 544B by the detection of the second bus failure possibility pattern is supplied to the bus output enable forming circuit 34. By turning off the bus output permission flag, the connection to the bus 12 is disconnected.

Figure 62:
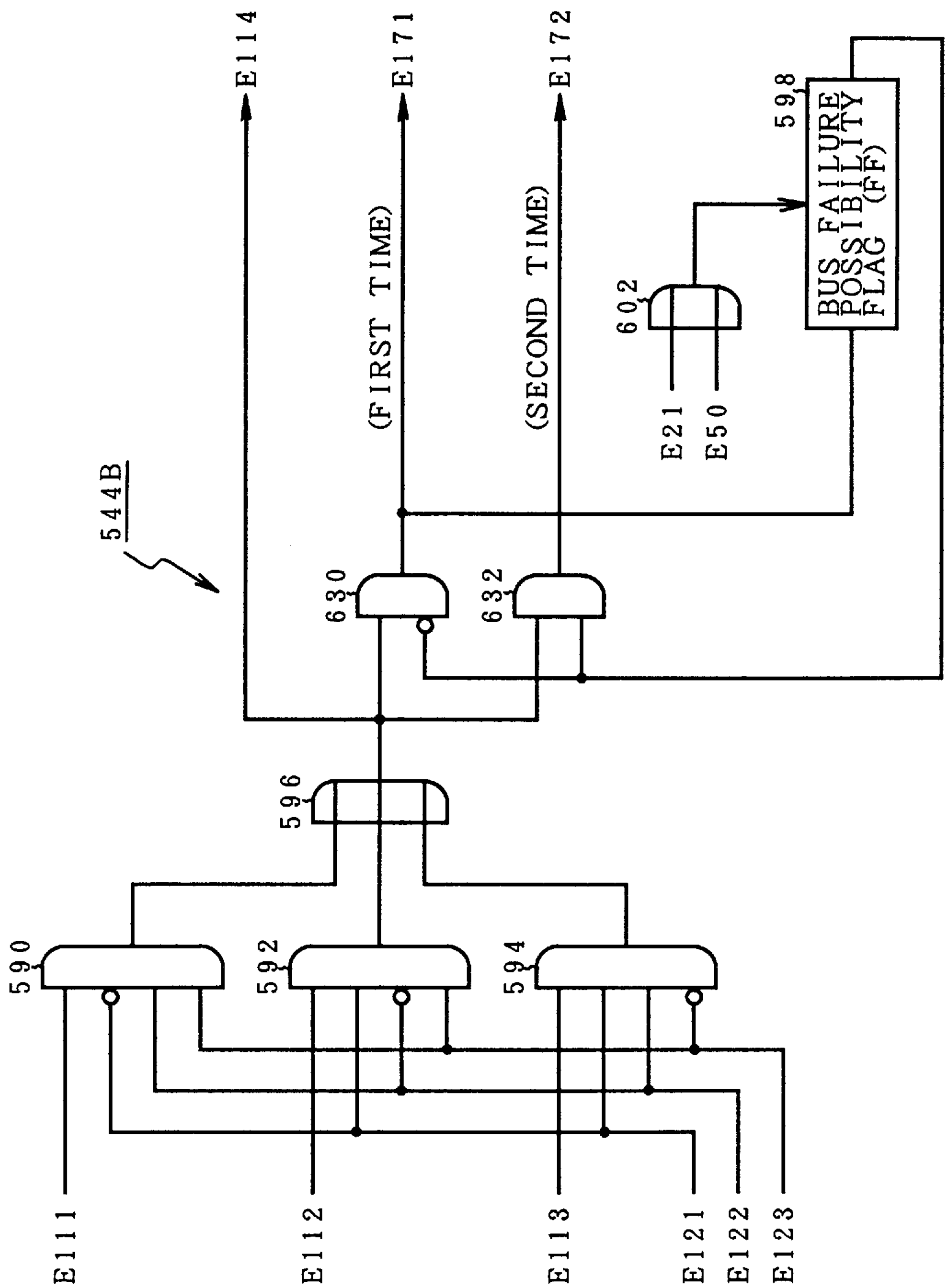
FIG. 62 is a block diagram of a bus failure detecting circuit in FIGS. 61A to 61C.

FIG. 62 is a block diagram of an embodiment of the bus failure detecting circuit 544B in FIGS. 61A to 61C. The bus failure detecting circuit 544B is fundamentally the same as the bus failure detecting circuit 544 in FIG. 54. The bus information failure detection signals E121, E122, and E123 obtained by the dissidence of the bus information in the processors 10-1 to 10-3 are inputted in parallel to the AND gates 590, 592, and 594. The decoding signals E111, E112, and E113 from the master processor number decoding circuit 542 are inputted to the AND gates 590, 592, and 594, respectively. In this case, when the master processor has been allocated to the processor 10-1, only the decoding signal E111 is turned on. When E121, E122, and E123=OFF, ON, ON in mode 4 in FIG. 53 in which the bus failure possibility pattern is obtained, an output of the AND gate 590 is turned on, thereby turning on the bus failure detection signal E114 through the OR gate 596. The bus failure detection signal E114 from the OR gate 596 is inputted to AND gates 630 and 632, respectively. An inverted signal of an output of the flag register 598 for setting/resetting the bus failure possibility flag is supplied to another input of the AND gate 630. Since the bus failure possibility flag is OFF in the initial state, the output of the flag register 598 is OFF. By the inverted input of this output, the AND gate 630 is in a permission state. Therefore, when the bus failure detection signal E114 is turned on due to the detection of the first failure possibility pattern, the output of the AND gate 630 is also turned on, thereby turning on the first bus failure detection signal E171. At this time, since the first bus failure detection signal E171 has been sent to a data input terminal of the flag register 598, the bus failure possibility flag is set by the turn-on of the bus information failure detection signal E21 which is obtained through the OR gate 602. As shown in FIGS. 61A to 61C, since the first bus failure detection signal E171 is inputted to the master information register 14C, the master processor is updated.

Figure 63:
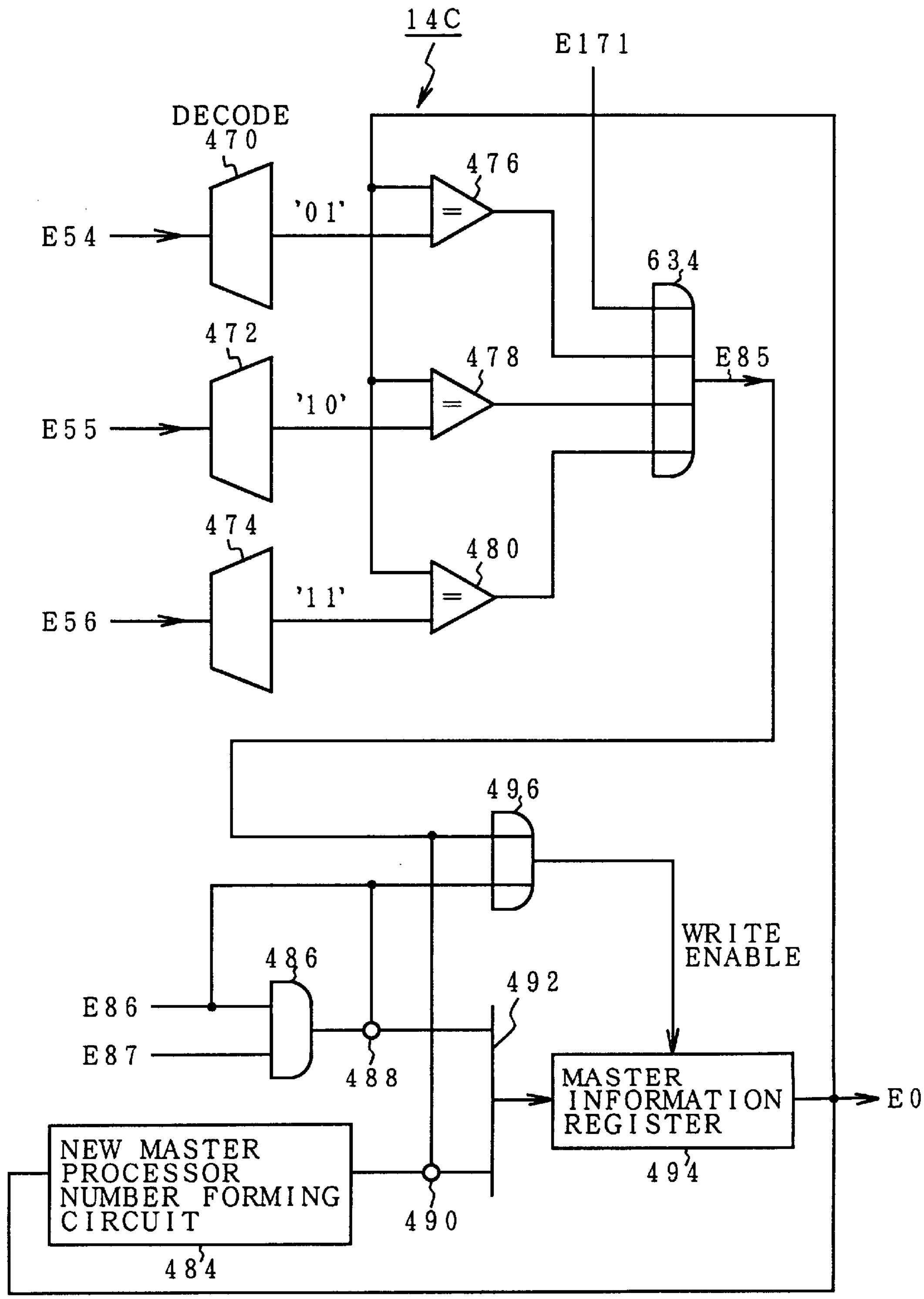
FIG. 63 is a block diagram of a master information register circuit in FIGS. 61A to 61C.

FIG. 63 is a block diagram of the master information register 14C in FIGS. 61A to 61C. A fundamental construction of the master information register 14C is the same as that in FIG. 56. An OR gate 634 is used in place of the OR gate 600. The first bus failure detection signal E171 outputted from the bus failure detecting circuit 544B in FIG. 62 is inputted to the OR gate 634, thereby forcedly performing the updating by the new master processor number forming circuit 484 of the master information register 14C.

Figure 64:
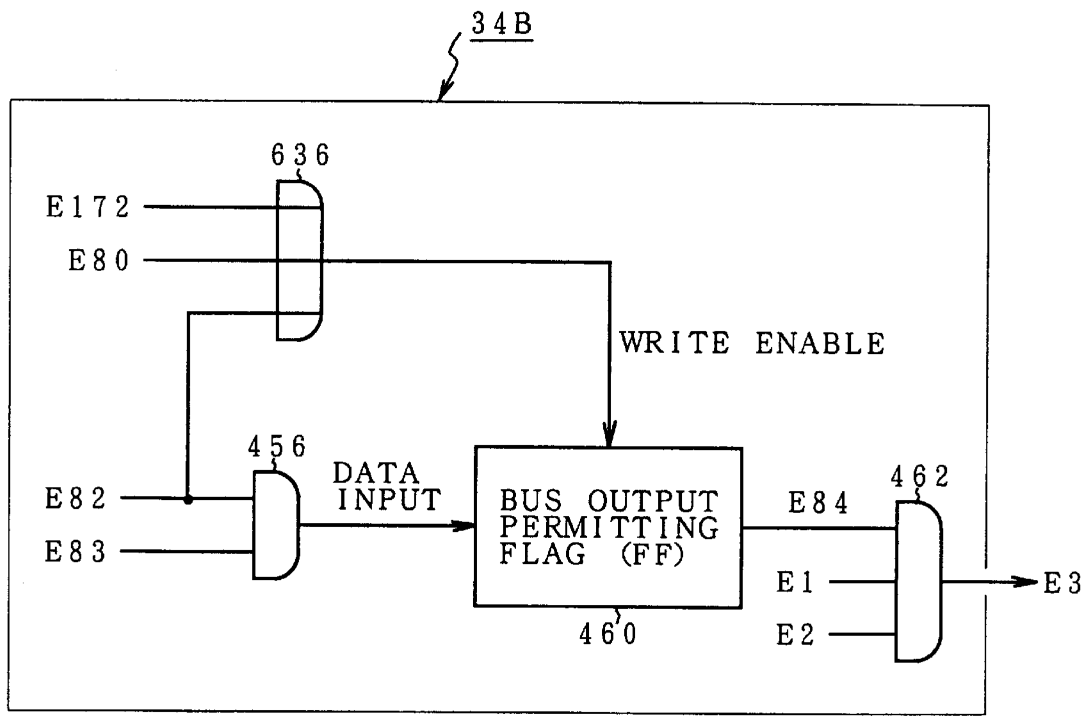
FIG. 64 is a block diagram of a bus output enable circuit in FIGS. 61A to 61C.

Referring again to FIG. 62, after the master processor was updated by the turn-on of the first bus failure detection signal E171, when the same failure pattern in mode 4 is detected, for example, since the master processor is switched to the processor 10-2 at this time and the decoding signal E112 is ON, an output of the AND gate 592 is turned on when the bus information failure detection signals (E121, E122, E123=ON, OFF, ON) according to the bus failure possibility pattern. The bus failure detection signal E114 is again turned on through the OR gate 596. At this time, since the bus failure possibility flag in the flag register 598 is ON, the AND gate 630 is in an inhibition state due to the inverted input and the AND gate 632 is in a permission state. Therefore, the output of the AND gate 632 is turned on due to the turn-on of the output of the OR gate 596 and is outputted as a second bus failure detection signal E172. The second bus failure detection signal E172 based on the detection of the second bus failure possibility pattern is inputted to a bus output enable forming circuit 34B shown in FIG. 64. A fundamental circuit construction of the bus output enable forming circuit 34B is the same as the bus output enable forming circuit 34A in FIG. 43. The second bus failure detection signal E172 is inputted to an OR gate 636 from the bus failure detecting circuit 544B in FIG. 62, thereby forcedly turning off the bus output permission flag of the flag register 460. The flag signal E84 is turned off by the turn-off of the bus output permission flag, the AND gate 462 is set into an inhibition state, the turn-on of the bus enable signal E3 by the self master signal E1 and bus output timing signal E2 is inhibited, and the tristate circuit 24 for bus in FIGS. 52A to 52C is disconnected from the bus 12. The disconnection of the processor 10-1 from the bus 12 is also simultaneously performed in the other processors 10-2 and 10-3. Thus, the bus output permission flag is turned off in all of the processors 10-1 to 10-3 constructing the TMR unit 10 and the disconnection of the TMR unit 10 from the bus 12 is executed. In this case, if the TMR unit 10 constructs the multiple bus as shown in FIGS. 59A to 59C, the failed bus is disconnected from the TMR unit 10 and the processes can be continued by the reduced construction using the remaining multiple buses.

In the embodiment as shown in FIGS. 61A to 61C, when an intermittent failure occurs in the bus 12 due to noises or the like, this failure is detected as a bus failure possibility pattern by the TMR unit 10. The master processor of the TMR unit 10 is updated by the detection of the bus failure possibility pattern. The bus failure possibility flag is set. In this state, after the system was normally operated for a long time, when an intermittent failure again occurs in the bus 12 due to noises or the like, since the bus failure possibility flag still remains in the on state, it is judged that the bus failure occurs, so that the bus 12 is disconnected. Therefore, a bus failure detecting circuit 544C in FIG. 65 is used in place of the bus failure detecting circuit 544B in FIGS. 61A to 61C and in order to avoid that the bus is disconnected due to the intermittent noises of the bus, a function to reset the bus failure possibility flag which was once turned on by a software is provided.

Figure 65:
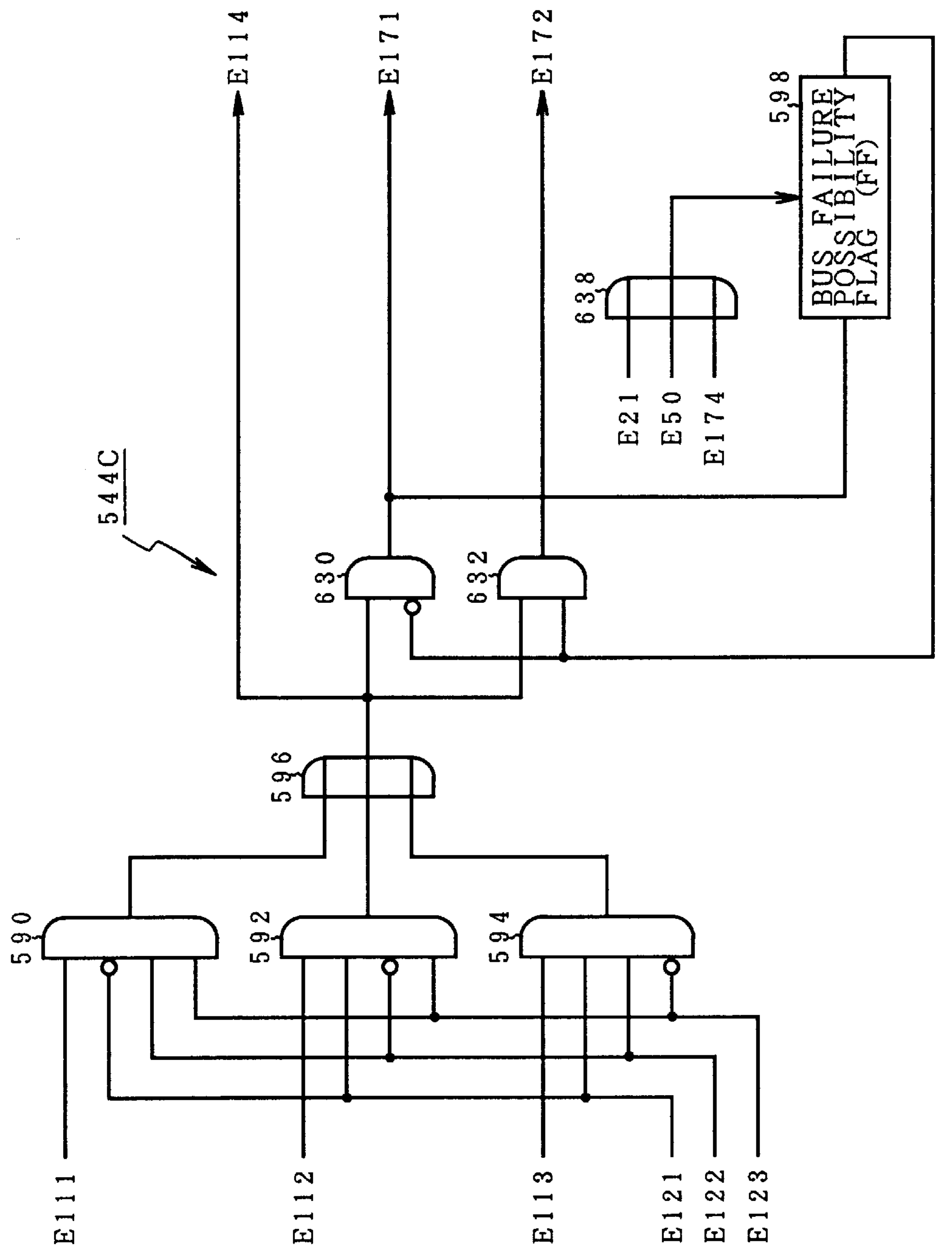
FIG. 65 is a block diagram of a bus failure detecting circuit for resetting a bus failure possibility flag by an instruction of a software.
Figure 66:
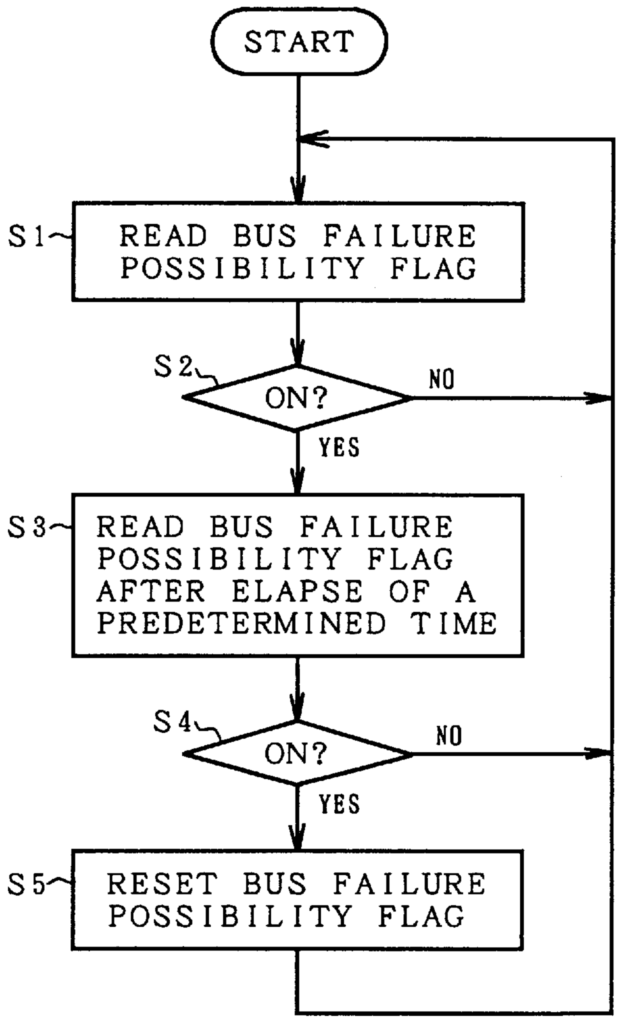
FIG. 66 is a flowchart for a resetting process by a software in FIG. 65.

The bus failure detecting circuit 544C in FIG. 65 is characterized in that an OR gate 638 of three inputs is used in place of the OR gate 602 for the flag register 598 of the bus failure detecting circuit 544B in FIG. 62, and in addition to the bus information failure detection signal E21 and master information failure detection signal E50, the bus failure possibility flag of the flag register 598 can be turned off by a software resetting instruction signal E174. The process for resetting the bus failure possibility flag by the software is as shown in a flowchart of FIG. 66. First in step S1, the bus failure possibility flag of the flag register 598 is periodically read. When it is judged in step S2 that the flag is ON, step S3 follows and the bus failure possibility flag is again read after the elapse of a predetermined time. When it is judged in step S4 that the flag is again ON due to the reading of the flag after the elapse of a predetermined time, step S5 follows. By turning on the software resetting instruction signal E174, the bus failure possibility flag is reset in step S5. Therefore, even if the intermittent bus failure due to the noises or the like continuously occurs twice for a time exceeding a predetermined time, the bus failure possibility flag which was once turned on is forcedly turned off by an instruction by the software. Therefore, a situation such that the bus is disconnected by the detection of the next bus failure can be avoided.

Figure 67:
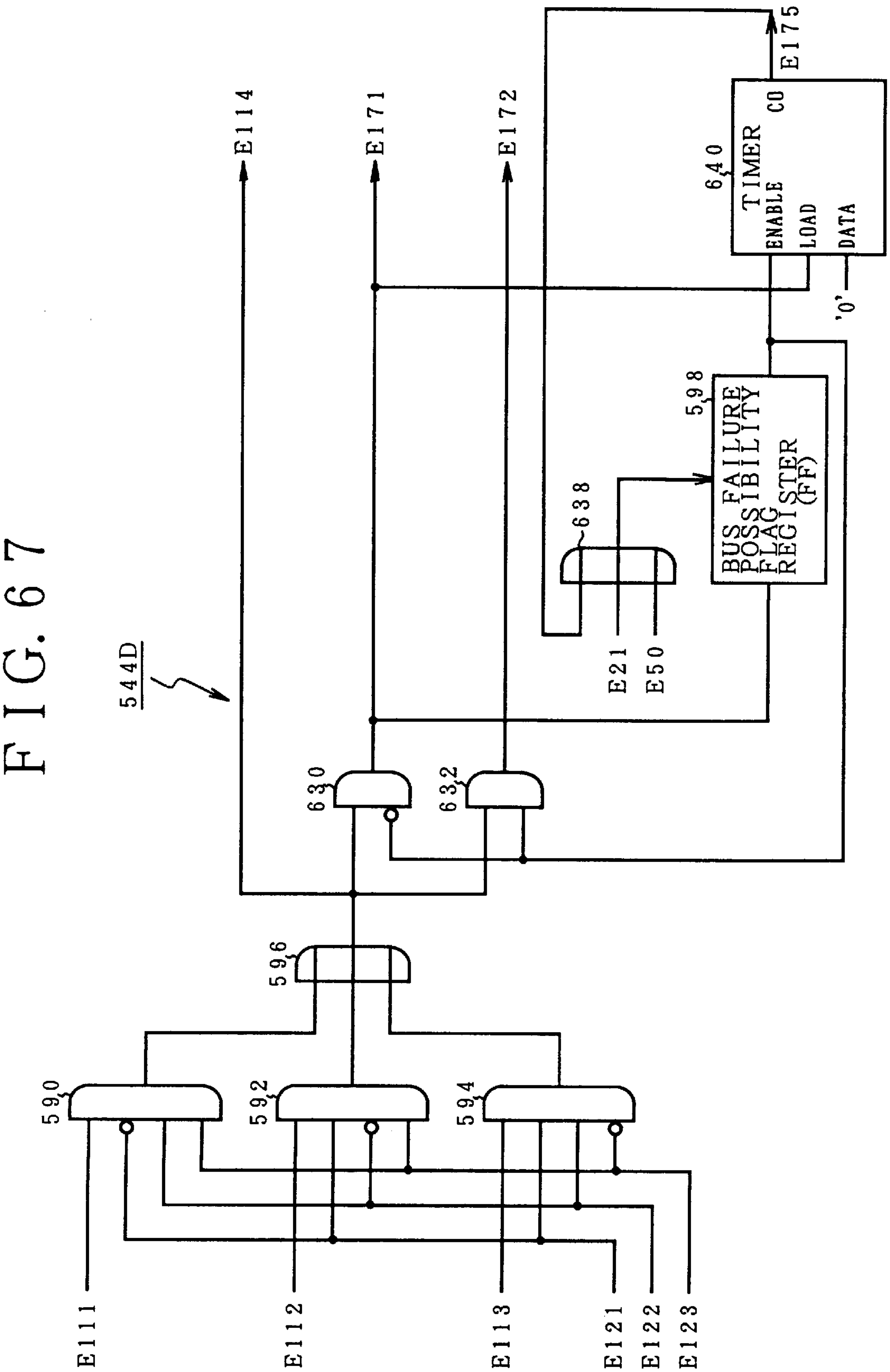
FIG. 67 is a block diagram of a bus failure detecting circuit for resetting the bus failure possibility flag by a hardware.

FIG. 67 is a block diagram of another bus failure detecting circuit 544D which is used in place of the bus failure detecting circuit 544B in the embodiment of FIGS. 61A to 61C. The embodiment is characterized in that after the bus failure possibility flag was turned on by the failure detection of the first time, a timer is activated and the bus failure possibility flag is forcedly returned to OFF after the elapse of a predetermined time by the timer. Namely, the bus failure detecting circuit 544D in FIGS. 61A to 61C is characterized in that, with respect to the bus failure detecting circuit 544C for resetting the flag by the software of FIG. 65, further, a timer 640 which is activated by an output by the turn-on of the flag of the flag register 598 and turns on a timer signal E175 after the elapse of a predetermined time is provided and the timer signal E175 of the timer 640 is inputted to the OR gate 638 in place of the software resetting instruction signal E174. Therefore, when the bus failure possibility flag of the flag register 598 is turned on due to the ON output of the AND gate 630 by the turn-on of the bus failure detection signal E114 from the OR gate 596 by the detection of the bus failure possibility pattern of the first time, an enable input terminal of the timer 640 is turned on, a load terminal is turned on by the first bus failure detection signal E171 which is outputted at that time, and the timer 640 is activated. After the elapse of a predetermined time, when the timer output signal E175 is turned on, the bus failure possibility flag of the flag register 598 is forcedly reset to OFF through the OR gate 638. By such a hardware construction using the timer, a situation such that the bus is disconnected from the TMR unit 10 in the case where the intermittent bus failure continuously occurs twice can be avoided.

[Notification of software for bus disconnection]

Figure 68B:
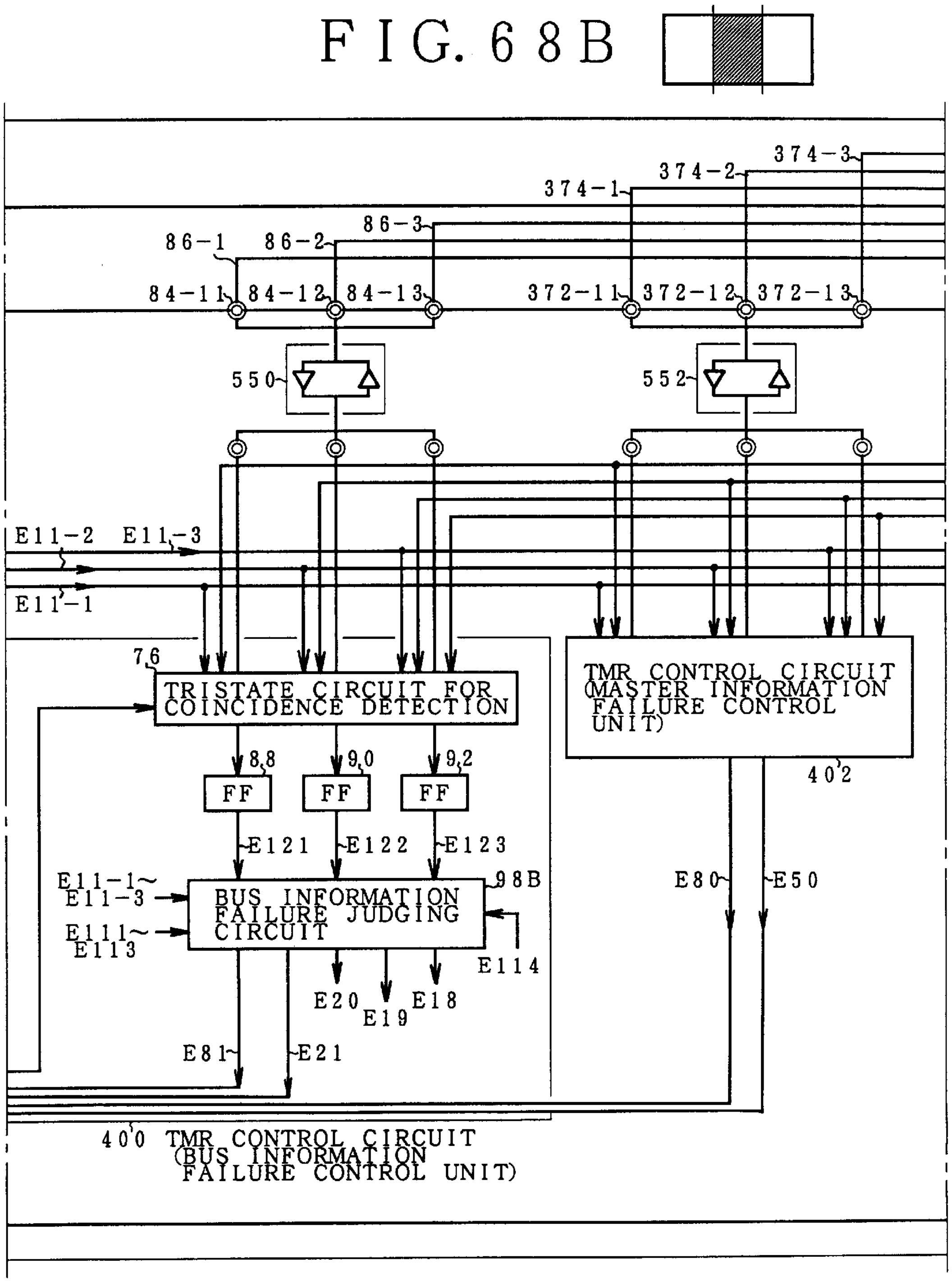
Figure 68C:
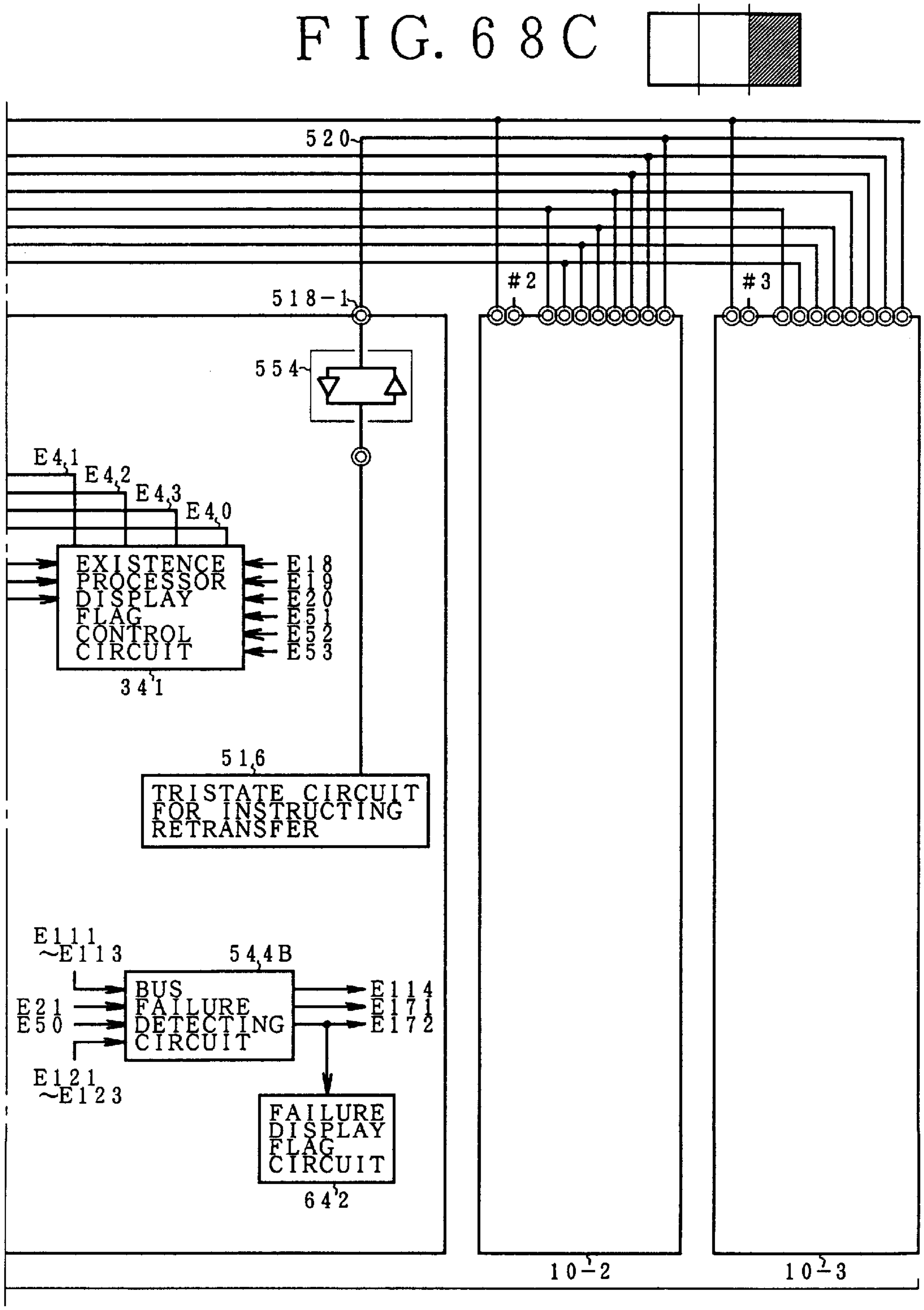

FIGS. 68A to 68C show an embodiment having a function such that when a failure of the bus 12 itself occurs and the bus 12 is disconnected from the TMR unit 10, an event of the bus failure is displayed to the software. In order to display the event of the failure for the bus disconnection to the software, a failure display flag circuit 642 is provided as representatively shown in the processor 10-1 of the TMR unit 10.

Figure 69:
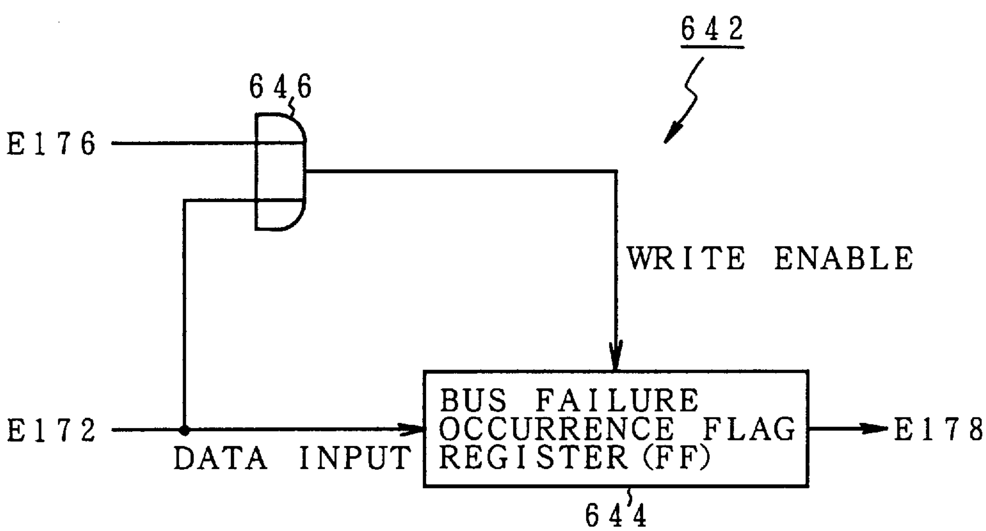
FIG. 69 is a block diagram of a failure display flag circuit in FIGS. 68A to 68C.

FIG. 69 is a block diagram of the failure display flag circuit 642 in FIGS. 68A to 68C. A flag register 644 is provided for the failure display flag circuit 642. The second bus failure detection signal E172 which is turned on by the detection of the second time of the bus failure possibility pattern from the bus failure detecting circuit 544B in FIGS. 68A to 68C is inputted to the data input terminal of the flag register 644. An output of the OR of the second bus failure detection signal E172 and a software resetting instruction signal E176 is supplied from an OR gate 646 to a write enable terminal of the flag register. When the bus failure possibility pattern continues twice and the second bus failure detection signal E172 is turned on, the bus failure generation flag of the flag register 644 is turned on and a flag signal E178 is outputted. At this time, the software receives the failure notification by a circuit, which will be obviously explained hereinlater, reads the bus failure generation flag of the flag register 644, and can know the occurrence of the bus failure by the turn-on of the flag. When the bus failure occurs, since the bus has been disconnected, the software executes a failure process such that the command which has been being executed in the failed bus is again executed via the remaining normal bus even after the reduction of the construction.

Figure 70A:
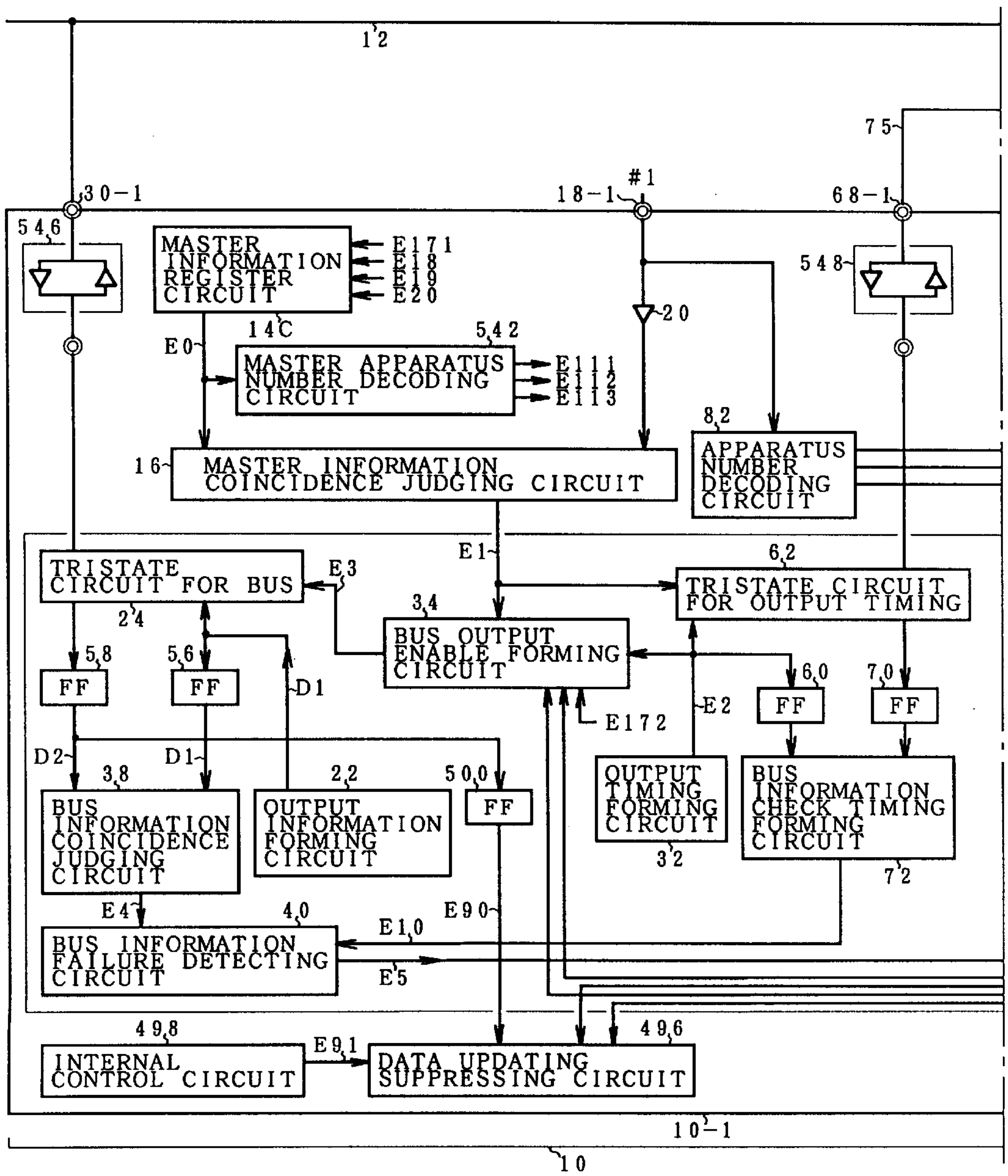
FIGS. 70A, 70B, and 70C are block diagrams of a TMR unit having a bus failure occurrence flag.
Figure 70B:
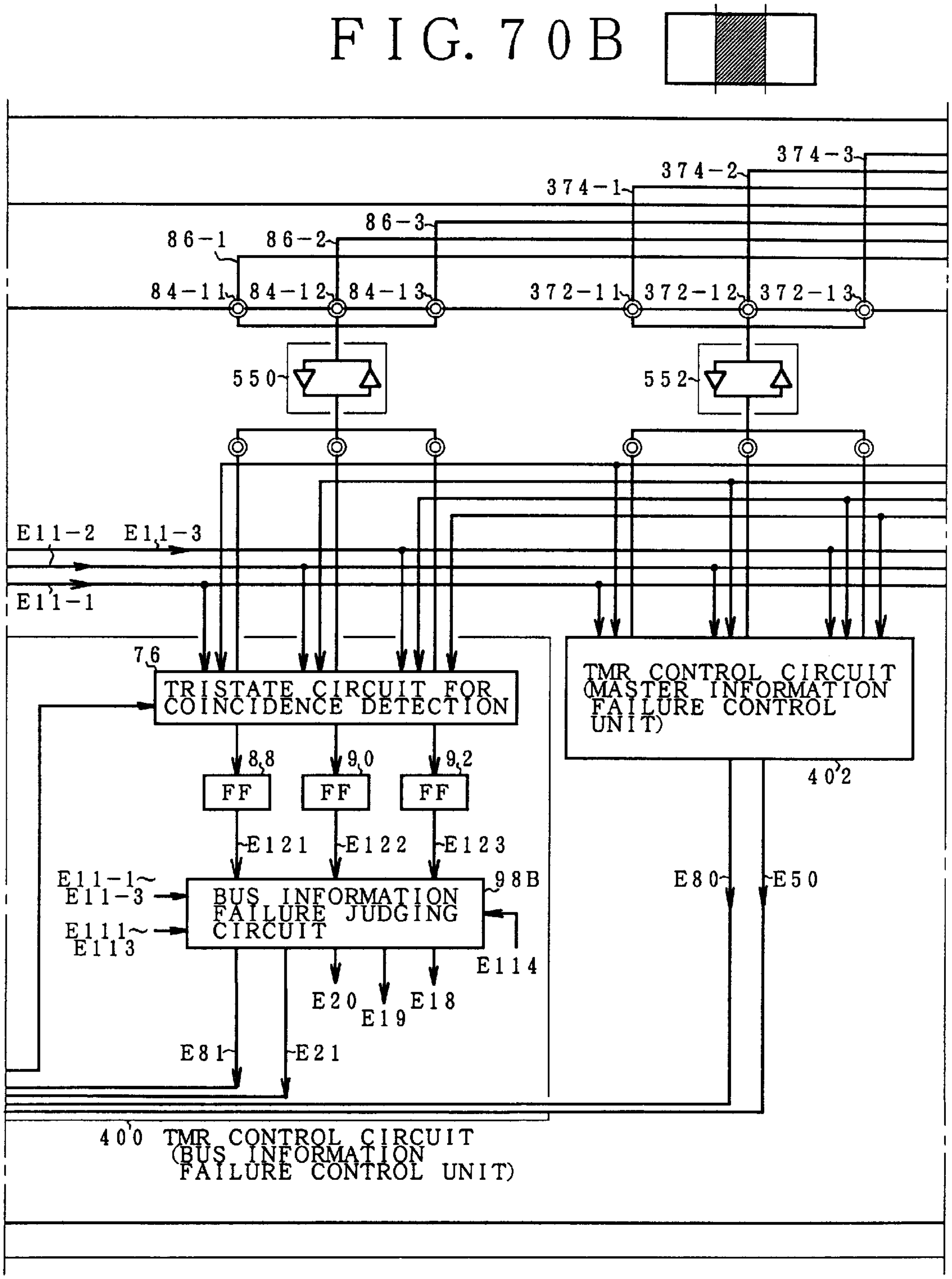
Figure 70C:
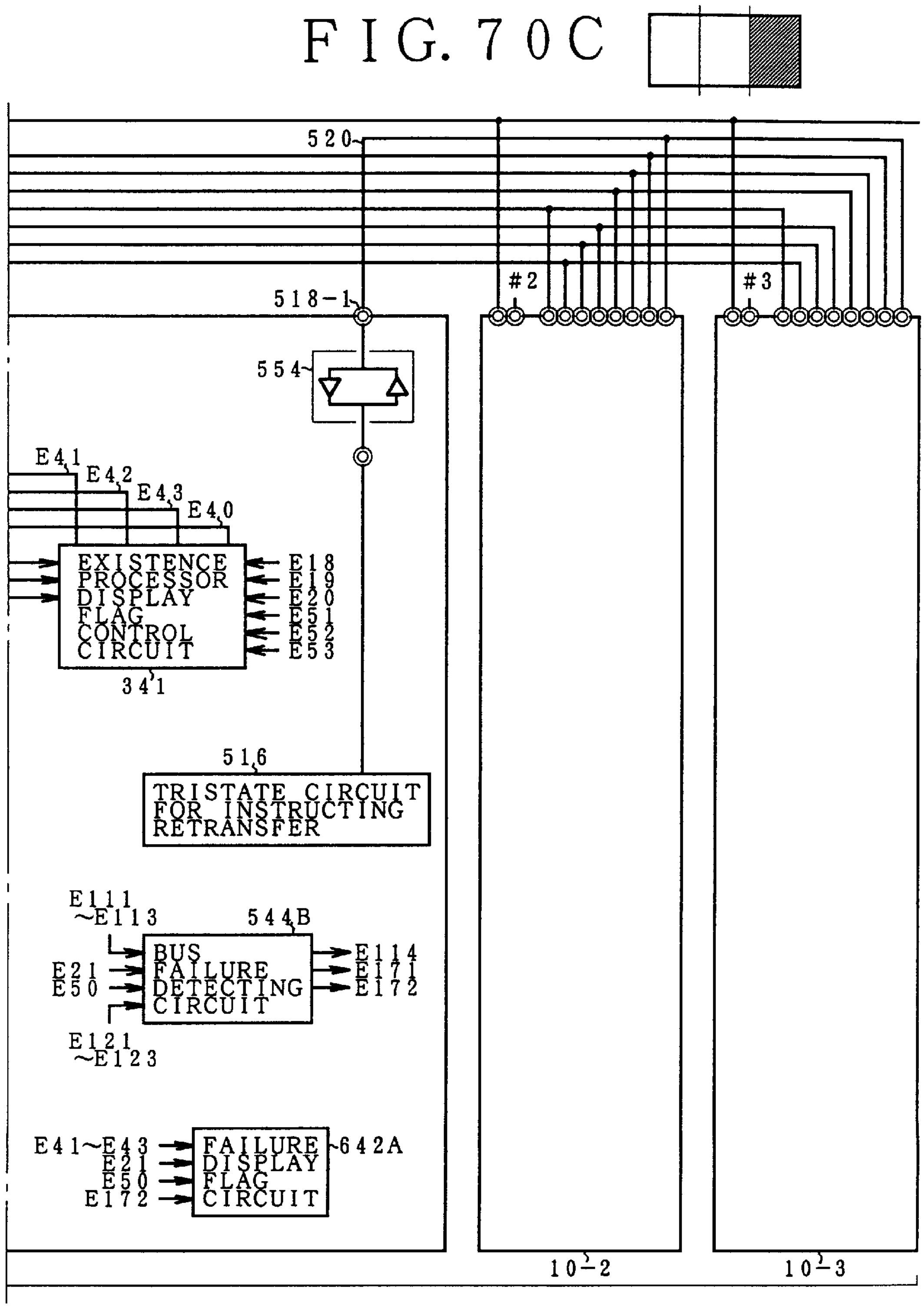

FIGS. 70A to 70C show an embodiment having a function such that in the case where a failure of the bus information or a failure of the master information is detected while the TMR unit 10 is executing the reduced operation by only the two processors, such an event is notified to the software. As for each processor of the TMR unit 10, as representatively shown in the processor 10-1, a failure display flag circuit 642A for setting/resetting the failure display flag indicative of the failure detection state when the reduction operation is being executed by only the two processors is provided. The existence processor display flag signals E41 to E43 showing the existence of the processors 10-1 to 10-3 are inputted from the existence processor flag control circuit 340 to the failure display flag circuit 642. The bus failure detection signal E21 is inputted from the bus information failure judging circuit 98B and the master information failure detection signal E50 from the master information failure detection judging circuit provided for the TMR control circuit 402 is further inputted. Moreover, the second bus failure detection signal E172 which is turned on by the detection of the second time of the bus failure possibility pattern from the bus failure detecting circuit 544B is inputted.

Figure 71:
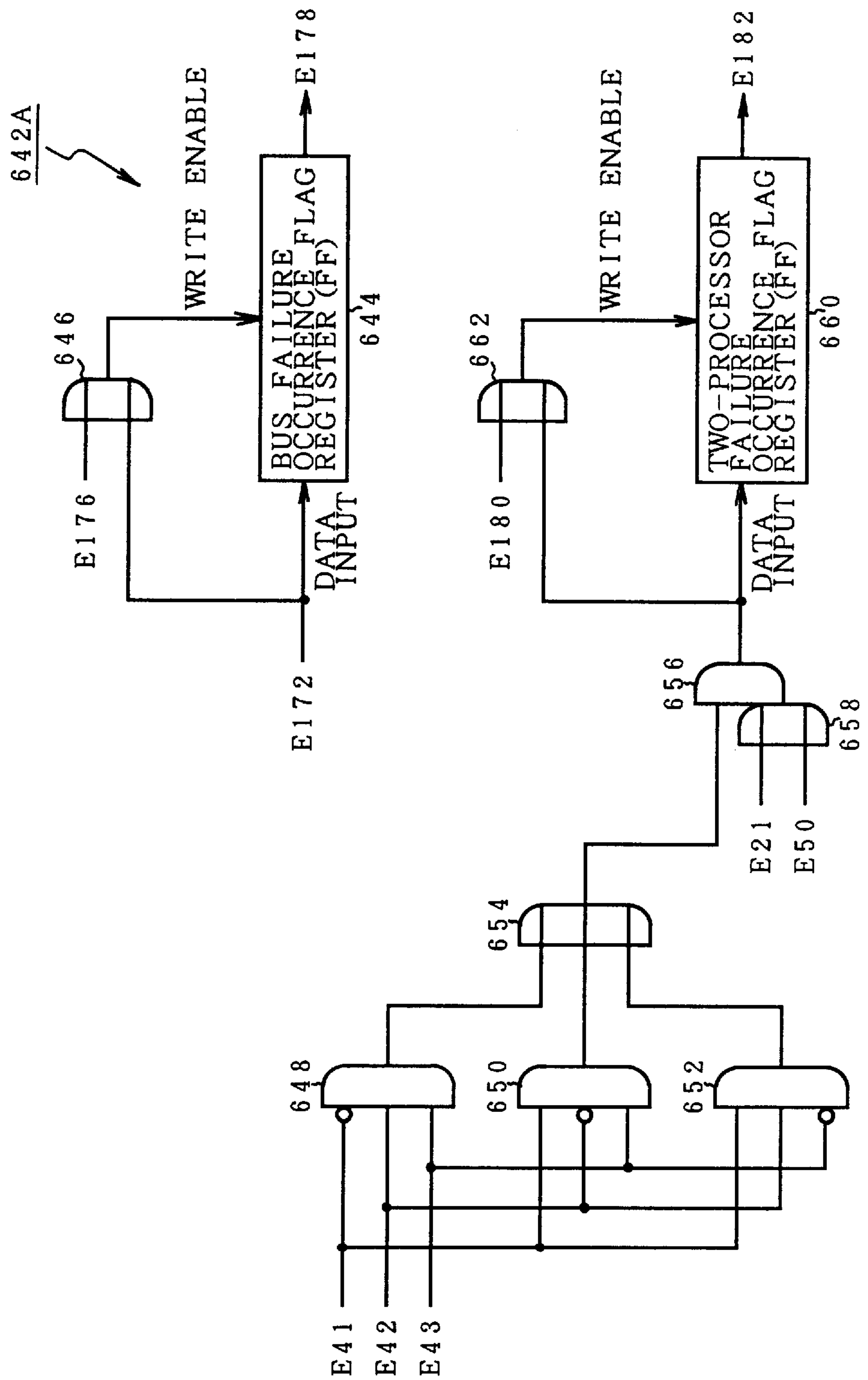
FIG. 71 is a block diagram of a TMR unit having a two-processor failure occurrence flag register due to a reduction.

FIG. 71 is a block diagram of an embodiment of the failure display flag circuit 642A in FIGS. 70A to 70C. In addition to the failure display flag circuit 642 in FIG. 69, a flag register 660 to turn on/off a 2-processor failure occurrence flag is provided for the failure display flag circuit 642A. Reduction patterns of the two processors are detected from the existence processor flag signals E41, E42, and E43 by AND gates 648, 650, and 652 and an OR gate 654 and a detection result is inputted to a data input terminal of the flag register 660. For example, when the reduced operation is being executed by the two processors 10-2 and 10-3 in FIGS. 70A to 70C, since the existence processor flag signal E41 is OFF due to the disconnection and the signals E42 and E43 are ON, so that an output of the AND gate 648 is turned on and is inputted to an AND gate 656 through the OR gate 654. The bus information failure detection signal E21 or master information failure detection signal E50 is supplied to another input of the AND gate 656 via an OR gate 658. Therefore, when a failure is detected, an output of the AND gate 656 is turned on and the 2-processor failure occurrence flag of the flag register 660 is set to ON. The flag of the FF 660 can be reset by a software resetting instruction signal E180 transmitted via an OR gate 662. Therefore, when the failure detection by the bus information failure detection signal E21 or master information failure detection signal E50 is notified, the software reads flag signals E178 and E182 from the flag registers 644 and 660 and recognizes the occurrence of the 2-processor failure from the turn-on of the flag signal E182. The software can execute a necessary failure process.

Figure 72A:
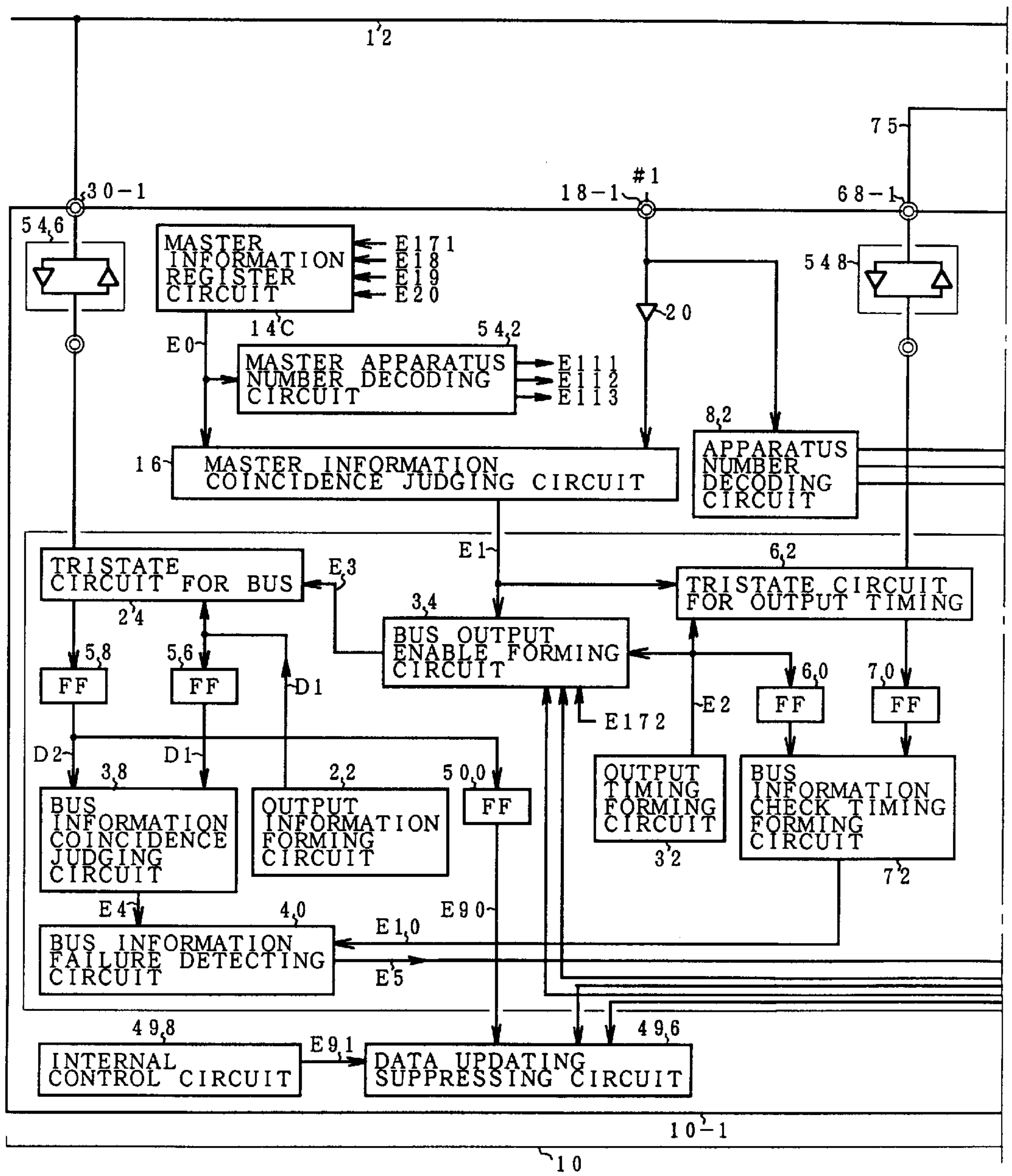
FIGS. 72A, 72B, and 72C are block diagrams of a TMR unit having a function for notifying the software of the occurrence of a failure.
Figure 72B:
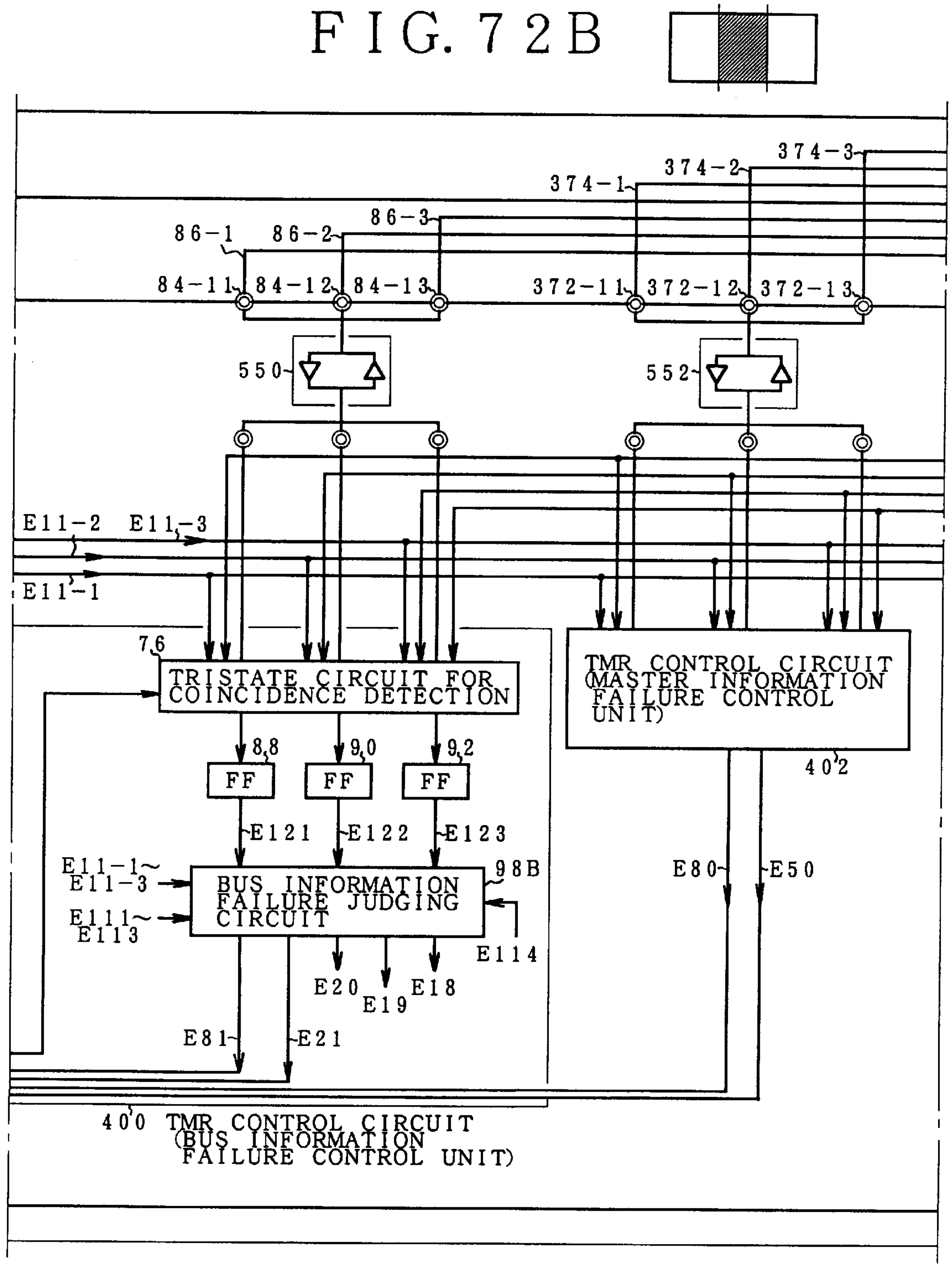
Figure 72C:
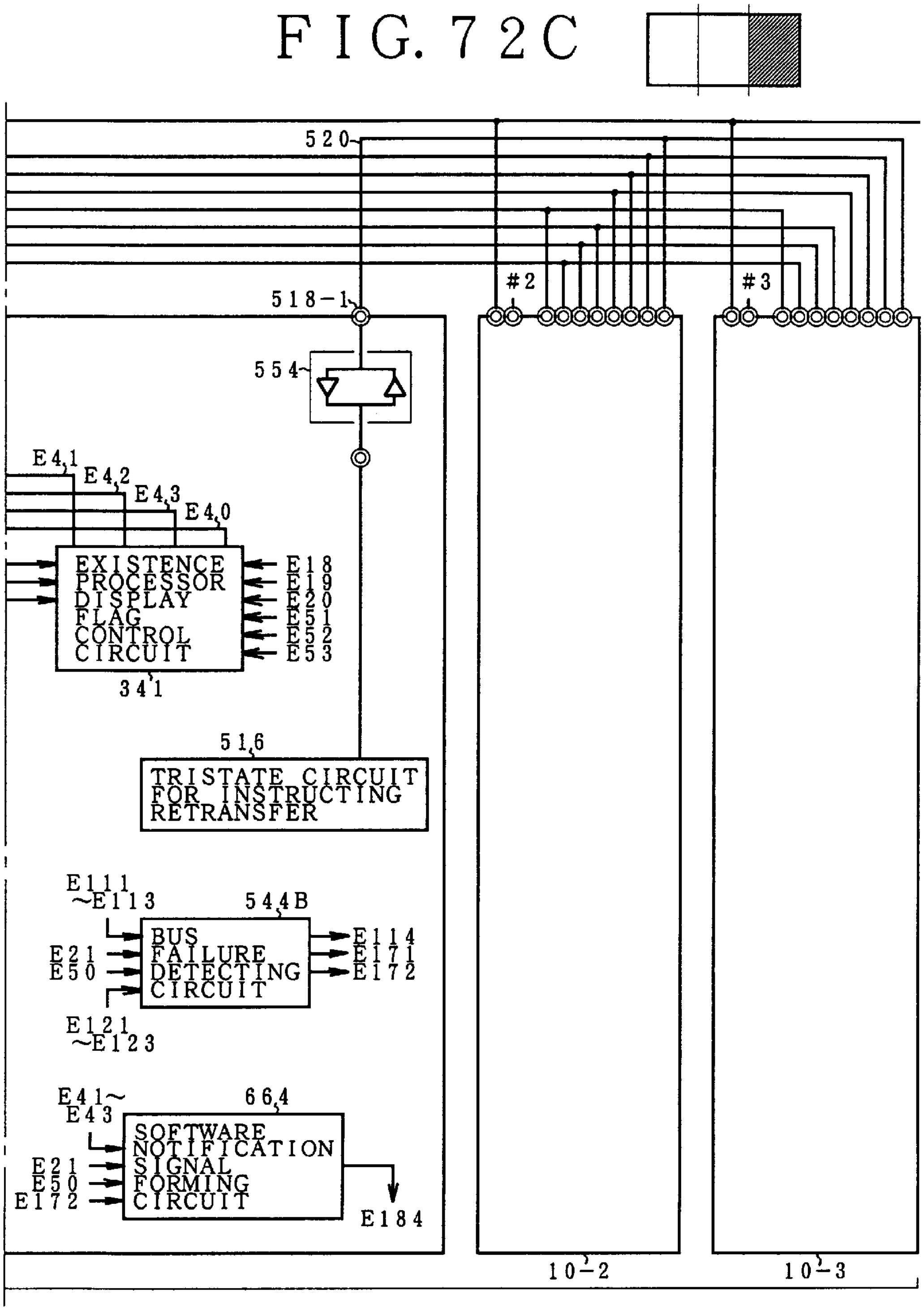

FIGS. 72A to 72C show an embodiment having a function such that when a failure of the bus itself occurs or when the TMR unit 10 is executing the reduction operation by only two processors, if a failure due to the dissidence of the bus information or the dissidence of the master information is detected, such an event is notified to the software. In the embodiment, as shown in the processor 10-1 constructing the TMR unit 10, the software notification signal forming circuit 664 is newly provided.

Figure 73:
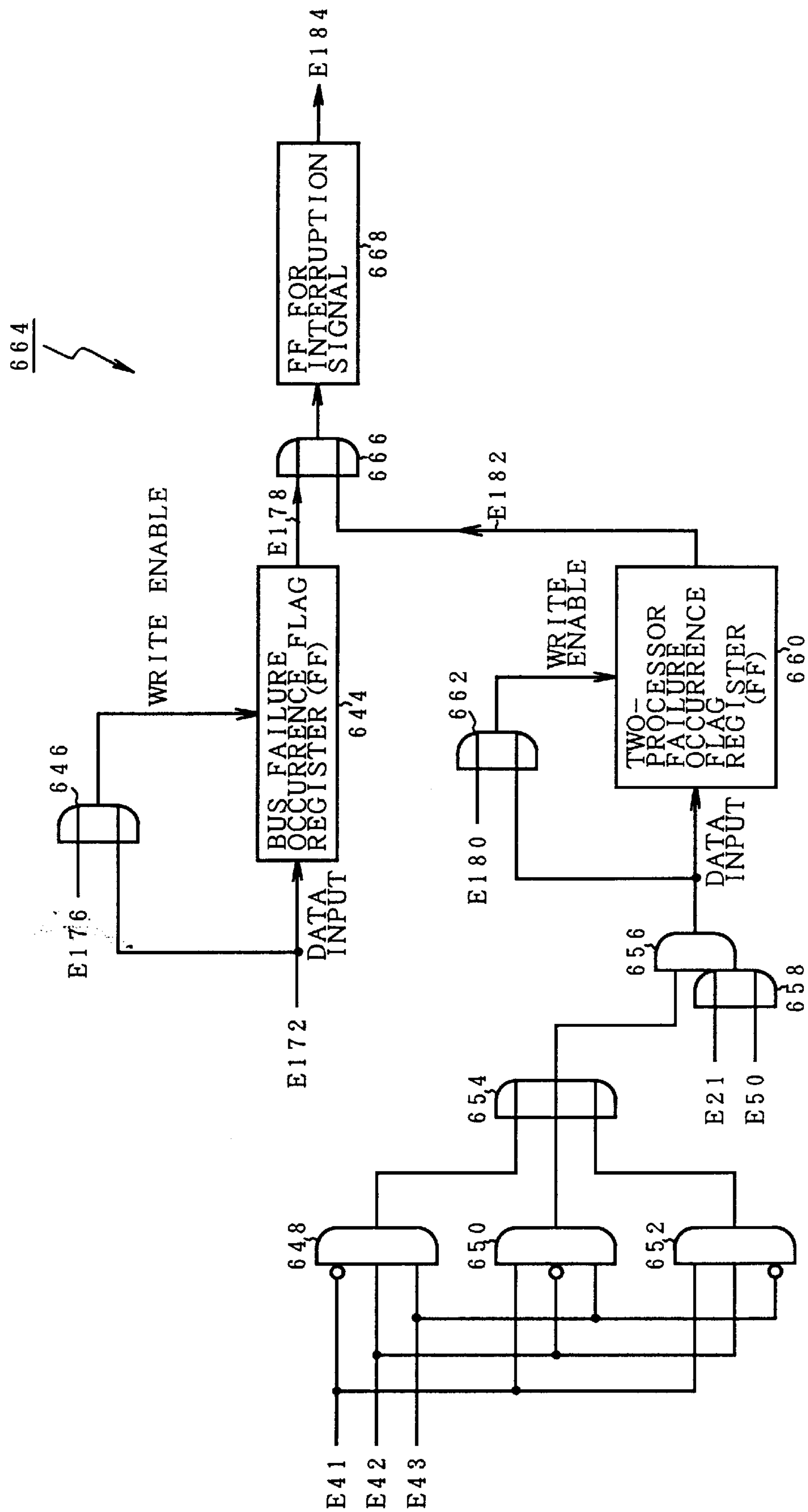
FIG. 73 is a block diagram of a software notification signal forming circuit in FIGS. 72A to 72C.

FIG. 73 is a block diagram of an embodiment of the software notification signal forming circuit 664 in FIGS. 72A to 72C. According to the software notification signal forming circuit 664, an OR gate 666 and an FF 668 for an interruption signal are further provided for the failure display flag circuit 642A in FIG. 71. That is, the flag signal E178 by the turn-on of the bus failure occurrence flag of the flag register 664 and the flag signal E182 due to the turn-on of the 2-processor failure occurrence flag of the flag register 660 are held in the FF 668 through the OR gate 666. Therefore, the FF 668 for interruption signal is set through the OR gate 666 by the flag signal E178 due to the turn-on of the bus failure occurrence flag of the flag register 644 when the bus failure possibility pattern continues twice. The occurrence of the failure is notified to the software by the turn-on of an interruption signal E184 and the necessary failure occurrence process can be performed. Similarly, in the case where the bus information failure or the master information failure is detected while the reduction operation is being executed by the two processors and the 2-processor failure occurrence flag of the flag register 660 is turned on, the FF 668 for interruption signal is set and the interruption signal E184 is turned on. An interruption notification of the failure occurrence is performed to the software. Similarly, the necessary failure process can be performed.

[Wake-up mode upon switching of failed processor]

Figure 74:
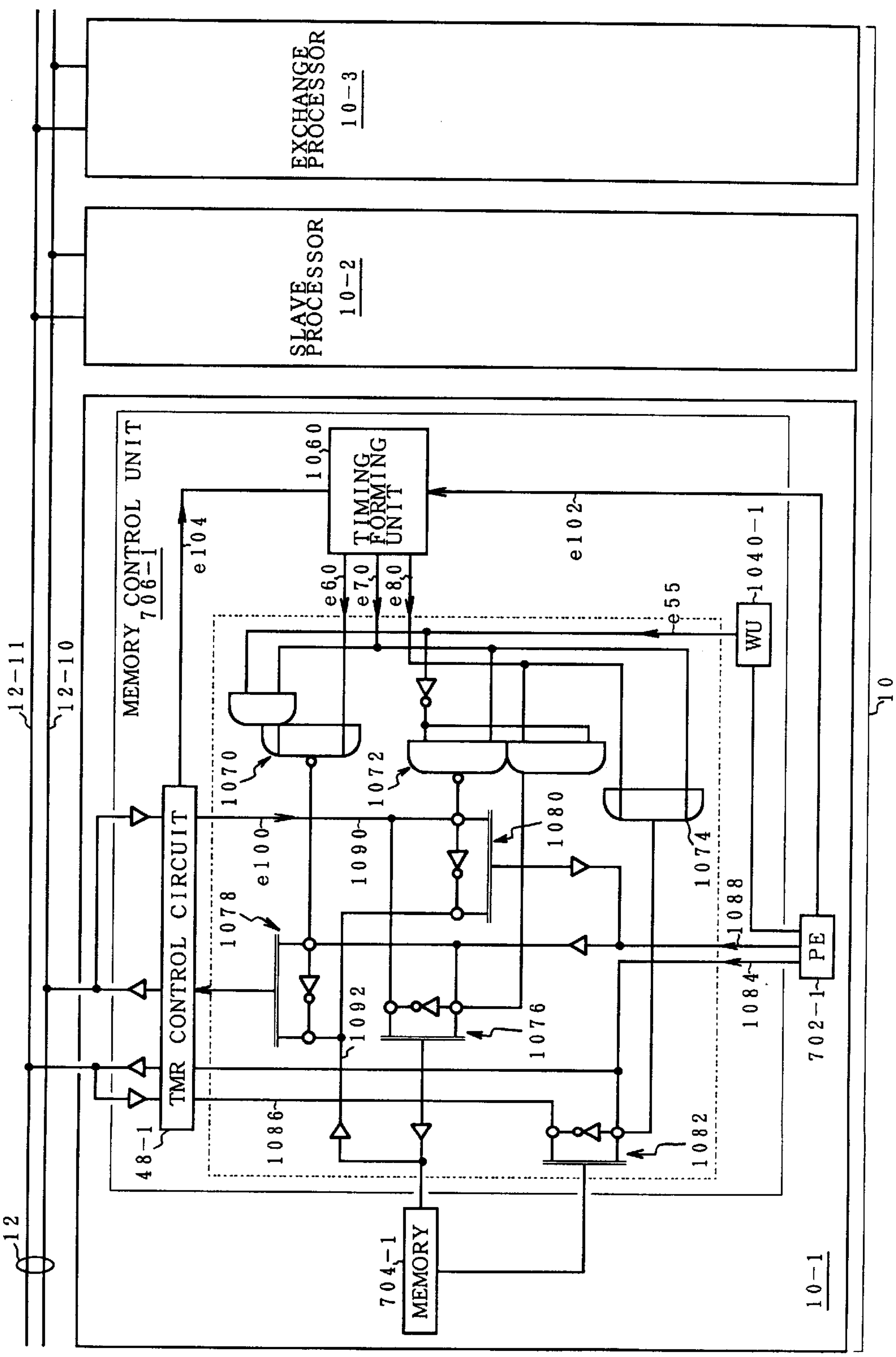
FIG. 74 is a block diagram of an embodiment for leading a processor exchange by a wake-up mode.

FIG. 74 shows an embodiment in a wake-up mode which is set upon activation of the system when a failed processor is exchanged to a new processor after the processor 10-3 as one of the processors 10-1 to 10-3 constructing the TMR unit 10 was disconnected due to a failure. Although a construction with three modules comprising one master module and two slave modules (one of them is an exchange module) is shown as an example in the embodiment, the invention can be also similarly applied to a 2-module construction comprising one master module and one slave module (=exchange module). The TMR unit 10 is in a set state of the wake-up mode and has a reduction construction of two processors comprising the master processor 10-1 and slave processor 10-2. The exchange processor 10-3 cannot be returned to the TMR unit 10 because the memory contents don't coincide with the memory contents of the master processor 10-1 and slave processor 10-2. Therefore, in the wake-up mode, a memory copy process from the master processor 10-1 to the exchange processor 10-3 is executed. A procedure when exchanging the processor is as follows. First, in a state in which the processor 10-3 fails, the TMR unit 10 executes the multiplexing operation in a reduced construction by the two processors comprising the master processor 10-1 and slave processor 10-2. In this state, when the failure of the processor 10-3 is confirmed, the operator exchanges the failed processor 10-3 to the new processor as shown in the diagram. When the failed processor is exchanged, since the processors 10-1 to 10-3 have to be activated from the clock sync level, the multiplexing operation of the TMR unit 10 is once stopped at this time point. In what is called a system stop state due to the multiplexing operation, the synchronization of the clock levels between the existing processors 10-1 and 10-2 and the exchange processor 10-3 is executed among the three processors 10-1 to 10-3. Further, the state of the exchange processor is set to the same state as that of the existing processors 10-1 and 10-2. When the synchronization among the processors and the setting of the internal state as mentioned above are finished, the wake-up mode is set with respect to all of the processors 10-1 to 10-3. The multiplexing operation as a TMR unit 10 by the master processor 10-1 and slave processor 10-2 and the copy process of the memory for the exchange processor 10-3 are activated.

To enable the processing operation in such a wake-up mode, as representatively shown in the master processor 10-1 in FIG. 74, a memory control unit 706-1 is provided for a processor element 702-1 in the master processor 10-1 and a memory 704-1 as a main memory. The memory control unit 706-1 is connected to the bus 12 through the TMR control circuit 48-1. The bus 12 is constructed by a data bus 12-10 and an address bus 12-11. As a TMR control circuit 48-1 itself, the circuit shown in detail in the foregoing embodiment is used. The memory control unit 706-1 is provided with a wake-up flag setting circuit 1040-1 by using the wake-up mode as a setting unit. The wake-up flag setting circuit 1040-1 turns on the wake-up flag to 1 at a time point of the end of the operation of the clock level among the processors 10-1 to 10-3 after the processor was replaced to the exchange processor 10-1 and at a time point of the end of the setting of the internal state. The wake-up flag which was once turned on is turned off to 0 at a time point of the end of the process for copying from the memory 704-1 of the master processor 10-1 to the memory of the exchange processor 10-3. A timing forming unit 1060 receives a PE access signal e102 from the processor element 702-1 and a bus access signal e104 from the TMR control circuit 48-1 and generates timing signals e60, e70, and e80 at timings of a read access and a write access, respectively. Namely, the timing signal e60 is turned on in case of performing a read access of the memory 704-1 of the processor itself by a read access by the other processor and is turned off by the other access. The timing signal e70 is turned on by the read access of the memory 704-1 by the processor element 702-1 of the processor itself. The timing signal e80 is likewise turned on by the write access of the memory 704-1 by the processor element 702-1 of the processor itself. An address bus 1084 is supplied from the processor element 702-1 to the memory 704-1 through a multiplexer 1082. An address bus 1086 on the bus 12 side is inputted to the multiplexer 1082 from the TMR control circuit 48-1. The multiplexer 1082 receives the timing signal e70 or e80 which is turned on by the read access or write access by the processor element 702-1 of the processor itself from the timing forming unit 1060 through an OR gate 1074, thereby connecting the address bus 1084 from the processor element 702-1 to the memory 704-1. On the other hand, when the timing signal e60 in the case where the timing forming unit 1060 reads the memory 704-1 by the read access from the other processor is ON, since an output of the OR gate 1074 is turned off, the multiplexer 1082 connects the address bus 1086 from the TMR control circuit 48-1 to the memory 704-1. A data bus 1088 from the processor element 702-1 is connected to the memory 704-1 through a multiplexer 1076 and is also connected to the external data bus 12-10 via the TMR control circuit 48-1 from a multiplexer 1078. The multiplexer 1076 selects the data bus 1088 from the processor element 702-1 and a data bus 1090 from the external data bus 12-10 via the TMR control circuit 48-1. That is, when the timing signal e80 is ON by the write access by the processor element 702-1 of the processor itself from the timing forming unit 1060 and the mode is not the wake-up mode, the multiplexer 1076 selects the data bus 1088 from the processor element 702-1 and connects to the memory 704-1. On the other hand, when the timing signal e70 is turned off or the wake-up mode is set by the external access, the data bus 1090 from the TMR control circuit 48-1 side is selected and connected to the memory 704-1. The multiplexer 1078 selects a data bus 1092 from the memory 704-1 to the external data bus 12-10 and the data bus 1088 from the processor element 702-1. The selection control of the multiplexer 1078 is performed by a gate circuit 1070 having an AND gate and an OR gate. A flag signal e55 from the wake-up flag setting circuit 1040-1 and the timing signal e70 by the read access of the processor itself from the timing forming unit 1060 are inputted to the AND gate of the gate circuit 1070. Therefore, the flag signal e55 is in an ON state by the set state of the wake-up mode. In this state, when the timing signal e70 indicative of the read access of the processor itself from the timing forming unit 1060 is turned on, an output of the gate circuit 1070 is turned off, the data bus 1092 from the memory 704-1 is selected, and the read data is transferred to the external data bus 12-10. When the timing signal e60 is turned on by the read access from the other processor from the timing forming unit 1060 irrespective of the wake-up mode, the multiplexer 1078 is switched through the gate circuit 1070 so as to similarly transfer the read data from the memory to the data bus 12-10. A multiplexer 1080 selects the data bus 1092 from the memory 704-1 and the data bus 1090 from the external data bus 12-10 via the TMR control circuit 48-1. The selection control of the multiplexer 1080 is performed by the gate circuit 1072. The gate circuit 1072 is constructed by an NAND gate of two inputs and an inverter. Since the flag signal e55 is ON in the wake-up mode, an output of the inverter of the gate circuit 1072 is turned off. Therefore, an output of the NAND gate is always ON irrespective of the ON/OFF of the timing signal e70 of the read access of the processor itself from the timing forming unit 1060. The multiplexer 1080 selects the data bus 1090 from the external data bus 12-10 and connects to the data bus 1088 of the processor element 702-1. Therefore, in the wake-up mode, the read data from the memory 704-1 is not directly transferred from the multiplexer 1080 to the processor element 702-1 but is transferred from the multiplexer 1078 to the external data bus 12-10. At the same time, the read data is fetched from the multiplexer 1080 side and transferred to the processor element 702-1.

Figure 75A:
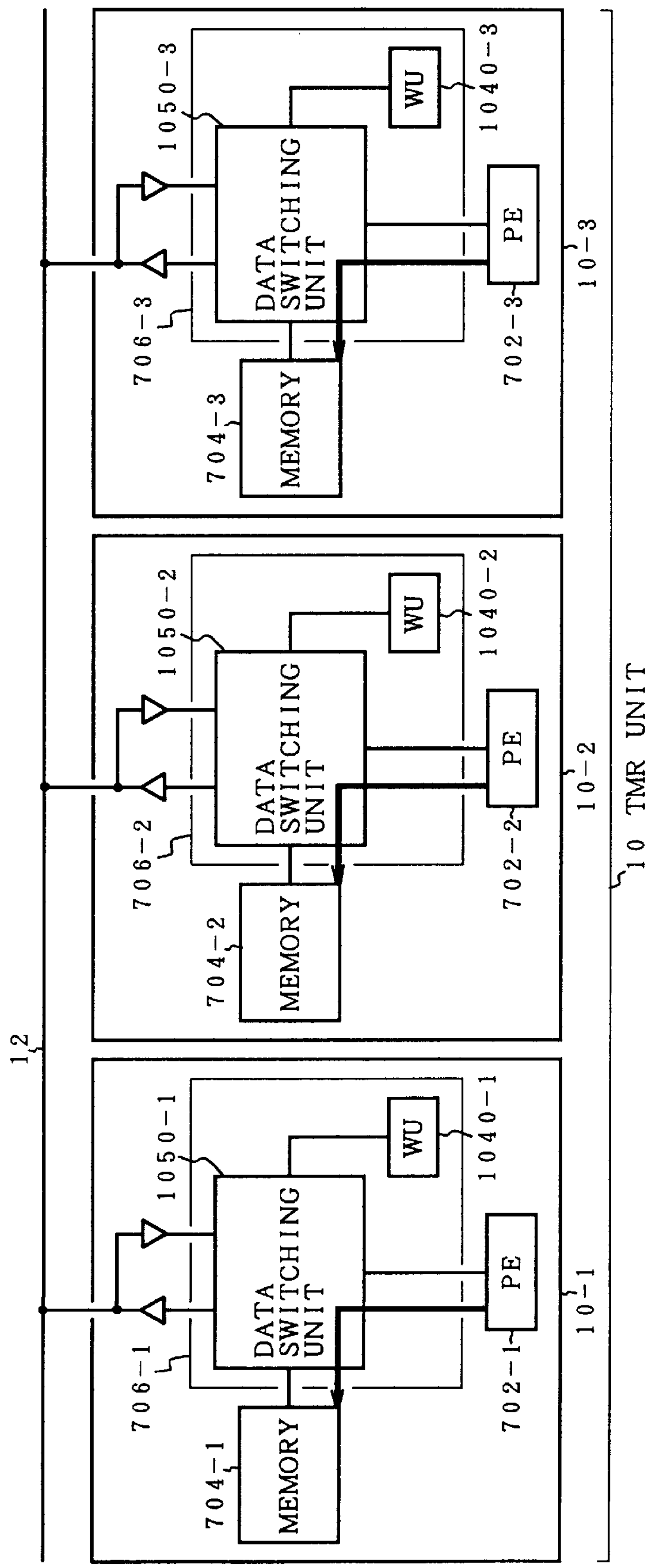
FIGS. 75A and 75B are explanatory diagrams for a read accessing process in the wake-up mode.
Figure 75B:
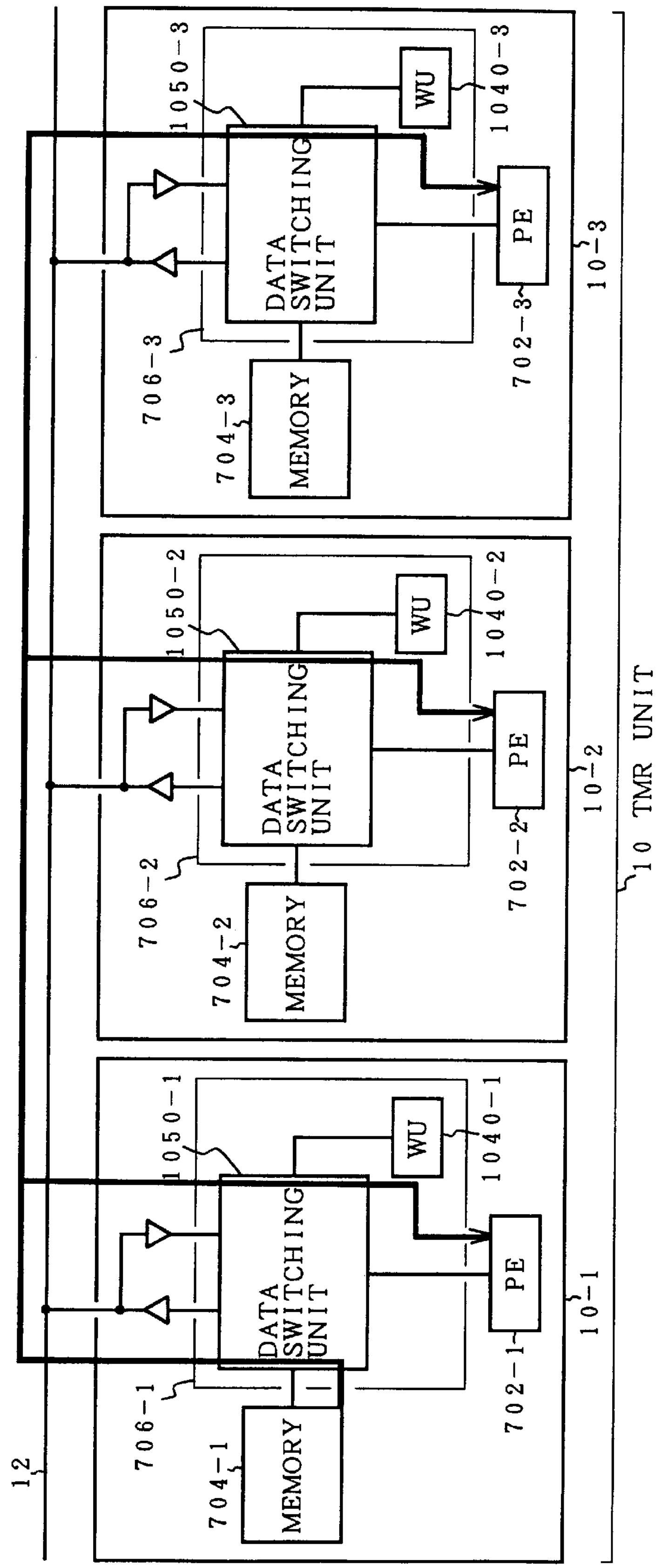

FIGS. 75A and 75B show the read access in the set state of the wake-up mode in a state in which the processors 10-1 to 10-3 are simplified. FIG. 75A shows a state in which the read access for the same memory address occurs simultaneously in processor elements 702-1 to 702-3 of the master processors 10-1 to 10-3. That is, the processor elements 702-1 to 702-3 of the master processors 10-1 and 10-2 and exchange processor 10-3 constructing the TMR unit 10 execute in a lump the read access to memories 704-1 to 704-3 through data switching units 1050-1 to 1050-3 provided for memory control units 706-1 to 706-3. At this time, in wake-up flag setting circuits 1040-1 to 1040-3, flags are set to 1, respectively.

FIG. 75B shows a transfer of the read data subsequent to the read access of the memory. First in the master processor 10-1, by setting the wake-up mode, the data switching unit 1050-1 transfers the read data from the memory 704-1 to the external bus 12 and, at the same time, fetches the read data on the bus 12 and transfers to the processor element 702-1. On the other hand, in the slave processor 10-2 and exchange processor 10-3, the read data from the memories 704-2 and 704-3 are not respectively transferred to the processor elements 702-2 and 702-3 by the data switching units 1050-2 and 1050-3 by the read access of the processor elements 702-2 and 702-3 but are ignored. In place of it, the read data on the bus 12 is fetched and transferred to the processor elements 702-2 and 702-3, respectively. As mentioned above, in the read access in the wake-up mode, the read data from the memory 704-1 of the master processor 10-1 is reflected to the processor elements 702-1 to 702-3 of all of the processors 10-1 to 10-3 via the data bus 12.

Figure 76A:
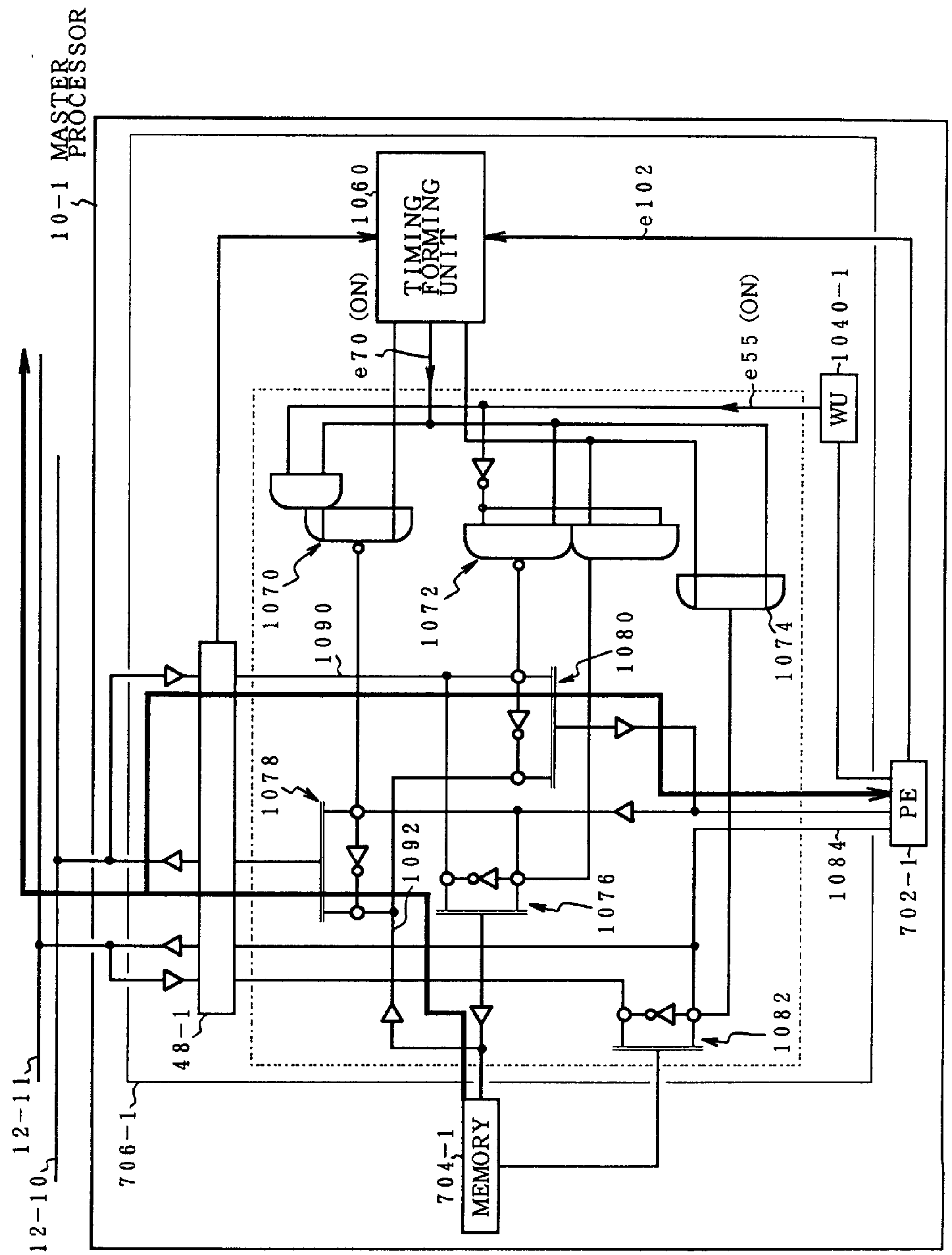
FIGS. 76A and 76B are explanatory diagrams of the circuit operation of a read access in FIGS. 75A and 75B.
Figure 76B:
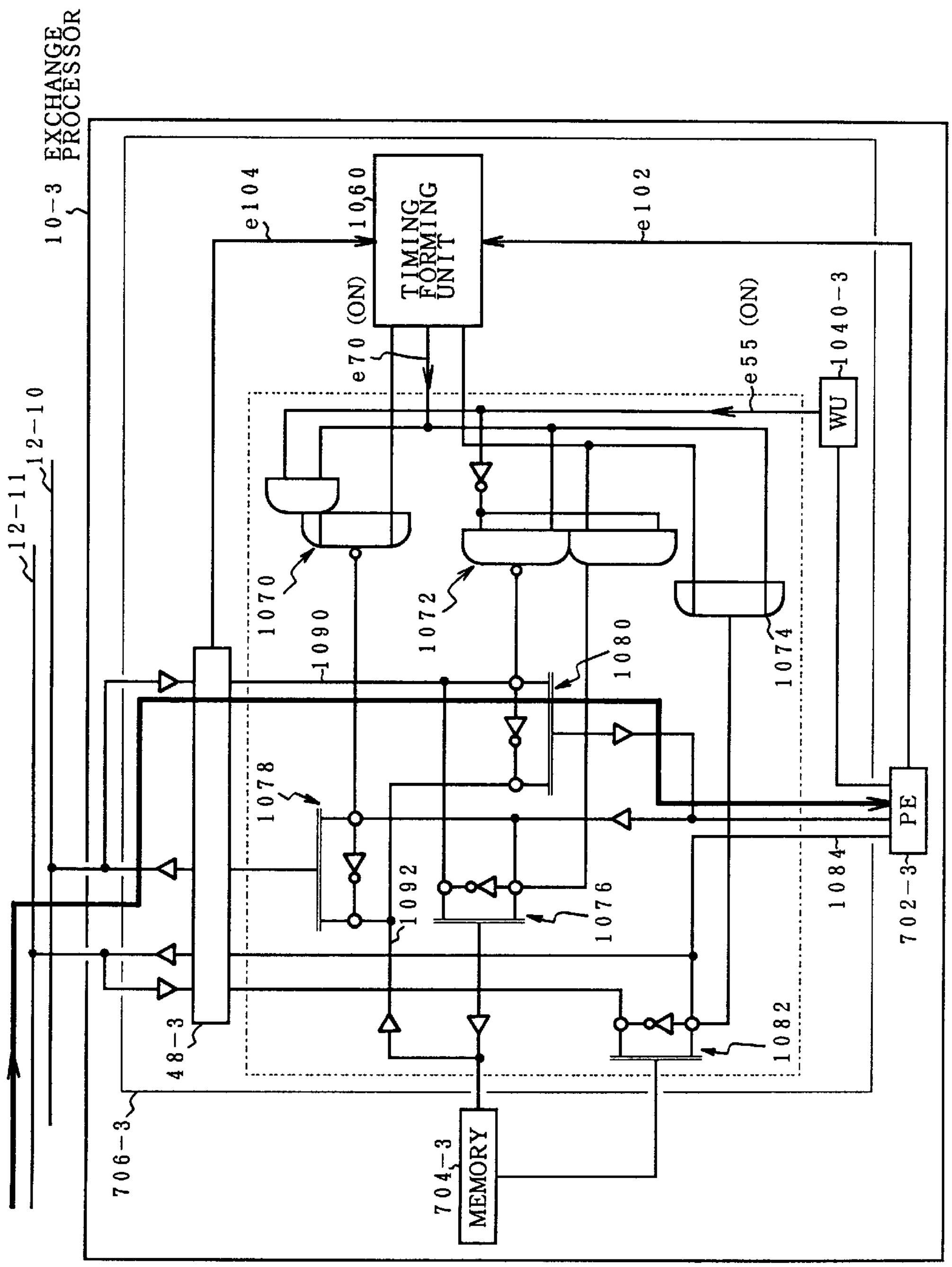

FIGS. 76A and 76B show the processing operation at the time of the read access in FIG. 75A with respect to the same internal construction as the master processor in FIG. 74. FIG. 76A shows the operation of the master processor 10-1. The timing forming unit 1060 turns on the timing signal e70 by the read access from the processor element 702-1. At this time, since the flag signal e55 from the wake-up flag setting circuit 1040-1 is ON, the output of the AND gate of the gate circuit 1070 is turned on and the multiplexer 1078 is switched to the data bus 1092 on the memory 704-1 side through the OR gate. On the other hand, since the output of the gate circuit 1072 is ON by the turn-on of the flag signal e55, the multiplexer 1080 always selects the data bus 1090 from the TMR control circuit 48-1. Further, the multiplexer 1082 selects the address bus 1084 from the processor element 702-1 through the OR gate 1074 by the turn-on of the timing signal e70. The memory 704-1 receives the read address from the processor element 702-1 and outputs the read data. The read data from the memory 704-1 passes from the multiplexer 1078 through the TMR control circuit 48-1 and is transferred to the external data bus 12-10 as shown by an arrow of a bold line. The address data from the processor element 702-1 is also directly transferred to the external address bus 12-11. The read data transferred to the external data bus 12-10 is simultaneously transferred to the processor element 702-1 through the TMR control circuit 48-1 and multiplexer 1080. FIG. 76B shows the operating states of the slave processor 10-2 and exchange processor 10-3 at the time of the read access. Although the operations are substantially the same as that of the master processor 10-1 in FIG. 76A, the data output to the bus 12 is not performed. Therefore, in the exchange processor 10-3, the read data transferred to the data bus 12-10 by the master processor 10-1 is transmitted to the processor element 702-3 through the TMR control circuit 48-3 and multiplexer 1080. Namely, in the exchange processor 10-3, the read data by the read access of the memory 704-3 is ignored. The slave processor 10-2 also executes substantially the same processing operation as that of the exchange processor 10-3 in FIG. 76B.

Figure 77:
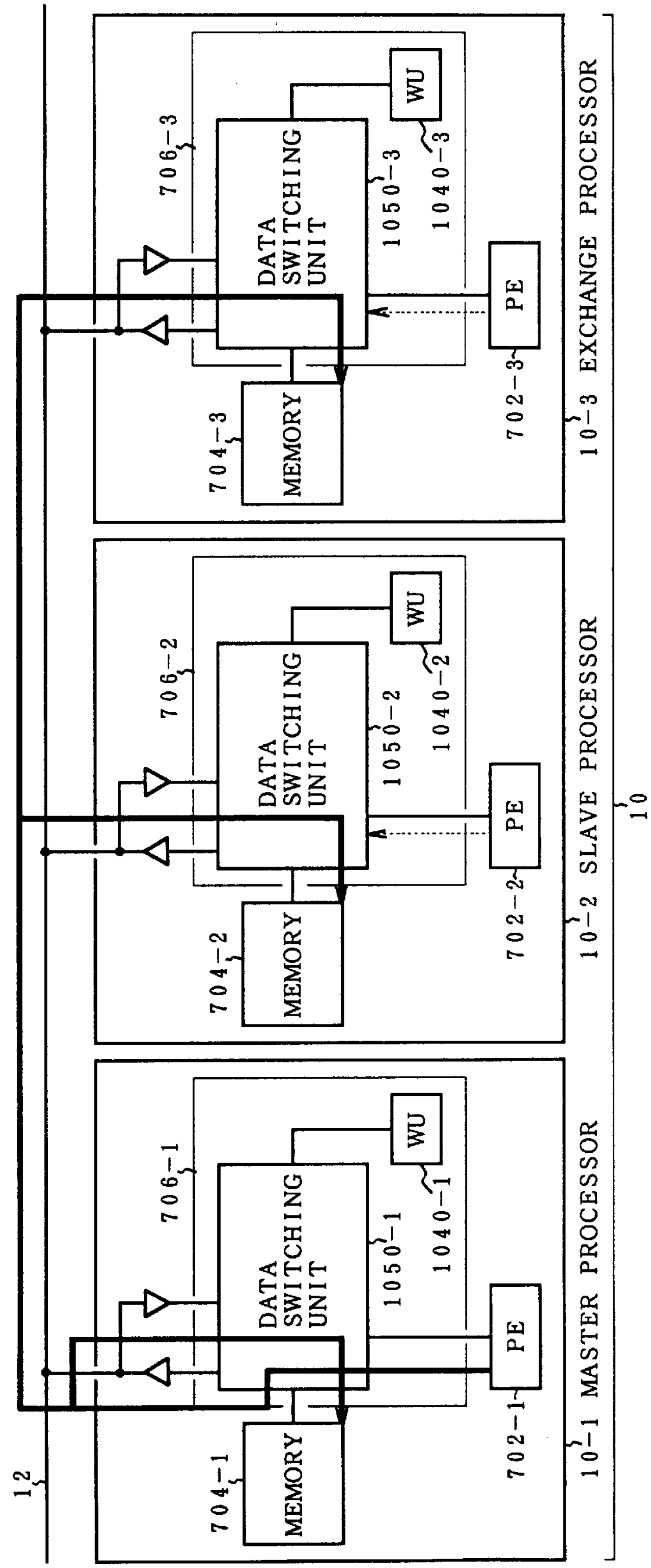
FIG. 77 is an explanatory diagram for a write accessing process in the wake-up mode.

FIG. 77 shows a data transfer at the time of the write access in the set state of the wake-up mode. Ordinarily, after completion of the read access as shown in FIGS. 75A and 75B, as shown in FIG. 77, the processor elements 702-1 to 702-3 of the processors 10-1 to 10-3 ordinarily execute the write access to the memories 704-1 to 704-3. Upon write accessing, the master processor 10-1 transfers the write data to the external bus 12 through the data switching unit 1050-1 and fetches the write data from the bus 12 by the data switching unit 1050-1 and writes into the memory 704-1. In the slave processor 10-2 and exchange processor 10-3, on the other hand, when the write accesses of the processor elements 702-2 and 702-3 are executed, the write data transferred from the master processor 10-1 onto the bus 12 is fetched by the data switching units 1050-2 and 1050-3 and is written into the memories 704-2 and 704-3. That is, in the slave processor 10-2 and exchange processor 10-3, the write data from the processor elements 702-2 and 702-3 of the processor itself is ignored.

Figure 78A:
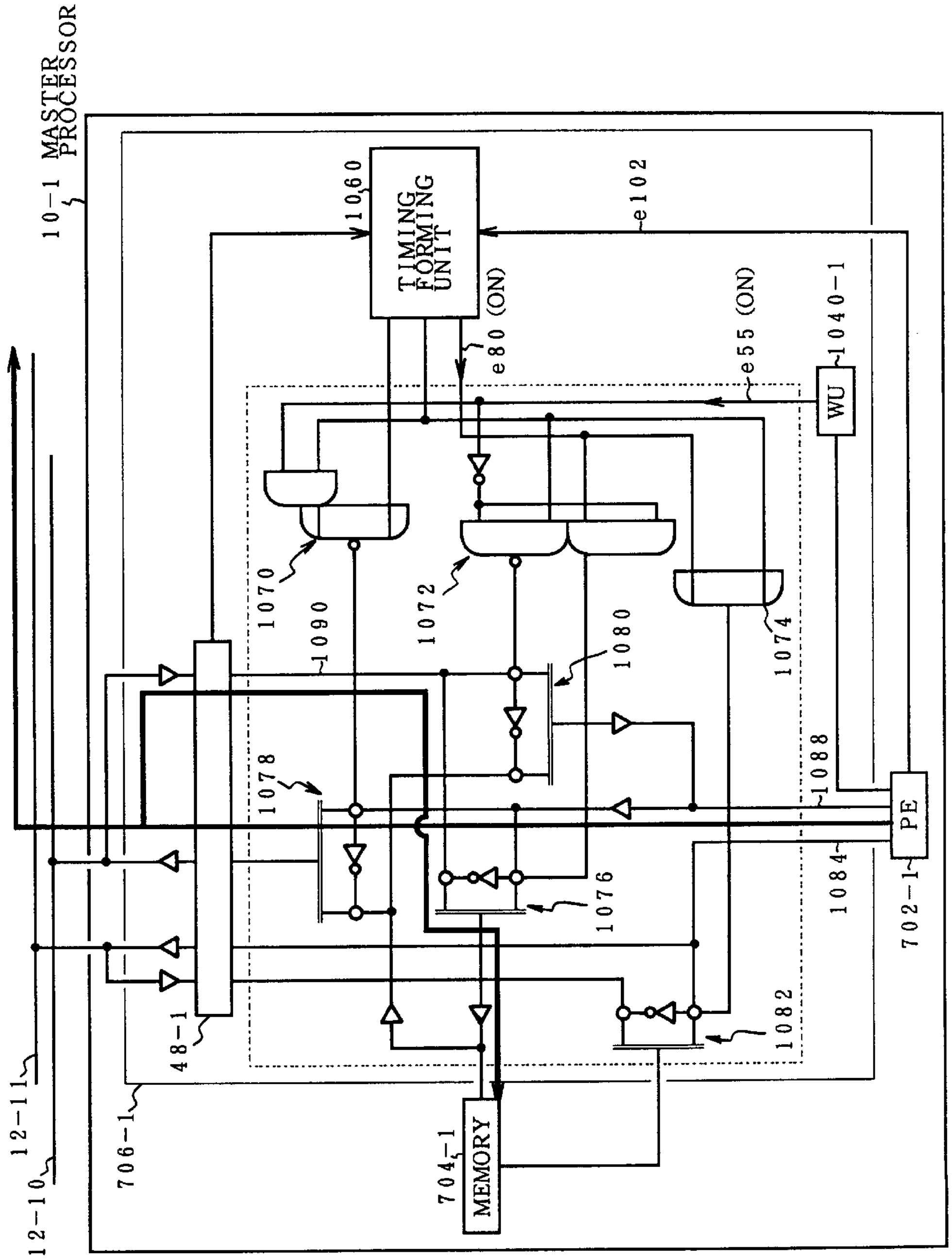
FIGS. 78A and 78B are explanatory diagrams for the circuit operation of a write access in FIG. 75.
Figure 78B:
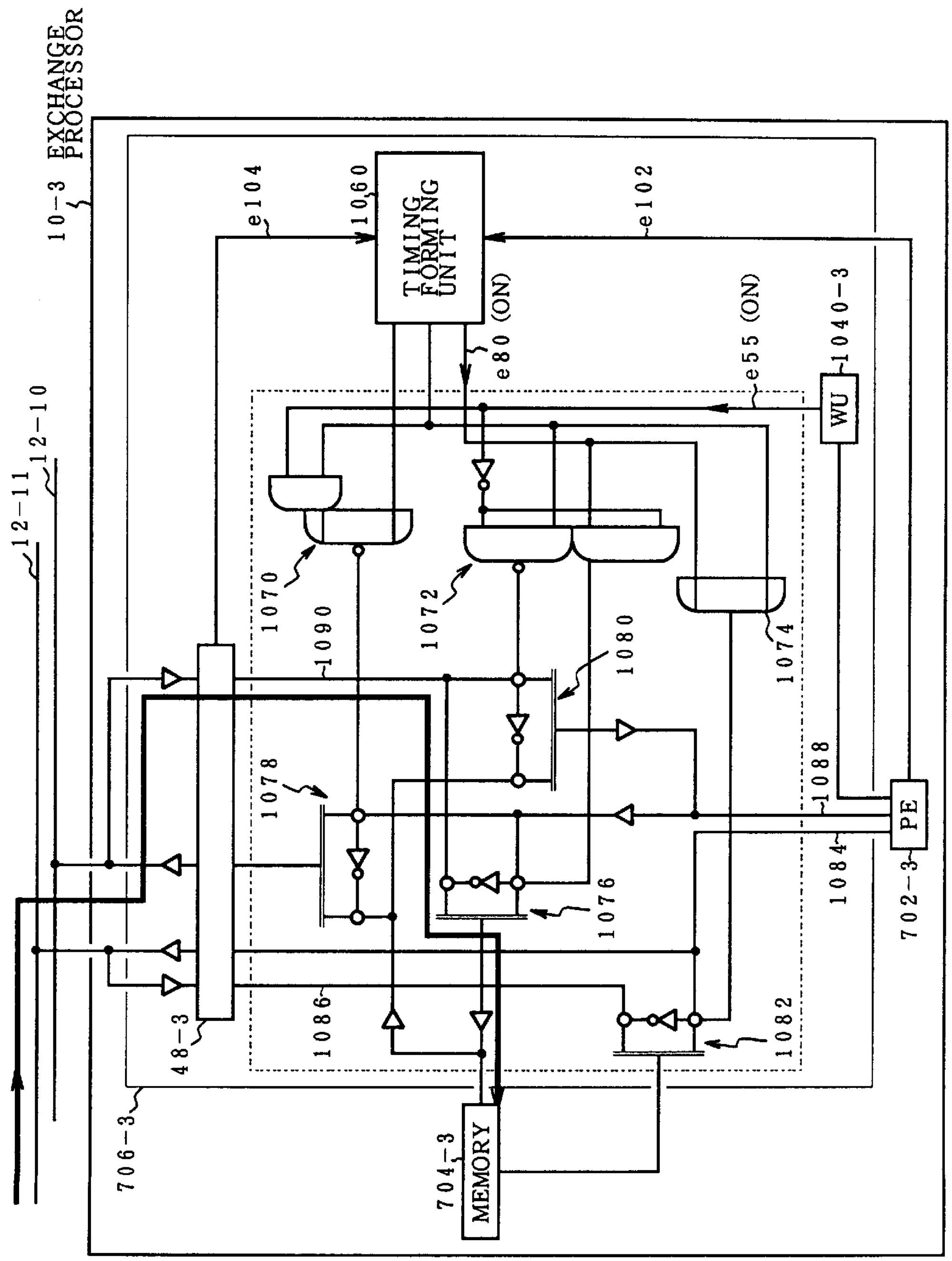

FIGS. 78A and 78B show the details in the processing operations of the master processor 10-1 and exchange processor 10-3 in the write access in FIG. 77. FIG. 78A shows the write access in the set state of the wake-up mode of the master processor 10-1. By receiving the PE access signal el02 in association with the write access of the processor element 702-1, the timing forming unit 1060 turns on the timing signal e80. Therefore, an output of the OR gate 1074 is turned on, the multiplexer 1084 is selected, and the address setting for the memory 704-1 is performed. Since the output of the gate circuit 1070 is simultaneously turned on by the turn-on of the timing signal e80, the multiplexer 1078 selects the data bus 1088 from the processor element 702-1 and connects to the external data bus 12-10 through the TMR control circuit 48-1. Since the wake-up flag is ON, the multiplexer 1076 selects the data bus 1090 through the TMR control circuit 48-1 and the data outputted to the data bus 12-10 is written into the memory 704-1. FIG. 78B shows the write accesses of the slave processor 10-2 and exchange processor 10-3. Although the operations are substantially the same as that of the master processor 10-1 in FIG. 78A, the data output to the bus 12 is not performed.

Figure 79:
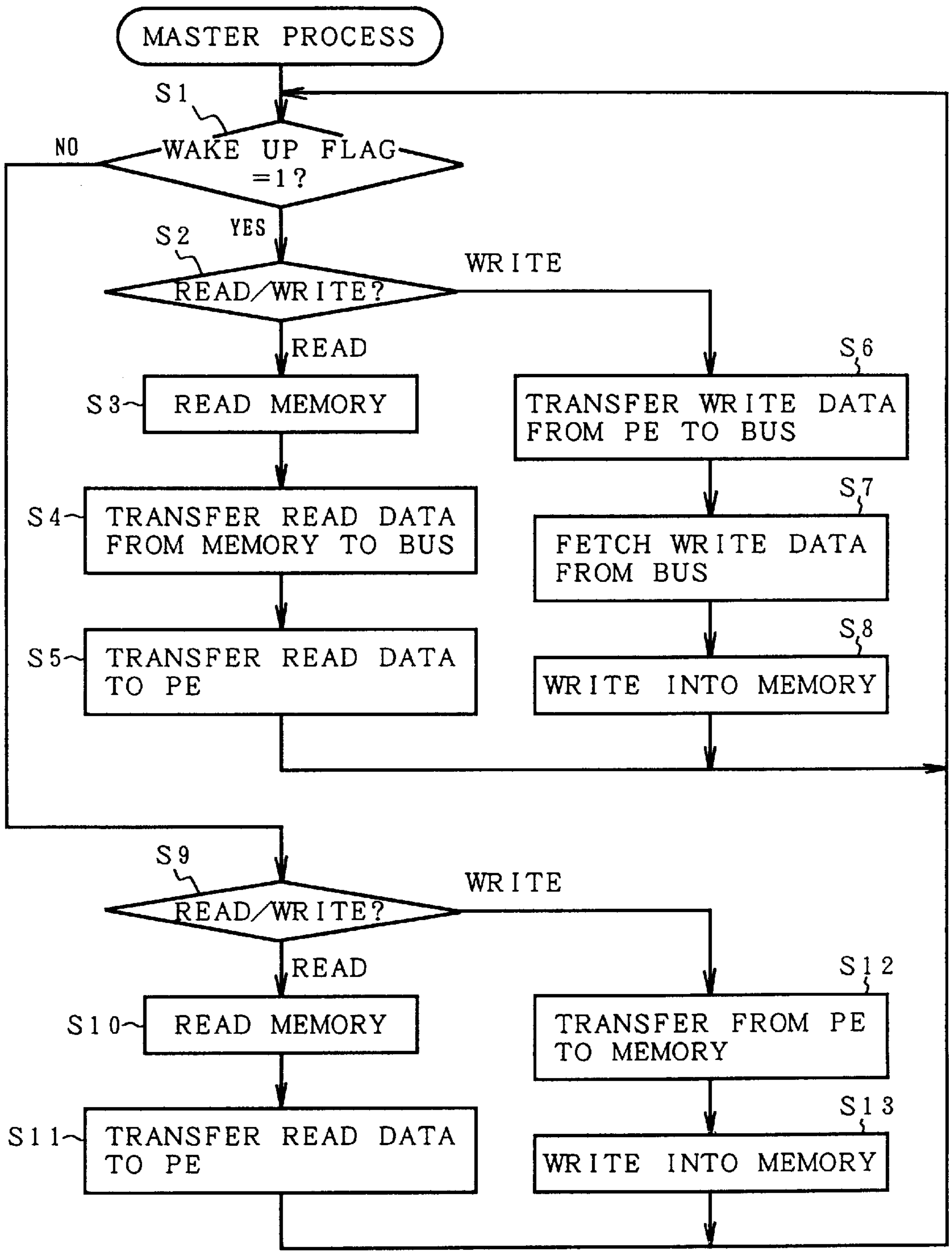
FIG. 79 is a flowchart for a master process due to the presence or absence of the wake-up mode.

Although the embodiment of FIG. 74 relates to the case where the data switching unit 1050 of the hardware construction has been provided for the memory control unit 706-1 as an example, the write access and read access in the wake-up mode can be also performed by the software processes by the processor and the like. FIG. 79 is a flowchart for the write access in the master processor which is executed by the software. First in step S1, a check is made to see if the wake-up flag is equal to 1. When the wake-up flag is equal to 1, step S2 follows and the read access or write access is checked. In case of the read access, the memory is read in step S3. In step S4, the read data is transferred to the bus. In step S5, the read data is fetched from the bus and is transferred to the processor element. When the write access is discriminated in step S2, the write data is transferred from the processor element to the bus in step S6. The write data is fetched from the bus in step S7 and is written into the memory in step S8. For such a wake-up mode set state, at the time of the operation of the multiple construction of the ordinary TMR unit, since the wake-up flag is equal to 0, step S9 follows and the read/write is discriminated. In case of the read access, the memory is read in step S10. The read data is transferred to the processor element in step S11. In case of the write access, the write data is transferred from the processor element to the memory in step S12 and is written into the memory in step S13. Namely, in the ordinary memory access, the read data and write data are not transferred to the external bus. The processes are executed in the processor.

Figure 80:
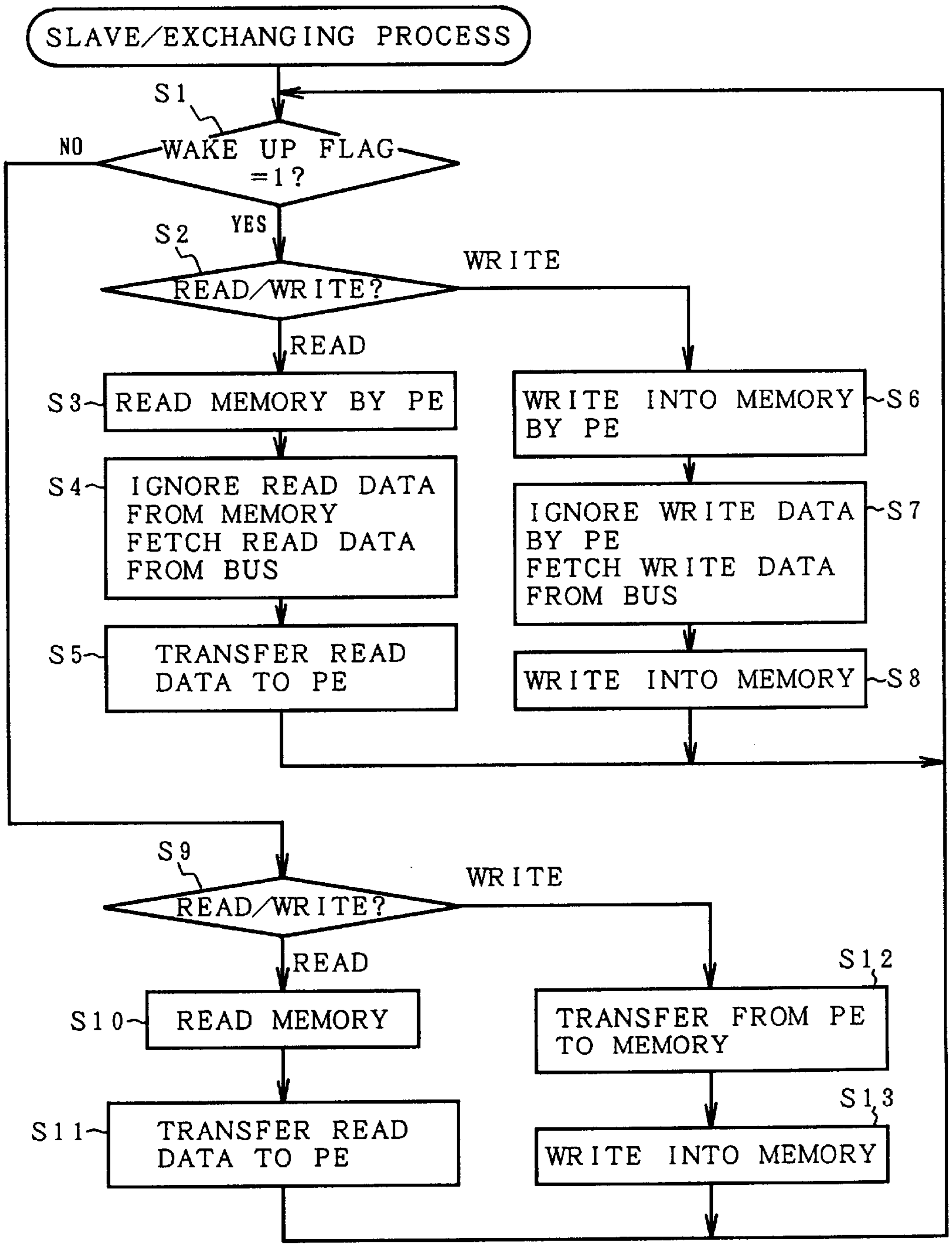
FIG. 80 is a flowchart for slave and exchange processor processes due to the presence or absence of the wake-up mode.

FIG. 80 is a flowchart for the processes of the slave processor or exchange processor corresponding to the master processes in FIG. 79. First in step S1, when it is discriminated that the wake-up flag has been set to 1, a check is made to see if the access is the read access or write access in step S2. In case of the read access, the memory read by the processor element is executed in step S3. In step S4, the read data of the memory is ignored and the read data from the master processor transferred onto the bus is fetched. The read data is transferred to the processor element in step S5.

In case of the write access, the memory write by the processor element is executed in step S6. The write data by the processor element is ignored and the write data transferred from the master processor is fetched onto the bus in step S7. The write data is transferred and written into the memory in step S8. In the ordinary multiplexing operation in which the wake-up flag is turned off to 0, in a manner similar to steps S9 to S13 of the master processor in FIG. 79, the transfer to the processor element by the memory read in the processor and the writing by the memory transfer from the processor element are executed for the read access or write access.

Figure 81A:
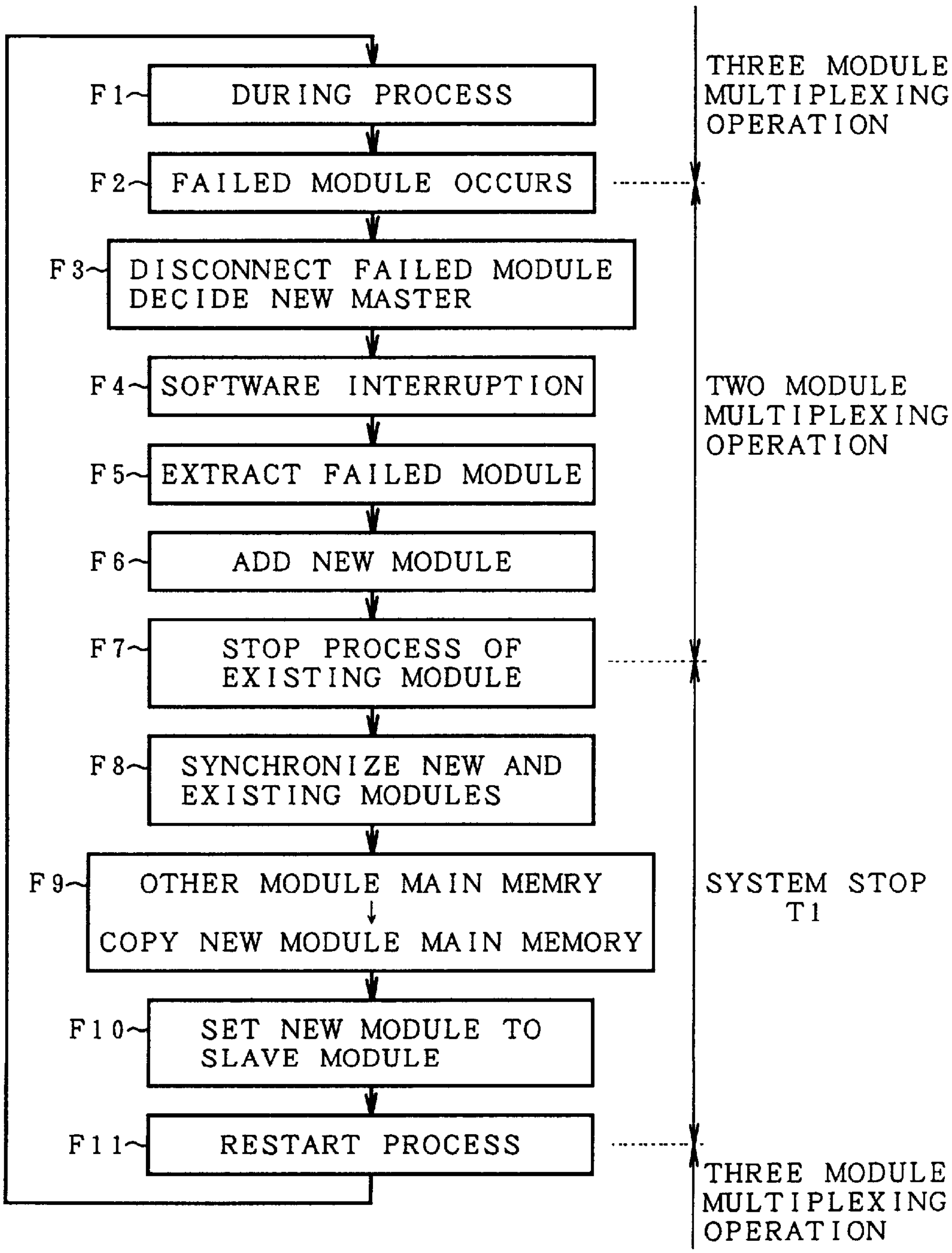
FIGS. 81A and 81B are explanatory diagrams of a comparison of a system stop at the time of the processor exchange due to the presence or absence of the wake-up mode.
Figure 81B:
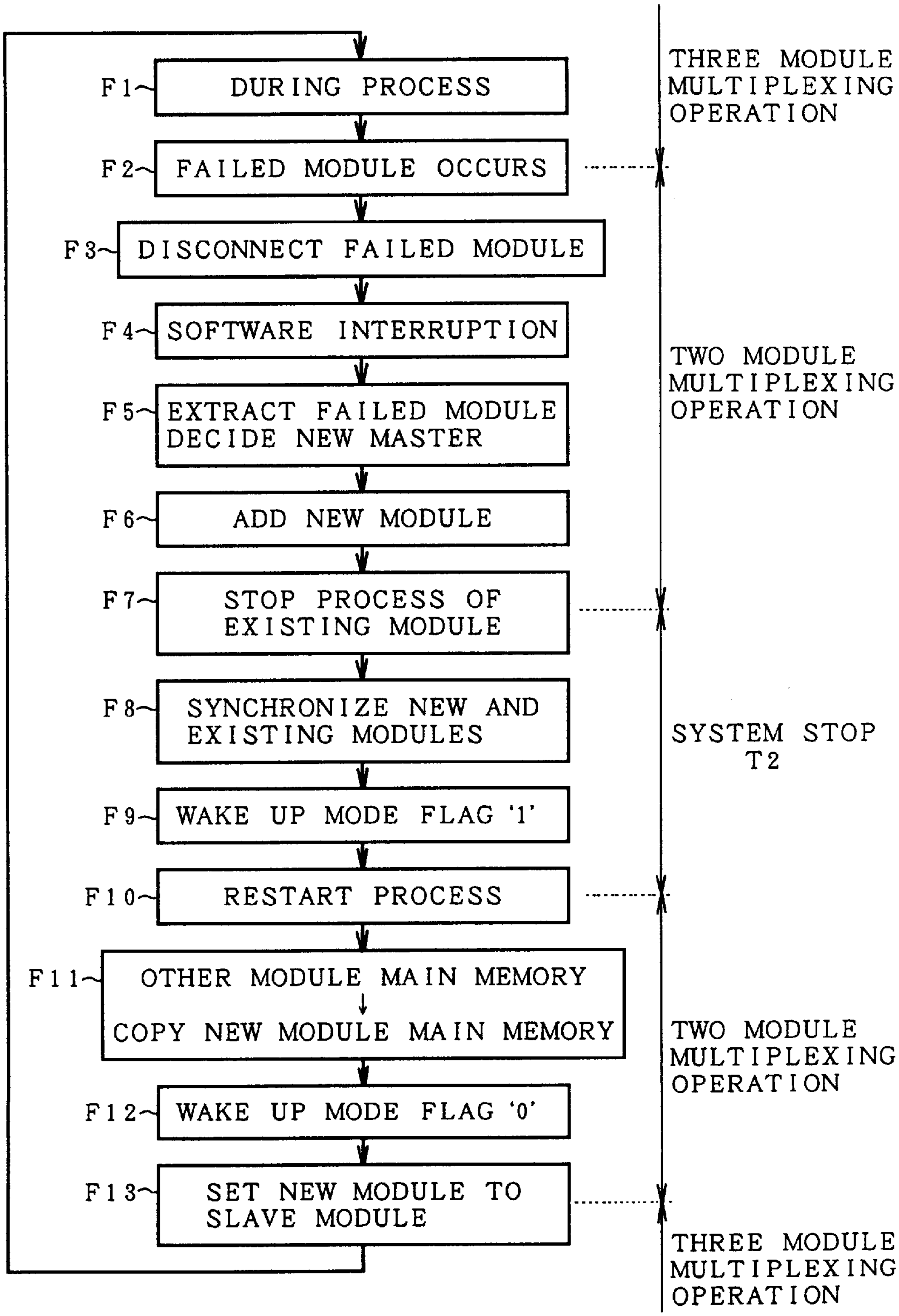

FIGS. 81A and 81B divisionally show processes by the setting of the wake-up mode of the invention and processes when the wake-up mode is not set with respect to the processing phase. FIG. 81A shows the processes in the case where the wake-up mode is not set. First in the ordinary mode, the multiplexing operation by three modules, namely, three processors 10-1 to 10-3 is executed. When a failed module occurs in this state as shown at phase F2, the failed module is disconnected from the TMR unit 10 at phase F3. A new master processor is determined from the remaining normal processors. The multiplexing operation in which the construction is reduced to two modules is executed. When shifting to the multiplexing operation by two modules, the failed module is recognized by the software interruption at phase F4 and the data is outputted to the outside. The operator can recognize the failed module. The operator extracts the failed module as shown at phase F5. A processor exchange to add a new module is executed at phase F6. The processor exchange in this case is an active maintenance such that it is executed while the system is held in the 2-module operating state. If the new module can be added at phase F6, the processes of the 2-module multiplexing operation by the existing modules are once stopped at phase F7. In the system stop state, first, the synchronization of the clock levels between the new module and the existence module is executed as shown at phase F8. Further, the internal state of the new module is set into the internal state of the existence module. Subsequently, the memory copy from the main memory of the existence module to the main memory of the new module is executed at phase F9. At the stage of the memory copy, the multiplexing operation is not activated. This is because if the multiplexing operation is activated, the memory of the copy source is rewritten during the copying operation and the contents in the memories of the existence module and new module don't coincide. After completion of the memory copy, the memory contents are allocated to the slave modules of the TMR unit at phase F10 and the TMR unit is reconstructed with respect to the three processors as targets. The system stop is cancelled at phase F11 and the processes by the 3-module multiplexing operation is restarted. In the case where the system doesn't have the wake-up mode of the invention as mentioned above, it is necessary to stop the system for a T1 time from the stop of the processes of the 2-module multiplexing operation by the existence module at phase F7 to the synchronization at phase F8, memory copy at phase F9, and reconstruction of three modules at phase F10. On the other hand, in the case where the set state of the wake-up mode of the invention is enabled, the processing routine is as shown in FIG. 81B. In FIG. 81B, the contents at phases F1 to F7 are substantially the same as those in FIG. 81A. At phase F7, when the processes of the existence module by the 2-module multiplexing operation are stopped on the basis of the exchange and addition of the new module, the synchronization of the clock levels between the existence module and the new module and the setting of the internal state are executed at phase F8. After that, the mode flag to set the wake-up mode is turned on to 1 at phase F9. Subsequently, at phase F10, the processes are restarted without finishing the memory copy. In the restart of the processes, the 2-module multiplexing operation by the existence module is restarted. In the invention, therefore, the system is stopped for only a short time T2 from the stop of the processes of the existence module at phase F7 to the setting of the wake-up mode at phase F9. When the processes are restarted at phase F10, the memory copy from the main memory of the existence module to the main memory of the new module is executed at phase F11. Even if the main memory is rewritten by the 2-module multiplexing operation at the time of the memory copy, the access data in association with the rewriting of the main memory is transferred from the master processor to the external bus and is reflected to the main memories of the slave processors and exchange processor. The memory contents of the copy source and the copy destination are always made coincide. Therefore, there is no need to stop the system for a period of time of the memory copy of the new module and the 2-module multiplexing operation can be continued. After completion of the memory copy at phase F11, the flag of the wake-up mode is turned off to 0 at phase F12. On the basis of the turn-off of the flag, the new module is returned to the TMR unit at phase F13, the TMR unit by three modules is reconstructed, and the processes of the 3-module multiplexing operation is restarted. The memory copy process for the exchange processor in the set state of the wake-up mode can be also executed by the processor element of the master processor 10-1, in order to reduce a burden on the processor element, a system adapter only for use of the memory copy is provided for the bus 12 and the system adapter side can also perform the access of the memory copy from the master processor to the exchange processor by an instruction of the memory copy from the master processor 10-1.

[Directory memory]

Figure 82:
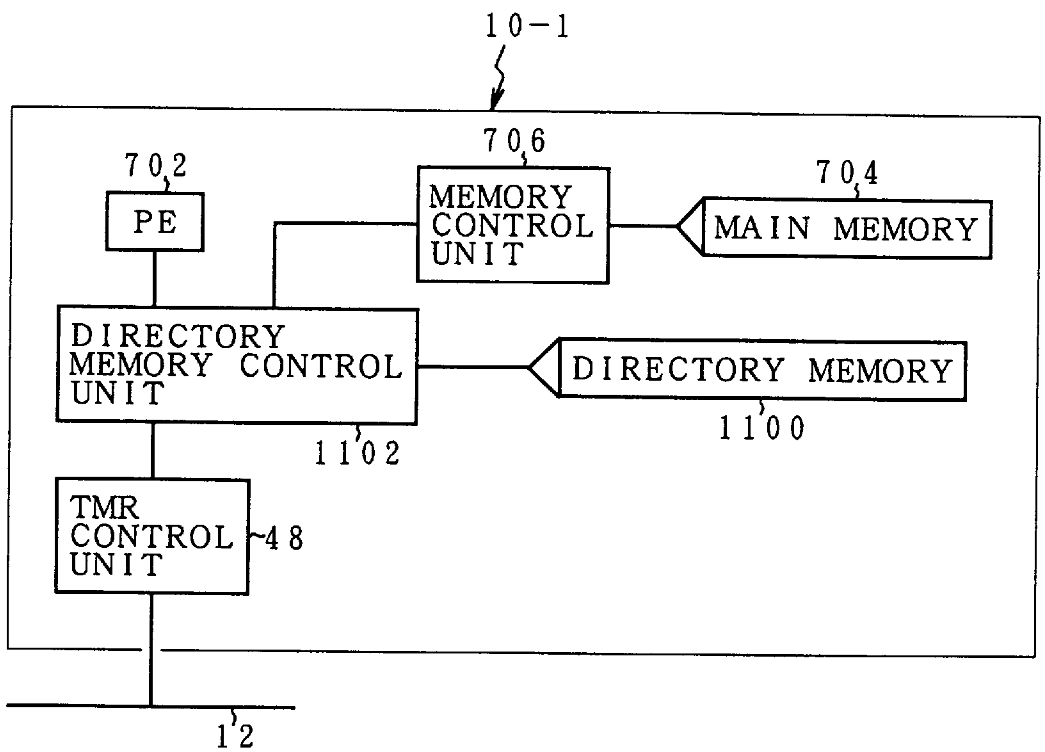
FIG. 82 is a block diagram of a processor having a directory memory.

FIG. 82 shows the processor 10-1 which is used for the TMR unit of the invention and a directory system is used for the access of the main memory. A processor element 702 is provided for the processor 10-1. The processor element 702 is constructed by a CPU and a cache mechanism. As a processor element 702, it is also possible to use a multi-CPU construction having a plurality of CPUs with caches. A main memory 704 as a main memory is provided for the processor element 702 through a memory control unit 706. The main memory 704 is managed by the directory system. To realize the directory system, a directory memory control unit 1102 and a directory memory 1100 are provided. The directory memory control unit 1102 is further connected to the external bus (common bus) 12 through the TMR control circuit 48 which has been clarified in the embodiment so far. The main memory 704 is divided on a unit basis of a predetermined block, for example, on a 64-byte unit basis and directory information indicating in which state the memory block is in the processor 10-1 is held in the directory memory 1100 by using the address of the memory block as an entry. As memory block states as directory information which is held in the directory memory 1100, for example, there are a "shared" state, a "dirty" state, an "invalid" state, and the like. The "shared" state denotes a state in which the same data as the memory block in the main memory 704 is held in caches of one or a plurality of processor elements 702. The "dirty" state denotes a state in which the newest data which is held in the cache of the processor element 702 and the contents in the main memory 704 are different. Further, the "invalid" state denotes a state in which the data in the main memory 704 is newest and the same data doesn't exist in the cache of any processor element. In the TMR unit constructing the information processor of a high reliability of the invention, when a failure occurs in a specific processor during the multiplexing operation, the failed processor is disconnected from the TMR unit, thereby reconstructing a TMR unit by the remaining processors which are normally operating. The processor disconnected from the TMR unit by the failure is exchanged to the new processor by the operator. When the failed processor is exchanged to the new processor, in order to return the exchange processor to the TMR unit, it is necessary to invalidate all of the entries in the directory memory 1100. In the invalidating process, since the processor element 702 executes a writing process for all of the entries in the directory memory 1100, the system is stopped for a period of time of the invalidating operation. It is desirable that such a system stop time is as short as possible. In the invention, therefore, the invalidation of the directory memory 1100 can be instantaneously executed in a very short time.

Figure 83:
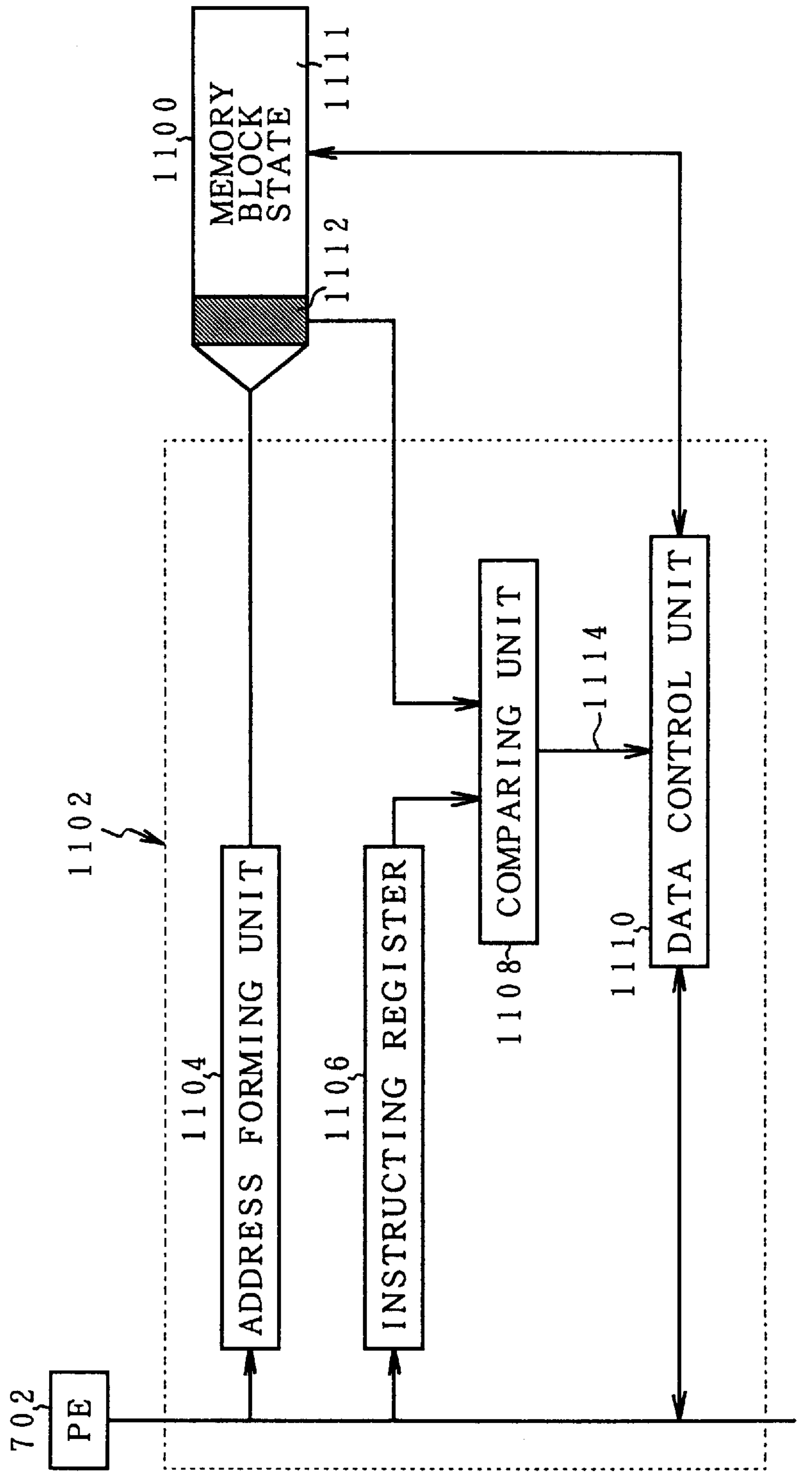
FIG. 83 is a block diagram of a directory memory control unit for performing an invalidation.

FIG. 83 is a block diagram of the directory memory control unit 1102 in FIG. 82. The directory memory 1100 can be instantaneously invalidated by only a change of a simple register instruction value by the processor element. An address forming unit 1104, an instructing register 1106, a comparing unit 1108, and a data control unit 1110 are provided for the directory memory control unit 1102. The directory information has been stored in the directory memory 1100 every entry obtained by dividing the main memory 704 on a predetermined block unit basis. Each directory information is constructed by a specific bit 1112 shown as a hatched portion in the diagram and a memory block state 1111. At the time of an initializing process by turning on a power source of the system, a specific value α, for example, a bit value of (α=0) is written every entry into the specific bit 1112 in the directory memory 1100. At the time of the initializing process upon activation of the system, a code indicative of an initial state, for example, (all 0) has been written in the memory block state field 1111. The same value as the bit value α written in the specific bit 1112 in the directory memory 1100, for example, α=0 has been written in the instructing register 1106 when system is activated. Therefore, in an operating state after the activation by the turn-on of the power source of the system, the value in the instructing register 1106 and the value of the specific bit 1112 in the directory memory 1100 always coincide. In the operating state as a TMR unit, the access address for the main memory 704 from the processor element 702 is set into the address forming unit 1104. The directory information of the corresponding entry is read by the read access of the directory memory 1100. In the reading operation of the directory information, the value of the specific bit 1112 is sent to the comparing unit 1108 and is compared with the value in the instructing register 1106. At this time, both of the value in the instructing register 1106 and the value of the specific bit 1112 are equal to α and the comparing unit 1108 generates a coincidence output. In this case, an invalidating instruction 1114 from the comparing unit 1108 is turned off. Therefore, the data control unit 1110 makes the memory block state 1111 which was read out from the directory memory 1100 valid and executes the access of the main memory 704 according to the "shared", "dirty", or "invalid" state shown in the memory block state 1111 or the cache access of the processor element 702. In the case where the invalidation of the directory memory 1100 is necessary due to the processor exchange or the like during the operation, the value α in the instructing register 1106 is changed to another value β, for example, β=1 by an instruction of the processor element 702. An address formation of all entries in the directory memory 1100 is designated for the address forming unit 1104, thereby allowing the invalidating process to be executed. Namely, each time the address forming unit 1104 designates the address serving as an entry in the directory memory 1100, the specific bit 1112 is read out and is compared by the comparing unit 1108. At this time, although the value of the specific bit 1112 is equal to α, the value in the instructing register 1106 has been changed to β for the invalidating operation. Since the comparing unit 1108 judges that those values don't coincide, the invalidating instruction 1114 is turned on. The data control unit 1110 which received the invalidating instruction 1114 changes the value to a value indicative of the "invalid" state, namely, the same value of (all 0) as that upon initialization irrespective of the memory block state 1111 of the directory memory 1100. By such an address designation for the directory memory 1100 by the directory memory control unit 1102 as mentioned above, the invalidating process can be completed at a high speed without needing the intervention of the processor element 702 in a range from the head address to the last address.

Figure 84:
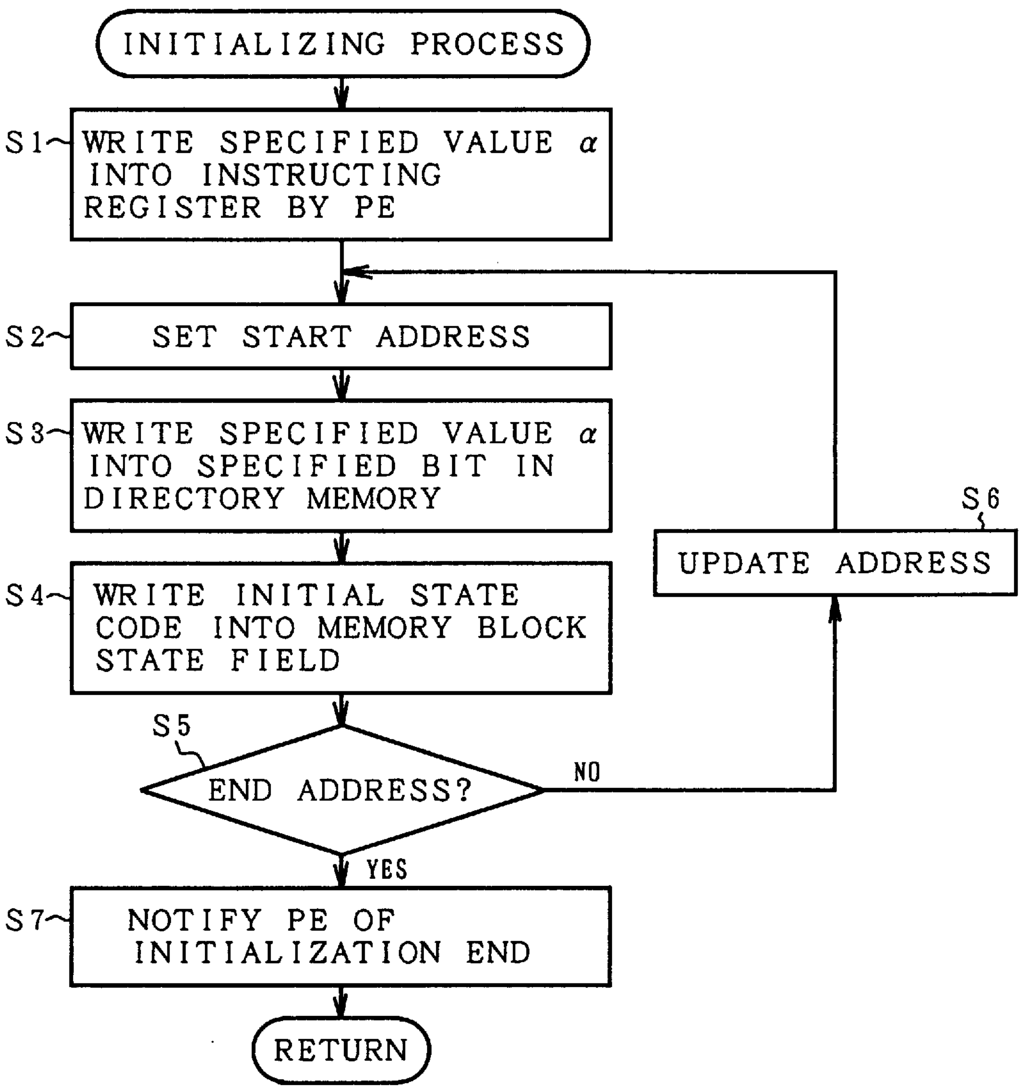

A flowchart of FIG. 84 relates to the initializing process of the directory memory 1100 upon activation by the turn-on of the power source of the system in the processor 10-1 in FIG. 82. In the initializing process, in step S1, the processor element writes the specific value α into the instructing register. In step S2, a start address is set into the address forming unit 1104. In step S3, the same specific value α as the value set in the instructing register 1106 is written into the specific bit 1112 in the directory memory 1100. In step S4, an initial state code is written into the memory block state field 1111. After completion of the initialization of one entry, a check is made in step S5 to see if the address is the end address. If NO, the address is updated in step S6 and the same processes as those mentioned above are repeated. In case of the end address, the end of the initialization is notified to the processor element 702 in step S7.

Figure 85:
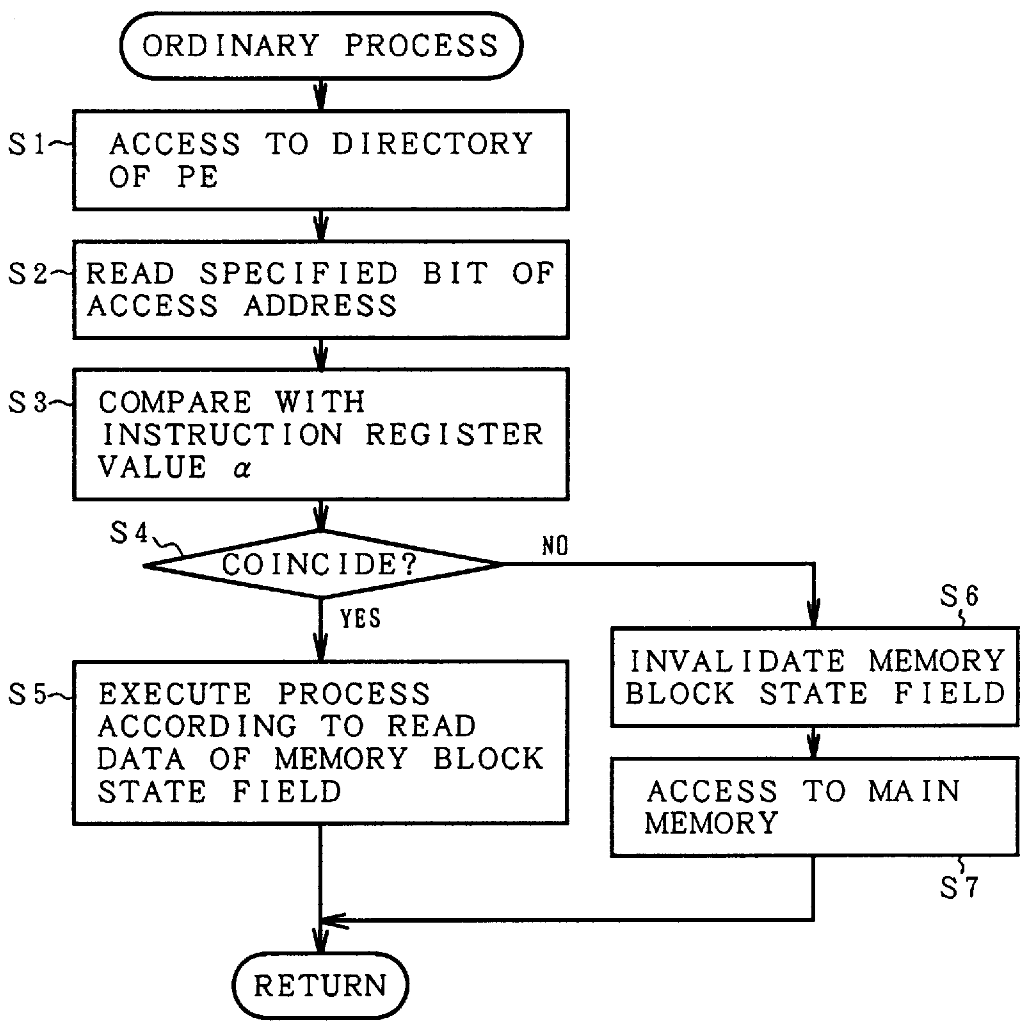
FIG. 85 is an ordinary flowchart for the directory memory during the operation.

A flowchart of FIG. 85 shows the processes in the ordinary operating state. In step S1, when there is an access to the directory memory control unit 1102 in association with the access of the main memory 704 from the processor element 702, the access address is designated by the address forming unit 1104, the directory memory 1100 is read, and the value of the specific bit 1112 is captured. In step S3, the value is compared with the value in the instructing register 1106 by the comparing unit 1108. When the coincidence of those values is discriminated in step S4, step S5 follows. The memory state block field 1111 in the directory memory 1100 is made valid. The processes according to the read data are executed. When they don't coincide by the comparing unit 1108, the invalidation instructing unit 1114 is turned on. In step S6, the invalidating process of the memory block state field 1111 in the directory memory 1100 is executed. In this case, the main memory 704 is accessed in accordance with the "invalid" state in step S7.

Figure 86:
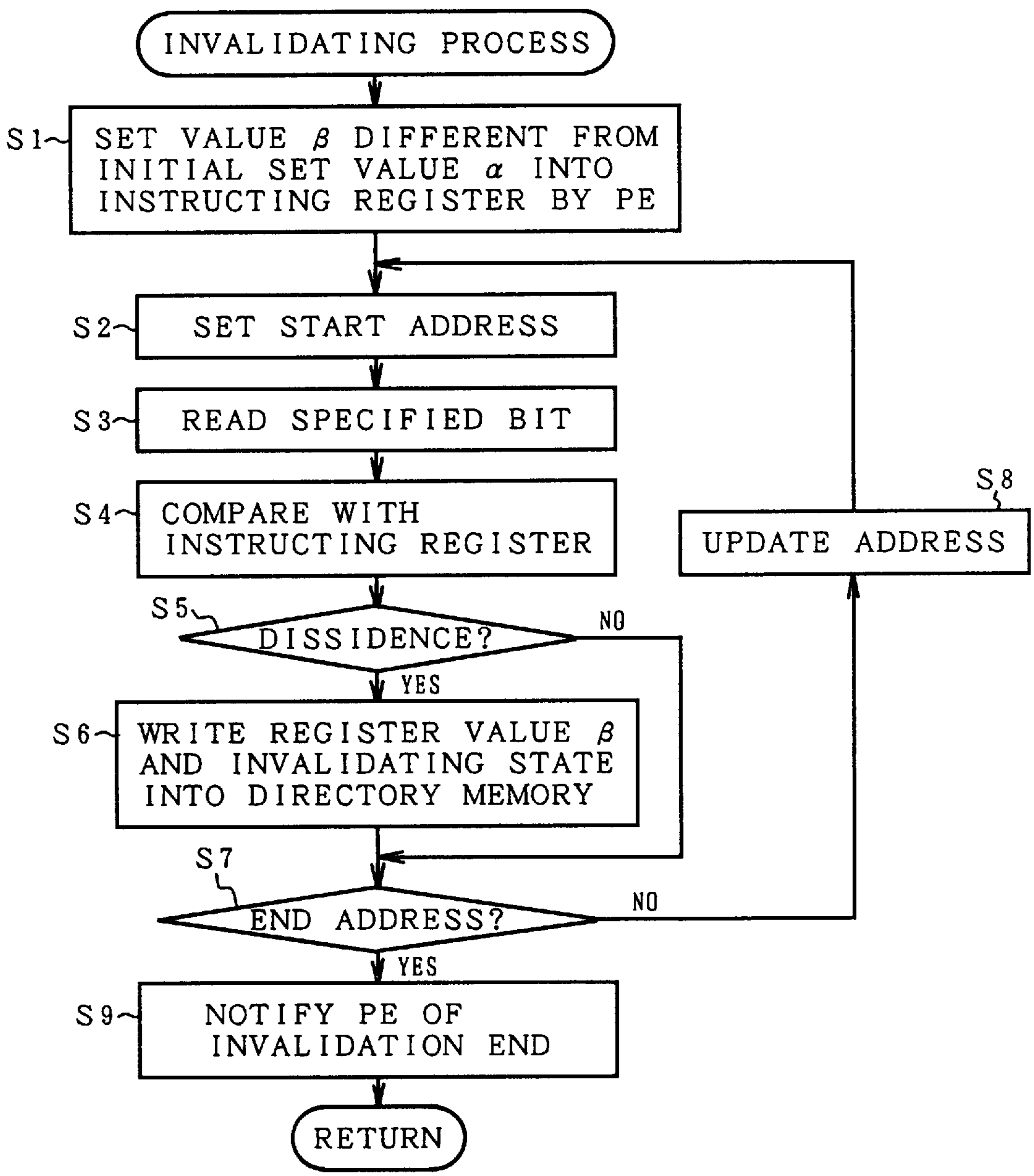
FIG. 86 is a flowchart for an invalidating process of the directory memory during the operation.

A flowchart of FIG. 86 shows the invalidating process during the operation of the directory memory control unit 1102 in FIG. 83. First in step S1, the processor element 702 sets the value β different from the initialization set value α into the instructing register 1106. In step S2, a start address of the directory memory 1100 is set by the address forming unit 1104. In step S3, the specific bit 1112 of the entry designated by the start address is read. The value of the specific bit 1112 is compared with the value in the instructing register 1106 by the comparing unit 1108 in step S4. In this case, since the comparison result by the comparing unit 1108 certainly indicates the dissidence, it is discriminated in step S5. Step S6 follows and the value β in the instructing register 1106 is written into the specific bit 1112 in the directory memory 1100 and, at the same time, the value showing the "invalid" state is written into the memory block state field 1111. In step S7, a check is made to see if the address is the end address. If NO, the address is updated in step S8 and the next entry is accessed. In case of the end address, the end of the invalidation is notified to the processor element 702 in step S9. In response to such a notification, the processor element 702 is shifted to, for example, the operating state in which the TMR unit is reconstructed. By such an invalidating process of the first time as mentioned above, the specific bit 1112 of all of the entries in the directory memory 1100 is changed to the value β in the instructing register 1106 which was changed upon invalidation.

Figure 87:
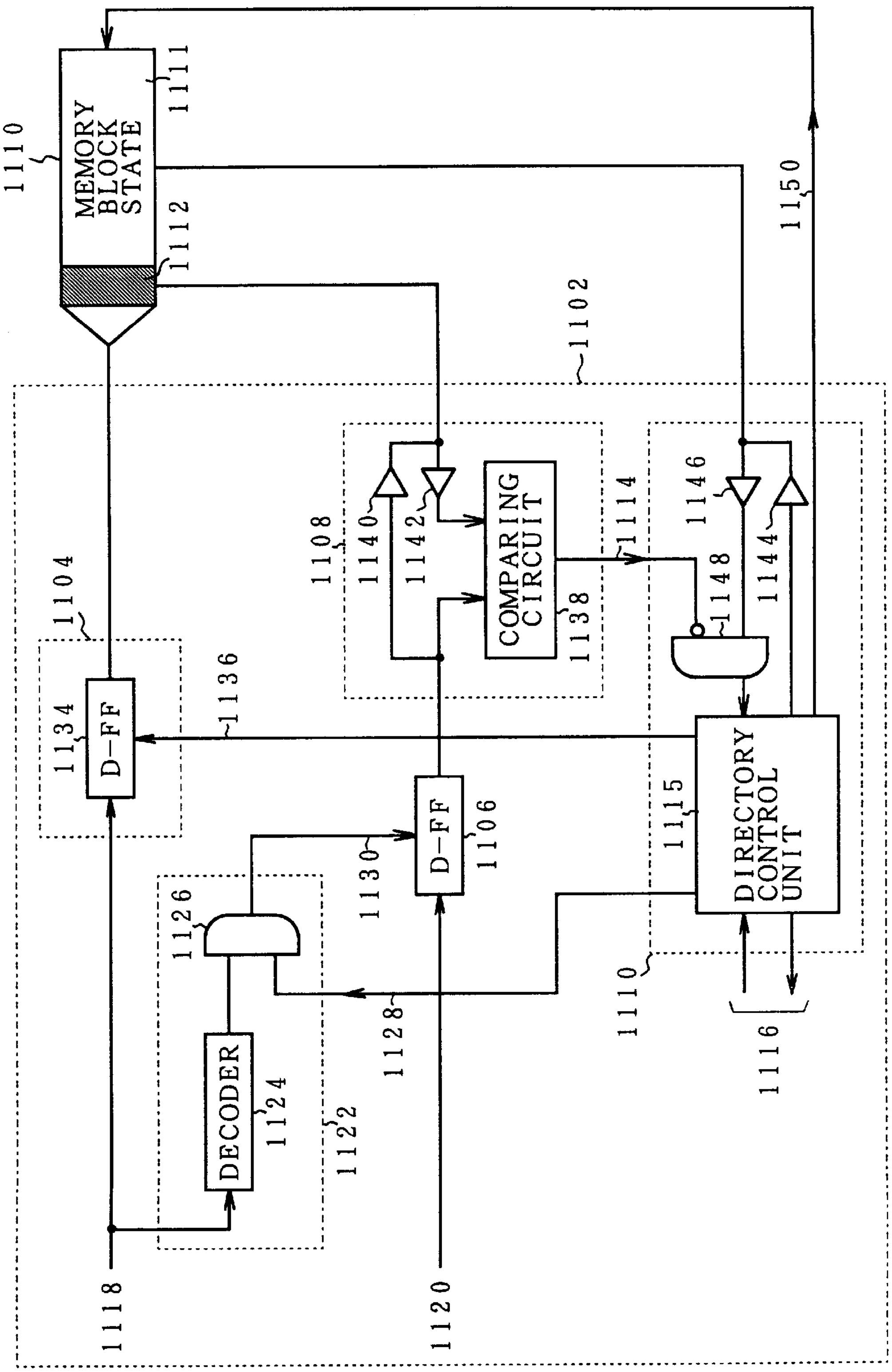
FIG. 87 is a circuit block diagram of a directory memory control unit in FIG. 83.

FIG. 87 is a block diagram in which the directory memory control unit 1102 in FIG. 83 is constructed by a logic circuit. A directory control unit 1115 is provided for the data control unit 1110, thereby performing the transmission and reception of access information 1116 to/from the processor element 702. In the ordinary operation, when the access to the main memory is performed, the access information 1116 is inputted to the directory control unit 1115. An address 1118 of the memory access is held in a D-FF 1134 provided for the address forming unit 1104 by an address holding instruction 1136 which is turned on at a predetermined timing. At the same time, the directory control unit 1115 outputs a memory control signal 1150 and updates the memory block state field 1111 on the basis of the access information. Subsequently, in order to enable the invalidating process during the operation of the invention, at the time of the initialization just after the power source was turned on, the processor element 702 clears the main memory 704, so that the (all 0) is set into the memory block state field 1111 in the directory memory 1110 with respect to all of the entries. At this time, the same value α as that of the D-FF constructing the instructing register 1106, for example, (α=bit 0) is set into the specific bit 1112 of all of the entries in the directory memory 1110. The specific value α is also supplied to the instructing register 1106 as data 1120 from the processor element upon initialization just after the turn-on of the power source. The instructing register 1106 holds the specific value α by the turn-on of a register setting instruction 1130 from a register decoding unit 1122 comprising a decoder 1124 and an AND gate 1126 at a predetermined timing. The register setting instruction 1130 is also executed synchronously with the turn-on of a register writing instruction 1128 from the directory control unit 1115. In case of invalidating the directory memory 1110 in association with the processor exchange or the like during the operation, the processor element writes the different value β, for example, (β=bit 1) into the instructing register 1106. That is, the directory control unit 1115 which received the access information 1116 from the processor element turns on the register writing instruction 1128. The address 1118 and data 1120 are supplied from the processor element at the timing of the turn-on of the register writing instruction 1128. A register write is recognized by the decoder 1124. The register setting instruction 1130 is turned on. The different value β given as data 1120 is set into the instructing register 1106. Subsequently, the processor element sequentially generates the access information 1116 and address 1118 to invalidate the directory memory 1110 from the head address. Therefore, each time the address forming unit 1104 holds the access address of the directory memory 1110, the reading operation of the directory memory 1110 by the memory control signal 1150 from the directory control unit 1115 is executed. The data transfer to the directory control unit 1115 from the directory memory 1110 is executed by a write data transfer by a driver 1144 and by a read data transfer by a driver 1146. At this time, the specific bit 1112 in the directory memory 1110 is inputted to the comparing unit 1108. The comparing unit 1108 is constructed by a driver 1140 for writing, a driver 1142 for reading, and a comparing circuit 1138. The read data of the specific bit 1112 is sent to the comparing circuit 1138 through the driver 1142 and is compared with the value in the instructing register 1106 which was changed to β at this time. Since the value of the specific bit 1112 is equal to the specific value α which was written upon initialization by the turn-on of the power source, they don't coincide. The invalidating instruction 1114 which is outputted from the comparing circuit 1138 is turned on. An AND gate 1148 is set into an inhibition state by the turn-on of the invalidating instruction 1114. The read data from the memory block state field 1111 in the directory memory 1110 is not supplied to the directory control unit 1115. The memory block state field 1111 is invalidated. The directory control unit 1115 is set into an inhibition state by the turn-on of the invalidating instruction 1114. The data obtained from the AND gate 1148 is regarded as read data of the memory state field 1111. The directory control unit 1115 executes an updating process for writing back such read data to the memory state field 1111 through the driver 1144. Thus, the memory block state field 1111 is rewritten to, for example, "all 0" indicative of the "invalid" state.

Figure 88:
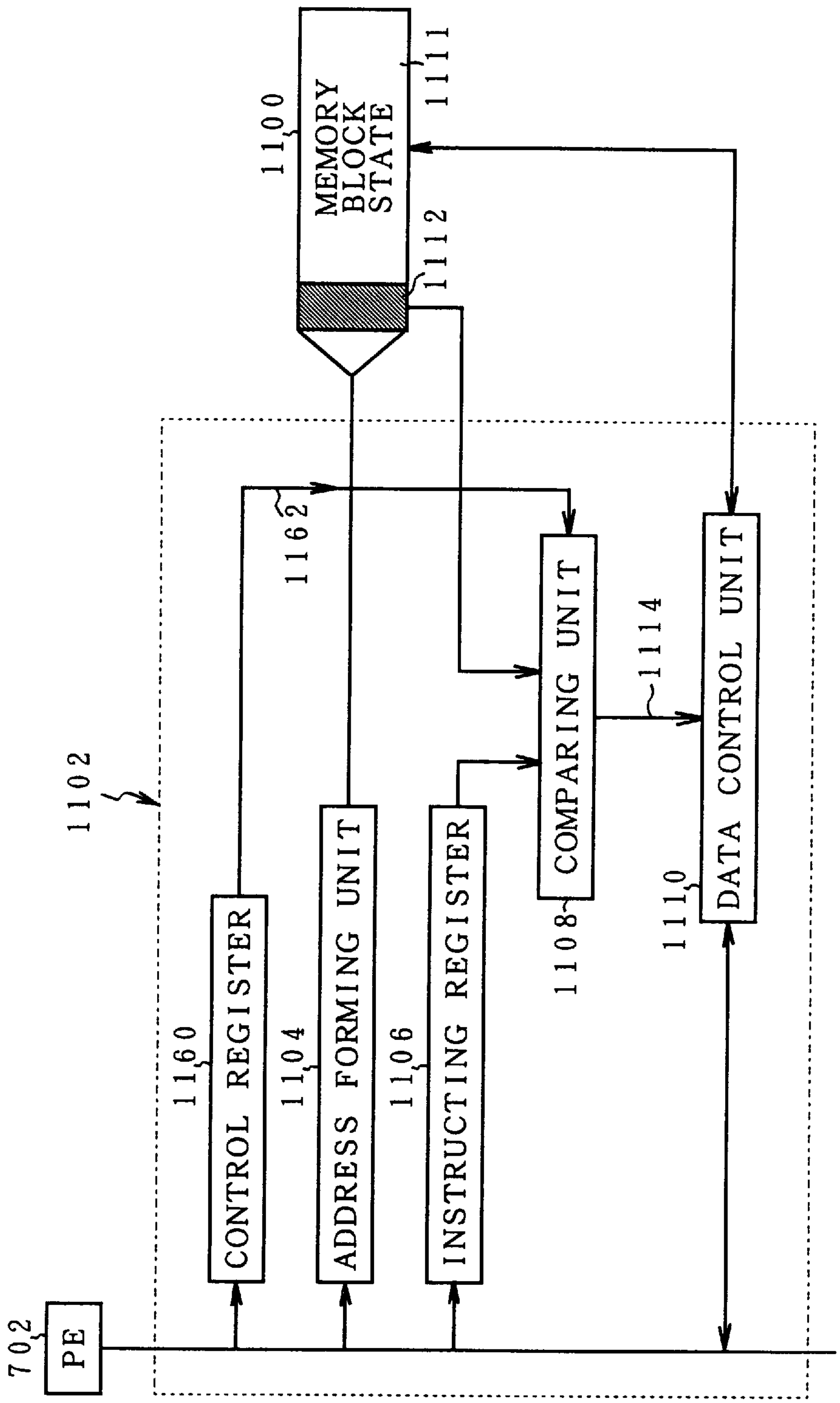
FIG. 88 is a block diagram of a directory memory control unit which can control an inhibition of the invalidating process.

FIG. 88 shows another embodiment of the directory memory control unit 1102 in FIG. 83 and is characterized in that by newly providing a control register 1160, the turn-on of the invalidating instruction 1114 by the comparing unit 1108 can be forcedly inhibited. In case of constructing the TMR unit as an information processor of a high reliability of the invention, it is necessary to instantaneously invalidate the directory memory 1110 during the operation in association with the exchange of the processor. However, in the case where the processor used in the invention is used by another processor, for example, by a single processor, there is a case where it is unnecessary to perform the instantaneous invalidation of the directory memory 1100 as in the TMR unit. In the embodiment of FIG. 88, therefore, when it is used in the TMR unit, the function of the comparing unit 1108 by the value of the control register 1160 is made valid and, in another application which doesn't need the instantaneous invalidation, by changing the value in the control register 1160, the function to instruct the invalidation by the comparing unit 1108 can be cancelled.

Figure 89:
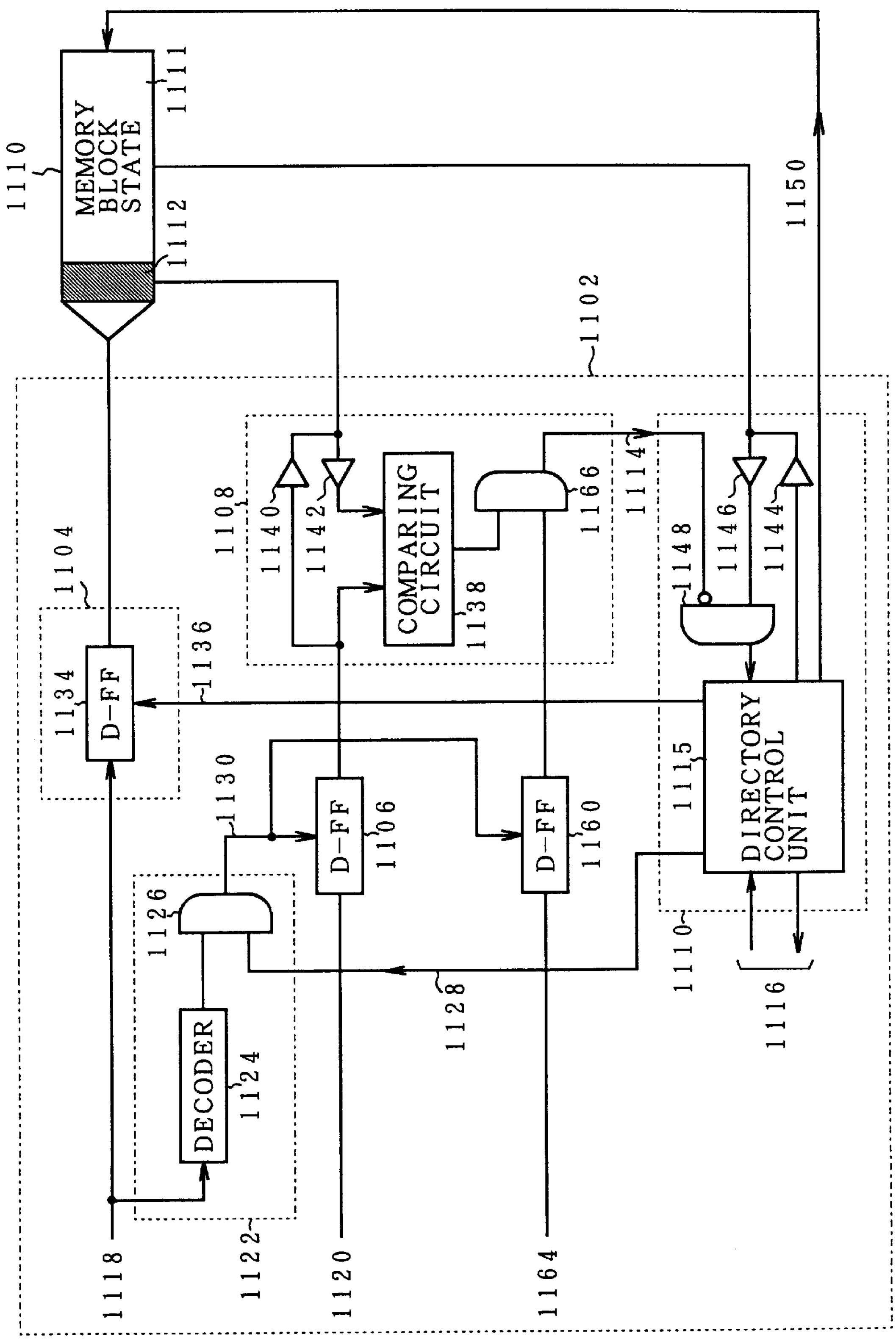
FIG. 89 is a circuit block diagram of the directory memory control unit in FIG. 88.

FIG. 89 is a block diagram constructed by a logic circuit of the directory memory control unit 1102 in FIG. 88. The control register 1160 is newly provided for the directory memory control unit 1102. The value in the control register 1160 can be changed by the data 1164 from the processor element and the register setting instruction 1130 from the register decoding unit 1122 based on the register writing instruction 1128 from the directory control unit 1110 based on the access information 1116. An output of the control register 1160 is inputted to an AND gate 1166 provided for the comparing unit 1108. An output of the comparing circuit 1138 is inputted to another input of the AND gate 1166. An output of the AND gate 1166 is sent as an invalidating instruction 1114 to the data control unit 1110. In case of using the directory memory control unit 1102 as a processor of the TMR unit of the invention, bit 1 is written into the control register 1160, a control output to the AND gate 1166 is turned on, and the AND gate 1166 is set into a permission state. Therefore, in the invalidating process, an output of an invalidation instructing signal due to the dissidence in the comparing circuit 1138 is turned on and is effectively inputted to the data control unit 1110. The directory memory 1100 is invalidated. On the other hand, when the instantaneous invalidation of the directory memory 1110 during the use is unnecessary due to the use by the unit other than the TMR unit, bit 0 is stored in the control register 1160 and the control output to the AND gate 1166 is turned off. Thus, the AND gate 1166 is set into an inhibition state and the invalidating instruction 1114 to the data control unit 1110 is turned off irrespective of ON/OFF of the output in the comparing circuit 1138. The value in the memory block state field 1111 which was read out from the directory memory 1100 can be always effectively handled.

Figure 90:
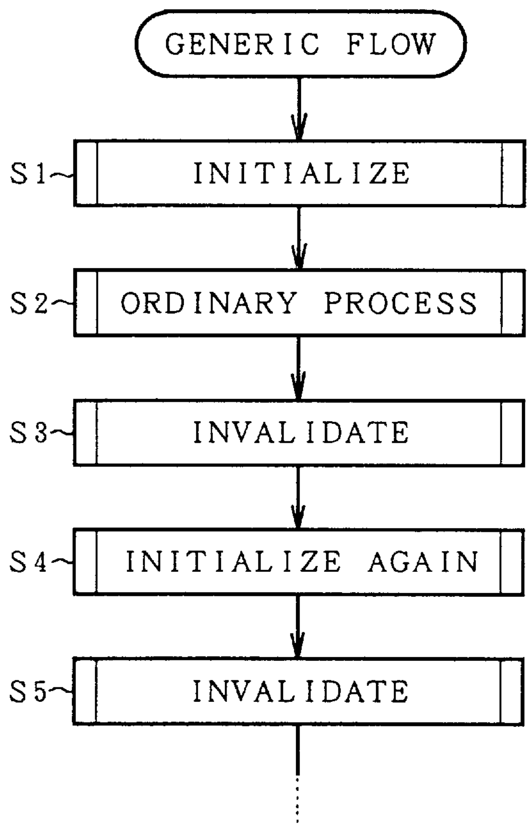
FIG. 90 is a generic flowchart for the invalidation of a plurality of number of times during the operation and an initializing process.

In case of using the processor 10-1 of the directory system shown in FIG. 82 in the TMR unit, there is a case where the operator desires to perform the invalidation a plurality of number of times in accordance with a system construction. In this case, in the directory memory control unit 1102, when the directory memory 1100 is invalidated once, the specific bit 1112 is changed to the value β of the instructing register 1106 which was changed for invalidation. Therefore, if the instructing register 1106 is returned to the original value α by the end of the invalidation and, after that, the value of the instructing register 1106 is again changed to β in order to again invalidate, since the specific bit 1112 has been set to β due to the first invalidation, all of the inputs of the comparing unit 1108 coincide due to the invalidation of the second time. The invalidating instruction 1114 is turned off. The invalidating process cannot be performed. Therefore, in order to perform the invalidation a plurality of number of times during the operation, after completion of the invalidation of the directory memory 1100, an initializing process to return the changed value β of the specific bit 1112 to the original value α is necessary. The re-initializing process to return the specific bit 1112 to the original value α is executed for a time interval during which the processor is operating as a TMR unit. Therefore, as shown in FIG. 83, if it is performed by the access information and the instruction of the entry address from the processor element 702, a burden on the processor element 702 increases and the performance of the multiplexing process as a TMR unit deteriorates. Therefore, as shown in a generic flowchart of FIG. 90, after the initialization in step S1, an ordinary process is executed in step S2. In step S3, the first invalidation by the exchange of the processor and the like is executed. After that, the initializing process is again performed in step S4. Subsequently, the invalidation of the second time is executed in step S5. In such a case, in order to reduce the burden on the processor element in the re-initialization during the operation in step S4, an initializing circuit as a hardware is provided on the directory memory control unit 1102 side as shown in the embodiment of FIG. 91.

Figure 91:
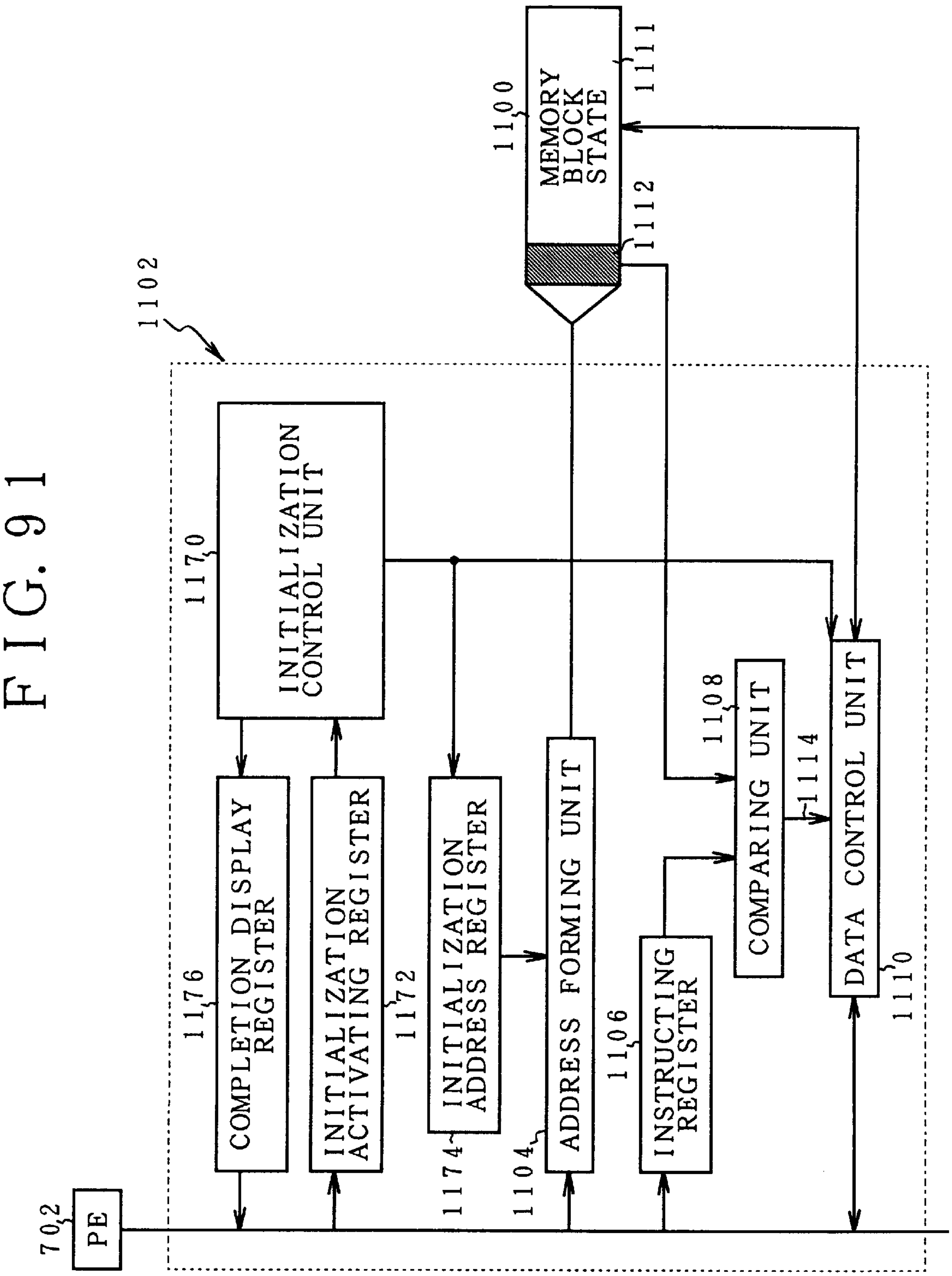
FIG. 91 is a block diagram of a directory memory control unit for performing the initializing process during the operation.

In FIG. 91, the directory memory control unit 1102 has the address forming unit 1104, instructing register 1106, comparing unit 1108, and data control unit 1110 in a manner similar to the embodiment of FIG. 83. In addition to them, an initialization control unit 1170, an initialization activating register 1172, an initialization address register 1174, and a completion display register 1176 are provided for the directory memory control unit 1102 as a hardware for the initializing process of the directory memory 1100. By changing the value of the instructing register 1106 from α to β by the directory memory control unit 1102, when the invalidation of the directory memory 1100 is finished, the processor element 702 writes a value indicative of an initializing instruction into the initialization activating register 1172. By receiving an output by the writing to the initialization activating register 1172, the initialization control unit 1170 starts the initialization. In the initializing operation, the head address in the directory memory 1100 is first set into the initialization address register 1174 and the directory memory 1100 is read through the address forming unit 1104. By the reading, the specific bit 1112 and the value of the instructing register 1106 are compared by the comparing unit 1108. At this time, the specific bit 1112 in the directory memory 1100 has been set to the change value β by the invalidation of the first time. The value in the instructing register 1106 has been returned to the original value α. Therefore, the comparing unit 1108 turns on the invalidating instruction 1114 by the dissidence. The data control unit 1110 which received the turn-on of the invalidating instruction 1114 sets the value of the specific bit 1112 of the read data to be equal to the value α of the instructing register 1106 and changes the memory block state field 1111 to the initial state and again writes. The above initializing process is executed with respect to all of the entries in the directory memory 1100. After completion of the processes, the value indicative of the completion is written into the completion display register 1176 and is notified as a response to the status command from the processor element 702. After completion of the initialization during the operation of the directory memory 1100 as mentioned above, the invalidation of the directory memory 1100 by changing the value of the instructing register 1106 from α to β can be again executed.

Figure 92:
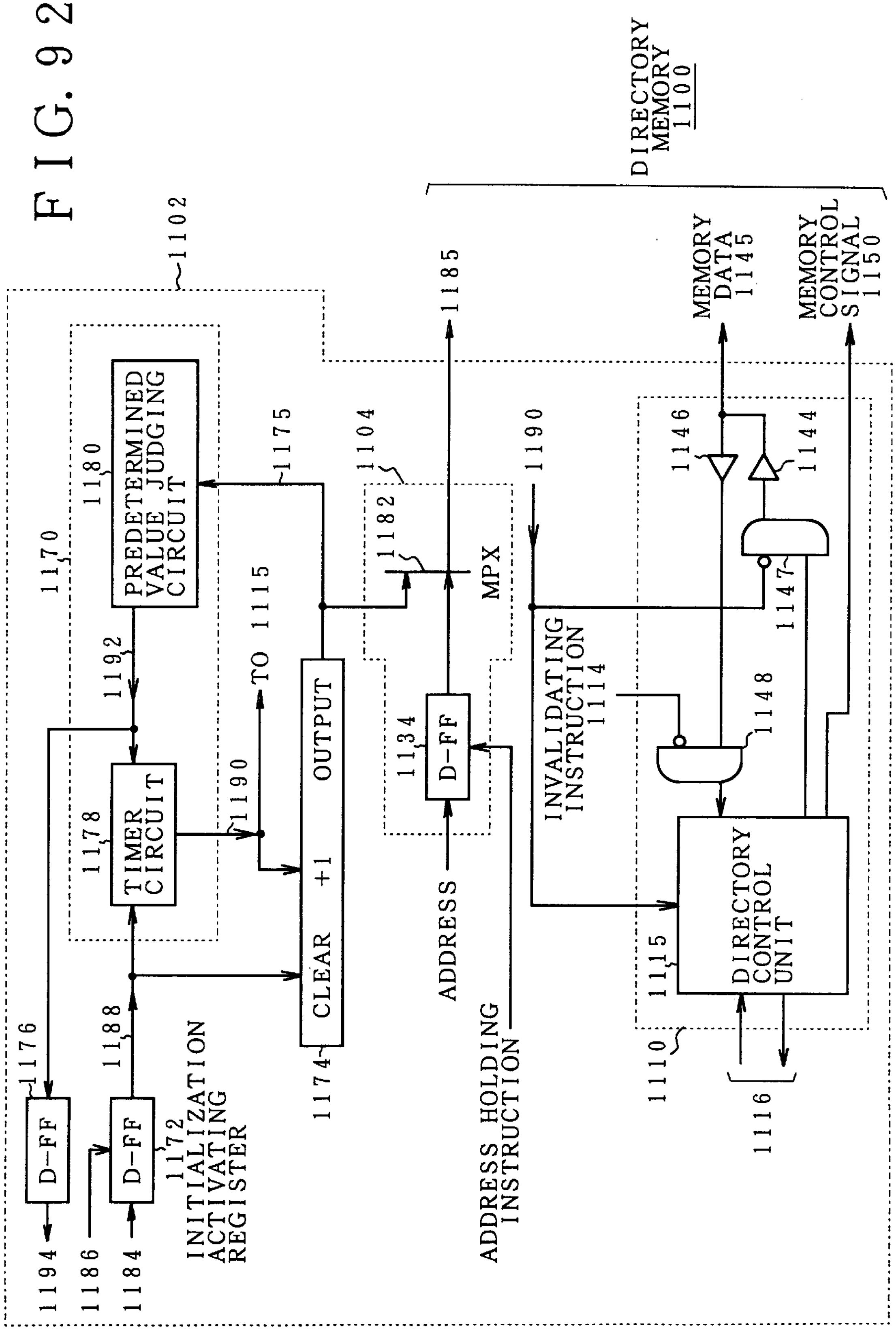
FIG. 92 is a circuit block diagram of the directory memory control unit in FIG. 91.

FIG. 92 is a block diagram of the logic circuit of the directory memory control unit 1102 in FIG. 91. Data 1184 sent from the processor element is held in the initialization activating register 1172 at a timing of a register setting instruction 1186 from the directory control unit 1115 based on the access information 1116 from the processor element, so that a starting instruction 1188 to the initialization control unit 1170 is turned on. At the same time, the turn-on of the initialization starting instruction 1188 clears the initialization address counter 1174 which operates as an address counter. A timer circuit 1178 and a predetermined value judging circuit 1180 are provided for the initialization control unit 1170. When receiving the starting instruction 1188 in the on state, the timer circuit 1178 is activated, and after that, outputs an initializing instruction 1190 at a predetermined period. The initializing instruction 1190 is sent to the directory control unit 1115 and the directory memory 1100 is initialized and updated. In this instance, a directory memory address 1185 is supplied from the initialization address register 1174 through a multiplexer 1182. Upon invalidation, the multiplexer 1182 is switched to the D-FF 1134 side and outputs the address 1118 from the processor element as a directory memory address 1185. Memory data 1145 obtained by the memory control signal 1150 to the directory memory 1100, namely, the read data is inputted to the AND gate 1148 through a driver 1146. In this instance, although not shown, the same comparing unit 1108 as that in FIG. 88 is provided for the directory memory control unit 1102 and compares the value of the specific bit 1112 in the directory memory 1100 with the value in the instructing register 1106. Although the value of the instructing register 1106 is equal to α, the value of the specific bit 1112 in the directory memory 1100 is equal to β due to the invalidation. Since those values don't coincide, the invalidating instruction 1114 is turned on, thereby setting the AND gate 1148 into an inhibition state. Therefore, the memory data 1145 by the reading from the directory memory 1100 for the directory control unit 1115 is inputted as (all 0) into the directory control unit. The read data of (all 0) inputted to the directory memory control unit 1115 is sent to the AND gate 1142 by the memory control signal 1150. In this instance, the initializing instruction 1190 is turned on and sets the AND gate 1142 into an inhibition state. Therefore, the write data from the directory control unit 1115 is set to (all 0) and is supplied as memory data 1145 to the directory memory 1100 by the driver 1144 and is written. Thus, the same (α=0) as that in the instructing register is written into the specific bit 1112 in the directory memory 1100 and (all 0) is also written into the whole block state field 1111. After completion of the writing, when the timer 1178 provided for the initialization control unit 1170 again turns on the initializing instruction 1190, the initialization address register 1174 is set to +1 and designates the next memory address. The predetermined value judging circuit 1180 provided for the initialization control unit 1170 compares a memory address 1175 in the initialization address register during the initialization with the predetermined maximum address in the directory memory 1100. Therefore, when the predetermined value judging circuit 1180 judges that the memory address 1175 coincides with the maximum address in the directory memory 1100, an initialization completing instruction 1192 is turned on, the timer circuit 1178 is reset, and the initializing operation is stopped. At the same time, the initialization completion instruction is set into the D-FF 1176 as a completion display register and is notified as data 1194 to the processor element. The notification to the processor element of the value of the completion display register 1176 can be performed by a method such that the processor element periodically refers to the completion display register 1176 by issuing a status command or the like or that an output of the completion display register 1176 is used as an interruption to the processor element.

Figure 93:
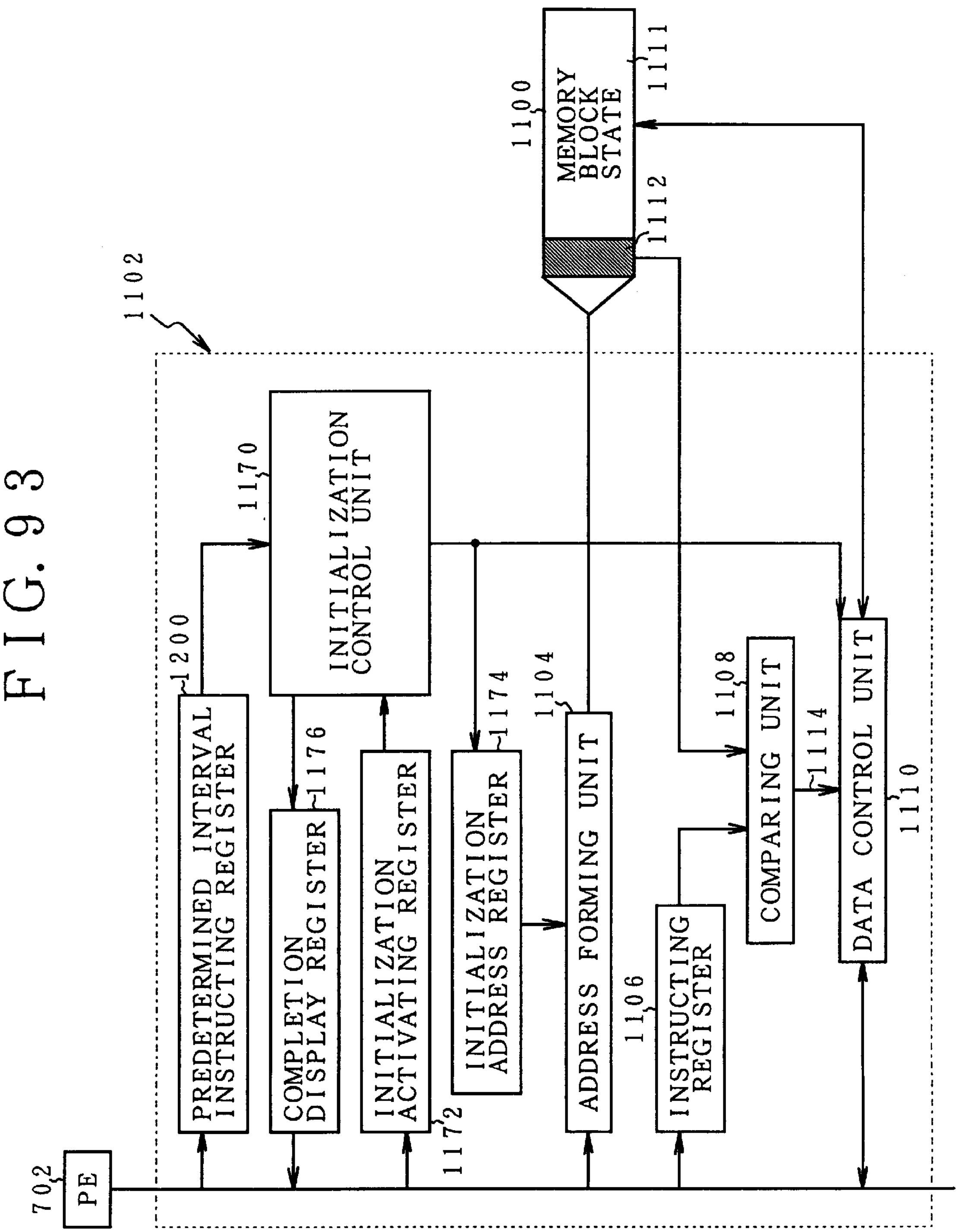
FIG. 93 is a block diagram of a directory memory control unit which can control a time interval of the initializing process of an entry unit.
Figure 94:
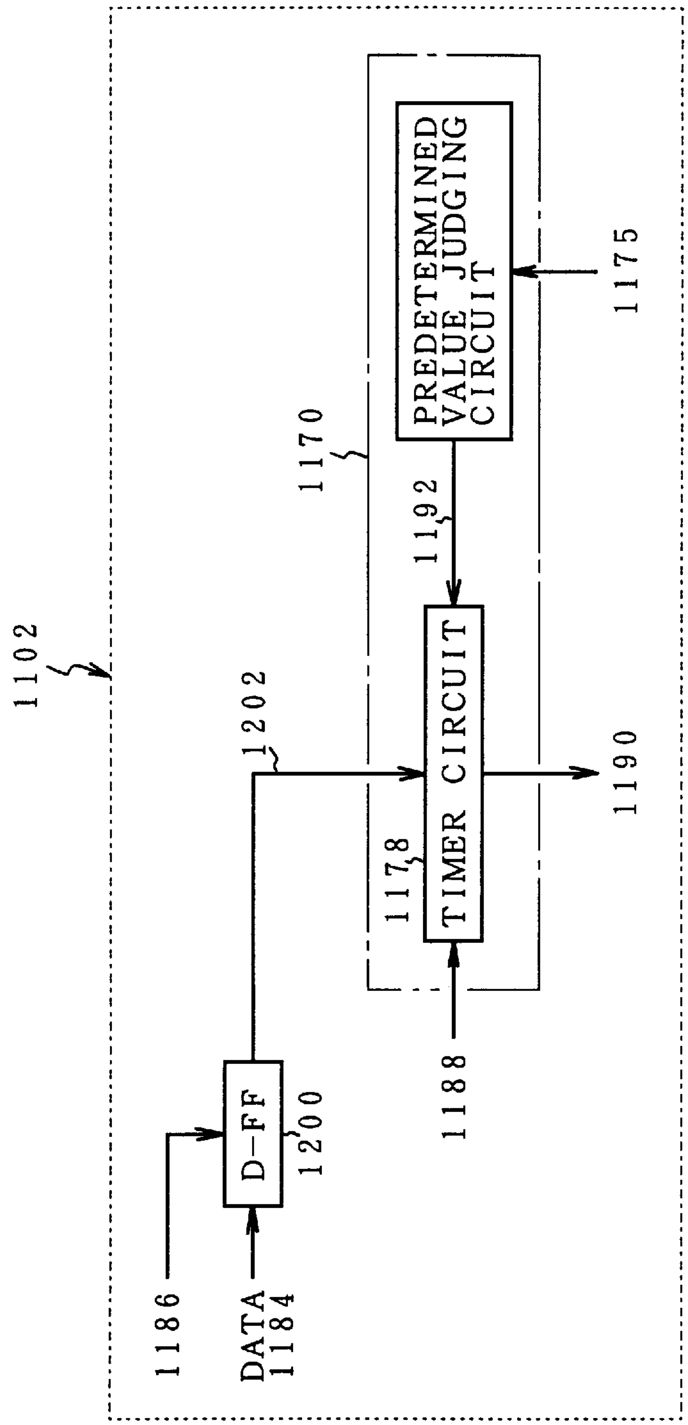
FIG. 94 is a circuit block diagram of a control portion of the time interval in FIG. 93.

FIG. 93 shows a modification of FIG. 91 and is characterized in that an interval of the initializing process for the directory memory 1100 can be arbitrarily set by the value from the processor element. Namely, in the initialization control unit 1170 in FIG. 91, although the initialization period has been fixedly determined by the timer circuit 1178 as shown in FIG. 92, if an accessing interval of the directory memory 1100 is too short, the memory access from the processor element 702 is busy and becomes a cause of deterioration of the performance. When the accessing interval is too long, it takes a too long time for initialization. Further, the optimum value of the accessing interval for the initializing process changes even depending on the system or the operation form. In the embodiment of FIG. 93, therefore, the period of the accessing interval of the initializing process can be set by an instruction from the processor element 702 as necessary. In the embodiment of FIG. 93, a predetermined interval instructing register 1200 is newly provided for the embodiment of FIG. 91. The details of the register 1200 will now be explained. As shown in the directory memory control unit 1102 in FIG. 94, a timer circuit in which the timer period of the timing circuit 1178 provided for the initialization control unit 1170 can be externally set is used, thereby enabling the timer period to turn on the initializing instruction 1190 to be varied by the setting of predetermined interval information 1202 from the predetermined interval instructing register 1200. The data 1184 from the processor element 702 is held in the predetermined interval instructing register 1200 at a timing for turning on the register setting instruction 1186. The timer period of the timer circuit 1178 can be determined by the data 1184. The other construction is substantially the same as that of the logic circuit in FIG. 91.

Figure 95:
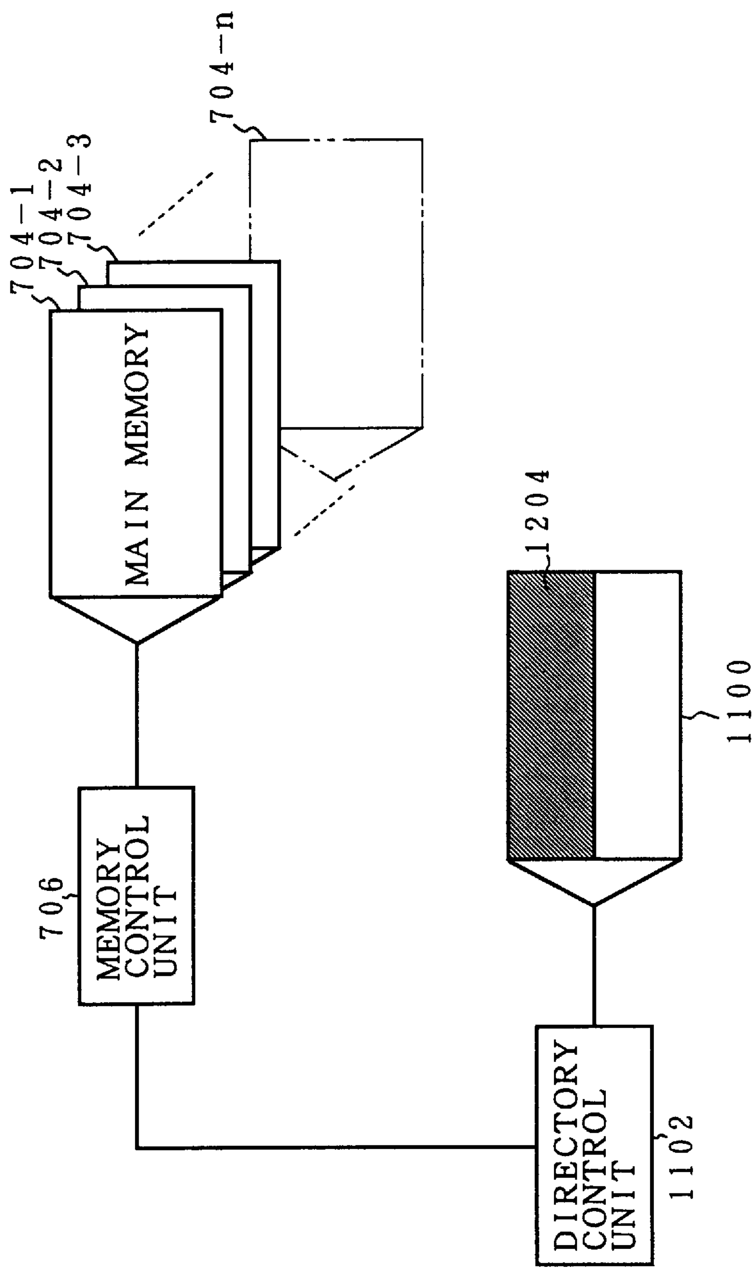
FIG. 95 is an explanatory diagram of an installing state of a main memory and a using state of a directory memory.

FIG. 95 shows a using state of the directory memory 1100 for an installing state of the main memory 704 in the processor 10-1 in FIG. 82. Ordinarily, the main memory has a structure, for example, which can expand to (n) main memories 704-1 to 704-n. A capacity largely differs depending on the number of memories which are installed. On the other hand, the directory memory 1100 has a memory capacity corresponding to the maximum capacity of the main memory. In such a construction of the expandable main memory, it is a rare case that the maximum number of main memories are installed in the actual system.

Figure 96:
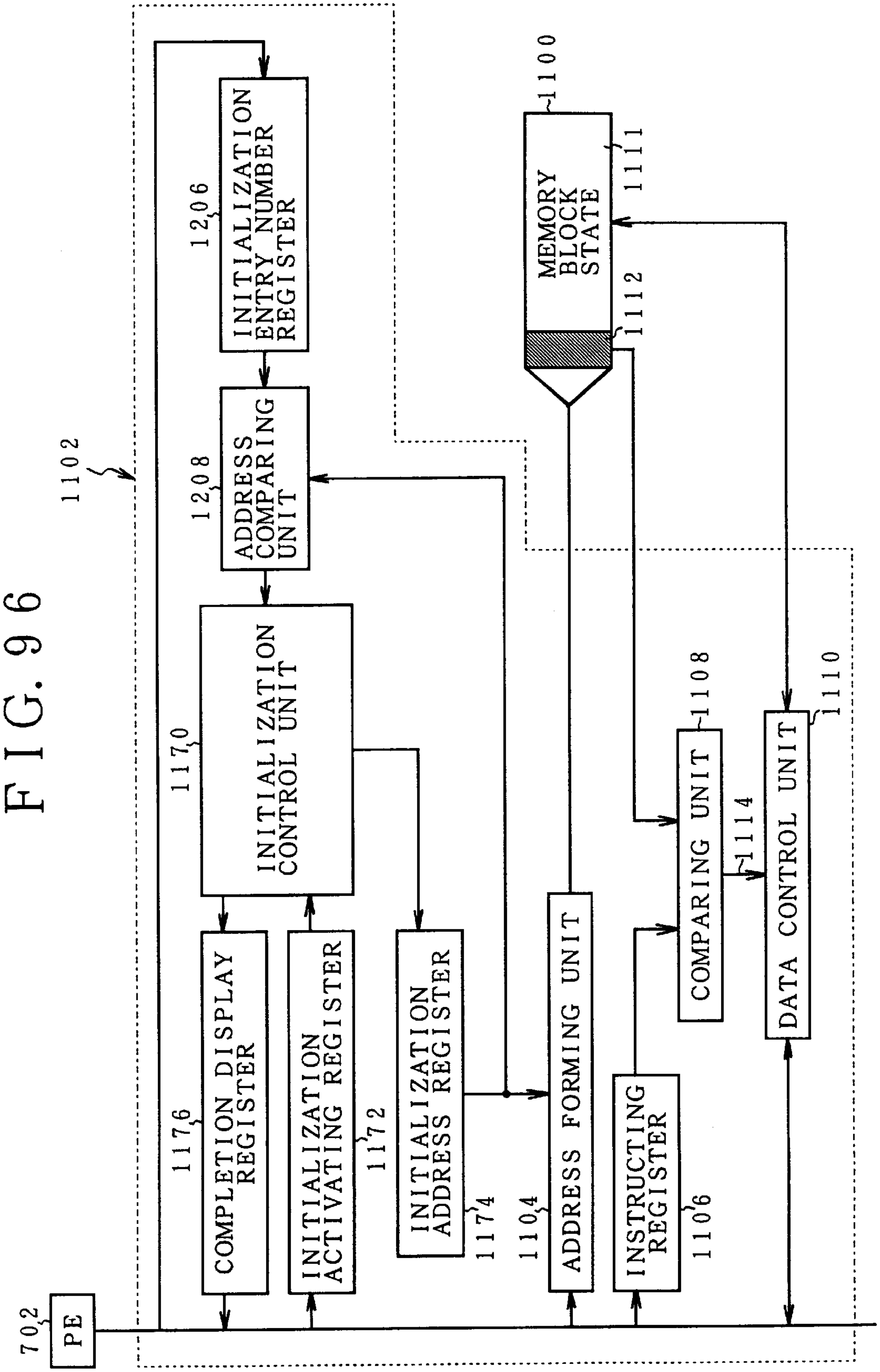
FIG. 96 is a block diagram of a directory memory control unit for initializing a region according to a main memory installation.

In the example of FIG. 95, the three main memories 704-1 to 704-3 are installed and the using state of the directory memory 1100 for the installing state is set to a hatched use region 1204. In such a case, it is vain to initialize the whole region by the initialization of the directory memory 1100. It is sufficient to initialize only the use region 1204. In the embodiment of FIG. 96, therefore, the initializing processes of the number as many as the number of initialization entries corresponding to the number of main memories installed are enabled from the head address in the directory memory 1100. An initialization entry number register 1206 and an address comparing unit 1208 are newly provided for the directory memory control unit 1102 in FIG. 96 in addition to the embodiment of FIG. 91. The initialization entry number corresponding to the number of main memories installed is stored in the initialization entry number register 1206. The initialization entry number is obtained by dividing the installation capacity of the main memories by the block capacity of the directory system. The address comparing unit 1208 compares the value in the initialization address register 1174 which is updated by the initializing process by the initialization control unit 1170 with the value in the initialization entry number register 1206 indicative of the initialization end position of the directory memory. When they coincide, the address comparing unit 1208 turns on a comparison output, thereby finishing the initializing process by the initialization control unit 1170.

Figure 97:
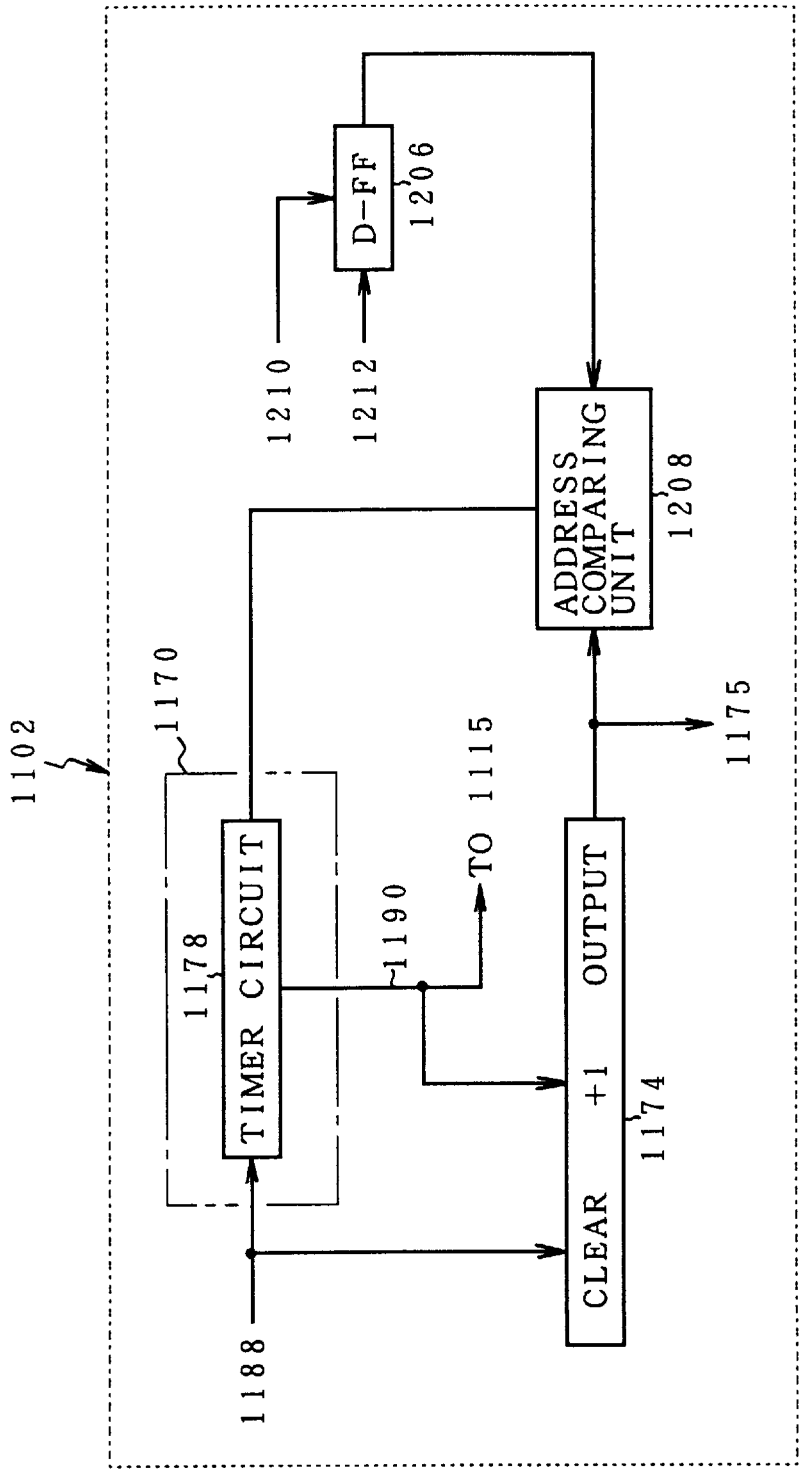
FIG. 97 is a circuit block diagram of an initializing portion of a specific region in FIG. 96.

FIG. 97 shows a logic circuit of a portion of the initialization control unit 1170, address comparing unit 1208, and initialization entry number register 1206 in the directory memory control unit 1102 in FIG. 96. First, data 1212 indicative of the initialization entry number is supplied to the initialization entry number register 1206 by an instruction from the processor element and is held at a timing of the turn-on of the register setting instruction 1210. The initialization entry number held in the initialization entry number register 1206 is inputted to the address comparing unit 1208. On the other hand, in the embodiment, the initialization control unit 1170 has only the timer circuit 1178 and is activated by the turn-on of the starting instruction 1188 from the initialization activating register 1172, turns on the initializing instruction 1190 at a predetermined timer period, and outputs the instruction 1190 to the initialization address register 1174 and directory control unit 1115 (not shown). The present initialization address 1175 in the initialization address register 1174 is compared with the value in the initialization entry number register 1206 by the address comparing unit 1208. When they coincide, the initialization completion instruction 1192 is turned on. By resetting the timer 1178, the initializing process is finished.

Figure 98:
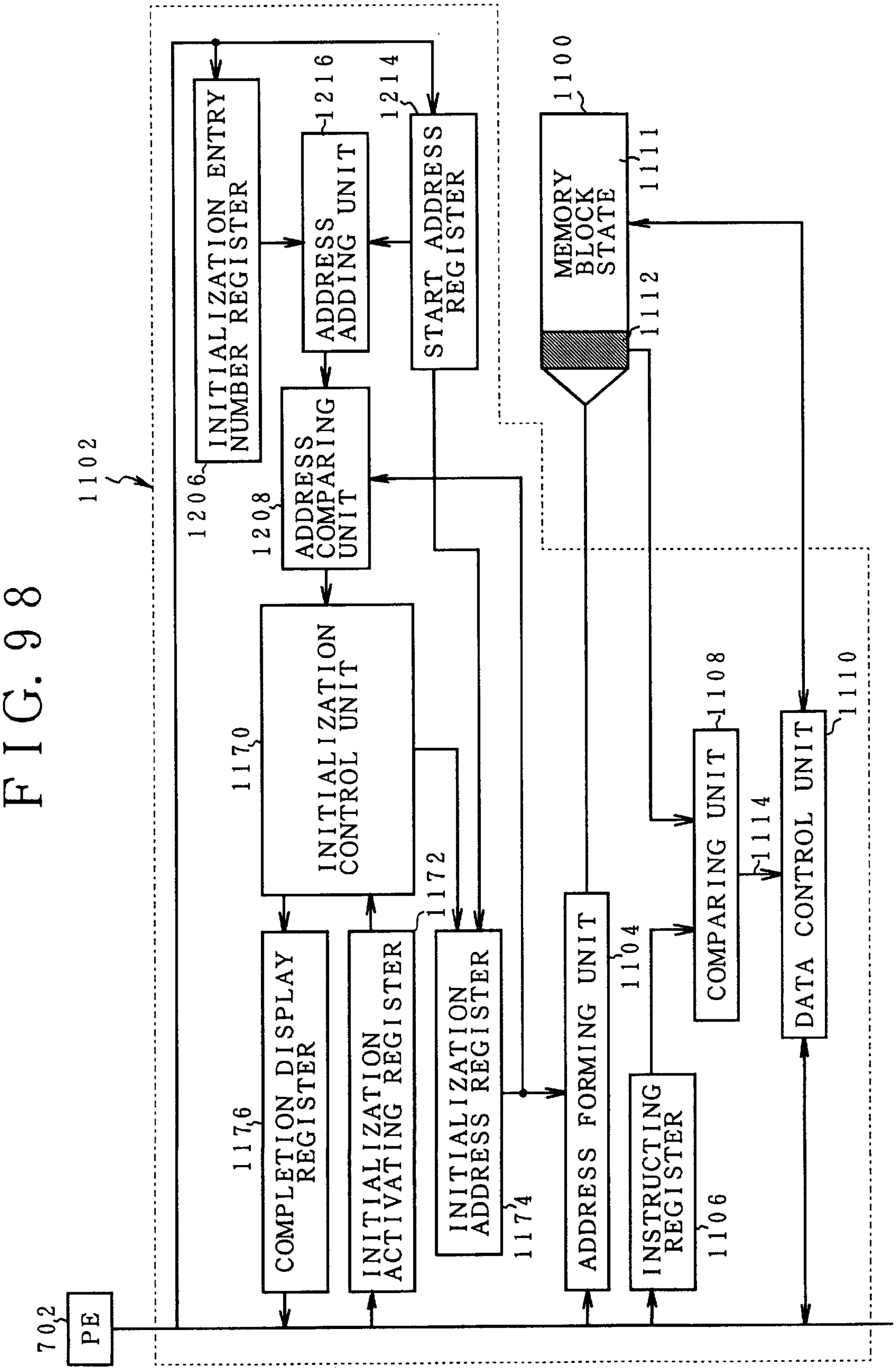
FIG. 98 is a block diagram of a directory memory control unit for initializing a region according to a discontinuous main memory installation.

FIG. 98 shows a modification of FIG. 96 and is characterized in that a region of an arbitrary directory memory is specified and the initializing process is executed in correspondence to that the installing state of the main memory is distributed. Namely, there is a case where the installation addresses in the main memories as in FIG. 95 are intermittently distributed instead of continuously. In such a case, if the initializing operation in a range from address 0 to the maximum address in the directory memory is executed, it takes a time. Therefore, it is necessary to perform the initialization for the regions which were partially distributed. In the embodiment of FIG. 98, accordingly, a start address register 1214 and an address adding unit 1216 are further added to the initialization entry number register 1206 in FIG. 96. An arbitrary initialization start address can be written into the start address register 1214 by an instruction from the processor element 702. The initialization entry number of the use region in which the start address in the initialization address register 1214 is set to a start point is stored in the initialization entry number register 1206. The initialization entry number in the start address register 1214 is sent to the initialization address register 1174 and the start address is formed. The start address is added to the value in the initialization entry number register 1206 by the address adding unit 1216, so that an initialization end address is calculated and set into the address comparing unit 1208. The address comparing unit 1208 compares an initialization target address which is outputted every initialization from the initialization address register 1174 with an initialization end address from the address adding unit 1216. When they coincide, the control of the initialization control unit 1170 is stopped.

Figure 99:
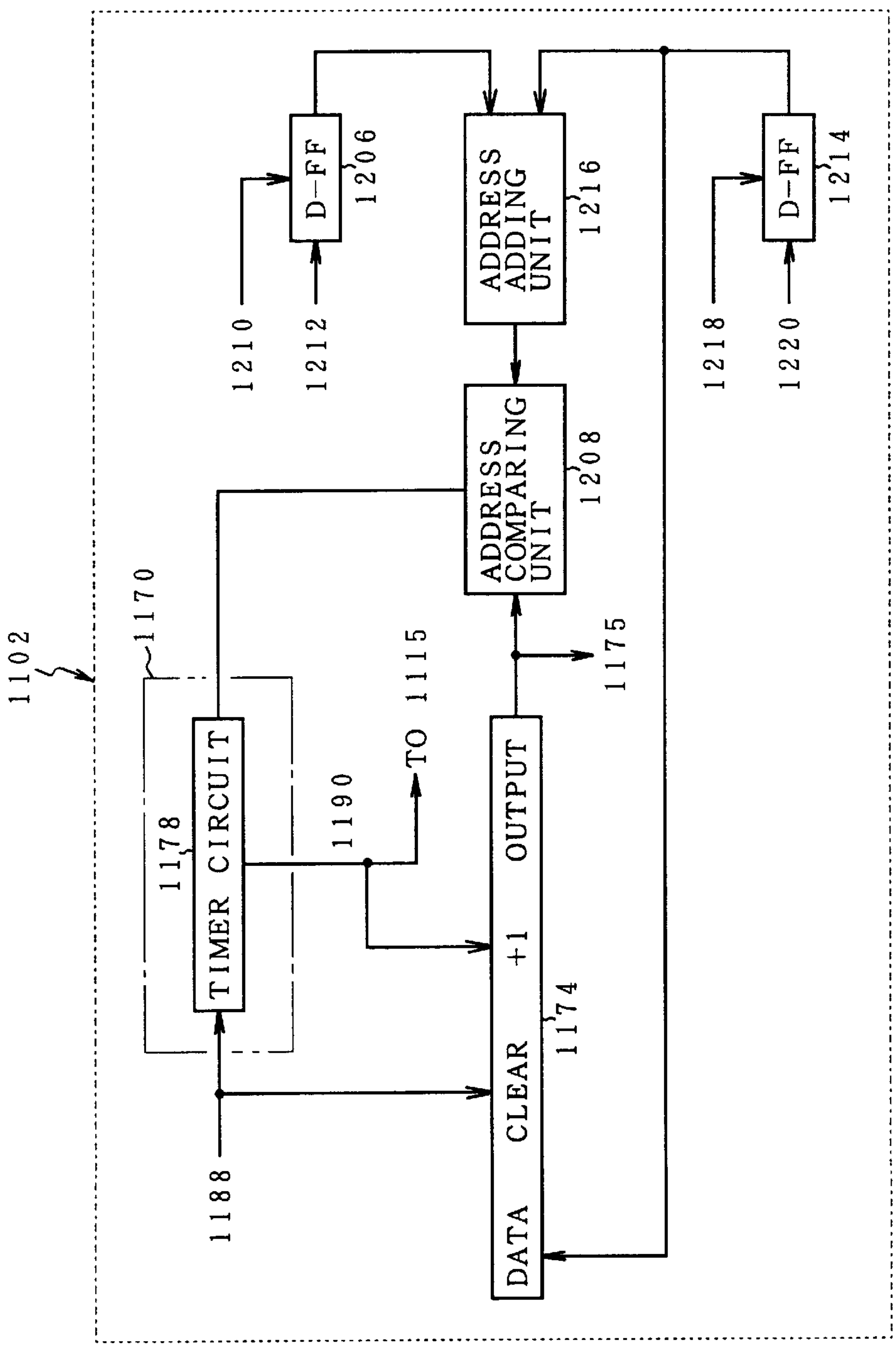
FIG. 99 is a circuit block diagram of an initializing portion of a specific region in FIG. 98.

FIG. 99 shows a logic circuit with respect to the initialization control unit 1170, address comparing unit 1208, initialization entry number register 1206, start address register 1214, and address adding unit 1216 in FIG. 98. Namely, the start address register 1214 using a D-FF and the address adding unit 1216 are newly provided for the circuit of FIG. 96. The start address by data 1220 stored by the turn-on of the register instruction 1218 is stored in the start address register 1214 as data for the initialization address register 1174 and is used as a counter initial value. Therefore, by the turn-on of the initializing instruction 1190 at a predetermined period from the timer 1178 provided for the initialization control unit 1170, the initialization address register 1174 starts to count from the start address set in the start address register 1214 and executes the initialization from the start address. When the address comparing unit 1208 judges that the initialization address coincides with the initialization end address which is outputted from the address adding unit 1216, the initialization completing instruction 1192 is turned on, the timer 1178 is turned off, and the initializing process is finished.

Figure 100:
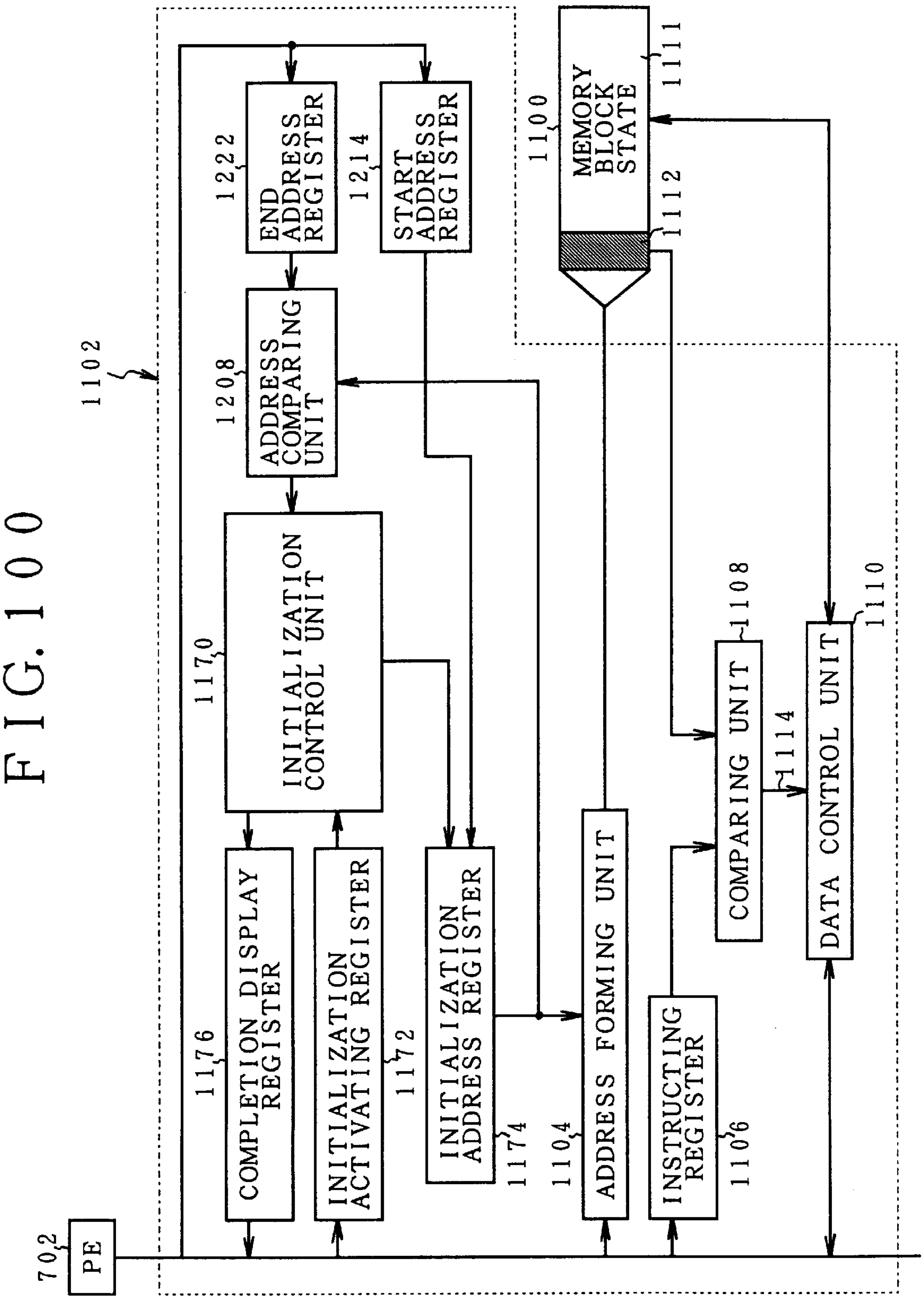
FIG. 100 is a block diagram of a directory memory control unit in which the setting of an initialization end address in FIG. 98 is simplified.

FIG. 100 shows a modification of FIG. 98. To simplify the hardware construction, FIG. 100 is characterized in that an end address register 1222 to set an end address of the initialization in the directory memory 1100 from the processor element 702 is provided. The other construction is substantially the same as that in FIG. 98.

Figure 101:
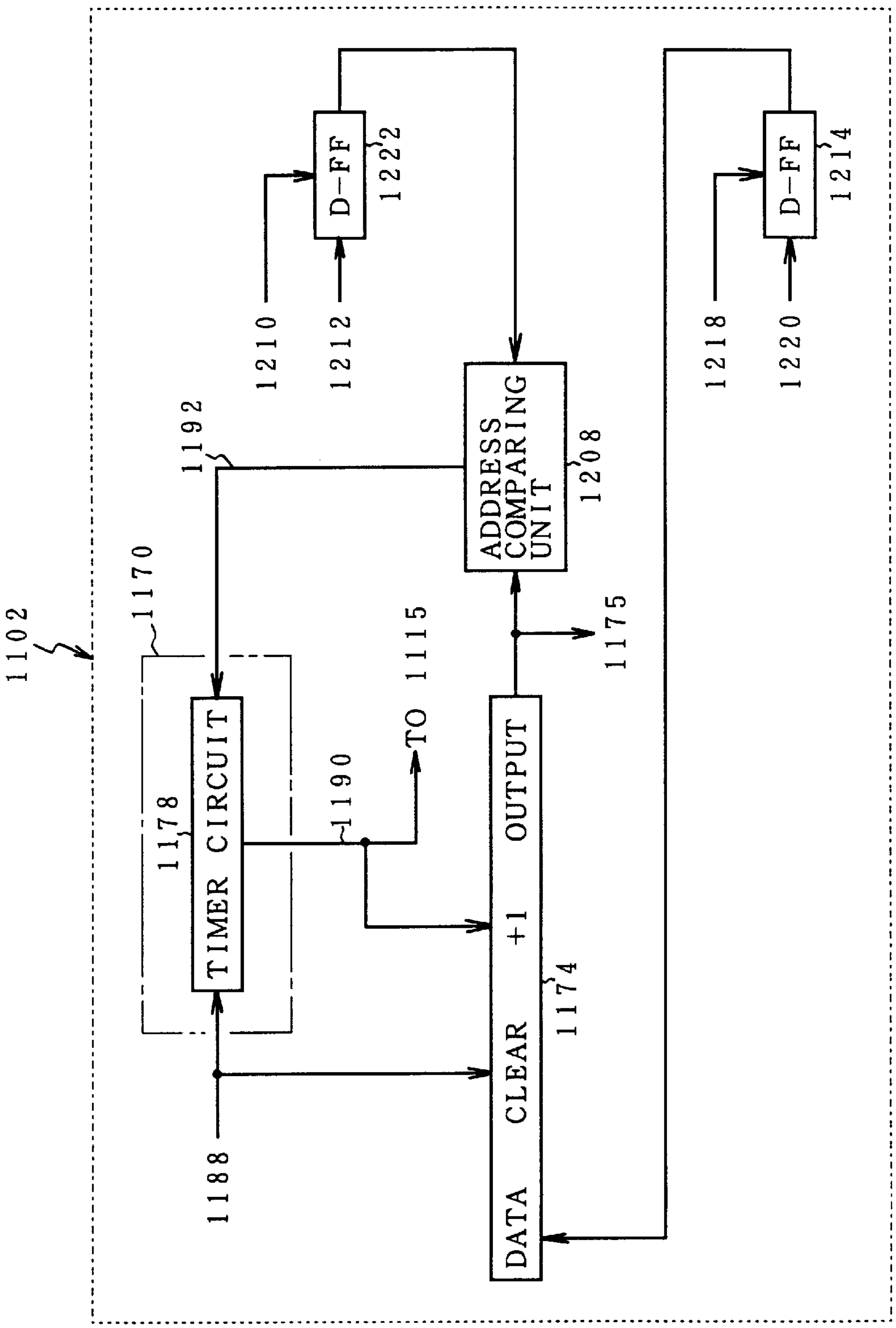
FIG. 101 is a circuit block diagram of an initializing portion of a specific region in FIG. 100.

FIG. 101 shows a logic circuit showing a portion of the initialization control unit 1170, address comparing unit 1208, end address register 1222, start address register 1214, and initialization address register 1174. When comparing with FIG. 99, according to the logic circuit, only the end address register 1222 is used in place of the initialization entry number register 1206 and adding unit 1216, so that the hardware construction can be simplified. The initialization end address in the directory memory 1100 which is set into the end address register 1222 is calculated as a value obtained by adding the initialization entry number based on the installation memory capacity to the value of the start address according to the installing state of the main memories on the processor element 702 side and is set.

According to the invention as described above, an information processing system having an enough high reliable function can be cheaply realized by a hardware construction of a relatively small scale without preparing a hardware construction of a large scale.

A failure can be certainly detected. Further, when a failure occurs, the failed processor is disconnected and a reduced construction can be reconstructed without stopping all of the processors constructing the multiplex unit, and the processes can be continued while keeping a matching performance of the processing contents.

Even during the copy of the main memory when the failed processor is exchanged to the new processor, the memory access of the master processor is reflected to the memories of the slave processors and exchange processor through the bus transfer by setting the wake-up mode. Thus, the system can be operated without stopping the multiplexing operation by the processors constructing the existing multiplex unit and without causing a dissidence of the memory contents by the copy process. The system stop time at the time of the exchange of the processor can be minimized. The high reliability of an information processor as a fault-tolerant system can be remarkably improved.

Further, since the invalidation is performed on the basis of the dissidence between the specific bit in the directory memory and the value in the instructing register, the whole region in the directory memory can be invalidated by merely changing the instructing register. The invalidation of the directory memory is completed in a very short time. The system stop time when it is operated as a TMR unit is minimized. It largely contributes to the improvement of the performance as an information processor of the high reliability.

What is claimed is:

1. An information processing system comprising:

a multiplex unit which is connected through a bus and has a plurality of processors for simultaneously executing a same processing operation and in which one of said processors is set to a master processor, the remaining processors are set to slave processors, said master processor executes a transmission of formed information to said bus and a fetching of the information on said bus, and said slave processor executes the fetching of the information on said bus;

a mode setting unit for setting a wake-up mode when the processor disconnected from said multiplex unit due to a failure is exchanged to a new processor and a synchronization of clock levels with the processors constructing said multiplex unit is performed; and a memory control unit for allowing a memory access to be executed in said master processor via said bus in a set state of said wake-up mode and for fetching data on said bus and allowing the memory accesses to be executed in said slave processors and said exchange processor.

2. A system according to claim 1, wherein in the set state of said wake-up mode, in the case where there is a read access to a memory from the processor, said memory control unit of said master processor transfers read data from the memory to said bus and, at the same time, fetches the read data from said bus and transfers to said processor, and in the case where there is a read access to the memory, each memory control unit of said slave processors and said exchange processor fetches the read data from said bus transferred by said master processor.

3. A system according to claim 2, wherein in the set state of said wake-up mode, in the case where there is a write access to the memory from the processor, said memory control unit of said master processor transfers write data in the memory to said bus and, at the same time, fetches the write data from said bus and transfers and writes into said memory, and in the case where there is a write access to the memory, each of the memory control units of said slave processors and the exchange processor fetches the write data from said bus transferred by said master processor and writes into the memory.

4. An information processing system comprising:

a multiplex unit which is connected through a bus and has a plurality of processors for simultaneously executing a same processing operation and in which one of said processors is set to a master processor, the remaining processors are set to slave processors, said master processor executes a transmission of formed information to said bus and a fetching of the information on said bus, and said slave processor executes the fetching of the information on said bus;

a directory memory in which directory information indicative of a state of each memory block of a main memory divided into a predetermined block size has been stored and, further, a specific value has been written into a specific bit of said directory information upon initialization of the system by a turn-on of a power source;

an instructing register in which the same value as the specific bit of said directory information has been stored;

a data control unit for comparing the value of said specific bit with said instructing register value when said directory information is read out, for making said directory information valid when those values coincide, and for updating said directory information to an "invalid" state indicating that the data in a main memory is newest and doesn't exist in the other portions when said values don't coincide; and an invalidating unit for changing the value in said instructing register to another value when said processor is exchanged, thereby invalidating all of the contents in said directory memory.

5. A system according to claim 4, further has a control register for inhibiting the invalidating process of said directory memory by the data control unit, and even when the value in said instructing register and the value of the specific bit of said directory information don't coincide, said directory information is made valid.

6. A system according to claim 4, further comprising:

an initialization activating register;

an initialization completion display register; and an initialization control unit for allowing said data control unit to start the initializing operation of said directory memory when a predetermined value is written into said initialization activating register by the processor, for writing the same value as that in said instructing register into the specific bit in said directory memory and writing a value indicative of the "invalid" state into the other bits during the initializing operation, and for writing a value indicative of a completion of the initialization into said completion display register after completion of the writing into all regions in said directory memory, and wherein subsequent to the invalidation of said directory memory, the directory memory is initialized, thereby enabling the invalidation to be executed a plurality of number of times.

7. A system according to claim 6, further having a time interval instructing register for designating a time interval of the initializing operation of an entry unit of said directory memory by said initialization control unit.

8. A system according to claim 6, further comprising:

an initialization entry number register for instructing an initialization entry number in said directory memory corresponding to an installation number of said main memories; and an address comparing unit for instructing an end of the initializing operation to said initialization control unit when an initialization target address which is updated during the initializing operation coincides with an address number that is instructed by said initialization entry number register, and wherein the initialization of a region of said directory memory corresponding to the installation of said main memories is enabled.

9. A system according to claim 8, further comprising:

a start address register for instructing an initialization start address; and an address adding unit for adding the initialization entry number that is instructed by said initialization entry register to the start address that is instructed by said start address register, thereby obtaining an initialization end address, and wherein in said address comparing unit, when the initialization target address which is updated during the initializing operation coincides with the address from said adding unit, an end of the initializing operation is instructed to said initialization control unit, thereby enabling the initialization of discrete regions in said directory memory corresponding to the installation of said main memories.

10. A system according to claim 8, further comprising:

a start address register for instructing an initialization start address;

an end address register for instructing an initialization end address, and wherein in said address comparing unit, when the initialization target address which is updated during the initializing operation coincides with said initialization end address, an end of the initializing operation is instructed to said initialization control unit, thereby enabling the initialization of an arbitrary region in said directory memory corresponding to the installation of said main memories.

11. An information processing system including a bus and comprising:

a multiplex unit coupled to the bus and comprising:

processors coupled to the bus and simultaneously executing an identical processing operation, one of said processors being a master processor outputting information to the bus and fetching information from the bus, the remaining of said processors being slave processors fetching the information from said bus, each of said processors comprising:

a memory control unit executing a memory access in said master processor via said bus in a wake-up mode and fetching data on said bus, and executing memory accesses in said slave processors and a new processor, said memory control unit comprising:

a multiplex control circuit detecting a failure when the information formed by each of said processors and the information output onto said bus is compared, thereby allowing an internal circuit to execute a necessary process; and a mode setting unit setting the wake-up mode when one of the processors is disconnected from said multiplex unit due to a failure and is replaced with the new processor, and synchronizing clock levels with the processors in said multiplex unit.

12. A system according to claim 11, wherein said multiplex control circuit comprises an information coincidence judging circuit detecting a dissidence between the information output onto said bus and the information formed by each of said processors, said dissidence being detect by the information coincidence judging circuit when the information formed by each of said processors is output by each of said processors.

13. A system according to claim 11, wherein said multiplex control circuit comprises:

an output timing forming circuit forming a timing signal indicative of an information output timing when the information formed is output onto said bus, a timing signal output circuit outputting said timing signal to the other processors by an exclusive-use signal line in a allocating state of the master processor, and a bus information failure detecting circuit outputting a comparison result of the bus information and the output information by the timing signal input from said signal line or a timing signal formed by the processor itself in an allocating state of the master processor and outputting a comparison result of the bus information and the output information by the timing signal from the master processor input from said signal line or the timing signal formed by the processor itself in an allocating state of the slave processor.

14. A system according to claim 11, wherein said multiplex control circuit comprises:

a bus information failure detecting circuit outputting a failure detection result to the other processors by an exclusive-use signal line when the failure is detected by the comparison of the bus information and the output information, and a bus information failure judging circuit forming a failure judgment signal indicative of the failure when a failure detection result from the other processor or a failure detection result of the processor itself is obtained.

15. A system according to claim 11, wherein when the failure of the master processor is detected, the multiplex control circuit of the processor to which the master processor was allocated disconnects a connection with said bus by the processor itself, and in the multiplex control circuit of the processor to which the slave processor was allocated, a new master processor is determined among the remaining processors and reconstructs a reduced multiplex unit.

16. A system according to claim 11, wherein said multiplex control circuit comprises a master information notifying circuit notifying each other of master information indicating each of the processors recognizes which processor is a master processor by inputting and outputting said master information through exclusive-use signal lines.

17. A system according to claim 16, wherein said multiplex control circuit comprises a master information failure judging circuit forming a master failure judgment signal indicative of the processor in which a master information failure occurred on the basis of a comparison result between the master information of the processor itself in said master information notifying circuit and the master information notified from the other processor.

18. A system according to claim 17, wherein when the master information failure judging circuit judges that the master information of the master processor fails, said multiplex control circuit disconnects the failed master processor from the bus, determines a new master processor from the remaining slave processors, and reconstructs a reduced multiplex unit.

19. An information processing system including a bus and comprising:

a multiplex unit coupled to the bus and comprising a plurality of processors simultaneously executing an identical processing operation, one of said processors being a master processor and the remaining processors being slave processors, said master processor executing and fetching a transmission of information on the bus, and said slave processors executing fetching of the information from said bus, each of said processors comprising:

a mode setting unit setting a wake-up mode when the processor is disconnected from said multiplex unit due to a failure and is replaced with a new processor, and synchronizing clock levels with the processors in said multiplex unit;

a memory control unit executing a memory access in said master processor via said bus in a set state of said wake-up mode, and fetching data on said bus and executing the memory accesses in said slave processors and the new processor;

a multiplex control circuit detecting a failure when the output information formed by each of said processors and the bus information output onto said bus is compared, thereby allowing an internal circuit to execute a necessary process; and an existence processor display flag circuit comprising an existence processor display flag indicating which processor is normally operating among the plurality of processors constructing said multiplex unit, and which processor is disconnected from said multiplex unit due to the failure.

20. A system according to claim 19, wherein said multiplex control circuit comprises an output mask circuit masking an output of information from the processor itself by said existence processor display flag which is turned off when the processor itself is disconnected from said multiplex unit and outputting said masked output information.

21. A system according to claim 20, wherein said multiplex control circuit comprises a bus output permission flag circuit setting a bus output permission flag which is turned on in an output permission state to the bus, and said output mask circuit masks the output of the information from the processor itself by said bus output permission flag and outputs the masked output information.

22. A system according to claim 19, wherein said multiplex control circuit comprises an input mask circuit masking the output information from the other processor by said existence processor display flag which is turned off when the processor is disconnected from said multiplex unit and for inputting said masked output information.

23. An information processing system including a bus and comprising:

a multiplex unit coupled to the bus and comprising a plurality of processors simultaneously executing an identical processing operation, one of said processors being a master processor and the remaining processors being slave processors, said master processor executing and fetching a transmission of information on the bus, and said slave processors fetching the information from said bus, each of said processors comprising:

a mode setting unit setting a wake-up mode when the processor is disconnected from said multiplex unit due to a failure and is replaced with a new processor, and synchronizing clock levels with the processors in said multiplex unit;

a memory control unit executing a memory access in said master processor via said bus in a set state of said wake-up mode, and fetching data on said bus and executing the memory accesses in said slave processors and the new processor;

a multiplex control circuit detecting a failure when the information formed by each of said processors and the information output onto said bus is compared, thereby allowing an internal circuit to execute a necessary process, said multiplex control circuit comprising a bus input/output circuit;

a transceiver circuit arranged between the bus input/output circuit and the bus; and a bus failure detecting circuit, provided for the multiplex control circuit of each of said processors, turning on a bus failure possibility flag when a bus failure possibility pattern of normal bus information in the master processor and bus information failure in all of the slave processors is detected, updating the master processor on the basis of the turning-on of said bus failure possibility flag, and suppressing a disconnection of the master processor from said multiplex unit due to said updating.

24. A system according to claim 23, wherein after the master processor is updated on the basis of the turning-on of said flag by a first detection of said bus failure possibility pattern, when the old master processor failure is detected, said bus failure detecting circuit determines that the old master processor failed, thereby disconnecting the old master processor and reconstructing a reduced multiplex unit.

25. A system according to claim 23, wherein a plurality of said buses are provided to construct a multi-bus, and in each of said processors, said bus failure detecting circuit is provided for each of said multiplex control circuits each of which is provided for every bus, and after the master processor is updated on the basis of the turning-on of said flag due to the first detection of said bus failure possibility pattern, when said bus failure possibility pattern is again detected, said bus failure detecting circuit disconnects all of the processors connected to said buses, thereby allowing the system to operate as a reduced multi-bus construction.

26. A system according to claim 23, wherein when an ON state continues without failure for at least a predetermined time, said bus failure detecting circuit resets said bus failure possibility flag.

* * * * *